United States Patent
Yamamoto et al.

(10) Patent No.: US 11,704,904 B2
(45) Date of Patent: Jul. 18, 2023

(54) IMAGING APPARATUS, IMAGING SYSTEM, IMAGING METHOD, AND IMAGING PROGRAM

(71) Applicant: Sony Corporation, Tokyo (JP)

(72) Inventors: Keitaro Yamamoto, Tokyo (JP); Suguru Aoki, Tokyo (JP); Ryuta Satoh, Tokyo (JP); Ryoji Eki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/269,544

(22) PCT Filed: Sep. 2, 2019

(86) PCT No.: PCT/JP2019/034500
§ 371 (c)(1),
(2) Date: Feb. 19, 2021

(87) PCT Pub. No.: WO2020/045685
PCT Pub. Date: Mar. 5, 2020

(65) Prior Publication Data
US 2021/0306586 A1    Sep. 30, 2021

(30) Foreign Application Priority Data

Aug. 31, 2018 (JP) .............................. JP2018-163700
Aug. 30, 2019 (JP) .............................. JP2019-159133

(51) Int. Cl.
*G06V 20/10* (2022.01)
*G06V 10/10* (2022.01)
(Continued)

(52) U.S. Cl.
CPC ............ *G06V 20/10* (2022.01); *G06F 18/214* (2023.01); *G06F 18/217* (2023.01); *G06V 10/10* (2022.01);
(Continued)

(58) Field of Classification Search
CPC .. H04N 5/378; H04N 5/23218; H04N 5/3452; H04N 5/3456; H04N 5/351;
(Continued)

(56) References Cited

U.S. PATENT DOCUMENTS 5,578,809 A     11/1996  Yamaji
2004/0028137 A1*  2/2004  Wyn-Harris .......... H04L 47/193
                                                      348/E5.065
(Continued)

FOREIGN PATENT DOCUMENTS

CN    101008983 A    8/2007
CN    101320425 A    12/2008
(Continued)

OTHER PUBLICATIONS

International Search Report and Written Opinion dated Nov. 26, 2019, received for PCT Application PCT/JP2019/034500, Filed on Sep. 2, 2019, 9 pages including English Translation.
(Continued)

*Primary Examiner* — Lin Ye
*Assistant Examiner* — Chan T Nguyen
(74) *Attorney, Agent, or Firm* — Xsensus LLP

(57) ABSTRACT

An imaging apparatus according to an embodiment includes: an imaging unit having a pixel region in which a plurality of pixels is arranged; a readout controller that controls readout of pixel signals from pixels included in the pixel region; a first unit-of-readout setting unit that sets a unit of readout as a part of the pixel region, for which the readout controller performs readout of the pixel signal; an image output unit that outputs a first image based on the pixel signal read out from the unit of readout to a subsequent stage; a second unit-of-readout controller that controls the unit of readout in which the readout controller performs readout of the pixel signal; and a recognition unit that learns training data for
(Continued)

each of the units of readout, performs a recognition process on the pixel signal for each of the units of readout, and outputs a recognition result.

19 Claims, 78 Drawing Sheets

(51) Int. Cl.
| | |
|---|---|
| G06V 20/56 | (2022.01) |
| G06F 18/214 | (2023.01) |
| G06F 18/21 | (2023.01) |
| H04N 25/75 | (2023.01) |
| H04N 23/61 | (2023.01) |
| H04N 25/50 | (2023.01) |
| H04N 25/58 | (2023.01) |
| H04N 25/79 | (2023.01) |
| H04N 25/441 | (2023.01) |
| H04N 25/445 | (2023.01) |
| G06V 10/25 | (2022.01) |

(52) U.S. Cl.
CPC ............ *G06V 10/25* (2022.01); *G06V 20/56* (2022.01); *H04N 23/61* (2023.01); *H04N 25/441* (2023.01); *H04N 25/445* (2023.01); *H04N 25/50* (2023.01); *H04N 25/58* (2023.01); *H04N 25/75* (2023.01); *H04N 25/79* (2023.01)

(58) Field of Classification Search
CPC ............ H04N 5/35536; H04N 5/379; H04N 5/23225; H04N 5/23229; H04N 5/2353; H04N 5/345; H04N 5/3454; H04N 5/3765; H04N 5/23219; H04N 5/374; H04N 5/2253; G06K 9/6256; G06K 9/6262; G06V 10/10; G06V 20/56; G06V 10/25; G06V 20/10; G06N 3/0445; G06N 3/0454; G06N 3/08
USPC .......................................................... 348/308
See application file for complete search history.

(56) References Cited

U.S. PATENT DOCUMENTS

| | | |
|---|---|---|
| 2007/0244842 A1 | 10/2007 | Ishii |
| 2008/0095436 A1* | 4/2008 | Kim .................. H04N 19/186 |
| | | 382/173 |
| 2009/0032597 A1 | 2/2009 | Barber et al. |
| 2009/0258667 A1 | 10/2009 | Suzuki |
| 2010/0253833 A1 | 10/2010 | Deever et al. |
| 2012/0057795 A1 | 3/2012 | Konishi |
| 2013/0088606 A1 | 4/2013 | Yagur |
| 2014/0151534 A1* | 6/2014 | Choo .................. H04N 5/3742 |
| | | 250/208.1 |
| 2014/0299665 A1 | 10/2014 | Barber |
| 2015/0151534 A1* | 6/2015 | DiGenova ............... B41F 13/10 |
| | | 101/483 |
| 2015/0358571 A1* | 12/2015 | Dominguez Castro ...................... |
| | | H04N 25/771 |
| | | 348/308 |
| 2015/0365610 A1 | 12/2015 | Castro et al. |
| 2016/0021302 A1* | 1/2016 | Cho .................. A61B 5/0037 |
| | | 348/349 |
| 2016/0148079 A1 | 5/2016 | Shen |
| 2017/0213112 A1 | 7/2017 | Sachs |
| 2018/0092587 A1 | 4/2018 | Tzveili |
| 2018/0164424 A1 | 6/2018 | Takaki |
| 2021/0319144 A1* | 10/2021 | Ishimaru ............ G06F 21/6245 |

FOREIGN PATENT DOCUMENTS

| | | |
|---|---|---|
| CN | 102194115 A | 9/2011 |
| CN | 102857688 A | 1/2013 |
| CN | 103077407 A | 5/2013 |
| CN | 103080978 A | 5/2013 |
| CN | 103391398 A | 11/2013 |
| CN | 103716661 A | 4/2014 |
| CN | 103942242 A | 7/2014 |
| CN | 104102340 A | 10/2014 |
| CN | 105373785 A | 3/2016 |
| CN | 107563168 A | 1/2018 |
| CN | 107944351 A | 4/2018 |
| CN | 108073943 A | 5/2018 |
| EP | 1 011 074 A2 | 6/2000 |
| JP | 1-93875 A | 4/1989 |
| JP | 9-138802 A | 5/1997 |
| JP | 2005-341097 A | 12/2005 |
| JP | 2005-354568 A | 12/2005 |
| JP | 2008-15860 A | 1/2008 |
| JP | 2010-020421 A | 1/2010 |
| JP | 2012-208606 A | 10/2012 |
| JP | 2013-12983 A | 1/2013 |
| JP | 2013-26713 A | 2/2013 |
| JP | 2017-112409 A | 6/2017 |
| KR | 10-2011-0056616 A | 5/2011 |
| WO | WO-2008004578 A1 | 1/2008 |
| WO | 2018/003212 A1 | 1/2018 |

OTHER PUBLICATIONS

Ignatius Wendianto Notonogoro et al., "Indonesian License Plate Recognition Using Convolutional Neural Network", 2018 6th International Conference on Information and Communication Technology (ICOICT), IEEE, May 3, 2018, pp. 366-369, XP033444437, DOI: 10.11091COICT.2018.8528761 [retrieved on Nov. 8, 2018].

* cited by examiner

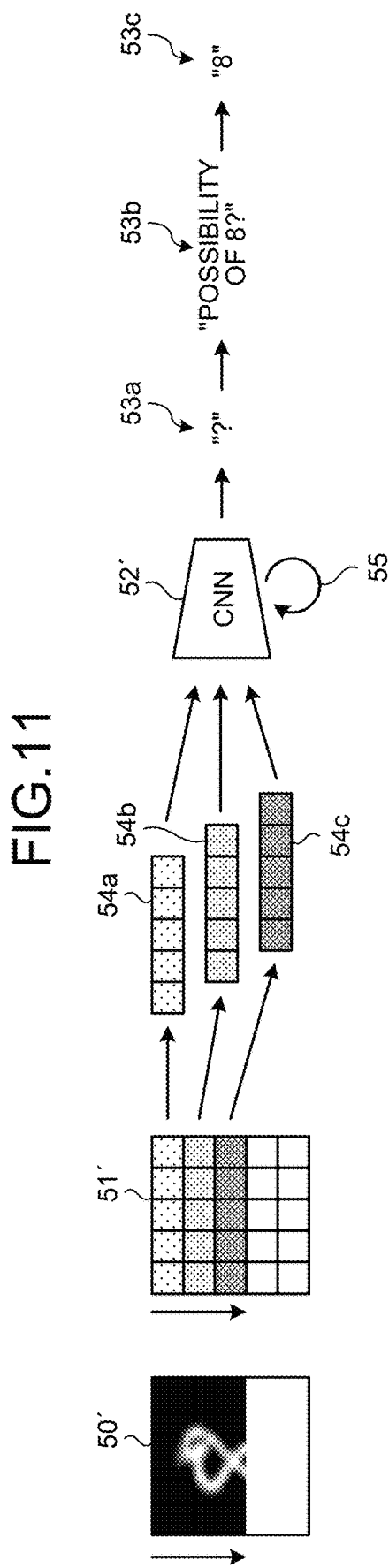

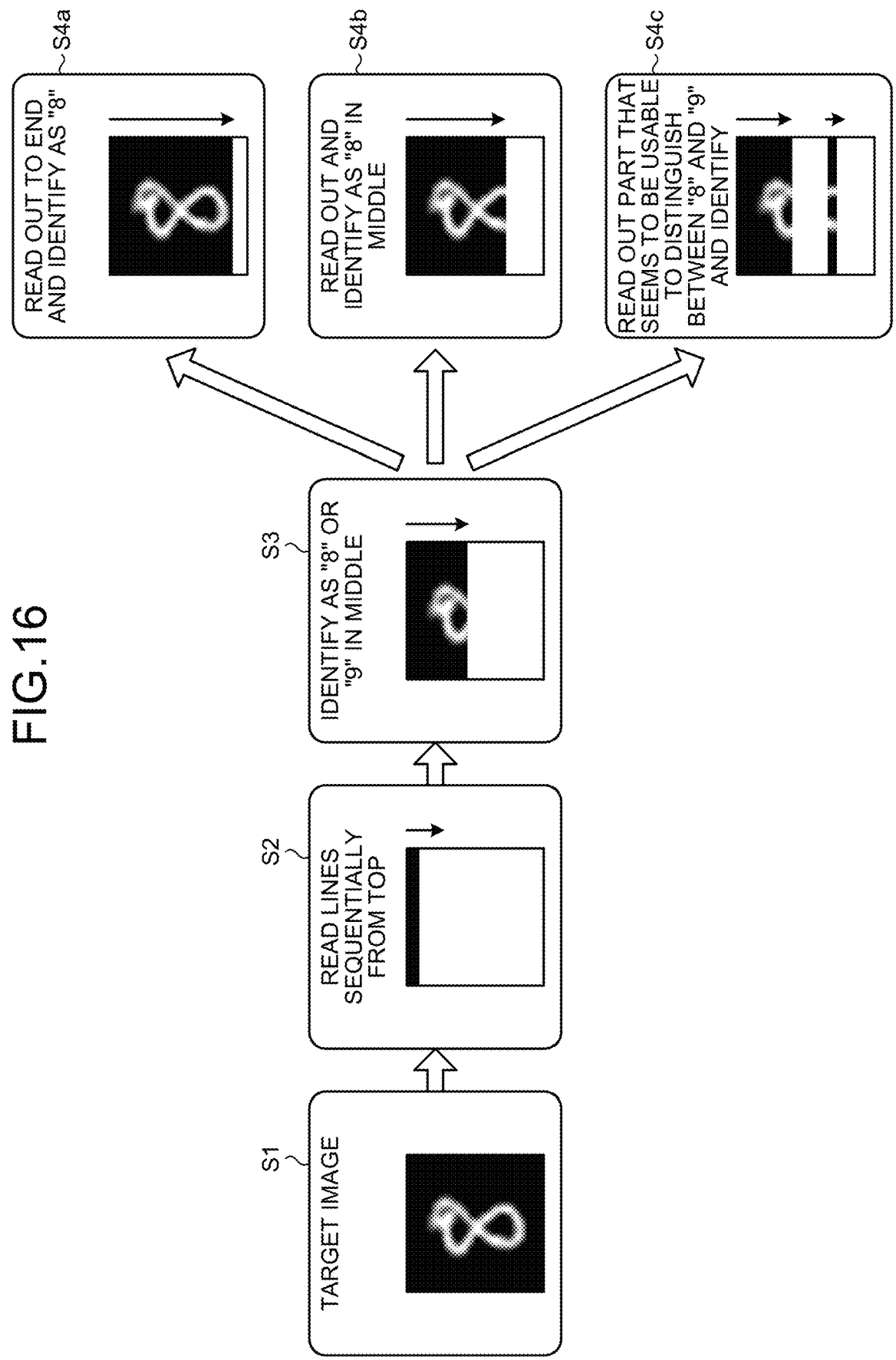

FIG.20A
(a)
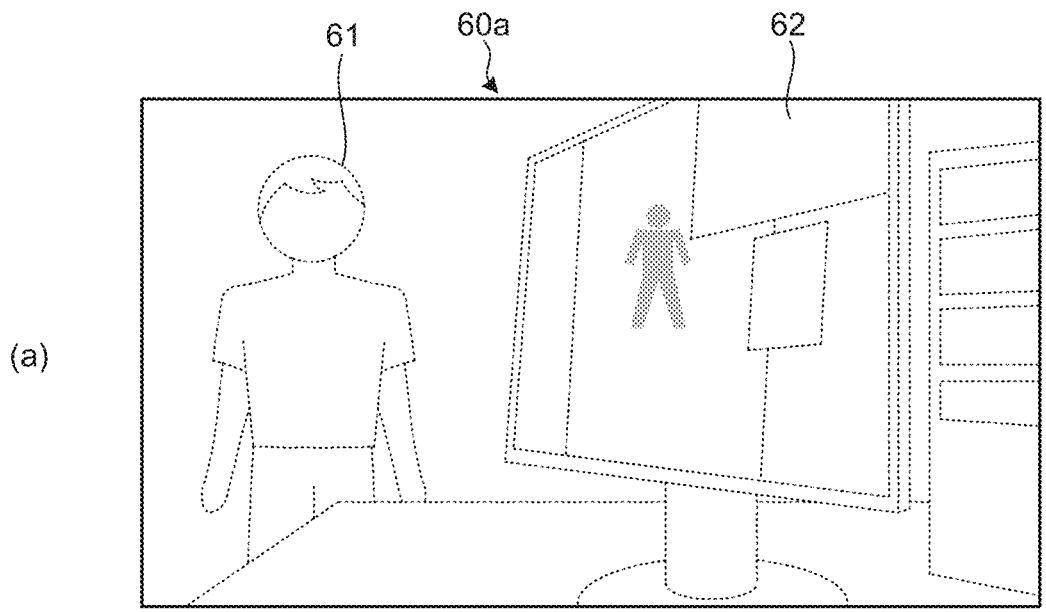
(b)
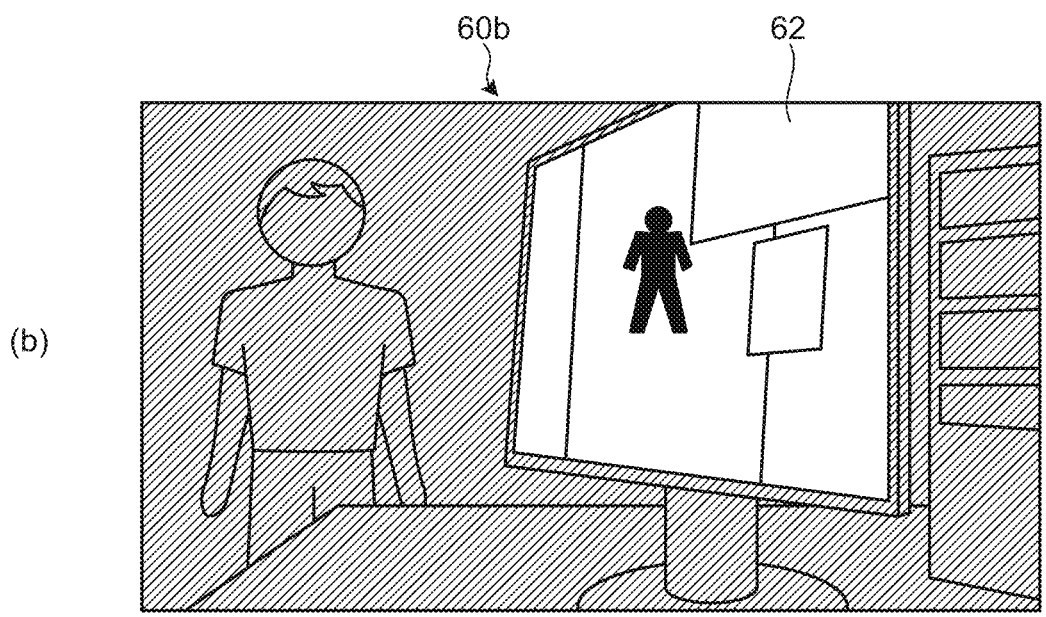

FIG.20B
(a)
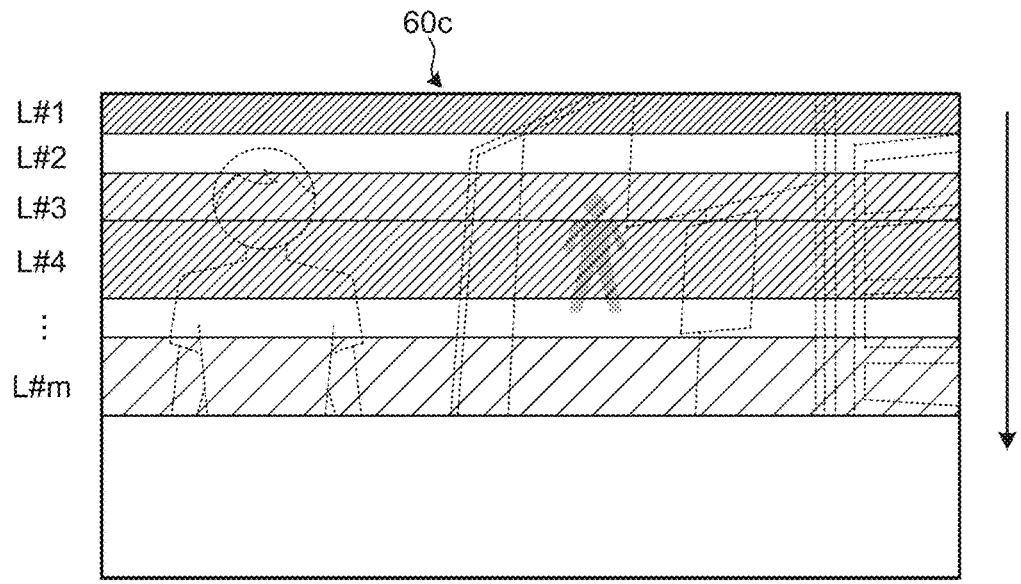
(b)
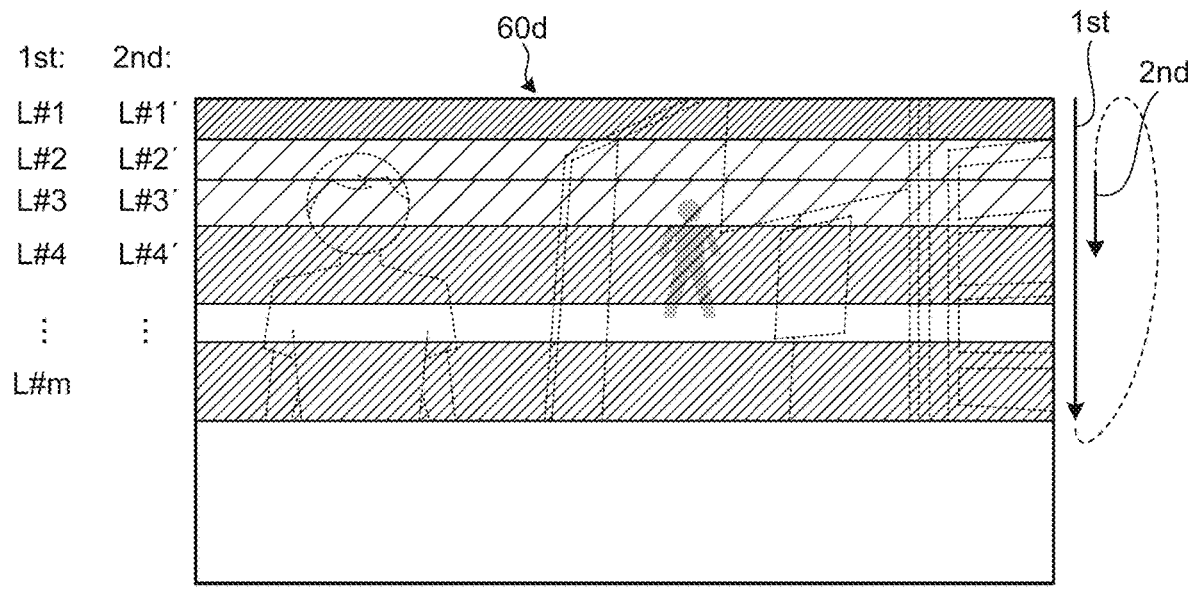

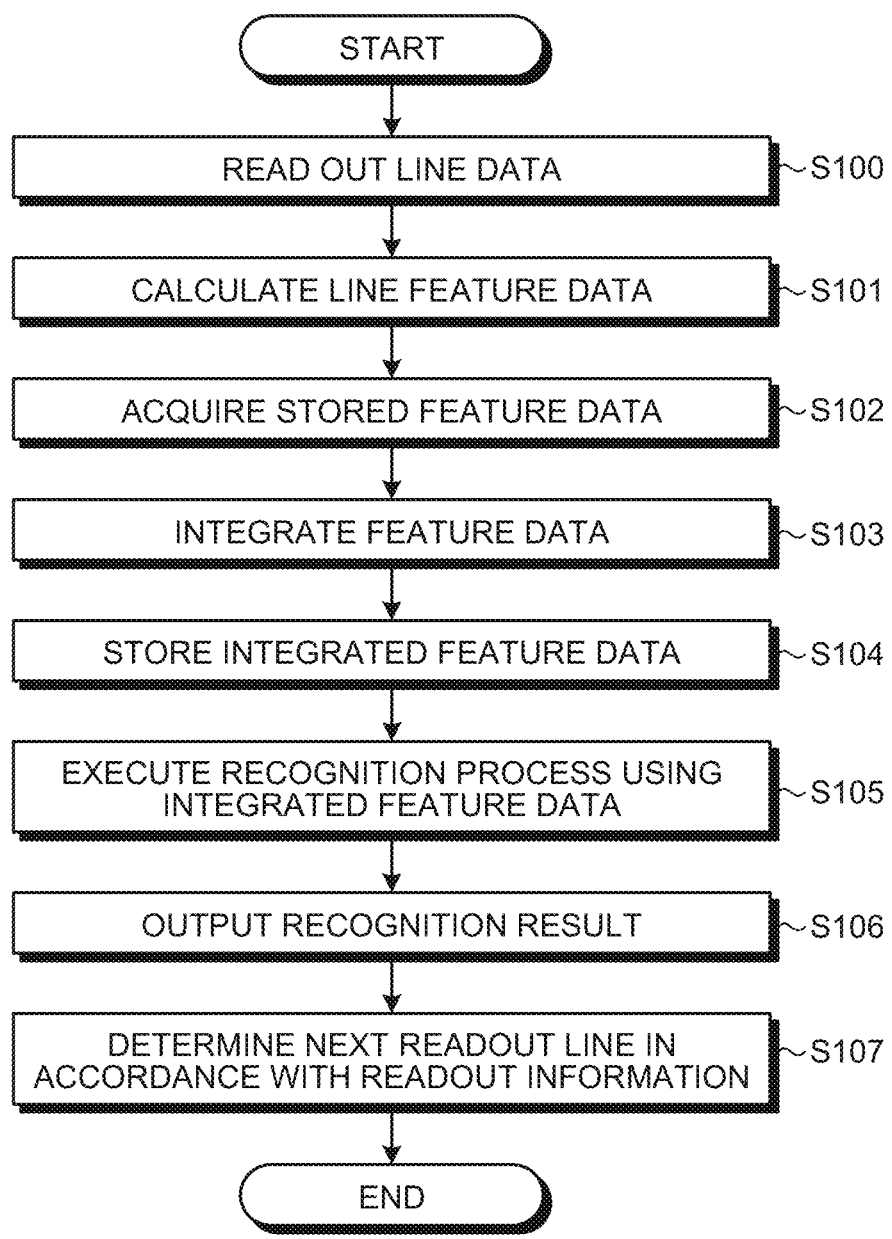

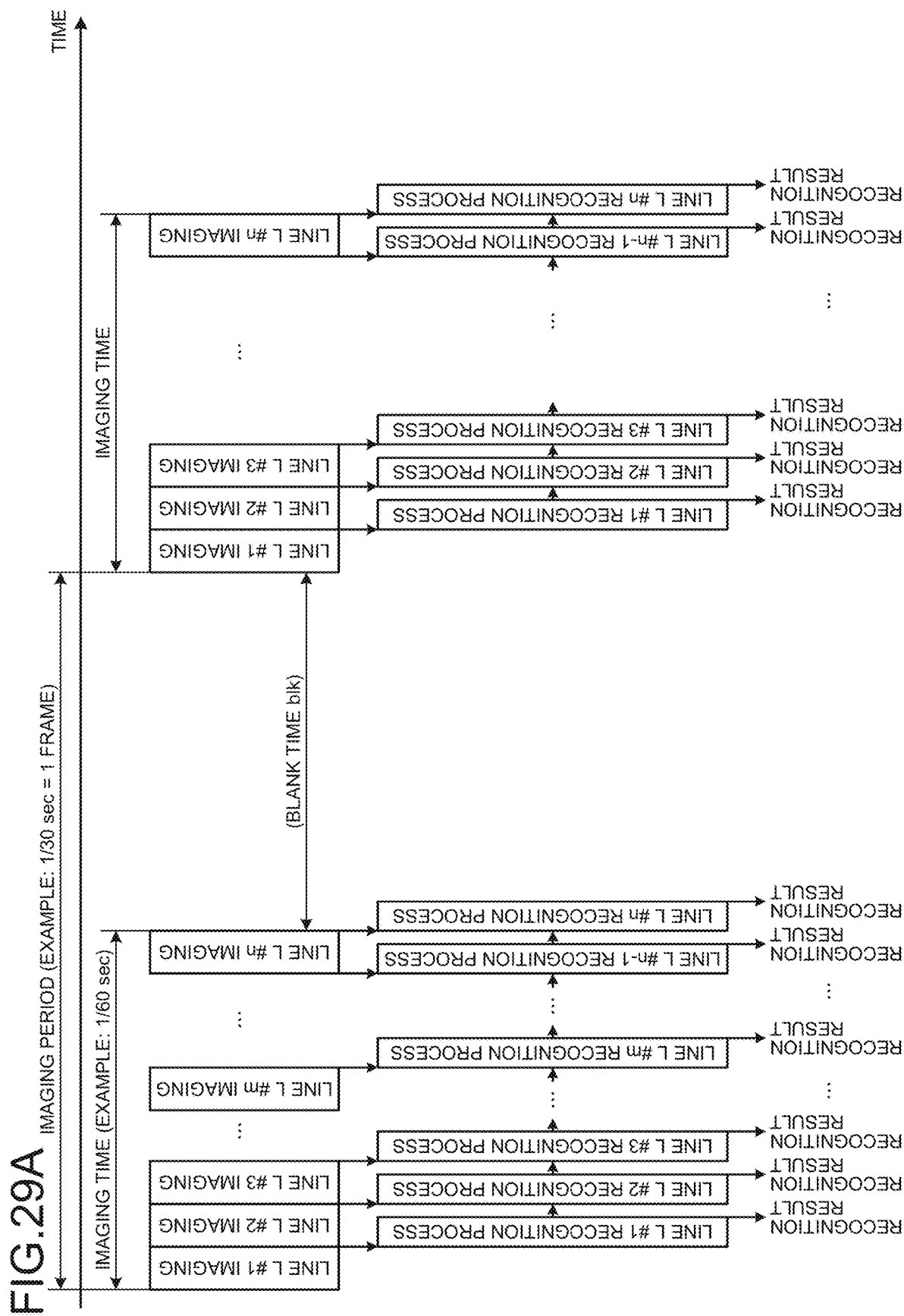

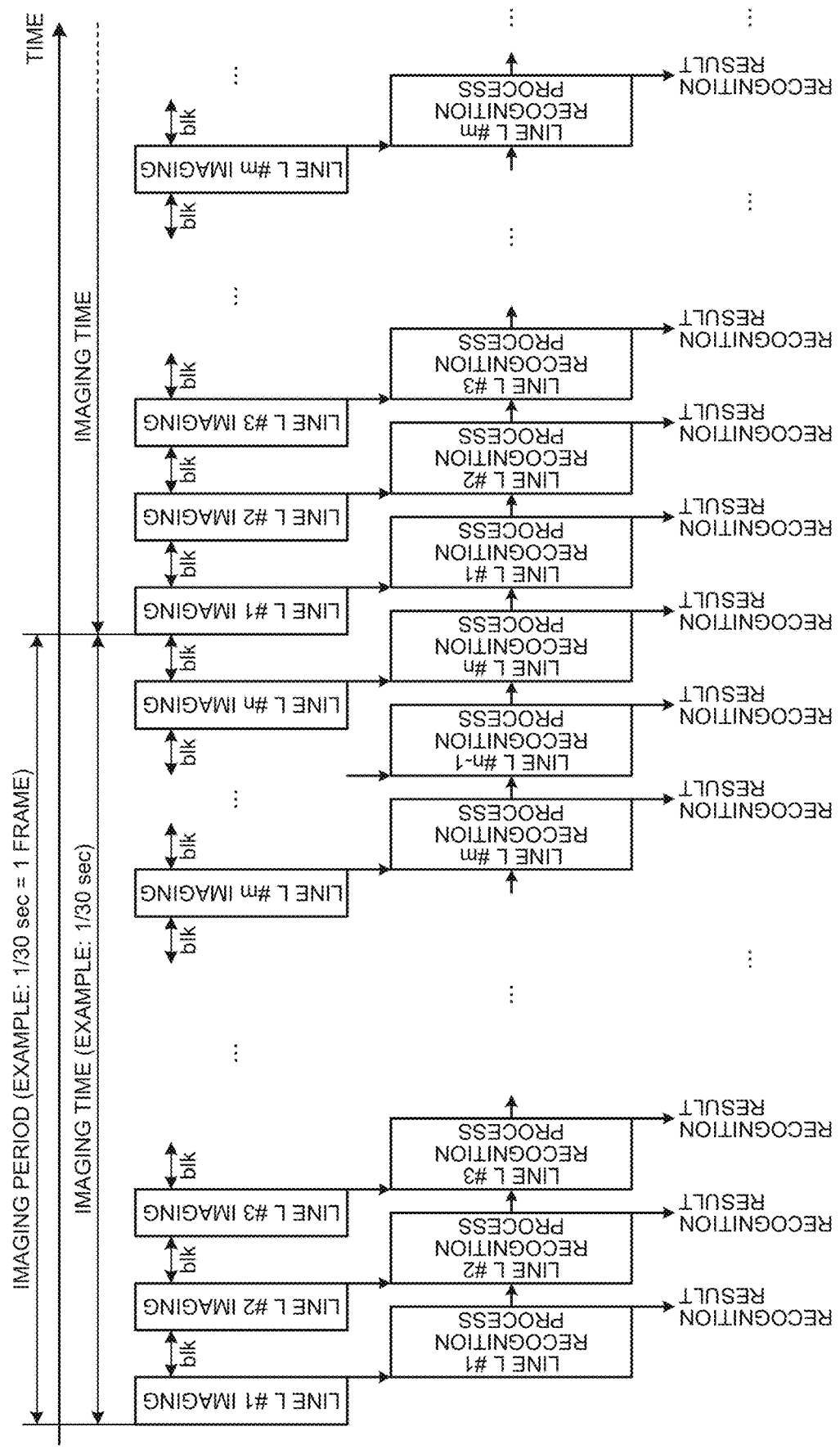

FIG.41
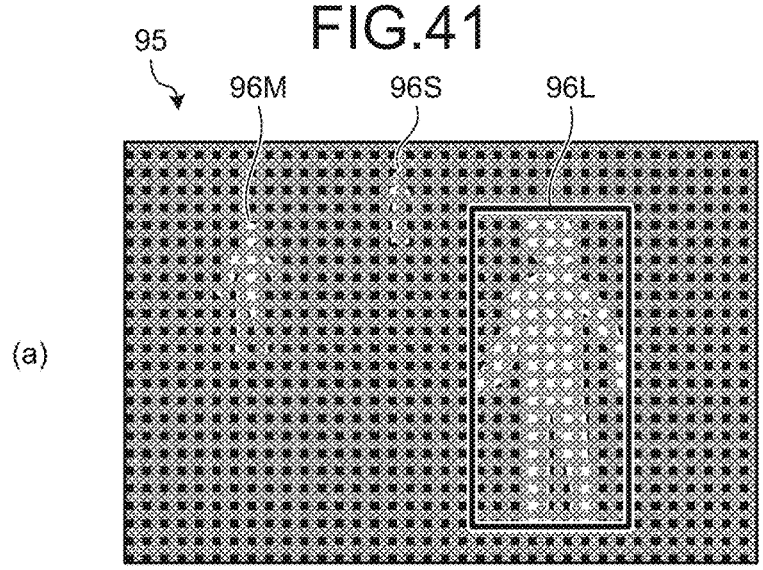
(a)
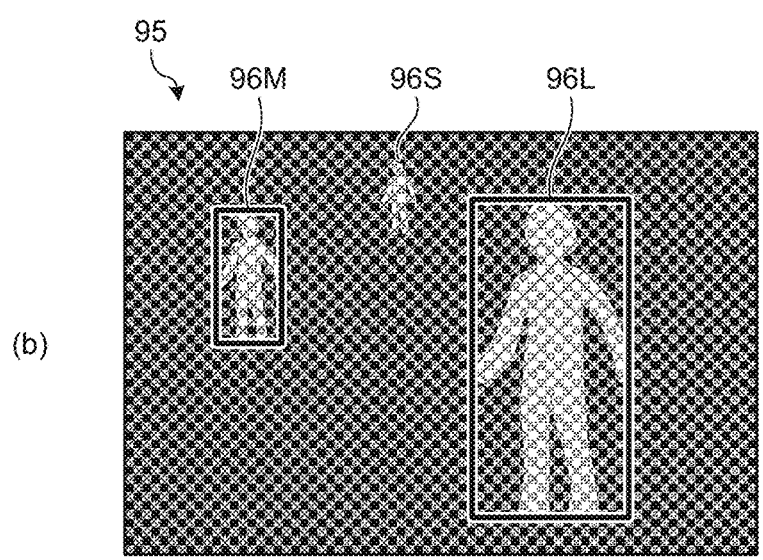
(b)
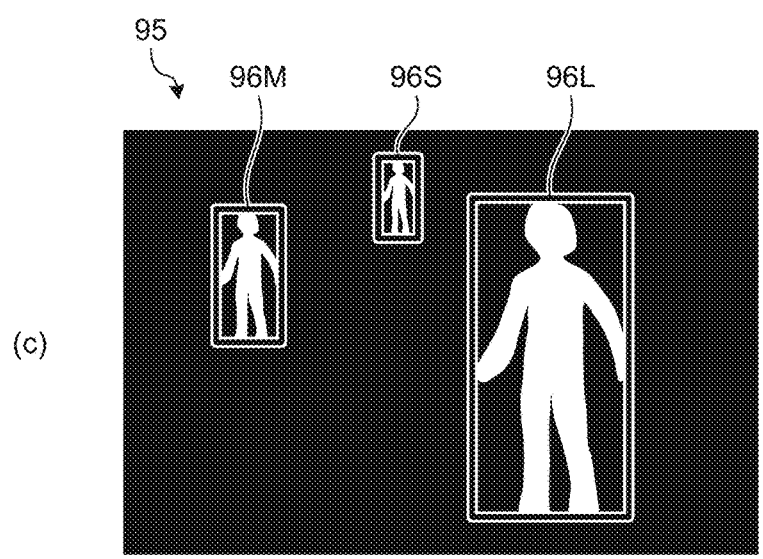
(c)

FIG.53
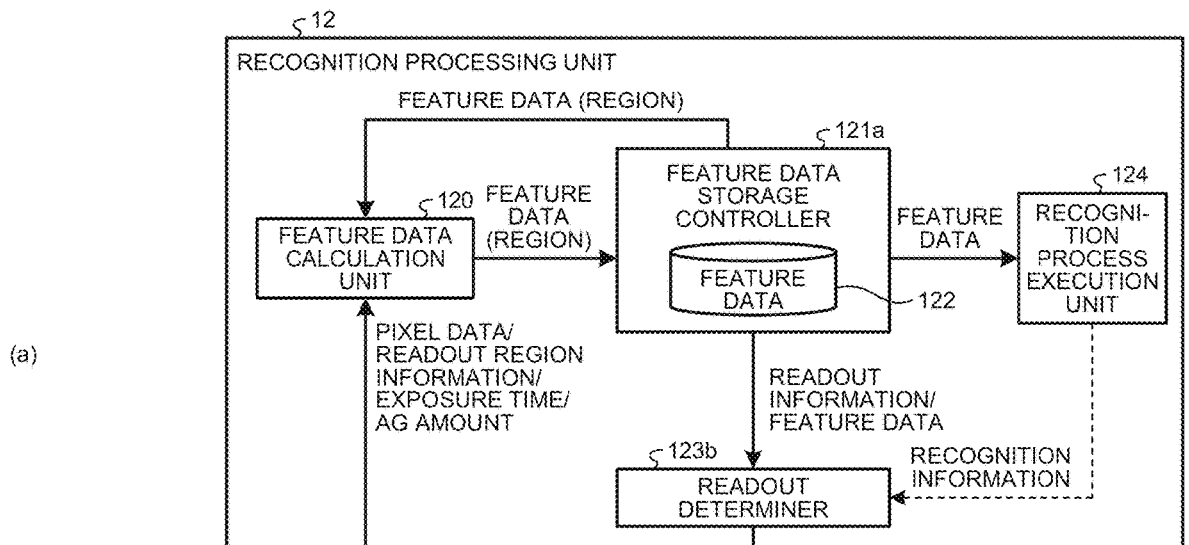
(a)
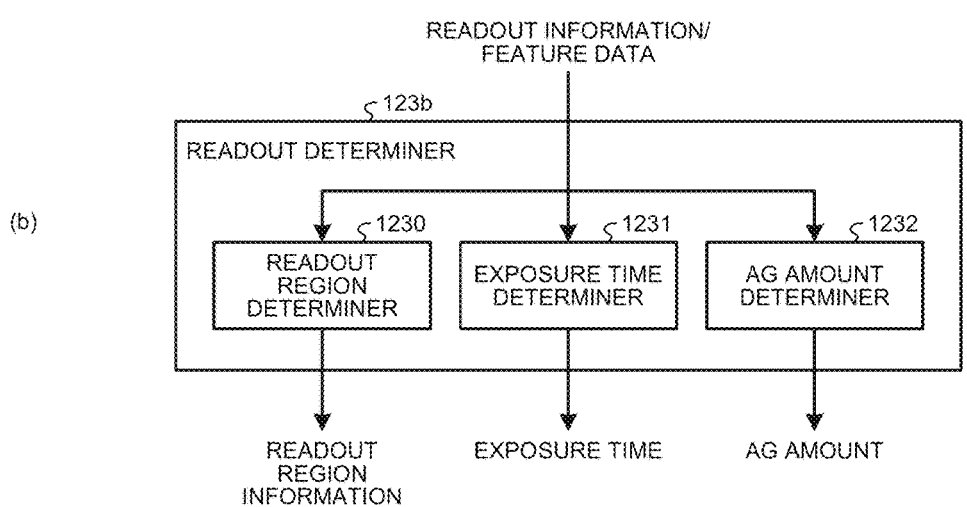
(b)

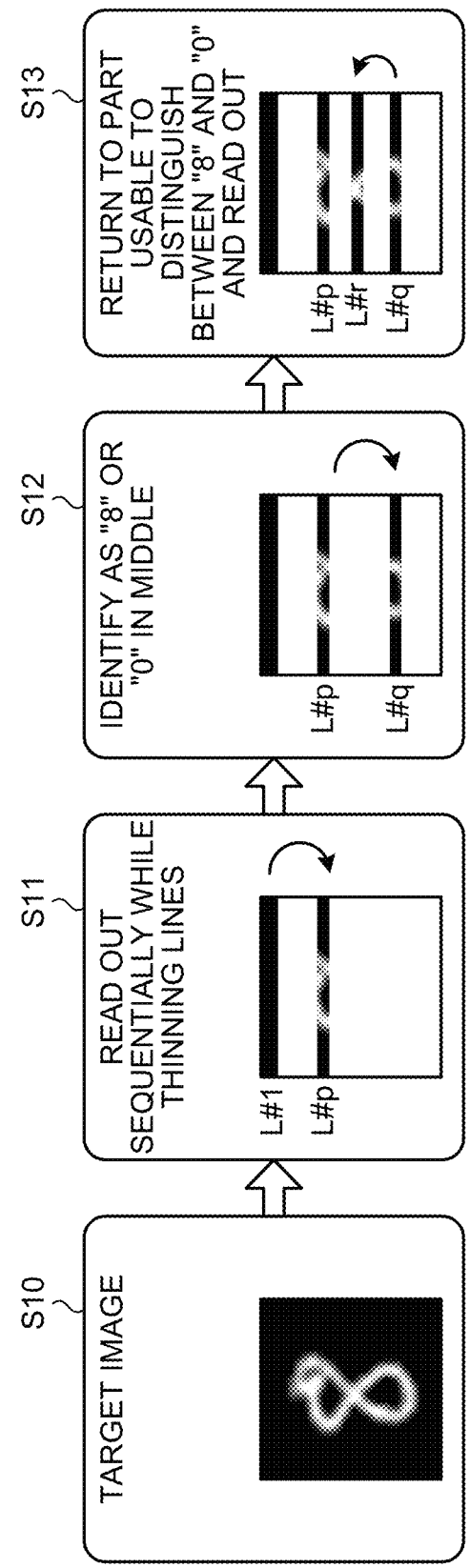

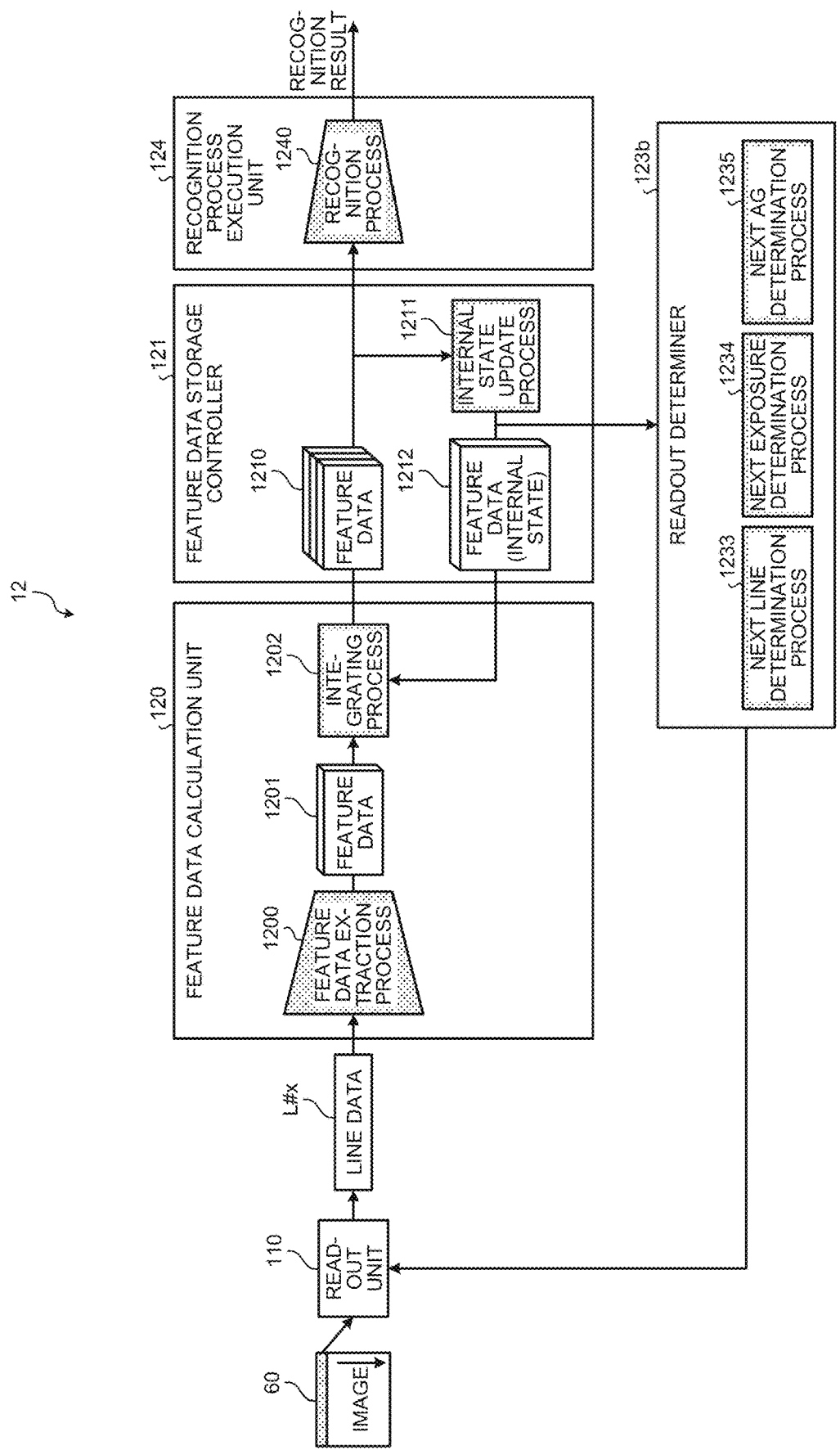

FIG.64
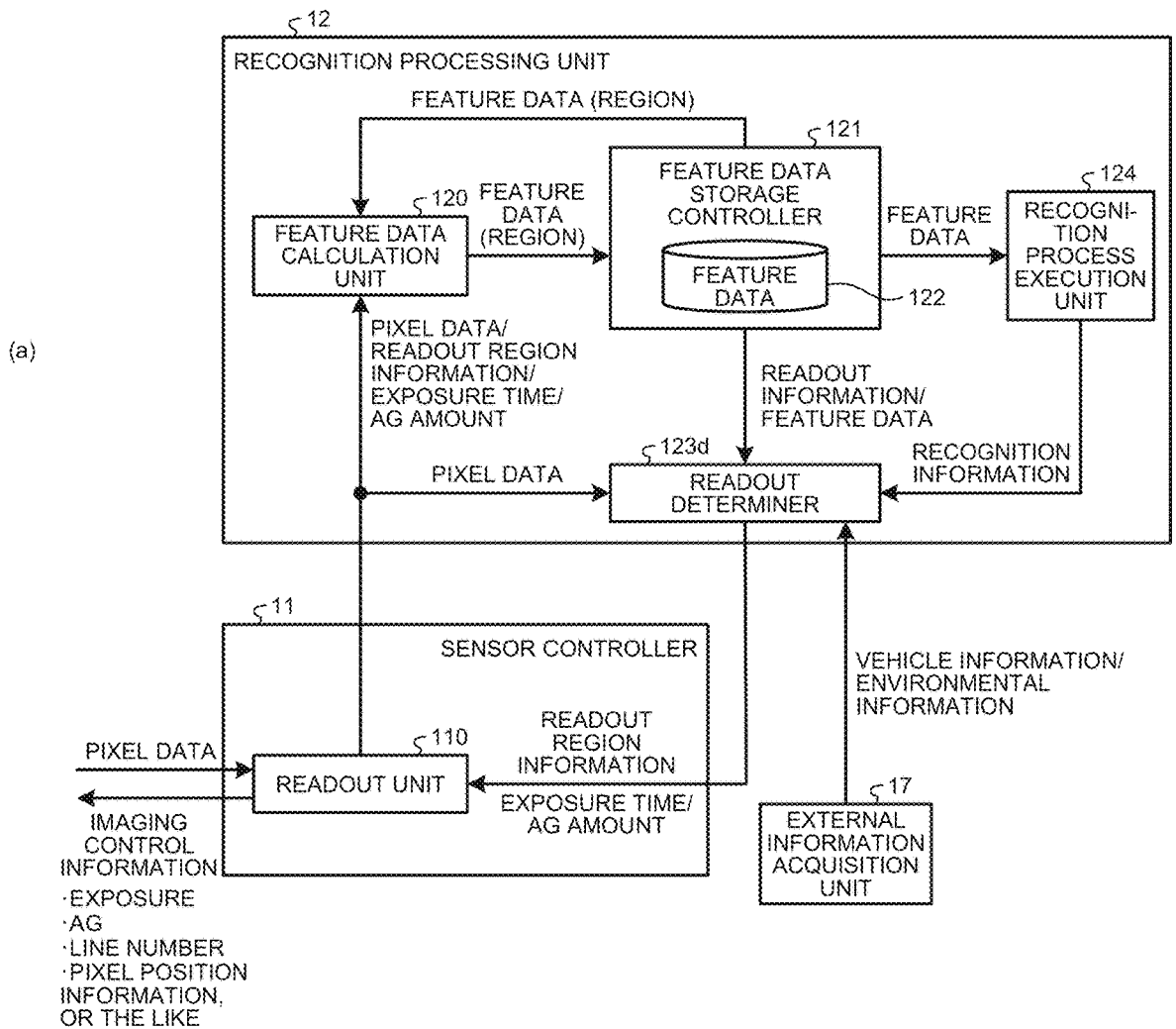
(a)
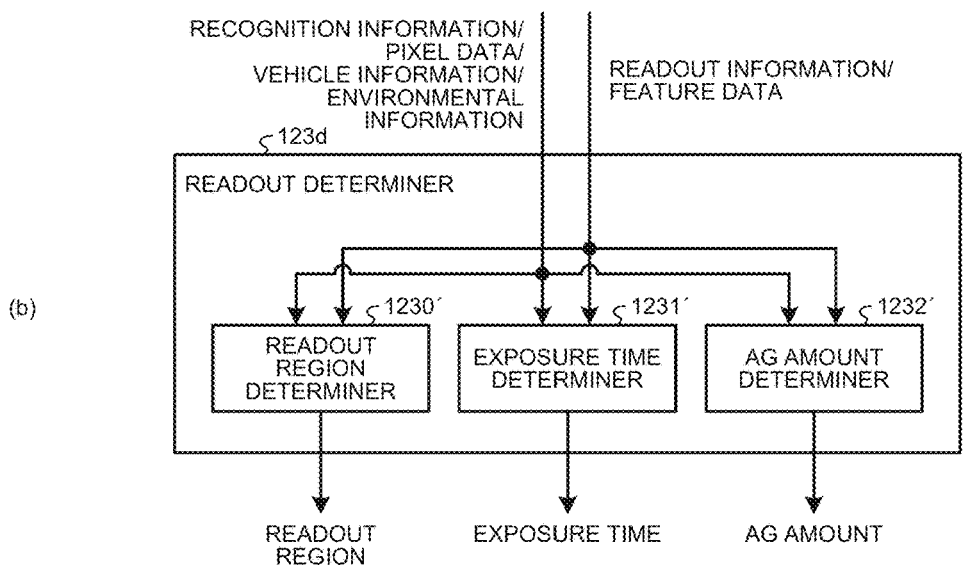
(b)

FIG.65
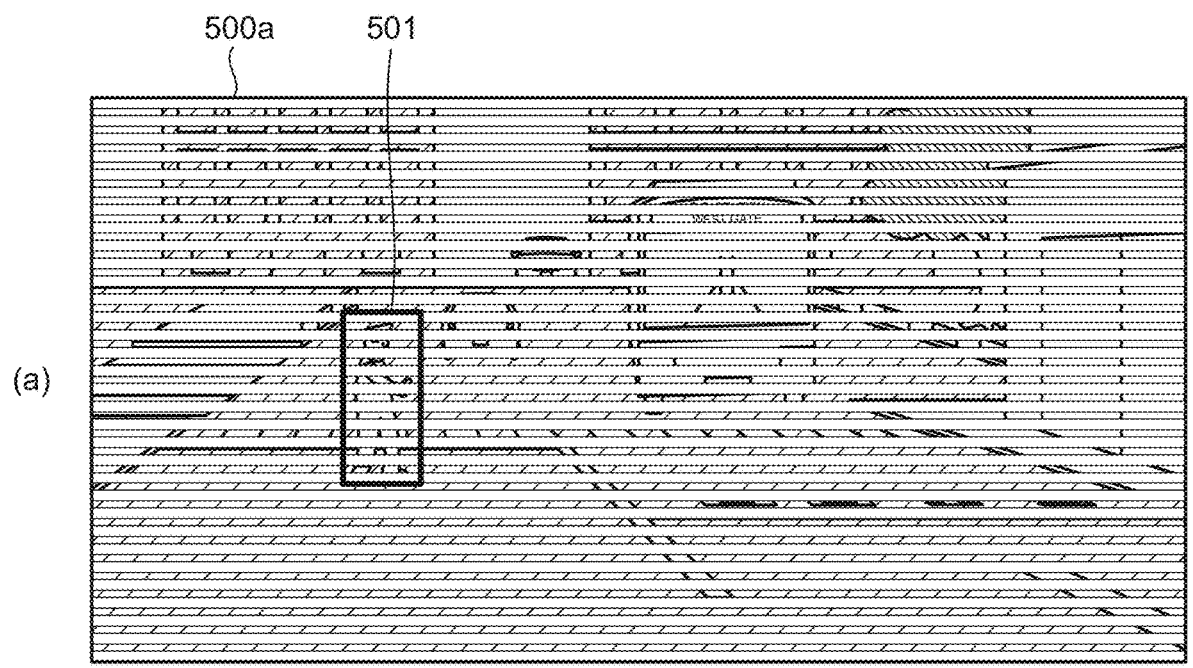
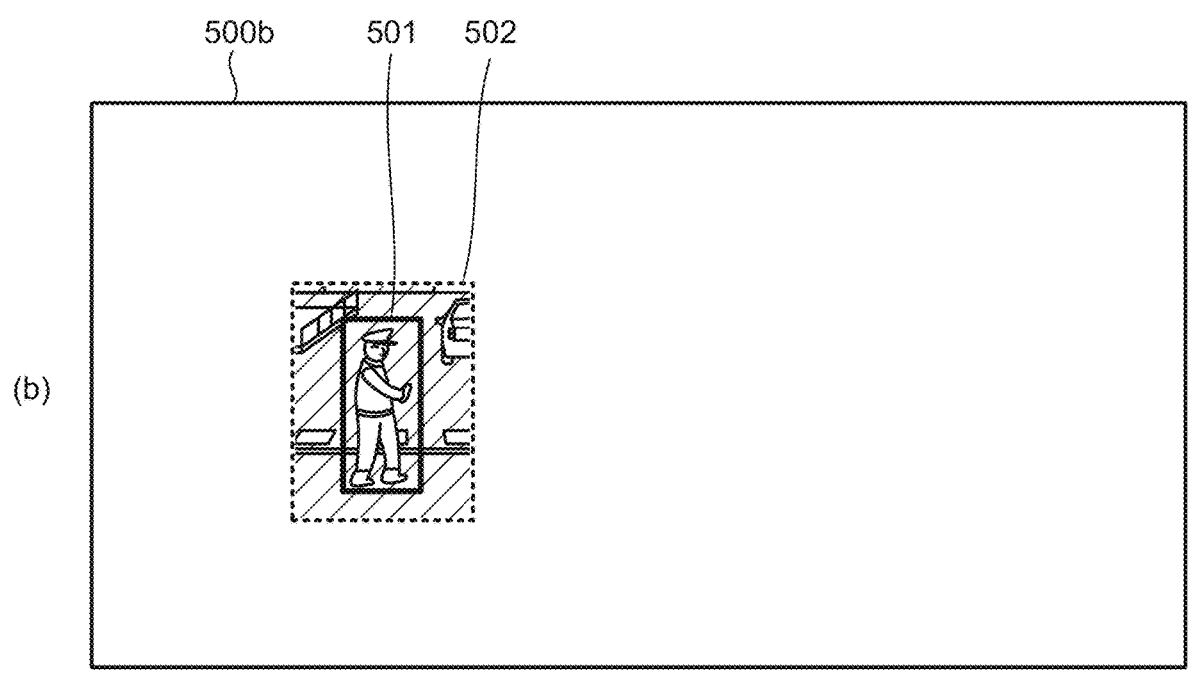

FIG.66
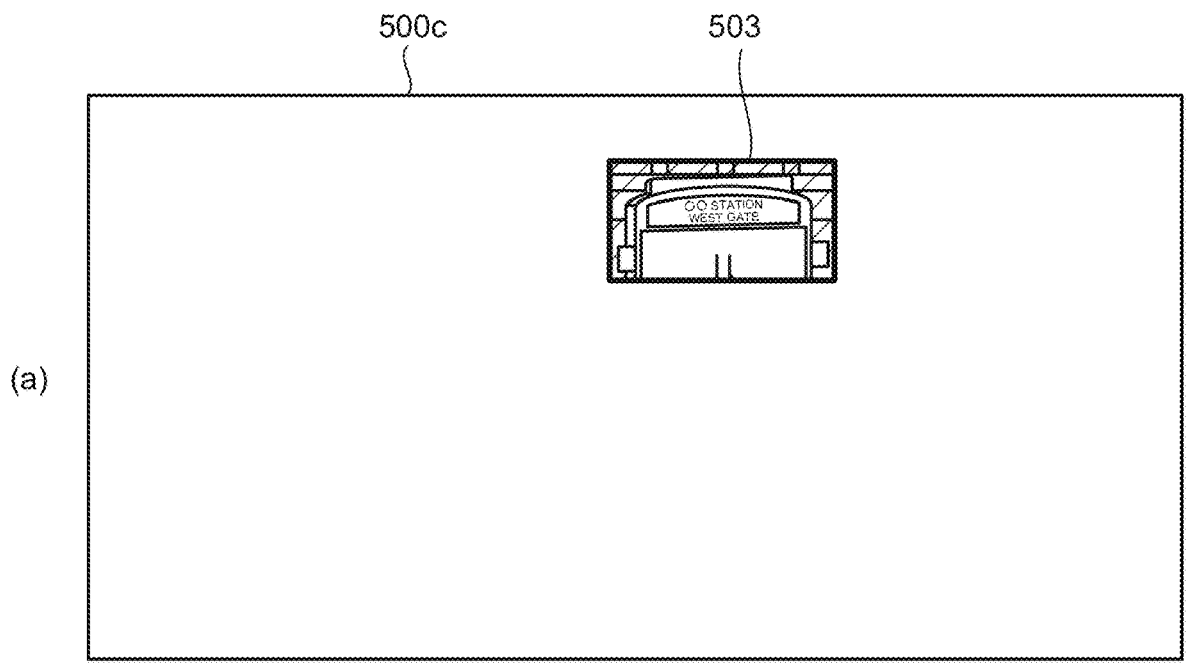
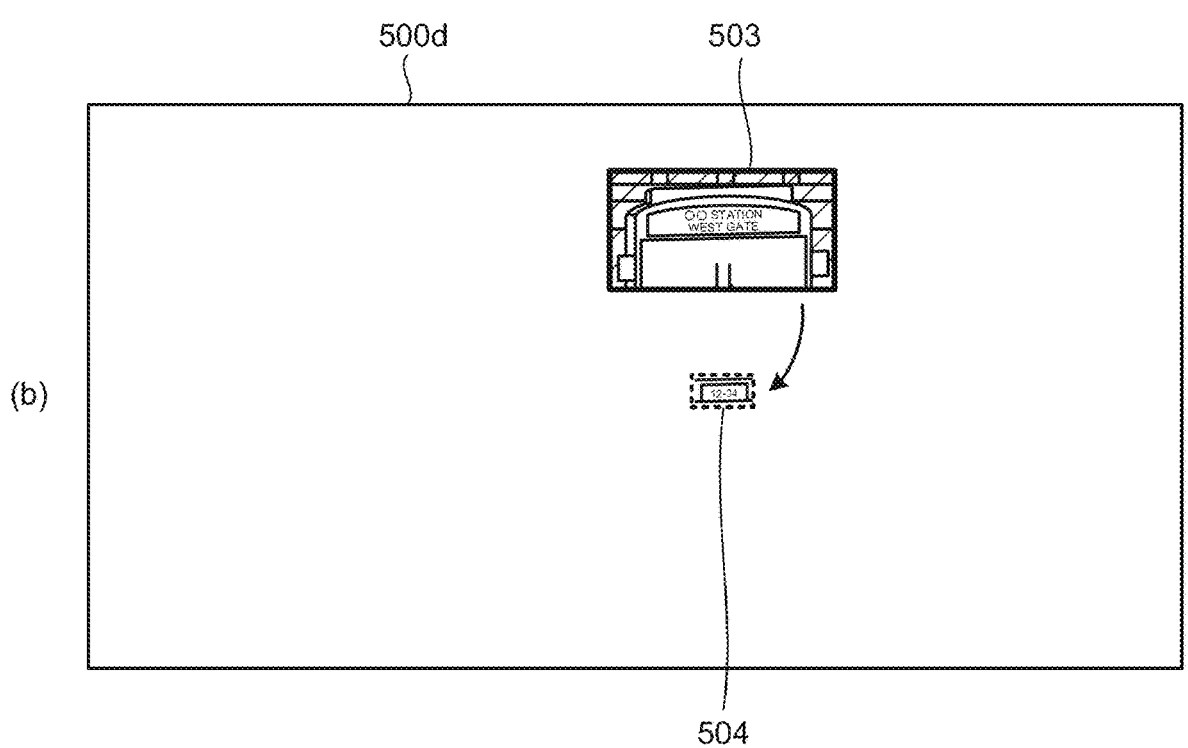

FIG.67
(a)
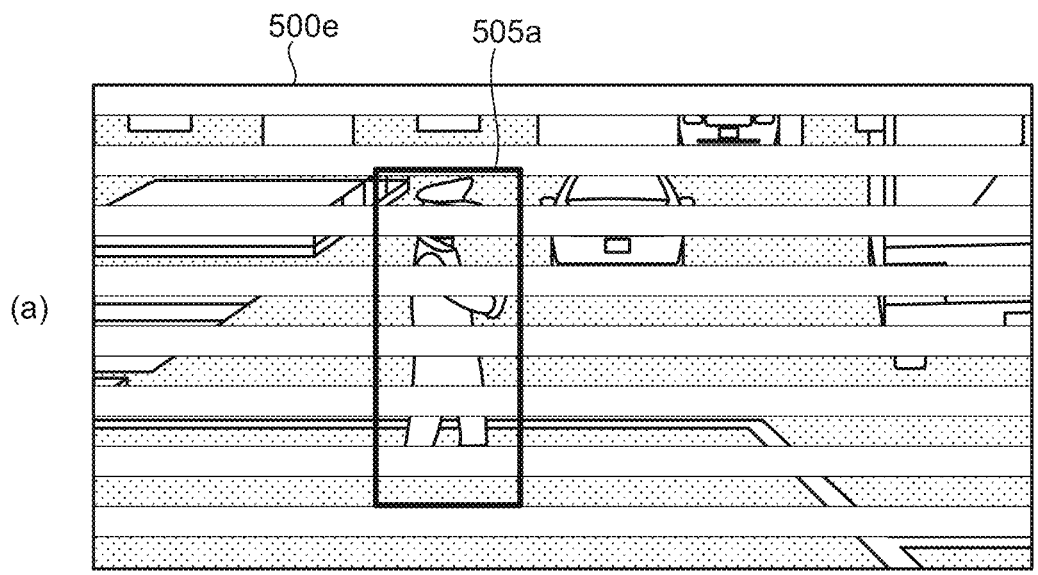
(b)
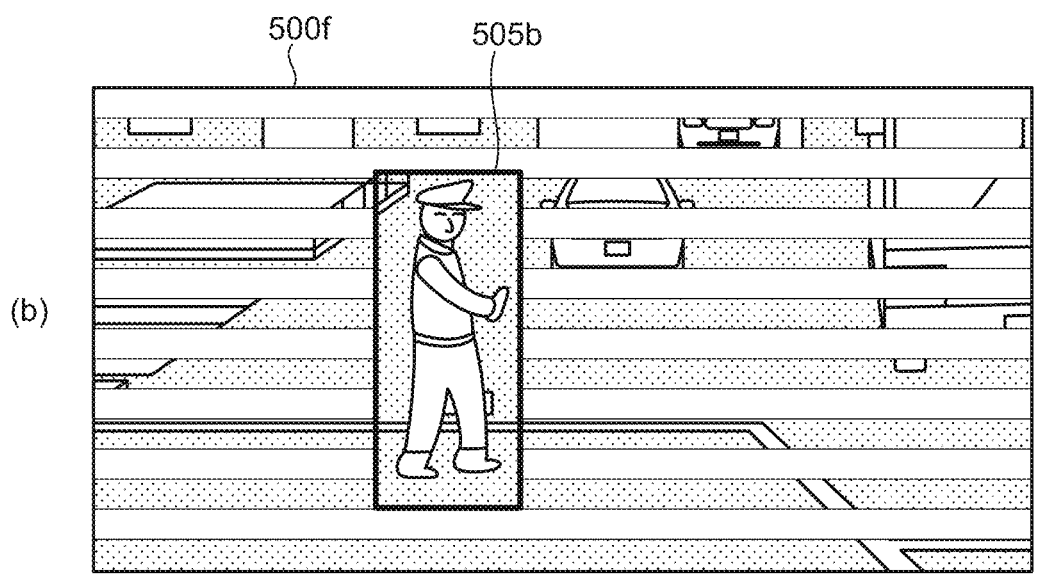

FIG.75
(a)
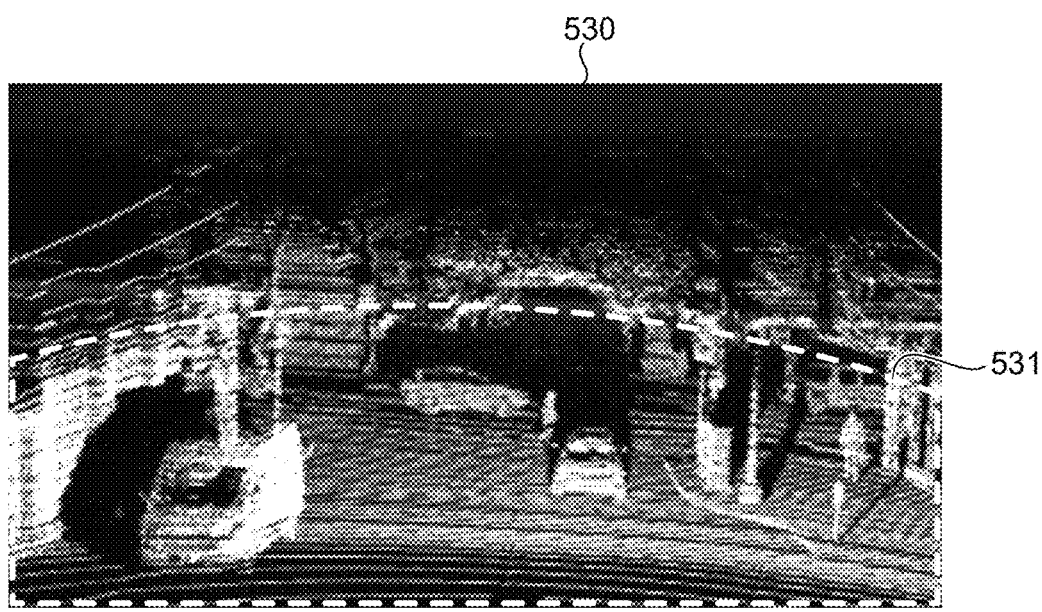
(b)
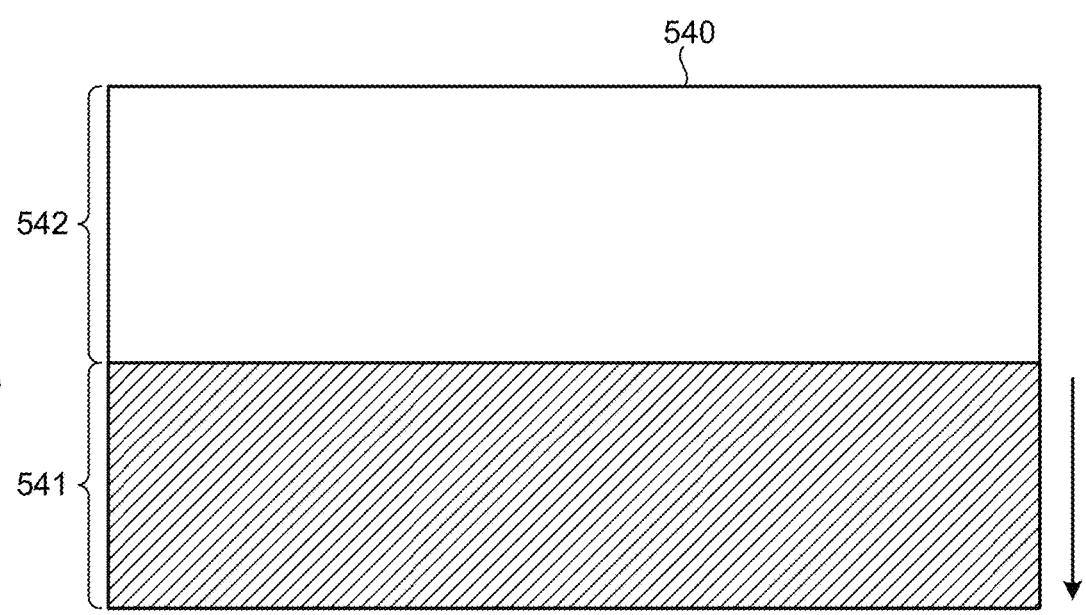

IMAGING APPARATUS, IMAGING SYSTEM, IMAGING METHOD, AND IMAGING PROGRAM

CROSS-REFERENCE TO RELATED APPLICATIONS

The present application is based on PCT filing PCT/JP2019/034500, filed Sep. 2, 2019, which claims priority to JP 2018-163700, filed Aug. 31, 2018, and JP 2019-159133, filed Aug. 30, 2019, the entire contents of each are incorporated herein by reference.

FIELD

The present disclosure relates to an imaging apparatus, an imaging system, an imaging method, and an imaging program.

BACKGROUND

In recent years, with the sophistication of imaging apparatuses such as digital still cameras, digital video cameras, and small cameras mounted on multifunctional mobile phones (smartphones), there have been developments of imaging apparatuses equipped with an image recognition function of recognizing a predetermined object included in a captured image.

CITATION LIST

Patent Literature

Patent Literature 1: JP 2017-112409 A

SUMMARY

Technical Problem

In general, an image suitable for recognition processes in the image recognition function is different from an image suitable for visual recognition by human. Therefore, in an attempt to improve the recognition accuracy in an imaging apparatus equipped with an image recognition function, it might be difficult to use an image captured for the recognition process as an image that can sufficiently provide information as an image for visual recognition.

The present disclosure aims to provide an imaging apparatus, an imaging system, an imaging method, and an imaging program capable of achieving both imaging for recognition processes and imaging for visual recognition.

Solution to Problem

For solving the problem described above, an imaging apparatus according to one aspect of the present disclosure has an imaging unit having a pixel region in which a plurality of pixels is arranged; a readout controller that controls readout of pixel signals from pixels included in the pixel region; a first unit-of-readout setting unit that sets a unit of readout as a part of the pixel region, for which the readout controller performs readout of the pixel signal; an image output unit that outputs a first image based on the pixel signal read out from the unit of readout, to a subsequent stage; a second unit-of-readout setting unit that sets the unit of readout in which the readout controller performs readout of the pixel signal; and a recognition unit that learns training data for each of the units of readout, performs a recognition process on the pixel signal for each of the units of readout, and outputs a recognition result which is a result of the recognition process.

BRIEF DESCRIPTION OF DRAWINGS

FIG. 11 is a diagram schematically illustrating an image recognition process for obtaining a recognition result from a part of an image as a recognition target.

FIG. 16 is a schematic diagram schematically illustrating a recognition process according to each of embodiments of the present disclosure.

FIG. 20A is a schematic view illustrating an application example of the first embodiment.

FIG. 20B is a schematic view illustrating an application example of the first embodiment.

FIG. 28 is a flowchart illustrating an example of the recognition process according to the second embodiment.

FIG. 29A is a time chart illustrating an example of controlling readout and the recognition process according to the second embodiment.

FIG. 29B is a time chart illustrating an example of controlling readout and the recognition process according to the second embodiment.

FIG. 41 is a view specifically illustrating the frame readout process according to the fourth modification of the second embodiment.

FIG. 53 is a functional block diagram of an example illustrating a function according to a tenth modification of the second embodiment.

FIG. 56 is a schematic diagram illustrating a second process according to the tenth modification of the second embodiment.

FIG. 60 is a schematic diagram illustrating in more detail an example of processes in a recognition processing unit according to the tenth modification of the second embodiment.

FIG. 64 is a functional block diagram illustrating an example of functions according to a first modification of the third embodiment.

FIG. 65 is a schematic diagram illustrating a first setting method according to the first modification of the third embodiment.

FIG. 66 is a schematic diagram illustrating a second setting method according to the first modification of the third embodiment.

FIG. 67 is a schematic diagram illustrating a third setting method according to the first modification of the third embodiment.

FIG. 75 is a diagram illustrating a second modification of the fourth embodiment.

DESCRIPTION OF EMBODIMENTS

Figure 1:
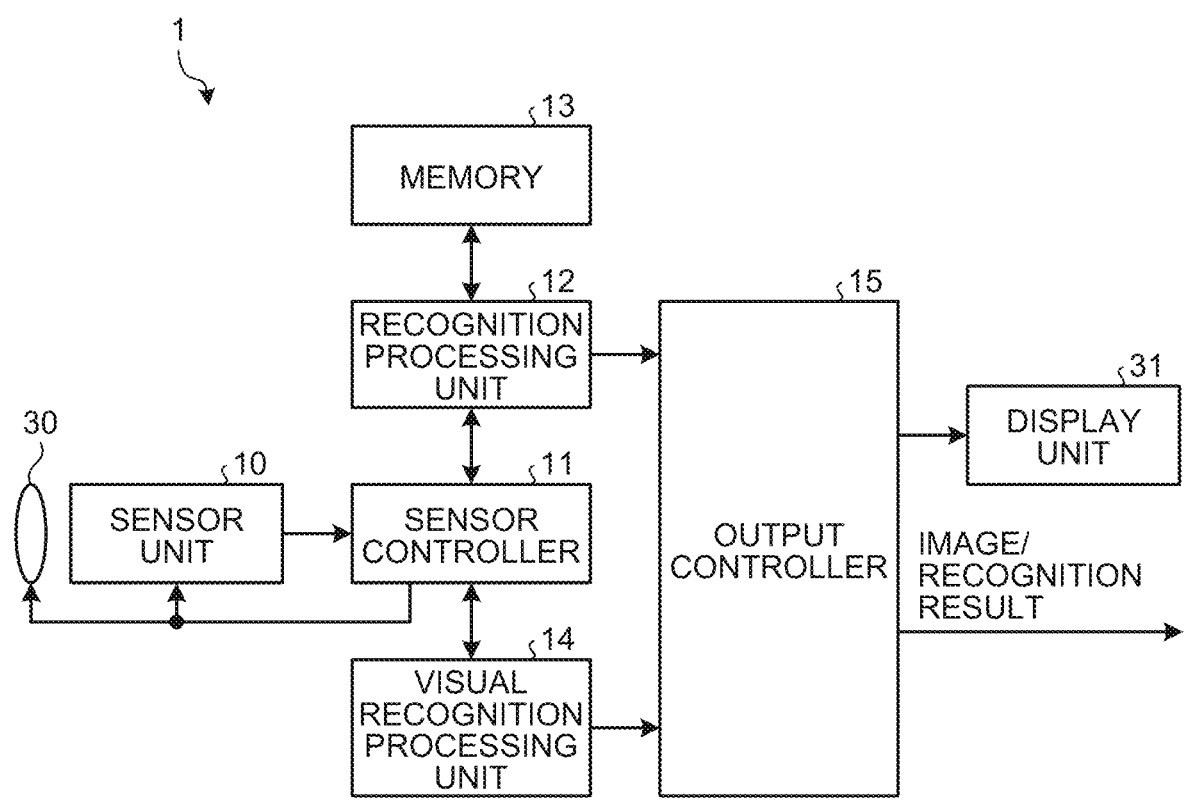
FIG. 1 is a block diagram illustrating a configuration of an example of an imaging apparatus applicable to each of embodiments of the present disclosure.

Embodiments of the present disclosure will be described below in detail with reference to the drawings. In each of the following embodiments, the same parts are denoted by the same reference symbols, and a repetitive description thereof will be omitted.

Hereinafter, embodiments of the present disclosure will be described in the following order.

1. Configuration example according to each of embodiments of the present disclosure
2. Examples of existing technologies applicable to the present disclosure
2-1. Overview of rolling shutter
2-2. Overview of global shutter
2-3. Deep Neural Network (DNN)
2-3-1. Overview of Convolutional Neural Network (CNN)
2-3-2. Overview of recurrent neural network (RNN)
2-4. Drive speed
3. Overview of present disclosure
4. First Embodiment
4-1. Operation examples in the recognition processing unit
4-2. Specific example of operations in the recognition processing unit
4-3. Application example of the first embodiment
5. Second Embodiment
5-0-1. Configuration example according to the second embodiment
5-0-2. Example of processes in the recognition processing unit according to second embodiment
5-0-3. Details of recognition process according to second embodiment
5-0-4. Example of control of readout and recognition processes according to second embodiment
5-1. First modification of the second embodiment
5-2. Second modification of the second embodiment
5-3. Third modification of the second embodiment
5-4. Fourth modification of the second embodiment
5-5. Fifth modification of the second embodiment
5-6. Sixth modification of the second embodiment
5-7. Seventh modification of the second embodiment
5-8. Eighth modification of the second embodiment
5-9. Ninth modification of the second embodiment
5-10. Tenth modification of the second embodiment
6. Third Embodiment
6-0-1. Method of determining unit-of-readout patterns and readout order patterns
6-0-1-1. Example of unit-of-readout patterns and readout order patterns
6-0-1-2. Specific example of unit-of-readout patterns priority setting method
6-0-1-3. Specific example of readout order patterns priority setting method
6-1. First modification of third embodiment
6-2. Second modification of third embodiment
6-3. Third modification of third embodiment 7. Fourth Embodiment
7-1. First modification of fourth embodiment
7-2. Second modification of fourth embodiment
7-3. Third modification of fourth embodiment
8. Fifth Embodiment

1. CONFIGURATION EXAMPLE ACCORDING TO EACH OF EMBODIMENTS OF THE PRESENT DISCLOSURE

A configuration of an imaging apparatus according to the present disclosure will be schematically described. FIG. 1 is a block diagram illustrating a configuration of an example of an imaging apparatus applicable to each of embodiments of the present disclosure. In FIG. 1, an imaging apparatus 1 includes a sensor unit 10, a sensor controller 11, a recognition processing unit 12, a memory 13, a visual recognition processing unit 14, and an output controller 15. The imaging apparatus 1 is a complementary metal oxide semiconductor (CMOS) image sensor (CIS) in which these individual units are integrally formed by using CMOS. The imaging apparatus 1 is not limited to this example, and may be another type of optical sensor such as an infrared light sensor that performs imaging with infrared light.

The sensor unit 10 outputs a pixel signal corresponding to the light emitted to a light receiving surface via a optical unit 30. More specifically, the sensor unit 10 has a pixel array in which pixels including at least one photoelectric conversion element are arranged in a matrix. The light receiving surface is formed by individual pixels arranged in a matrix in the pixel array. The sensor unit 10 further includes: a drive circuit for driving individual pixels included in the pixel array and a signal processing circuit that performs predetermined signal processing on the signal read out from each of pixels and outputs the processed signal as a pixel signal of each of the pixels. The sensor unit 10 outputs the pixel signal of each of the pixels included in the pixel region as image data in digital format.

Hereinafter, in the pixel array included in the sensor unit 10, a region in which valid pixels for generating the pixel signal are arranged will be referred to as a frame. Frame image data is formed by pixel data based on each of pixel signals output from each of the pixels included in the frame. Furthermore, each of rows in the pixel array of the sensor unit 10 is referred to as a line, and pixel data based on a pixel signal output from each of pixels included in the line will form line image data. The operation in which the sensor unit 10 outputs a pixel signal corresponding to the light applied to the light receiving surface is referred to as imaging. The sensor unit 10 controls the exposure at the time of imaging and the gain (analog gain) of the pixel signal in accordance with the imaging control signal supplied from the sensor controller 11 described below.

Constituted with a microprocessor, for example, the sensor controller 11 controls the readout of pixel data from the sensor unit 10, and outputs pixel data based on each of pixel signals read out from each of pixels included in the frame. The pixel data output from the sensor controller 11 is passed to the recognition processing unit 12 and the visual recognition processing unit 14.

Furthermore, the sensor controller 11 generates an imaging control signal for controlling the imaging in the sensor unit 10. The sensor controller 11 generates the imaging control signal in accordance with instructions from the recognition processing unit 12 and the visual recognition processing unit 14, which will be described below, for example. The imaging control signal contains information indicating the above-described exposure and analog gain set at the time of imaging in the sensor unit 10. The imaging control signal further contains a control signal (vertical synchronization signal, horizontal synchronization signal, or the like) used by the sensor unit 10 to perform imaging operation. The sensor controller 11 supplies the generated imaging control signal to the sensor unit 10.

The optical unit 30 is provided to apply light from the subject to the light receiving surface of the sensor unit 10 and is disposed at a position corresponding to the sensor unit 10, for example. The optical unit 30 includes, for example, a plurality of lenses, a diaphragm mechanism for adjusting the size of an aperture with respect to the incident light, and a focus mechanism for adjusting the focus of light applied to a light receiving surface. The optical unit 30 may further include a shutter mechanism (mechanical shutter) that adjusts the duration for which light is applied to the light receiving surface. The diaphragm mechanism, focus mechanism, and shutter mechanism of the optical unit 30 can be controlled by the sensor controller 11, for example. Not limited to this, the aperture/diaphragm and focus of the optical unit 30 can be controlled from the outside of the imaging apparatus 1. It is also possible to integrally configure the optical unit 30 with the imaging apparatus 1.

The recognition processing unit 12 performs recognition processing on an object included in the image containing pixel data based on the pixel data passed from the sensor controller 11. In the present disclosure, for example, a digital signal processor (DSP) reads out and executes a program that has undergone preliminary learning using training data and that is stored as a learning model in the memory 13, thereby actualizing the recognition processing unit 12 as a machine learning unit that performs the recognition process using a deep neural network (DNN). The recognition processing unit 12 can instruct the sensor controller 11 to read out the pixel data needed for the recognition process from the sensor unit 10. The recognition result obtained by the recognition processing unit 12 is passed to the output controller 15.

The visual recognition processing unit 14 executes processing for obtaining an image suitable for human recognition on the pixel data passed from the sensor controller 11, and outputs image data containing a set of pixel data, for example. For example, an image signal processor (ISP) reads out and executes a program stored beforehand in the memory (not illustrated), thereby actualizing the visual recognition processing unit 14.

For example, in a case where a color filter is provided for each of pixels included in the sensor unit 10 and the pixel data has individual types of color information, namely, information of red (R), green (G), and blue (B), the visual recognition processing unit 14 can execute a demosaic process, a white balance process, or the like. Furthermore, the visual recognition processing unit 14 can instruct the sensor controller 11 to read out the pixel data needed for the visual recognition process from the sensor unit 10. The image data in which pixel data has undergone image processing performed by the visual recognition processing unit 14 is passed to the output controller 15.

The output controller 15 is constituted with a microprocessor, for example, and outputs one or both of the recognition result passed from the recognition processing unit 12 and the image data passed as a visual recognition processing result from the visual recognition processing unit 14, to the outside of the imaging apparatus 1. The output controller 15 can output image data to a display unit 31 having a display device, for example. This enables the user to visually recognize the image data displayed by the display unit 31. The display unit 31 may be built in the imaging apparatus 1 or may be provided outside the imaging apparatus 1.

Figure 2A:
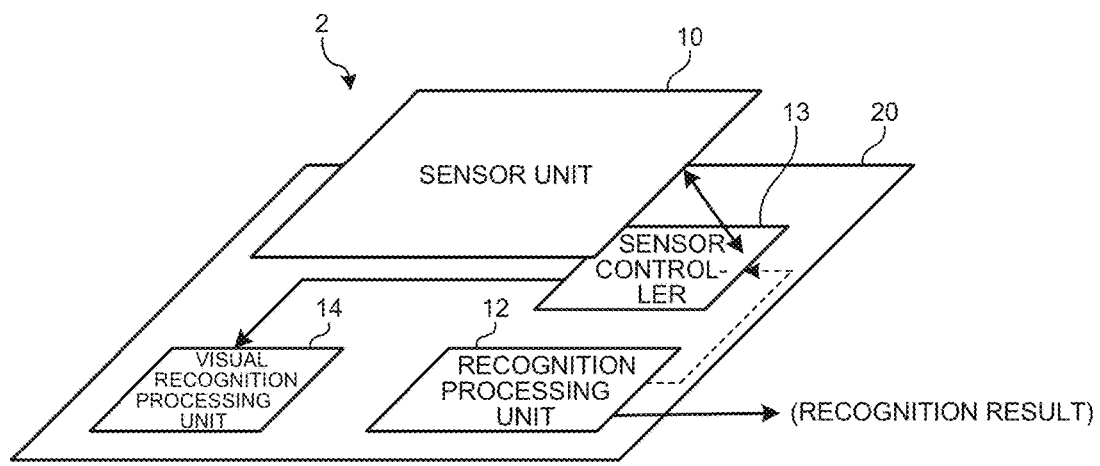
FIG. 2A is a schematic diagram illustrating an example of a hardware configuration of an imaging apparatus according to each of embodiments.
Figure 2B:
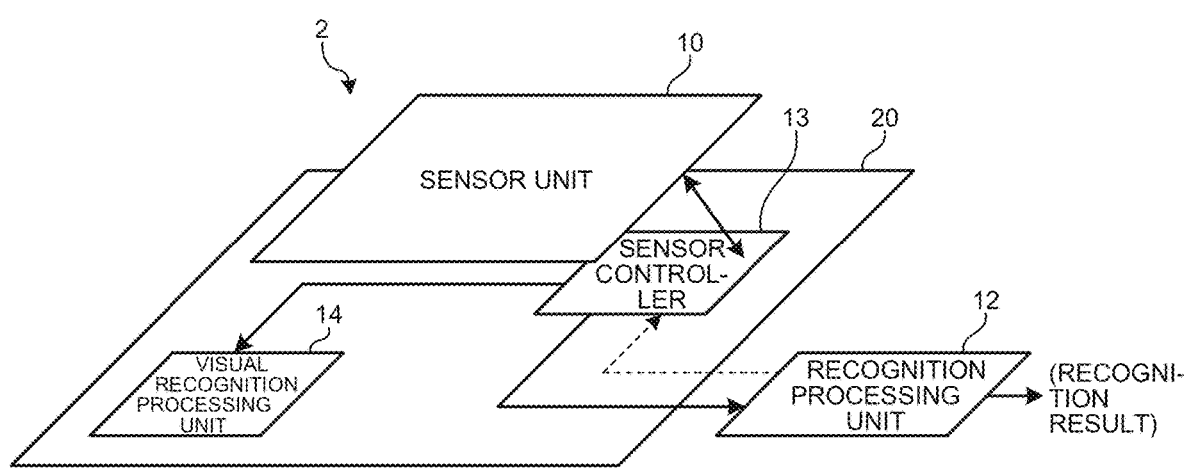
FIG. 2B is a schematic diagram illustrating an example of a hardware configuration of an imaging apparatus according to each of embodiments.

FIGS. 2A and 2B are schematic diagrams illustrating an example of a hardware configuration of the imaging apparatus 1 according to each of embodiments. FIG. 2A in an example in which the sensor unit 10, the sensor controller 11, the recognition processing unit 12, the memory 13, the visual recognition processing unit 14, and the output controller 15, out of the components in FIG. 1, are mounted on one chip 2. Note that FIG. 2A omits illustration of the memory 13 and the output controller 15 for simplification.

In the configuration illustrated in FIG. 2A, the recognition result obtained by the recognition processing unit 12 is output to the outside of the chip 2 via the output controller 15 (not illustrated). Furthermore, in the configuration of FIG. 2A, the recognition processing unit 12 can acquire pixel data for use in recognition from the sensor controller 11 via an internal interface of the chip 2.

FIG. 2B is an example in which the sensor unit 10, the sensor controller 11, the visual recognition processing unit 14, and the output controller 15, out of the components in FIG. 1, are mounted on one chip 2, and the recognition processing unit 12 and the memory 13 (not illustrated) are disposed outside the chip 2. FIG. 2B also omits illustration of the memory 13 and the output controller 15 for simplification, similarly to FIG. 2A.

In the configuration of FIG. 2B, the recognition processing unit 12 acquires pixel data to be used for recognition via an interface provided for inter-chip communication. Furthermore, in FIG. 2B, the recognition result obtained by the recognition processing unit 12 is output from the recognition processing unit 12 directly to the outside, but the output method is not limited to this example. That is, in the configuration of FIG. 2B, the recognition processing unit 12 may return the recognition result to the chip 2 and may perform control to output the result from the output controller 15 (not illustrated) mounted on the chip 2.

In the configuration illustrated in FIG. 2A, the recognition processing unit 12 is mounted on the chip 2 together with the sensor controller 11, enabling high-speed communication between the recognition processing unit 12 and the sensor controller 11 to be executed by the internal interface of the chip 2. On the other hand, the configuration illustrated in FIG. 2A has a difficulty in replacement of the recognition processing unit 12, leading to a difficulty in changing the recognition process. In contrast, the recognition processing unit 12 in the configuration illustrated in FIG. 2B is provided outside the chip 2, there is a need to perform communication between the recognition processing unit 12 and the sensor controller 11 via an interface between the chips. This makes the communication between the recognition processing unit 12 and the sensor controller 11 slower than in the configuration illustrated in FIG. 2A, leading to a possibility of an occurrence of delay in the control. On the other hand, the recognition processing unit 12 can be easily replaced, and thus various recognition processes can be implemented.

Hereinafter, unless otherwise specified, the imaging apparatus 1 has a configuration including the sensor unit 10, the sensor controller 11, the recognition processing unit 12, the memory 13, the visual recognition processing unit 14, and the output controller 15, which are mounted on one chip 2 in FIG. 2A.

In the configuration illustrated in FIG. 2A described above, the imaging apparatus 1 can be formed on one substrate. Not limited to this, the imaging apparatus 1 may be implemented as a stacked CIS in which a plurality of semiconductor chips is stacked and integrally formed.

Figure 3A:
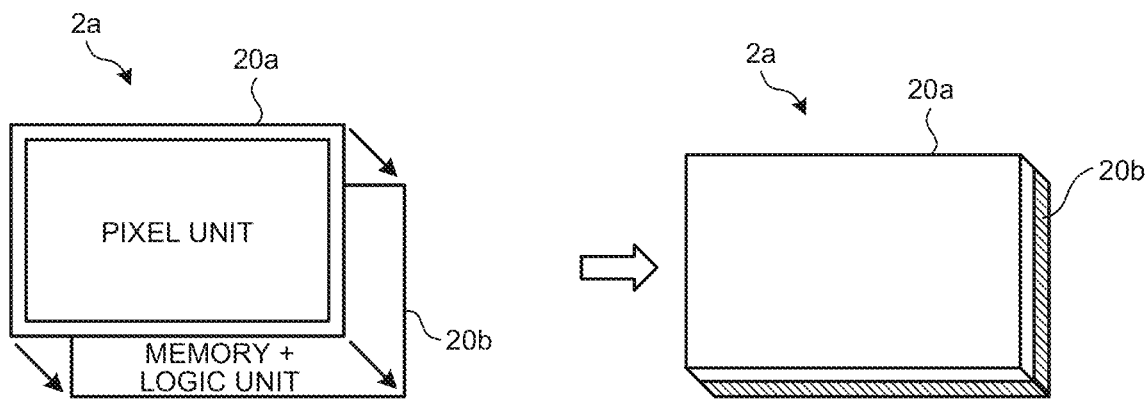
FIG. 3A is a diagram illustrating an example in which an imaging apparatus according to each of embodiments is formed as a stacked CIS with a two-layer structure.

As an example, the imaging apparatus 1 can be formed to have a two-layer structure in which semiconductor chips are stacked in two layers. FIG. 3A is a diagram illustrating an example in which the imaging apparatus 1 according to each of embodiments is formed as a stacked CIS with a two-layer structure. In the structure of FIG. 3A, a pixel unit 20a is formed on a first-layer semiconductor chip, and a memory+ logic unit 20b is formed on a second-layer semiconductor chip. The pixel unit 20a includes at least a pixel array in the sensor unit 10. For example, the memory+logic unit 20b includes the sensor controller 11, the recognition processing unit 12, the memory 13, the visual recognition processing unit 14, and the output controller 15, as well as an interface provided for communication between the imaging apparatus 1 and the outside. The memory+logic unit 20b further includes a part or all of the drive circuit that drives the pixel array in the sensor unit 10. Furthermore, although not illustrated, the memory+logic unit 20b can further include memory used by the visual recognition processing unit 14 for processing image data.

As illustrated on the right side of FIG. 3A, the first-layer semiconductor chip and the second-layer semiconductor chip are bonded together while having electrical contact with each other, enabling the imaging apparatus 1 to be configured as one solid-state imaging element.

Figure 3B:
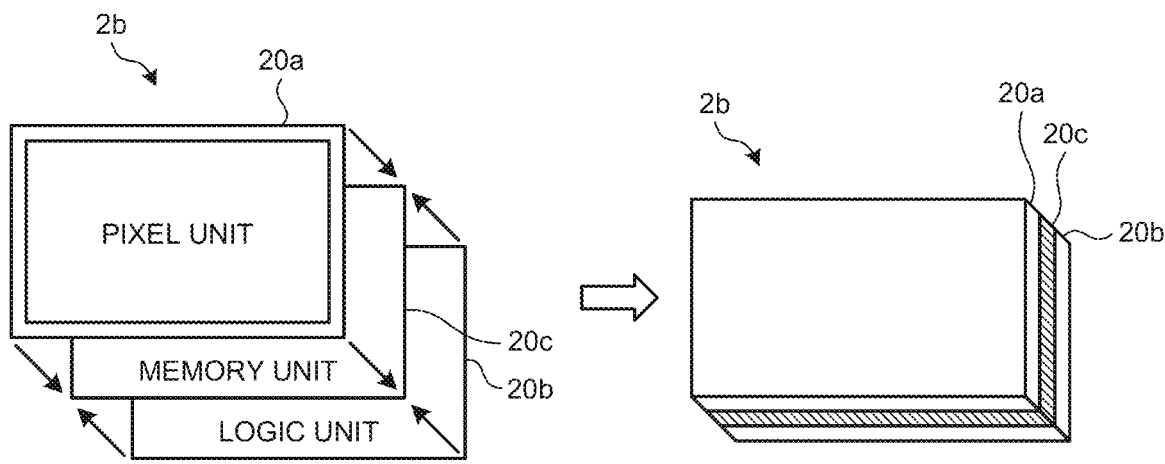
FIG. 3B is a diagram illustrating an example in which an imaging apparatus according to each of embodiments is formed as a stacked CIS with a three-layer structure.

As another example, the imaging apparatus 1 can be formed to have a three-layer structure in which semiconductor chips are stacked in three layers. FIG. 3B is a diagram illustrating an example in which the imaging apparatus 1 according to each of embodiments is formed as a stacked CIS with a three-layer structure. In the structure of FIG. 3B, a pixel unit 20a is formed on a first-layer semiconductor chip, a memory unit 20c is formed on a second-layer semiconductor, and a logic unit 20b' is formed on a third-layer semiconductor chip. In this case, the logic unit 20b' includes the sensor controller 11, the recognition processing unit 12, the visual recognition processing unit 14, the output controller 15, and the interface provided for communication between the imaging apparatus 1 and the outside, for example. Furthermore, the memory unit 20c can include the memory 13 and memory used by the visual recognition processing unit 14 for processing image data, for example. The memory 13 may be included in the logic unit 20b'.

As illustrated on the right side of FIG. 3B, the first-layer semiconductor chip, the second-layer semiconductor chip, and the third-layer semiconductor chip are bonded together while having electrical contact with each other, enabling the imaging apparatus 1 to be configured as one solid-state imaging element.

Figure 4:
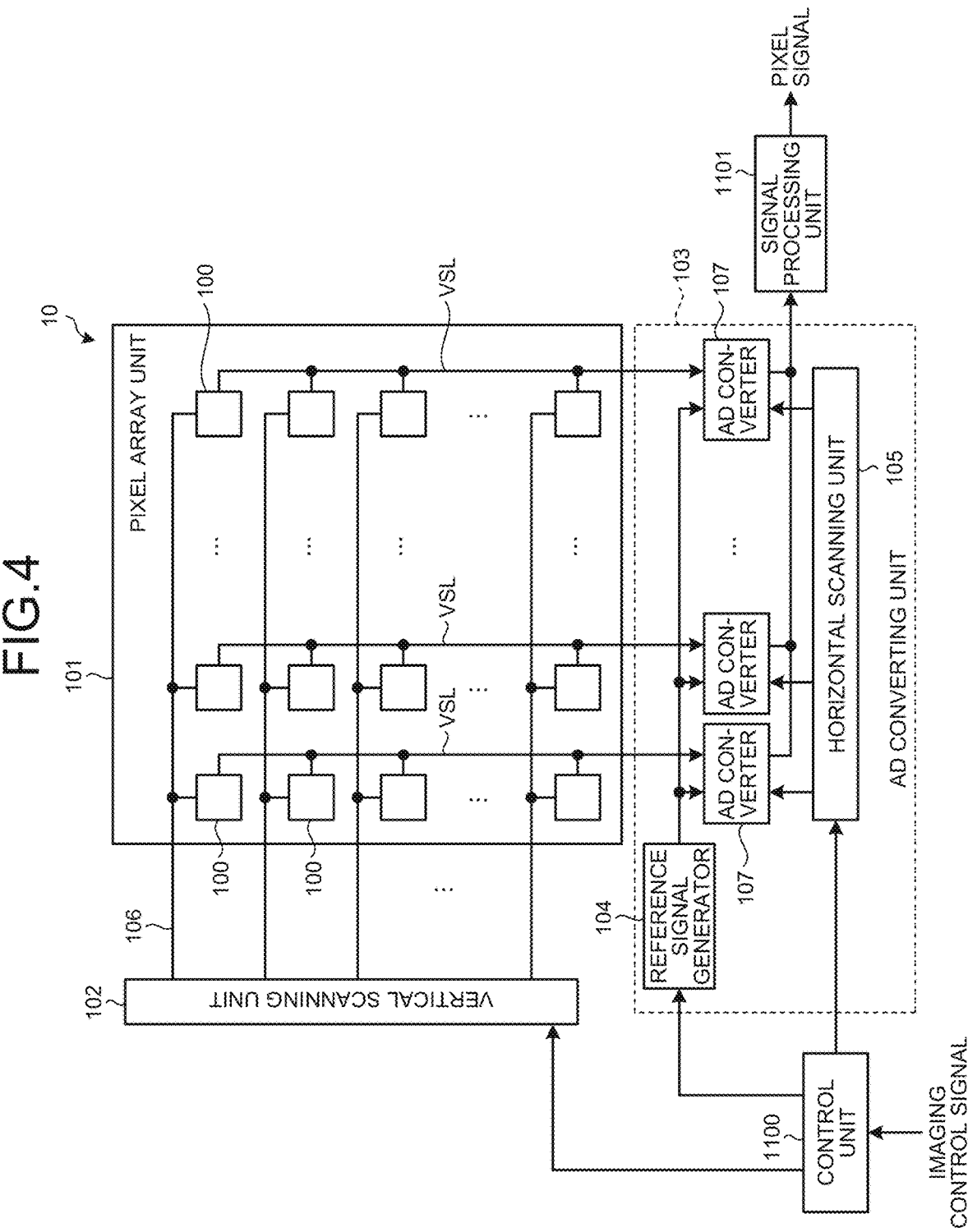
FIG. 4 is a block diagram illustrating a configuration of an example of a sensor unit applicable to each of embodiments.

FIG. 4 is a block diagram illustrating a configuration of an example of the sensor unit 10 applicable to each of embodiments. In FIG. 4, the sensor unit 10 includes a pixel array unit 101, a vertical scanning unit 102, an analog to digital (AD) converting unit 103, a pixel signal line 106, a vertical signal line VSL, a control unit 1100, and a signal processing unit 1101. In FIG. 4, the control unit 1100 and the signal processing unit 1101 can be included in the sensor controller 11 illustrated in FIG. 1, for example.

The pixel array unit 101 includes a plurality of pixel circuits 100 each of which including a photoelectric conversion element using a photodiode, for example, which performs photoelectric conversion on the received light, and a circuit that performs readout of a charge from the photoelectric conversion element. In the pixel array unit 101, the plurality of pixel circuits 100 are arranged in a matrix in the horizontal direction (row direction) and the vertical direction (column direction). In the pixel array unit 101, the arrangement of the pixel circuits 100 in the row direction is referred to as a line. For example, in a case where an image of one frame is formed by 1920 pixels×1080 lines, the pixel array unit 101 includes at least 1080 lines including at least 1920 pixel circuits 100. A pixel signal read out from the pixel circuit 100 included in the frame forms an image (a piece of image data) of one frame.

Hereinafter, an operation of reading out a pixel signal from each of the pixel circuits 100 included in the frame in the sensor unit 10 will be described as an operation of reading out a pixel from the frame, as appropriate. Furthermore, an operation of reading out a pixel signal from each of the pixel circuits 100 of the line included in the frame will be described as an operation of reading out a line, as appropriate, Furthermore, in the pixel array unit 101, the pixel signal line 106 is connected to each of rows and the vertical signal line VSL is connected to each of columns, regarding row and columns of each of the pixel circuits 100. An end of the pixel signal line 106 that is not connected to the pixel array unit 101 is connected to the vertical scanning unit 102. The vertical scanning unit 102 transmits a control signal such as a drive pulse used at the time of readout of a pixel signal from a pixel, to the pixel array unit 101 via the pixel signal line 106 under the control of the control unit 1100 described below. The end of the vertical signal line VSL that is not connected to the pixel array unit 101 is connected to the AD converting unit 103. The pixel signal read out from the pixel is transmitted to the AD converting unit 103 via the vertical signal line VSL.

The readout control of the pixel signal from the pixel circuit 100 will be schematically described. The readout of a pixel signal from the pixel circuit 100 is performed in processes of transferring the charge stored in the photoelectric conversion element by exposure to the floating diffusion layer (FD) and converting the transferred charge in the floating diffusion layer into a voltage. The voltage converted from the charge in the floating diffusion layer is output to the vertical signal line VSL via an amplifier.

More specifically, the pixel circuit 100 is set, during exposure, to turn off (open) the connection between the photoelectric conversion element and the floating diffusion layer so as to store the charge generated by the light incident by the photoelectric conversion, in the photoelectric conversion element. After the end of exposure, the floating diffusion layer and the vertical signal line VSL are connected in accordance with a selection signal supplied via the pixel signal line 106. Furthermore, the floating diffusion layer is connected to the supply line of the power supply voltage VDD or the black level voltage in a short period of time in accordance with a reset pulse supplied via the pixel signal line 106 so as to reset the floating diffusion layer. The reset level voltage (defined as voltage A) of the floating diffusion layer is output to the vertical signal line VSL. Thereafter, the transfer pulse supplied via the pixel signal line 106 turns on (close) the connection between the photoelectric conversion element and the floating diffusion layer so as to transfer the electric charge stored in the photoelectric conversion element to the floating diffusion layer. A voltage (defined as voltage B) corresponding to the amount of charge in the floating diffusion layer is output to the vertical signal line VSL.

The AD converting unit 103 includes an AD converter 107 provided for each of the vertical signal lines VSL, a reference signal generator 104, and a horizontal scanning unit 105. The AD converter 107 is a column AD converter that performs an AD conversion process on each of columns of the pixel array unit 101. The AD converter 107 performs the AD conversion process on the pixel signal supplied from the pixel circuit 100 via the vertical signal line VSL, and thereby generates two digital values (values corresponding to Voltage A and B used in the correlated double sampling (CDS) process for noise reduction.

The AD converter 107 supplies the two generated digital values to the signal processing unit 1101. The signal processing unit 1101 performs the CDS process based on the two digital values supplied from the AD converter 107, and thereby generates a pixel signal (a piece of pixel data) formed of a digital signal. The pixel data generated by the signal processing unit 1101 is output to the outside of the sensor unit 10.

Based on the control signal input from the control unit 1100, the reference signal generator 104 generates a ramp signal as a reference signal, which is used by each of the AD converters 107 to convert the pixel signal into two digital values. The ramp signal is a signal in which the level (voltage value) decreases with a constant slope with respect to the time, or a signal in which the level decreases stepwise. The reference signal generator 104 supplies the generated ramp signal to each AD converter 107. The reference signal generator 104 is configured by using a digital to analog converter (DAC) or the like.

When a ramp signal in which the voltage drops stepwise with a predetermined inclination is supplied from the reference signal generator 104, the counter starts counting in accordance with the clock signal. A comparator compares the voltage of the pixel signal supplied from the vertical signal line VSL with the voltage of the ramp signal, and stops the counting by the counter at the timing when the voltage of the ramp signal crosses the voltage of the pixel signal. The AD converter 107 outputs a value corresponding to the count value at the time when the count is stopped, thereby converting the pixel signal being the analog signal into a digital value.

The AD converter 107 supplies the two generated digital values to the signal processing unit 1101. The signal processing unit 1101 performs the CDS process based on the two digital values supplied from the AD converter 107, and thereby generates a pixel signal (a piece of pixel data) formed of a digital signal. The pixel signal being the digital signal generated by the signal processing unit 1101 is output to the outside of the sensor unit 10.

Under the control of the control unit 1100, the horizontal scanning unit 105 performs selective scanning in which each of the AD converters 107 is selected in a predetermined order so as to sequentially output each of the digital values temporarily held in each of the AD converters 107 to the signal processing unit 1101. The horizontal scanning unit 105 is implemented as a shift register or an address decoder, for example.

Based on the imaging control signal supplied from the sensor controller 11, the control unit 1100 performs drive control of the vertical scanning unit 102, the AD converting unit 103, the reference signal generator 104, the horizontal scanning unit 105, or the like. The control unit 1100 generates various drive signals that make a reference for the operation of the vertical scanning unit 102, the AD converting unit 103, the reference signal generator 104, and the horizontal scanning unit 105. Based on the vertical synchronization signal or the external trigger signal, and the horizontal synchronization signal, included in the imaging control signal, for example, the control unit 1100 generates a control signal to be supplied by the vertical scanning unit 102 to each of the pixel circuits 100 via the pixel signal line 106. The control unit 1100 supplies the generated control signal to the vertical scanning unit 102.

Furthermore, the control unit 1100 passes, for example, information indicating an analog gain included in the imaging control signal supplied from the sensor controller 11 to the AD converting unit 103. Based on the information indicating the analog gain, the AD converting unit 103 controls the gain of the pixel signal input to each of the AD converters 107 included in the AD converting unit 103 via the vertical signal line VSL.

Based on the control signal supplied from the control unit 1100, the vertical scanning unit 102 supplies various signals including a drive pulse in the pixel signal line 106 of the selected pixel row of the pixel array unit 101 to each of the pixel circuits 100 line by line, so as to allow the pixel signal to be output from each of the pixel circuits 100 to the vertical signal line VSL. The vertical scanning unit 102 is implemented as a shift register or an address decoder, for example. Furthermore, the vertical scanning unit 102 controls the exposure in each of the pixel circuits 100 based on the information indicating the exposure supplied from the control unit 1100.

The sensor unit 10 configured in this manner is a column AD type Complementary Metal Oxide Semiconductor (CMOS) image sensor in which AD converters 107 are arranged in columns.

2. EXAMPLES OF EXISTING TECHNOLOGIES APPLICABLE TO THE PRESENT DISCLOSURE

Prior to the description of each of embodiments according to the present disclosure, the existing technologies applicable to the present disclosure will be outlined in order to facilitate understanding.

(2-1. Overview of Rolling Shutter)

Figure 5A:
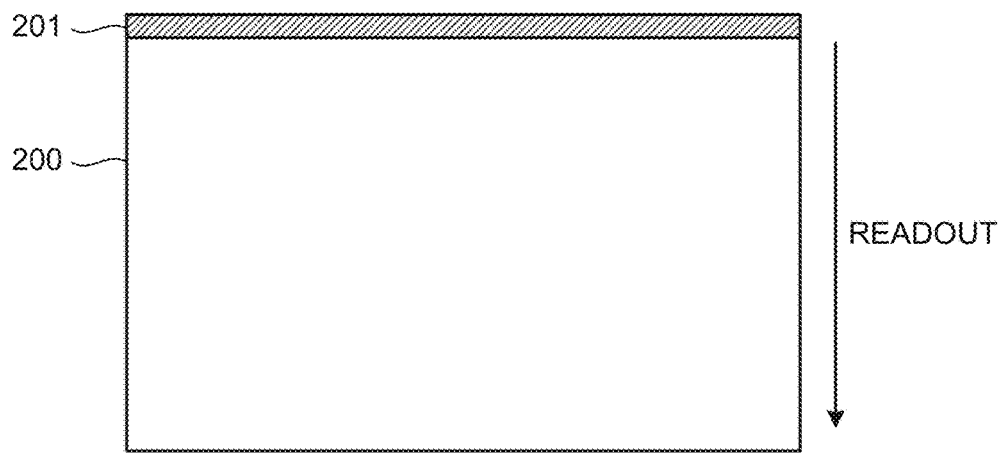
FIG. 5A is a schematic view illustrating a rolling shutter method.
Figure 5B:
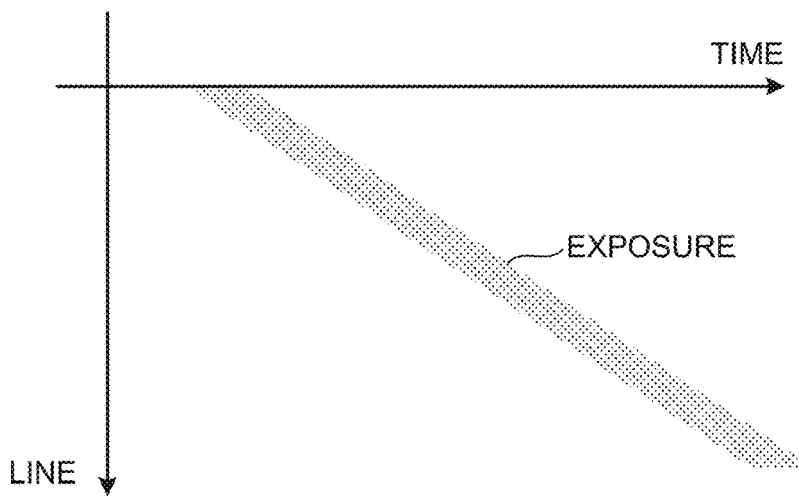
FIG. 5B is a schematic view illustrating a rolling shutter method.
Figure 5C:
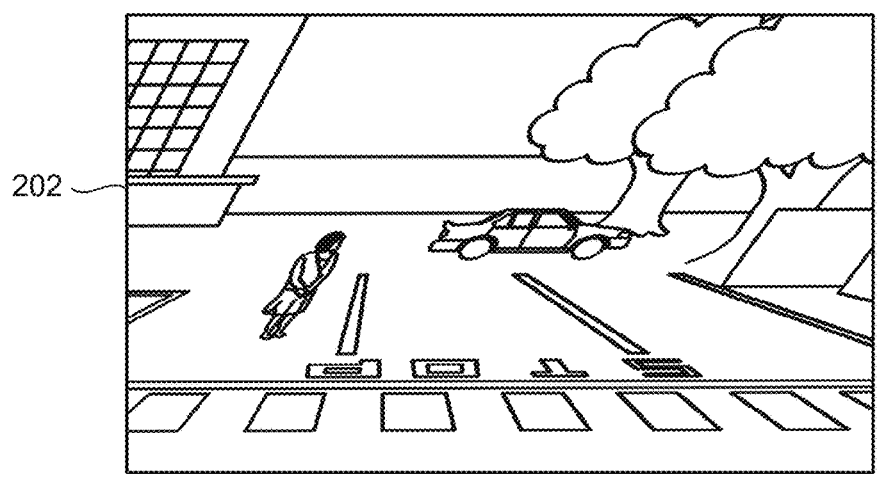
FIG. 5C is a schematic view illustrating a rolling shutter method.

Known imaging methods used at the execution of imaging by the pixel array unit 101 include a rolling shutter (RS) method and a global shutter (GS) method. First, the rolling shutter method will be schematically described. FIGS. 5A, 5B, and 5C are schematic views illustrating the rolling shutter method. In the rolling shutter method, as illustrated in FIG. 5A, imaging is performed in order from line 201 at an upper end of a frame 200, for example, in units of lines.

The above description has described "imaging" as representation of an operation in which the sensor unit 10 outputs a pixel signal corresponding to the light applied to the light receiving surface. More specifically, "imaging" is used to represent a series of operations starting from the exposure of a pixel up to the transfer of the pixel signal based on the charge stored by the exposure to the photoelectric conversion element included in the pixel, to the sensor controller 11. Furthermore, as described above, a frame refers to a region of the pixel array unit 101 in which the pixel circuit 100 valid for generating a pixel signal is arranged.

For example, in the configuration of FIG. 4, exposure is simultaneously executed for each of the pixel circuits 100 included in one line. After the end of the exposure, the pixel signals based on the charges stored by the exposure are simultaneously transferred in each of the pixel circuits 100 included in the line via each of the vertical signal lines VSL corresponding to each of the pixel circuits 100. By sequentially executing this operation in units of line, it is possible implement imaging with a rolling shutter.

FIG. 5B schematically illustrates an example of a relationship between imaging and time in the rolling shutter method. In FIG. 5B, the vertical axis represents the line position and the horizontal axis represents the time. In the rolling shutter method, since the exposure for each of lines is performed sequentially in the order of lines, the timing of exposure in each of the lines shifts sequentially with the position of the line, as illustrated in FIG. 5B. Therefore, for example, in a case where the horizontal positional relationship between the imaging apparatus 1 and the subject changes at high speed, the captured image of the frame 200 is distorted as illustrated in FIG. 5C. In the example of FIG. 5C, the image 202 corresponding to the frame 200 is an image inclined at an angle corresponding to the speed and direction of change in the horizontal positional relationship between the imaging apparatus 1 and the subject.

Figure 6A:
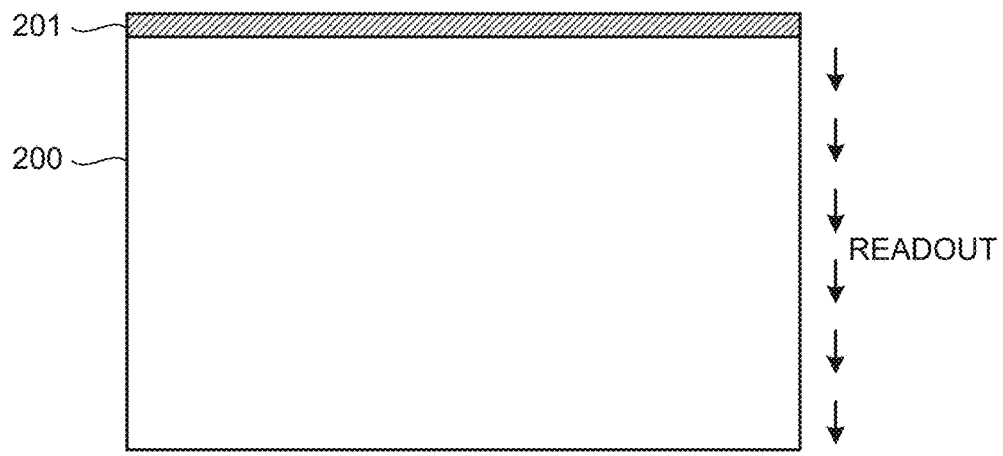
FIG. 6A is a schematic diagram illustrating line thinning in the rolling shutter method.
Figure 6B:
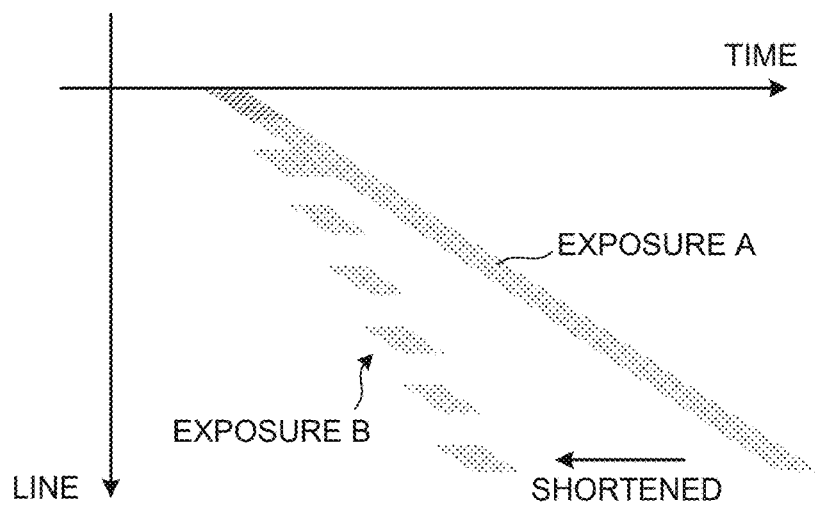
FIG. 6B is a schematic diagram illustrating line thinning in the rolling shutter method.
Figure 6C:
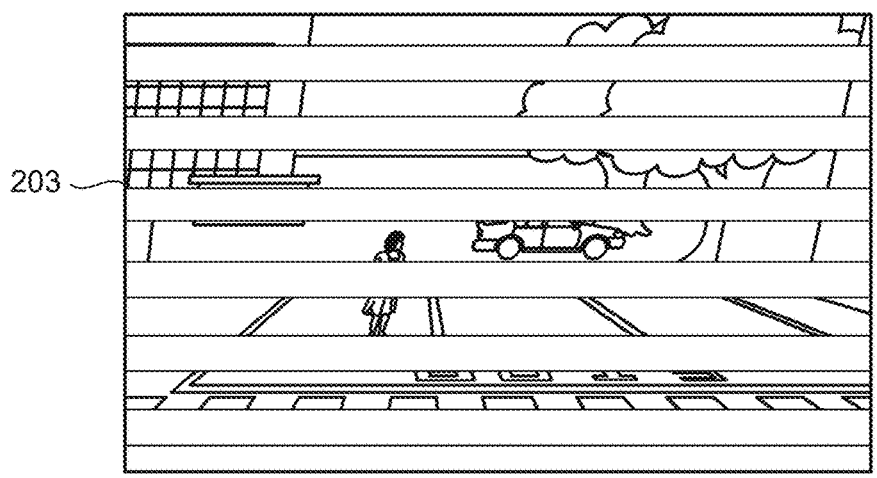
FIG. 6C is a schematic diagram illustrating line thinning in the rolling shutter method.

In the rolling shutter method, it is also possible to thin out lines for imaging. FIGS. 6A, 6B, and 6C are schematic views illustrating line thinning in the rolling shutter method. As illustrated in FIG. 6A, similarly to the example of FIG. 5A described above, imaging is performed in units of line from line 201 at the upper end of the frame 200 toward the lower end of the frame 200. At this time, imaging is performed while skipping lines at predetermined numbers.

Here, for the sake of explanation, it is assumed that imaging is performed every other line by performing one-line thinning. That is, after the imaging of the nth line, the imaging of the (n+2) line is performed. At this time, the time from the imaging of the nth line to the imaging of the (n+2) line is assumed to be equal to the time from the imaging of the nth line to the imaging of the (n+1) line when the thinning is not performed.

FIG. 6B schematically illustrates an example of a relationship between imaging and time when one-line thinning is performed in the rolling shutter method. In FIG. 6B, the vertical axis represents the line position and the horizontal axis represents the time. In FIG. 6B, exposure A corresponds to the exposure of FIG. 5B without thinning, and exposure B illustrates the exposure when one-line thinning is performed. As illustrated in the exposure B, execution of line thinning makes it possible to reduce the deviation of the exposure timing at the same line position as compared with the case where the line thinning is not executed. Therefore, as illustrated as image 203 in FIG. 6C, the distortion in the inclination direction occurring in the image of the captured frame 200 is smaller compared to the case where the line thinning illustrated in FIG. 5C is not performed. On the other hand, the resolution of the image when line thinning is performed is lower compared to the case where line thinning is not performed.

Figure 7A:
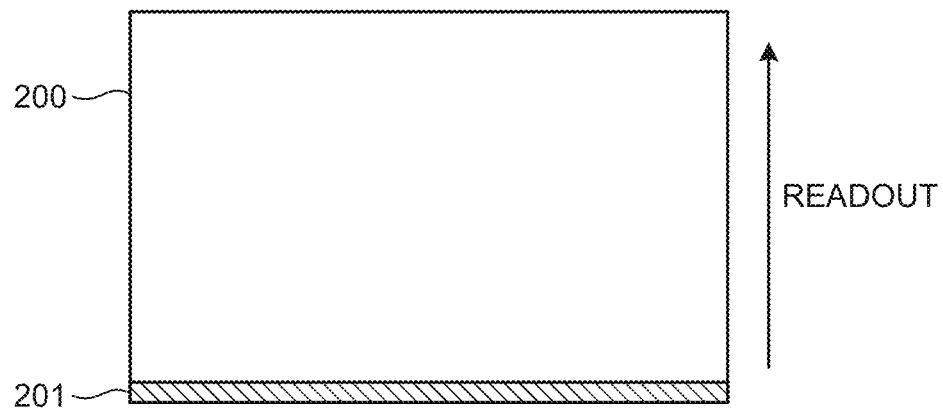
FIG. 7A is a diagram schematically illustrating an example of another imaging method in the rolling shutter method.
Figure 7B:
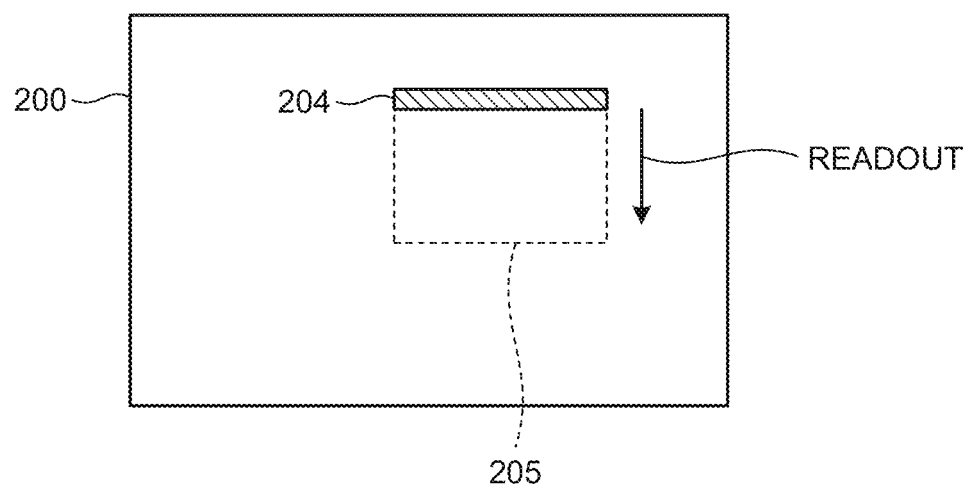
FIG. 7B is a diagram schematically illustrating an example of another imaging method in the rolling shutter method.

The above description is an example of the rolling shutter method in which imaging is performed sequentially in the order of lines from the upper end to the lower end of the frame 200. However, the present has been described, but the present disclosure is not limited to this example. FIGS. 7A and 7B are diagrams schematically illustrating examples of other imaging methods in the rolling shutter method. For example, as illustrated in FIG. 7A, it is possible, in the rolling shutter method, to perform imaging sequentially in the order of lines from the lower end to the upper end of the frame 200. In this case, the direction of the distortion of the image 202 in the horizontal direction would be opposite to the direction in the case where the images are imaged sequentially in the order of lines from the upper end to the lower end other frame 200.

Furthermore, by setting the range of the vertical signal line VSL used for the transfer of the pixel signal, for example, it is also possible to selectively read out a part of the line. Furthermore, by individually setting the line used for imaging and the vertical signal line VSL used for the transfer of the pixel signal, it is also possible to set the imaging start/end lines to positions other than the upper end and the lower end of the frame 200. FIG. 7B schematically illustrates an example in which a region 205 having a rectangular shape and width and height less than the width and height of the frame 200 is set as an imaging range. In the example of FIG. 7B, imaging is performed sequentially in the order of lines from line 204 at the upper end of the region 205 toward the lower end of the region 205.

(2-2. Overview of Global Shutter)

Figure 8A:
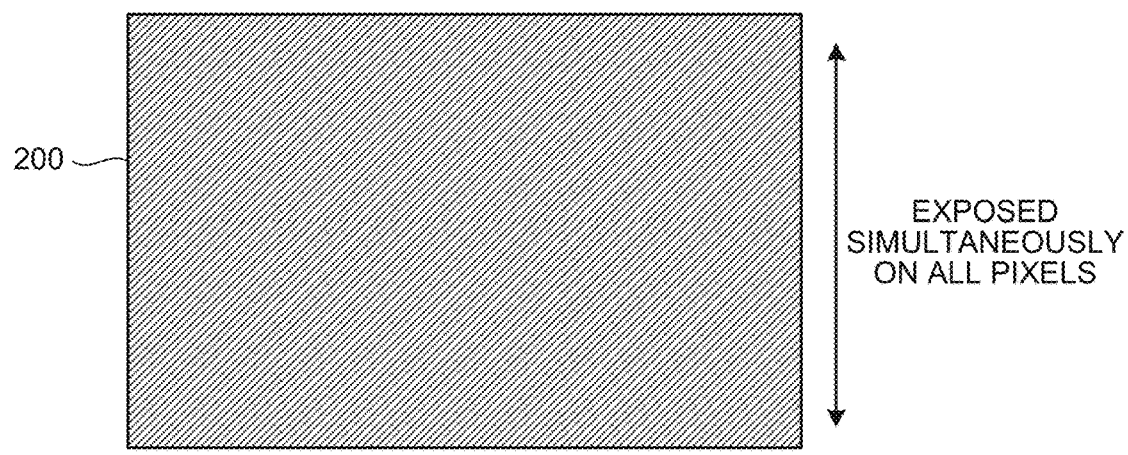
FIG. 8A is a schematic diagram illustrating a global shutter method.
Figure 8B:
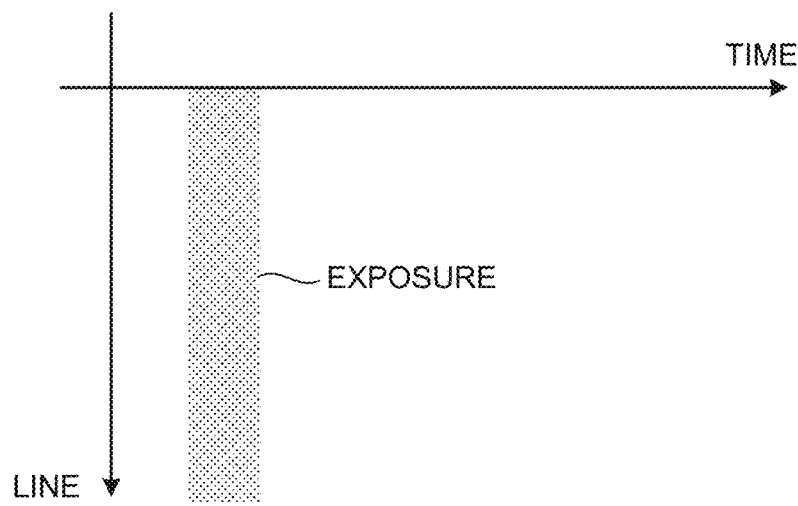
FIG. 8B is a schematic diagram illustrating a global shutter method.
Figure 8C:
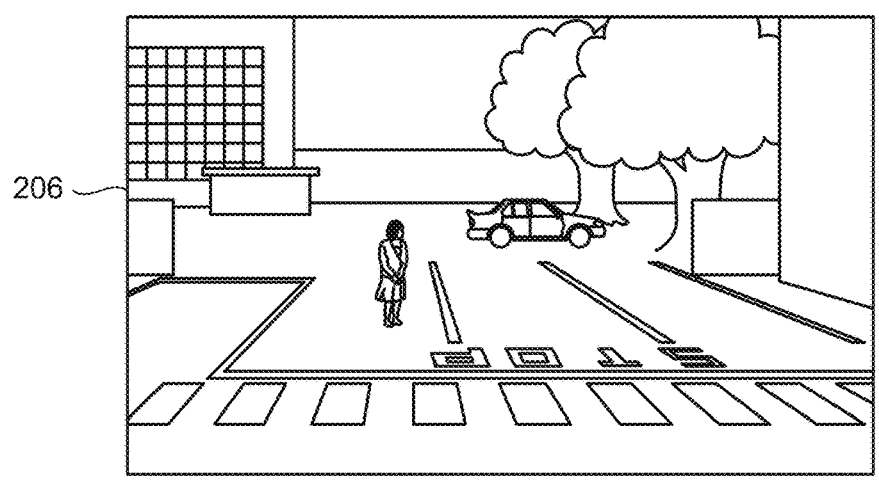
FIG. 8C is a schematic diagram illustrating a global shutter method.

Next, the global shutter (GS) method will be schematically described as an imaging method at the time of imaging by using the pixel array unit 101. FIGS. 8A, 8B, and 8C are schematic views illustrating the global shutter method. As illustrated in FIG. 8A, the global shutter method simultaneously exposes in all-pixel circuits 100 included in the frame 200.

When the global shutter method is implemented in the configuration of FIG. 4, it is conceivable, as an example, to use a configuration of the pixel circuits 100 in which a capacitor is further provided between the photoelectric conversion element and the FD. In addition, the configuration further includes a first switch provided between the photoelectric conversion element and the capacitor, and a second switch provided between the capacitor and the floating diffusion layer, individually, and the opening and closing of each of the first and second switches is controlled by pulses supplied via the pixel signal line 106.

In such a configuration, in all the pixel circuits 100 included in the frame 200, the first and second switches are set to open during the exposure period, and then, at completion of the exposure, the first switch is switched from open to closed state so as to transfer the charge from the photoelectric conversion element to the capacitor. Thereafter, with the capacitor regarded as a photoelectric conversion element, the charge will be read out from the capacitor in the sequence similar to the sequence used in the readout operation for the rolling shutter method above described. This makes it possible to perform simultaneous exposure in all the pixel circuits 100 included in the frame 200.

FIG. 8B schematically illustrates an example of a relationship between imaging and time in the global shutter method. In FIG. 8B, the vertical axis represents the line position and the horizontal axis represents the time. In the global shutter method, exposure is performed simultaneously in all the pixel circuits 100 included in the frame 200. This makes it possible to obtain the exposure timing which is same for each of lines, as illustrated in FIG. 8B. Therefore, for example, even in a case where the horizontal positional relationship between the imaging apparatus 1 and the subject changes at high speed, an image 206 captured in the frame 200 has no distortion due to the change as illustrated in FIG. 8C.

The global shutter method makes it possible to ensure the simultaneity of exposure timing in the all-pixel circuit 100 included in the frame 200. Therefore, by controlling the timing of each of pulses supplied by the pixel signal line 106 of each of lines and the timing of transfer by each of the vertical signal lines VSL, it is possible to achieve sampling (readout of the pixel signal) in various patterns.

Figure 9A:
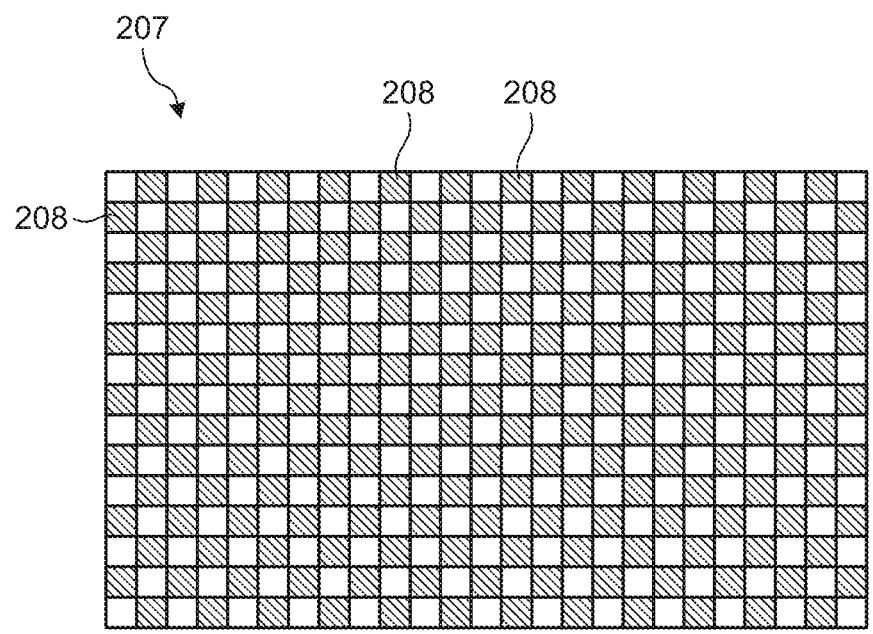
FIG. 9A is a diagram schematically illustrating an example of a sampling pattern implementable in the global shutter method.
Figure 9B:
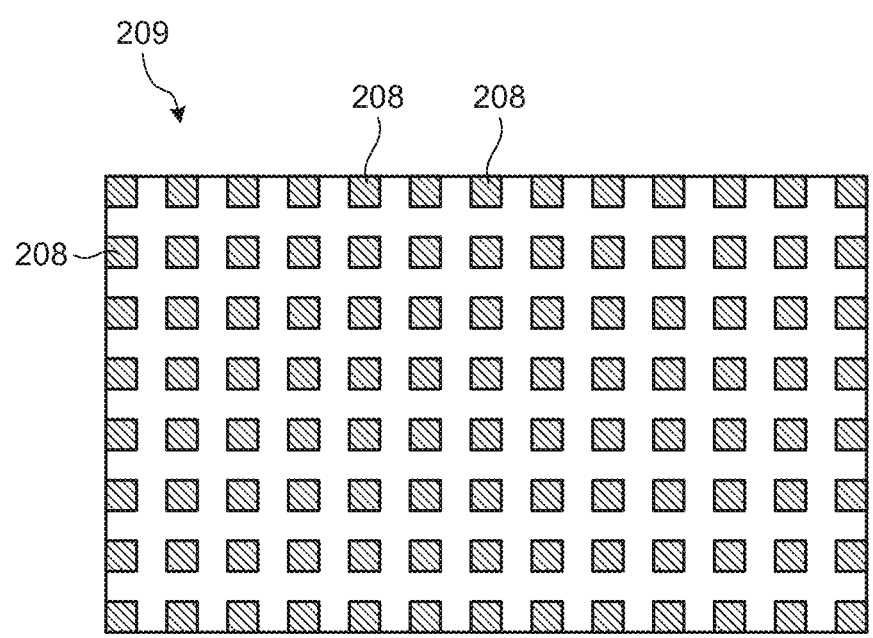
FIG. 9B is a diagram schematically illustrating an example of a sampling pattern implementable in the global shutter method.

FIGS. 9A and 9B are diagrams schematically illustrating an example of a sampling pattern that can be achieved in the global shutter method. FIG. 9A is an example in which a sample 208 of pixel signal readout is extracted in a checkered pattern from each of the pixel circuits 100 arranged in a matrix included in the frame 200. Furthermore, FIG. 9B is an example of extracting the sample 208 of pixel signal readout, from each of the pixel circuits 100 in a grid pattern. Furthermore, in the global shutter method as well, imaging can be performed sequentially in the order of lines similarly to the rolling shutter method described above.

(2-3. Deep Neural Network (DNN))

Next, a recognition process using a deep neural network (DNN) applicable to each of embodiments will be schematically described. In each of embodiments, the recognition process for image data is performed by using a convolutional neural network (CNN) and a recurrent neural network (RNN) in particular, among the DNNs. Hereinafter, the "recognition process for image data" will be referred to as an "image recognition process" or the like, as appropriate.

(2-3-1. Overview of CNN)

Figure 10:
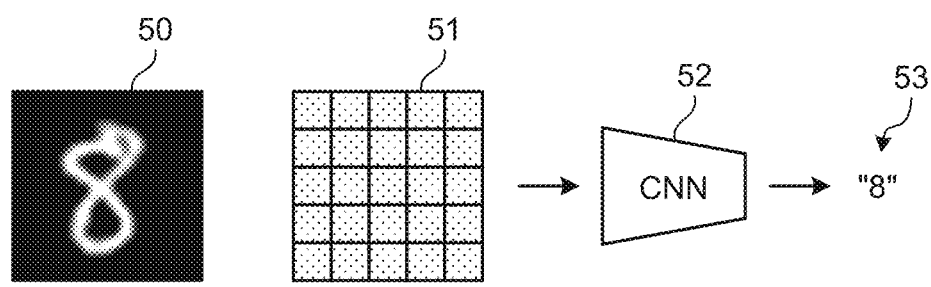
FIG. 10 is a diagram schematically illustrating an image recognition process performed by a CNN.

First, a CNN will be described schematically. In the image recognition process using a CNN, an image recognition process is performed based on image information provided by pixels arranged in a matrix. FIG. 10 is a diagram schematically illustrating an image recognition process performed by a CNN. Pixel information 51 for the whole of an image 50 including a drawing of a number "8", which is an object as a recognition target, is processed by a CNN 52 that has been trained in a predetermined manner. With this process, the number "8" is recognized as a recognition result 53.

In contrast, it is also possible to apply the process by the CNN based on an image for each of lines to obtain the recognition result from a part of the image as a recognition target. FIG. 11 is a diagram schematically illustrating an image recognition process of obtaining a recognition result from a part of the image as a recognition target. In FIG. 11, an image 50' is a partially acquired image of the number "8", which is an object as a recognition target, obtained in units of line. For example, pieces of pixel information 54a, 54b, and 54c for individual lines forming pixel information 51' of an image 50' are sequentially processed by a CNN 52' that has been trained in a predetermined manner.

For example, here is an assumable case where a recognition result 53a obtained by the recognition process performed by the CNN 52' for the pixel information 54a of the first line is not a valid recognition result. Here, a valid recognition result refers to a recognition result for which a score indicating the reliability of the recognized result is a predetermined value or higher. The CNN 52' performs an internal state update 55 based on this recognition result 53a. Next, the pixel information 54b of the second line undergoes a recognition process performed by the CNN 52', which has performed internal state update 55 based on the previous recognition result 53a. In FIG. 11, as a result of this process, a recognition result 53b indicating that the number as the recognition target is either "8" or "9" has been obtained. Furthermore, based on this recognition result 53b, internal information of CNN 52' is updated 55. Next, the pixel information 54c of the third line undergoes a recognition process performed by the CNN 52', which has performed internal state update 55 based on the previous recognition result 53b. As a result, in FIG. 11, the number as the recognition target is narrowed down to "8" out of "8" or "9".

Here, the recognition process illustrated in FIG. 11 updates the internal state of the CNN using the result of the previous recognition process. Next, the CNN whose internal state has been updated uses pixel information of the line adjacent to the line on which the previous recognition process has been performed to perform the recognition process. That is, the recognition process illustrated in FIG. 11 is executed sequentially in the order of lines for the image with the internal state of the CNN updated based on the previous recognition result. Therefore, the recognition process illustrated in FIG. 11 is a process that is recurrently executed sequentially in the order of lines and can be considered to have a structure equivalent to the process of an RNN.

(2-3-2. Overview of RNN)

Figure 12A:
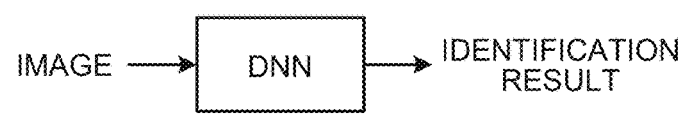
FIG. 12A is a diagram schematically illustrating an example of an identification process performed by DNN when time series information is not used.
Figure 12B:
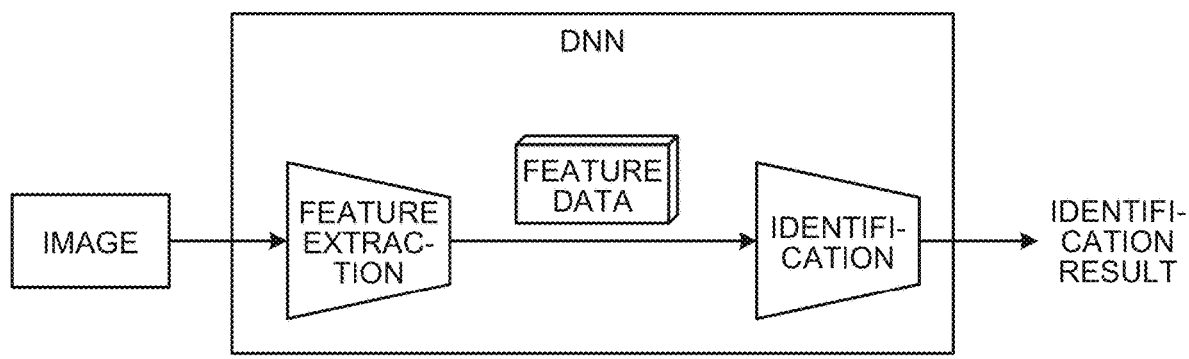
FIG. 12B is a diagram schematically illustrating an example of an identification process performed by DNN when time series information is not used.

Next, the RNN will be described schematically. FIGS. 12A and 12B are diagrams schematically illustrating an example of an identification process (recognition process) performed by a DNN when time series information is not used. In this case, one image is input to a DNN as illustrated in FIG. 12A. The DNN performs an identification process on the input image and outputs a result of the identification.

FIG. 12B is a diagram for providing more specific illustration of the process of FIG. 12A. As illustrated in FIG. 12B, the DNN executes a feature extraction process and an identification process. The DNN performs a feature extraction process on the input image, thereby extracting a feature data of the image. In addition, the DNN executes the identification process on the extracted feature data and obtains the identification result.

Figure 13A:
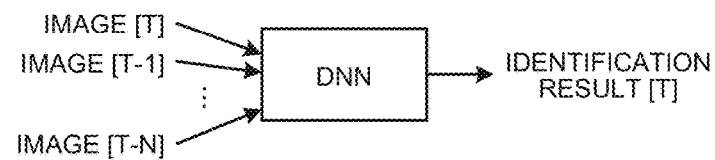
FIG. 13A is a diagram schematically illustrating a first example of an identification process performed by DNN when time series information is used.
Figure 13B:
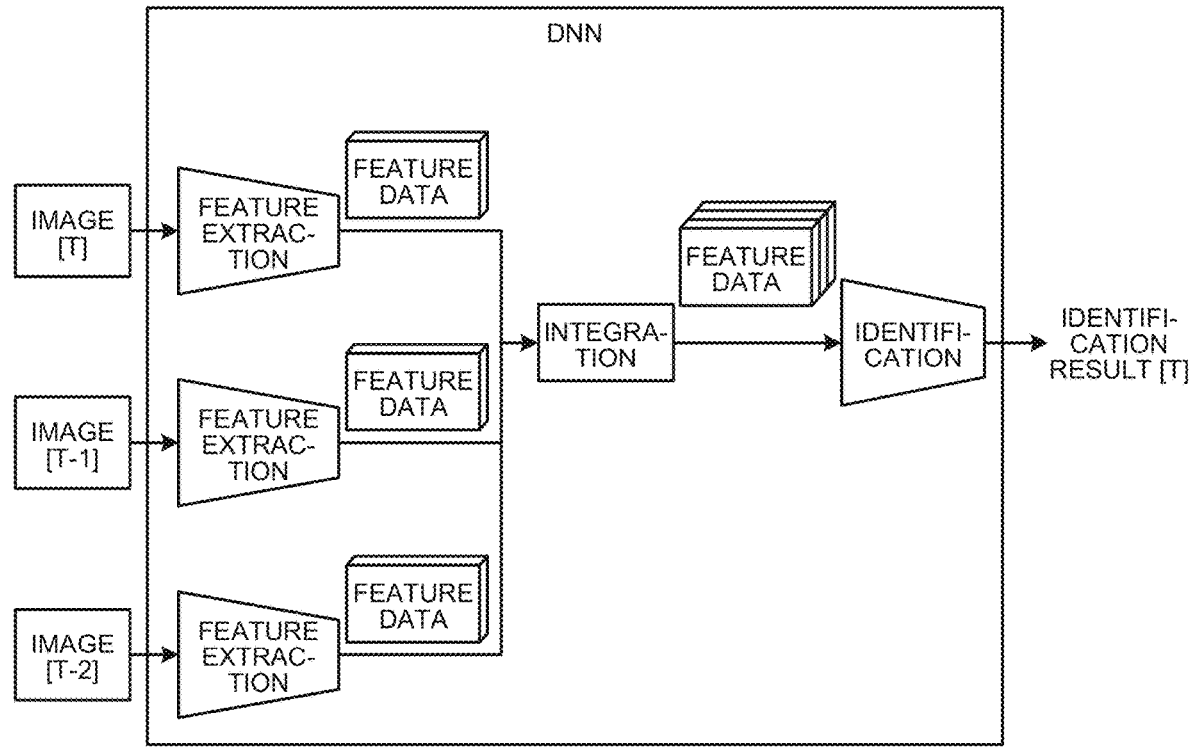
FIG. 13B is a diagram schematically illustrating the first example of an identification process performed by DNN when time series information is used.

FIGS. 13A and 13B are diagrams schematically illustrating a first example of an identification process performed by a DNN when time series information is used. In the examples of FIGS. 13A and 13B, identification process with the DNN is performed using a fixed number of pieces of past information in the time series. In the example of FIG. 13A, an image [T] at time T, an image [T−1] at time T−1 before time T, and an image [T−2] at time T−2 before time T−1 are input to the DNN. The DNN executes an identification process on each of the input images [T], [T−1], and [T−2], thereby obtaining an identification result [T] at time T.

FIG. 13B is a diagram for providing more specific illustration of the process of FIG. 13A. As illustrated in FIG. 13B, the DNN executes the feature extraction process described with reference to FIG. 12B above on each of the input images [T], [T−1], and [T−2], thereby extracting pieces of feature data individually corresponding to the images [T], [T−1], and [T−2]. The DNN integrates the feature data obtained based on these images [T], [T−1], and [T−2], and further executes an identification process on the integrated feature data, thereby obtaining an identification result [T] at time T.

The methods of FIGS. 13A and 13B would make it necessary to have a plurality of configurations for performing feature data extraction, as well as necessary to have a configuration for performing feature data extraction in accordance with the number of usable past images, leading to enlargement of the DNN configuration.

Figure 14A:
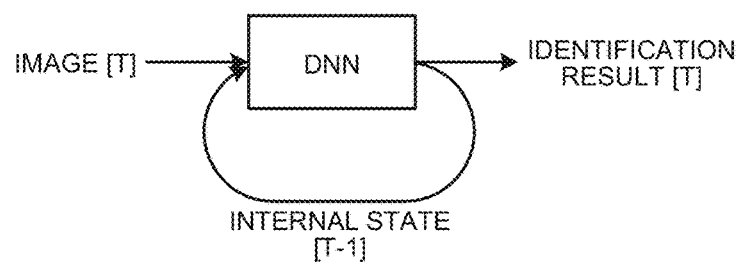
FIG. 14A is a diagram schematically illustrating a second example of an identification process performed by DNN when time series information is used.
Figure 14B:
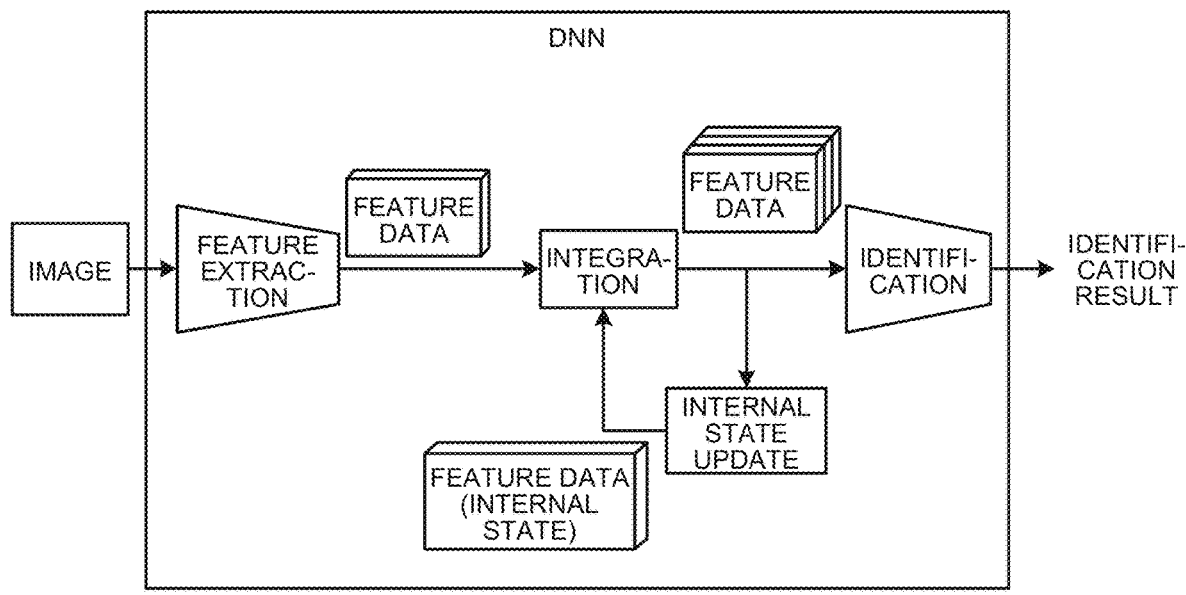
FIG. 14B is a diagram schematically illustrating the second example of an identification process performed by DNN when time series information is used.

FIGS. 14A and 14B are diagrams schematically illustrating a second example of an identification process performed by a DNN when time series information is used. In the example of FIG. 14A, an image [T] at time T is input to the DNN whose internal state has been updated to the state of time T−1, thereby obtaining an identification result [T] at time T.

FIG. 14B is a diagram for providing more specific illustration of the process of FIG. 14A. As illustrated in FIG. 14B, the DNN executes the feature extraction process described above with reference to FIG. 12B on the input image [T] at time T, thereby extracting the feature data corresponding to the image [T]. In the DNN, the internal state has been updated by the image before time T, and the feature data related to the updated internal state is retained. The feature related to the retained internal information and the feature data on the image [T] are integrated, and the identification process is executed on the integrated feature data.

The identification process illustrated in FIGS. 14A and 14B is executed using the DNN whose internal state has been updated using the immediately preceding identification result, and thus is a recurrent process. A DNN that performs a recurrent process in this manner is referred to as a recurrent neural network (RNN). The identification process performed by RNN is typically used in moving image recognition, or the like, in which it is possible to improve the identification accuracy by sequentially updating the internal state of the DNN with a frame image updated in time series, for example.

In the present disclosure, RNNs are applied to rolling shutter method structures. That is, in the rolling shutter method, pixel signals are read out sequentially in the order of lines. The pixel signals read out sequentially in the order of lines are applied to the RNN as information on the time series. This makes it possible to execute the identification process based on a plurality of lines with a smaller configuration compared with the case of using a CNN (refer to FIG. 13B). Not limited to this, an RNN can also be applied to the structure of the global shutter method. In this case, for example, it is conceivable to regard adjacent lines as information in time series.

(2-4. Drive Speed)

Figure 15A:
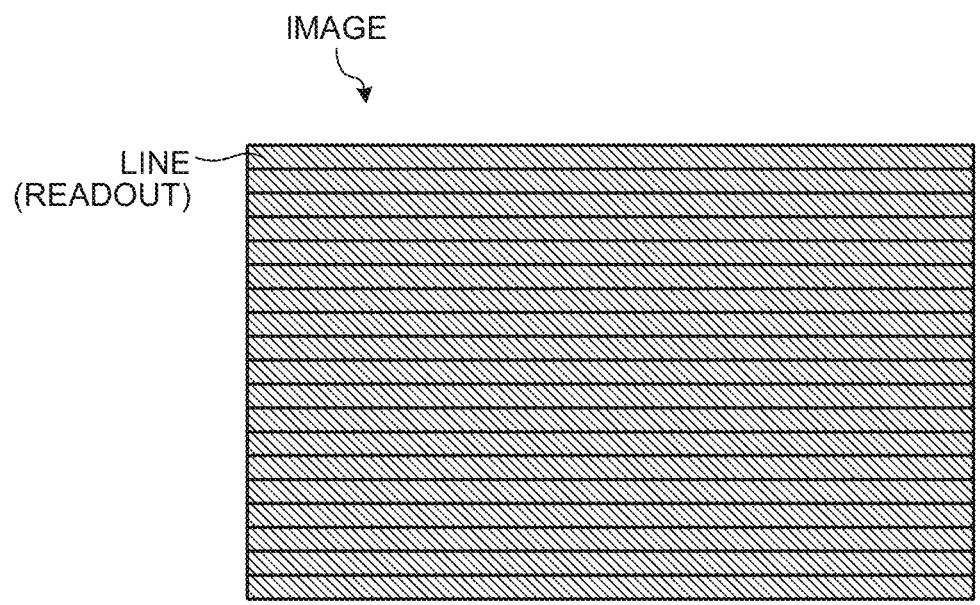
FIG. 15A is a diagram illustrating a relationship between a frame drive speed and a pixel signal readout amount.
Figure 15B:
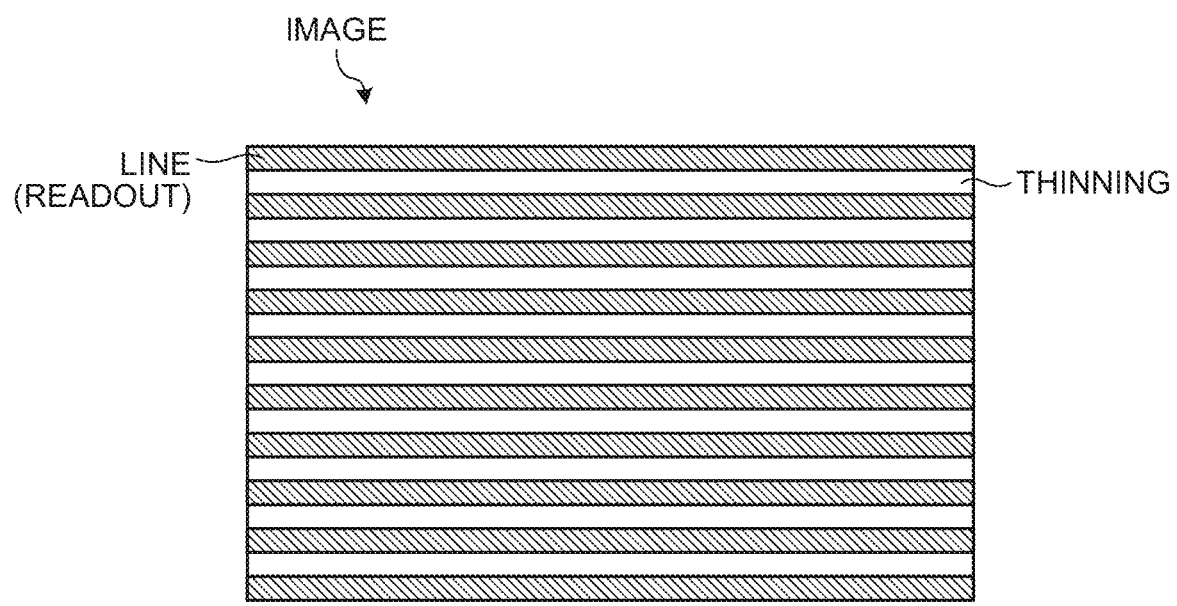
FIG. 15B is a diagram illustrating a relationship between a frame drive speed and a pixel signal readout amount.

Next, a relationship between the frame drive speed and the pixel signal readout amount will be described with reference to FIGS. 15A and 15B. FIG. 15A is a diagram illustrating an example of reading out all the lines in the image. Here, it is assumed that the resolution of the image as a recognition process target is 640 pixels horizontally× 480 pixels vertically (480 lines). In this case, when driving at a drive speed of 14400 [lines/sec], it is possible to output at 30 [frame per second (fps)].

Next, here is an assumable case of performing imaging while thinning of lines. For example, as illustrated in FIG. 15B, it is assumed that imaging is performed by skipping every other line, namely, imaging is performed by readout using ½ thinning. As a first example of ½ thinning, driving at a drive speed of 14400 [lines/sec] as described above halves the number of lines read out from the image. Although the resolution is reduced, it is possible to achieve an output at the rate 60 [fps], which is twice as fast as a case without thinning, leading to improvement of the frame rate. A second example of ½ thinning is a case where driving is performed at a drive speed of 7200 [fps], which is half of the first example. In this case, although the frame rate will be 30 [fps] similarly to the case without thinning, power saving is achieved.

When reading out an image line, it is possible to select whether thinning is not performed, thinning is performed to increase the drive speed, or thinning is performed and the drive speed is kept at the same speed as the case without thinning, in accordance with the purpose of the recognition process based on the pixel signal to read out.

3. OVERVIEW OF PRESENT DISCLOSURE

Hereinafter, each of embodiments of the present disclosure will be described in more detail. First, the processes according to each of embodiments of the present disclosure will be schematically described. FIG. 16 is a schematic diagram schematically illustrating a recognition process according to each of embodiments of the present disclosure. In FIG. 16, in Step S1, an imaging apparatus 1 (refer to FIG.

1) according to each of embodiments starts imaging of a target image, as a recognition target.

Note that the target image is an image in which a hand-written number "8", for example. Furthermore, as preconditions, the memory 13 preliminarily stores a learning model trained to be able to identify numbers by predetermined training data, as a program, and the recognition processing unit 12 reads out this program from the memory 13 and executes the program, thereby enabling identification of the numbers included in the image. Furthermore, the imaging apparatus 1 shall perform imaging by the rolling shutter method. Even when the imaging apparatus 1 performs imaging by the global shutter method, the following processes can be applied similarly to the case of the rolling shutter method.

When the imaging is started, the imaging apparatus 1 sequentially reads out the frame in units of line from the upper end side to the lower end side of the frame in Step S2.

When the line is read out up to a certain position, the recognition processing unit 12 identifies the number "8" or "9" from the image of the read out lines (Step S3). For example, the numbers "8" and "9" include a feature common to the upper half part. Accordingly, at a point where the line is read out in order from the top and the feature is recognized, the recognized object can be identified as either the number "8" or the number "9".

Here, as illustrated in Step S4a, the whole picture of the recognized object appears by reading up to the line at the lower end of the frame or the line near the lower end, and the object which has been identified as either the number "8" or "9" in Step S2 is now determined as the number "8".

In contrast, Steps S4b and S4c are processes related to the present disclosure.

As illustrated in Step S4b, when the line is read further from the line position read out in Step S3, the recognized object can be identified as the number "8" even before reaching the lower end of the number "8". For example, the lower half of the number "8" and the lower half of the number "9" have different features. By reading out the line to the part that clarifies the difference in the feature, it is possible to identify whether the object recognized in Step S3 is the number "8" or "9". In the example of FIG. 16, the object is determined to be the number "8" in Step S4b.

Furthermore, as illustrated in Step S4c, it is also conceivable to further read out from the line position of Step S3 in the state of Step S3 so as to jump to a line position where the object identified in Step S3 seems to be able to be determined as either the number "8" or the number "9". By reading out the line reached by the jump, it is possible to determine whether the object identified in Step S3 is the number "8" or "9". The line position reached by the jump can be determined based on a learning model preliminarily trained based on predetermined training data.

Here, in a case where the object is identified in Step S4b or Step S4c described above, the imaging apparatus 1 can end the recognition process. This makes it possible to shorten the recognition process and save power in the imaging apparatus 1.

Note that the training data is data that holds a plurality of combinations of input signals and output signals for each unit of readout. As an example, in the task of identifying numbers described above, data for each unit of readout (line data, subsampled data, or the like) is applicable as an input signal, and data indicating a "correct number" is applicable as an output signal. As another example, in a task of detecting an object, data for each unit of readout (line data, subsampled data, or the like) is applicable as an input signal, and an object class (human/vehicle/non-object), coordinates of the object (x, y, h, w), or the like, is applicable as an output signal. Furthermore, the output signal may be generated only from the input signal by using self-supervised learning.

4. FIRST EMBODIMENT

Next, a first embodiment of the present disclosure will be described.

(4-1. Operation Example in the Recognition Processing Unit)

In the imaging apparatus 1 according to a first embodiment, as described above, the recognition processing unit 12 reads out and executes a program stored in the memory 13 as a learning model trained in advance based on predetermined training data, thereby functioning as a recognizer using a DNN.

Figure 17:
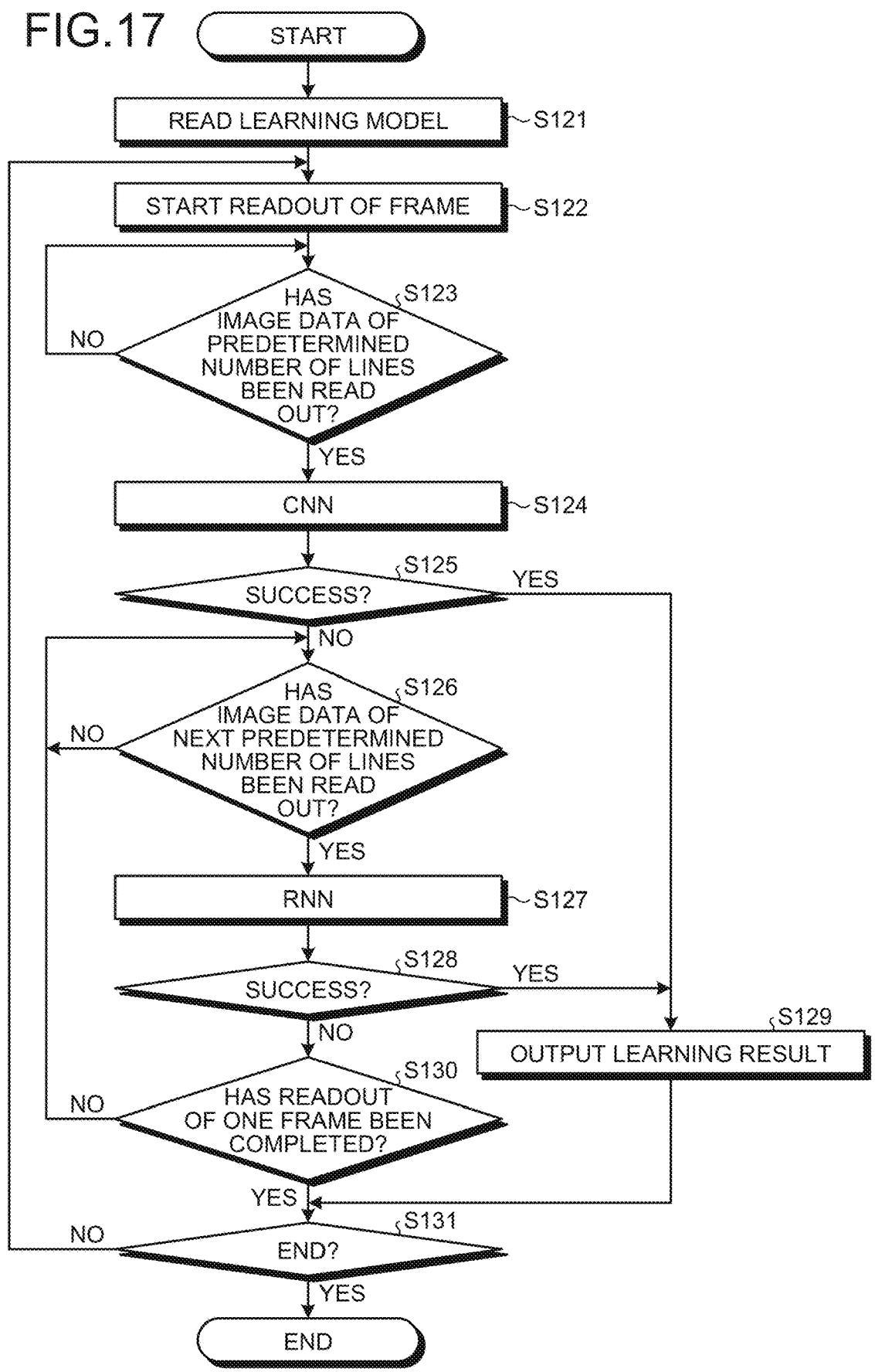
FIG. 17 is a flowchart illustrating an example of a recognition process performed by a recognition processing unit according to a first embodiment.

FIG. 17 is a flowchart illustrating an example of a recognition process performed by the recognition processing unit 12 according to the first embodiment. In FIG. 17, in Step S121, the DSP constituting the recognition processing unit 12 in the imaging apparatus 1 reads out the learning model from the memory 13 and executes it. With this processes, the DSP functions as the recognition processing unit 12.

Next, in Step S122, the recognition processing unit 12 in the imaging apparatus 1 instructs the sensor controller 11 to start readout of a frame from the sensor unit 10. In this frame readout, for example, one frame of image data is sequentially read out in units of line (also referred to as units of row). The recognition processing unit 12 determines whether a predetermined number of lines of image data in one frame has been read out.

When the recognition processing unit 12 determines that the image data of a predetermined number of lines in one frame has been read out (Step S123, "YES"), the recognition processing unit 12 proceeds to the process of Step S124. In Step S124, the recognition processing unit 12 executes a recognition process as a machine learning process using a CNN on the read image data in the predetermined number of lines. That is, the recognition processing unit 12 executes a machine learning process using a learning model on the image data of a predetermined number of lines as a unit region, the machine learning process using a CNN includes execution of various recognition or detection processes such as face detection, face authentication, line-of-sight detection, facial expression recognition, face direction detection, object detection, object recognition, motion (moving body) detection, pet detection, scene recognition, state detection, avoidance target object recognition, and other processes.

Here, the face detection is a process of detecting the face of a person included in the image data. The face authentication is one of biometric authentication, and is a process of authenticating whether the face of a person included in the image data matches the face of a person registered in advance. The line-of-sight detection is a process of detecting the direction of the line of sight of a person included in the image data. Facial expression recognition is a process of recognizing a person's facial expression included in the image data. The face direction detection is a process of detecting the up/down direction of a person's face included in the image data. The object detection is a process of detecting an object included in the image data. The object recognition is a process of recognizing what an object included in the image data is. The motion (moving body) detection is a process of detecting a moving body included in the image data. The pet detection is a process of detecting a pet such as a dog or a cat included in the image data. The scene recognition is a process of recognizing a scene (sea, mountain, or the like) being shot. The state detection is a process of detecting a state (normal state, abnormal state, or the like) of a person or the like included in the image data. The avoidance target object recognition is a process of recognizing an object as an avoidance target that exists in front of the traveling direction in a case where the person moves. The machine learning process executed by the recognition processing unit 12 is not limited to these examples.

In Step S125, the recognition processing unit 12 determines whether the machine learning process using the CNN in Step S124 is successful. When the recognition processing unit 12 determines that the machine learning process using the CNN is successful (Step S125, "YES"), the recognition processing unit 12 proceeds to the process of Step S129. In contrast, when the recognition processing unit 12 determines that the machine learning process using the CNN in Step S124 is a failure (Step S125, "NO"), the recognition processing unit 12 proceeds to the process of Step S126. In Step S126, the recognition processing unit 12 waits for the next predetermined number of lines of image data to be read out from the sensor controller 11 (Step S126, "NO").

In this description, a success in the machine learning process means that a certain detection result, recognition result, or authentication has been obtained in face detection, face authentication, or the like as illustrated above, for example. In contrast, a failure in the machine learning process means that sufficient detection results, recognition results, and authentication have not been obtained in face detection, face authentication, or the like as illustrated above, for example, Next, in Step S126, when the next predetermined number of lines of image data (unit region) is read out (Step S126, "YES"), the recognition processing unit 12 executes in Step S127 the machine learning process using an RNN on the predetermined number of lines of readout image data. The machine learning process using an RNN also utilizes results of the machine learning process using the CNN or the RNN executed so far, for the image data of the same frame.

In a case of having determined in Step S128 that the machine learning process using the RNN in Step S127 is successful (Step S128, "YES"), the recognition processing unit 12 proceeds to the process to Step S129.

In Step S129, the recognition processing unit 12 supplies the machine learning result successfully obtained in Step S124 or Step S127, for example, from the recognition processing unit 12 to the output controller 15. The machine learning result output in Step S129 is a valid recognition result obtained by the recognition processing unit 12, for example. The recognition processing unit 12 may store the machine learning result in the memory 13.

Furthermore, when the recognition processing unit 12 determines in Step S128 that the machine learning process using the RNN in Step S127 is a failure (Step S128, "NO"), the recognition processing unit 12 proceeds to the process of Step S130. In Step S130, the recognition processing unit 12 determines whether the readout of the image data for one frame is completed. When having determined that the readout of the image data for one frame has not been completed (Step S130, "NO"), the recognition processing unit 12 returns the process to Step S126, in which the process for the next predetermined number of lines of image data will be executed.

In contrast, when the recognition processing unit 12 determines in Step S130 that the readout of the image data for one frame is completed (Step S130, "YES"), the recognition processing unit 12 determines whether to end the series of processes of the flowchart in FIG. 17 in Step S131. When the recognition processing unit 12 determines not to end the process (Step S131, "NO"), the recognition processing unit 12 returns the process to Step S122 and executes similar operations on the next frame. When the recognition processing unit 12 determines to end the process (Step S131, "YES"), the recognition processing unit 12 ends the series of processes of the flowchart of FIG. 17.

The determination as to whether to proceed to the next frame in Step S131 may be made based on whether an end instruction has been input from the outside of the imaging apparatus 1, or based on whether the series of processes for the predetermined number of frames of the image data has been completed.

In addition, there is an assumable situation where the machine learning processes such as face detection, face authentication, line-of-sight detection, facial expression recognition, face direction detection, object detection, object recognition, motion (moving body) detection, scene recognition, or state detection are performed successively. In this situation, in a case where the former machine learning process is a failure, the latter machine learning process may be skipped. For example, when face authentication is to be executed after face detection, the latter process of face authentication may be skipped in a case where the face detection has been a failure.

(4-2. Specific Example of Operations in the Recognition Processing Unit)

Next, operations of the machine learning unit described with reference to FIG. 17 will be described with reference to specific examples. In the following, a case where face detection is executed using DNN will be illustrated.

Figure 18:
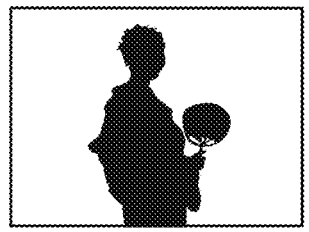
FIG. 18 is a view illustrating an example of image data for one frame.
Figure 19:
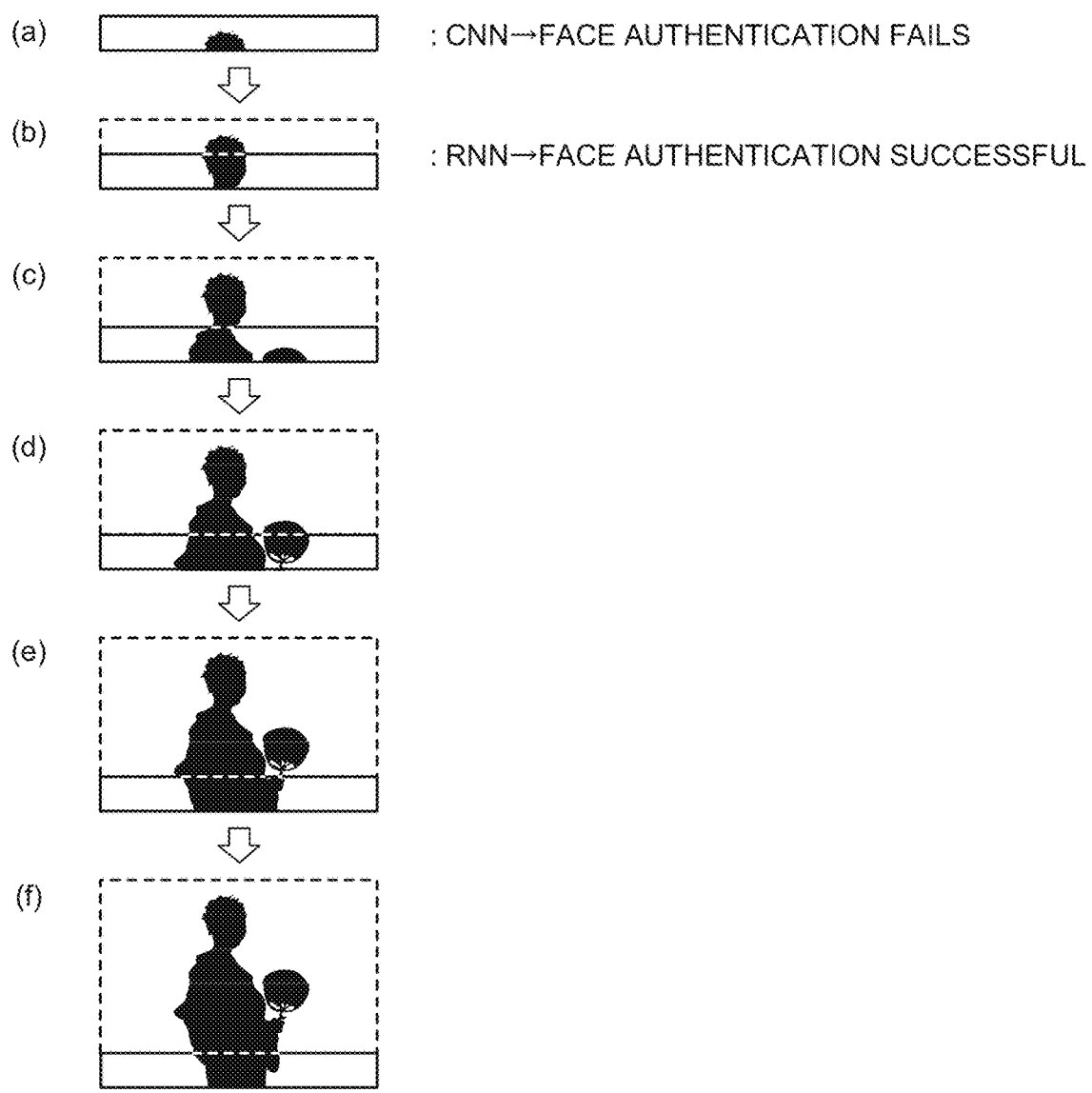
FIG. 19 is a view illustrating a flow of a machine learning process executed by the recognition processing unit according to the first embodiment.

FIG. 18 is a view illustrating an example of image data for one frame. FIG. 19 is a view illustrating a flow of a machine learning process executed by the recognition processing unit 12 according to the first embodiment.

When face detection is executed for image data as illustrated in FIG. 18 by machine learning, as illustrated in Section (a) of FIG. 19, the recognition processing unit 12 first receives an input of a predetermined number of lines of image data (corresponding to Step S123 in FIG. 17). By executing a machine learning process using a CNN on the predetermined number of lines of image data that has been input, the recognition processing unit 12 executes face detection (corresponding to Step S124 in FIG. 17). However, since the image data of the entire face has not been input yet at the stage of Section (a) of FIG. 19, the recognition processing unit 12 fails in face detection (corresponding to "NO" in Step S125 of FIG. 17).

Subsequently, as illustrated in Section (b) of FIG. 19, a next predetermined number of lines of image data is input to the recognition processing unit 12 (corresponding to Step S126 of FIG. 17). While utilizing the result of machine learning process using the CNN executed on the predetermined number of lines of image data input in Section (a) of FIG. 19, the recognition processing unit 12 executes the machine learning process using an RNN on the newly input predetermined number of lines of image data, thereby executing face detection (corresponding to Step S127 in FIG. 17).

At the stage of Section (b) of FIG. 19, image data of the entire face is input together with a predetermined number of lines of pixel data input at the stage of Section (a) of FIG. 19. Accordingly, at the stage of Section (b) of FIG. 19, the recognition processing unit 12 is successful in face detection (corresponding to "YES" in Step S128 of FIG. 17). This causes this operation to output a result of face detection without reading out the next and subsequent pieces of image data (image data in Sections (c) to (f) of FIG. 19) (corresponding to Step S129 in FIG. 17).

In this manner, by executing the machine learning process using a DNN for the predetermined number of lines of the image data, it is possible to omit readout of the image data and execution of the machine learning process after the point where the face detection is successful. This makes it possible to complete the processes such as detection, recognition, and authentication in a short time, leading to the reduction of the processing time and power consumption.

The predetermined number of lines is the number of lines determined by the size of a filter required by the algorithm of the learning model, and the minimum number is one line.

Furthermore, the image data read out from the sensor unit 10 by the sensor controller 11 may be image data thinned out in at least one of the column direction and the row direction. In that case, for example, when the image data is read out every other row in the column direction, the image data on the 2(N−1) (N is an integer of 1 or more) th line will be read out.

Furthermore, in a case where the filter required by the learning model algorithm is formed not in units of line unit but formed as a rectangular region in units of pixels such as 1×1 pixel or 5×5 pixels, image data in a rectangular region corresponding to the shape and size of the filter may be input to the recognition processing unit 12 instead of the predetermined number of lines of image data, as image data for a unit region on which the recognition processing unit 12 executes the machine learning process.

Furthermore, although the above illustrates the CNN and the RNN as examples of the DNN, the present disclosure is not limited to these, and other learning models can be used.

(4-3. Application Example of the First Embodiment)

Next, an application example of the first embodiment will be described. Here, as an application example of the first embodiment, the following is an example of controlling the exposure in a predetermined number of lines on which next readout is to be performed based on the result of the machine learning process performed by CNN in Step S124 of the flowchart of FIG. 17 and the result of the machine learning process performed by RNN in Step S127, for example. FIGS. 20A and 20B are schematic views illustrating an application example of the first embodiment.

Section (a) of FIG. 20A is a schematic view illustrating an example of an image 60a which is overexposed. The overexposure of the image 60a causes the image 60a to appear whitish as a whole. For example, a monitor 62 as an object included in the image 60a has a phenomenon referred to as blown-out highlight in the screen, making it difficult for the human eye to distinguish the details. On the other hand, a person 61 as another object included in the image 60a is slightly whitish due to overexposure, but appears easily identifiable to the human eye as compared with the monitor 62.

Section (b) of FIG. 20A is a schematic view illustrating an example of an image 60b which is underexposed. The underexposure of the image 60b causes the image 60b to appear blackish as a whole. For example, the person 61 visible in the image 60a is now difficult to identify to the human eye. On the other hand, the monitor 62 included in the image 60b can be identified in detail to the human eye as compared with the image 60a.

FIG. 20B is a schematic diagram illustrating a readout method according to an application example of the first embodiment. Sections (a) and (b) of FIG. 20B illustrate a case where frame readout is started in an underexposed state in Step S122 of the flowchart of FIG. 17 described above.

Section (a) of FIG. 20B illustrates a readout method according to a first example in the application example of the first embodiment. An image 60c of the Section (a) of FIG. 20B indicates, for example, that the recognition process using the CNN in Step S124 regarding a line L #1 at the top of a frame has failed, or a score representing the reliability of the recognition result is a predetermined value or less. In this case, the recognition processing unit 12 instructs the sensor controller 11 to set the exposure of a line L #2 to be read out in Step S126 to an exposure suitable for the recognition process (in this case, set to a larger exposure amount). In FIG. 20B, the lines L #1, L #2, and so on may be one individual line, or may be a plurality of lines adjacent to each other.

In the example in Section (a) of FIG. 20B, the exposure amount for line L #2 is larger than the exposure amount of line L #1. It is assumed, in this case, that the result is overexposure of line L #2 and the recognition process using the RNN in Step S127 has failed or the score is a predetermined value or less. The recognition processing unit 12 instructs the sensor controller 11 to set the exposure amount for line L #3 to be read out after the process returns from the Step S130 to the Step S126 to be smaller than the exposure amount for the line L #2.

Similarly, the exposure amount of the next line will be sequentially set also for lines L #4, . . . , L #m, . . . in accordance with the result of the recognition process.

In this manner, by adjusting the exposure amount of the line to be read out next based on the recognition result of a certain line, it is possible to execute the recognition process with higher accuracy.

In addition, as a further application of the above application example, as illustrated in Section (b) of FIG. 20B, there is a conceivable method of re-setting the exposure at a point where readout is done up to a predetermined line and then executing readout again from the first line of the frame. As illustrated in Section (b) of FIG. 20B, the recognition processing unit 12 reads out from line L #1 at the top of the frame to line L #m, for example, similarly to Section (a) described above (1st), and re-sets the exposure based on the recognition result. The recognition processing unit 12 reads out individual lines L #1, L #2, and so on again for the frame based on the re-set exposure (2nd).

In this manner, the exposure is re-set based on the result of readout of a predetermined number of lines, and the lines L #1, L #2, . . . will be read out again from the top of the frame based on the re-set exposure, making it possible to execute the recognition process with higher accuracy.

5. SECOND EMBODIMENT (5-0-1. Configuration Example According to the Second Embodiment)

Figure 21:
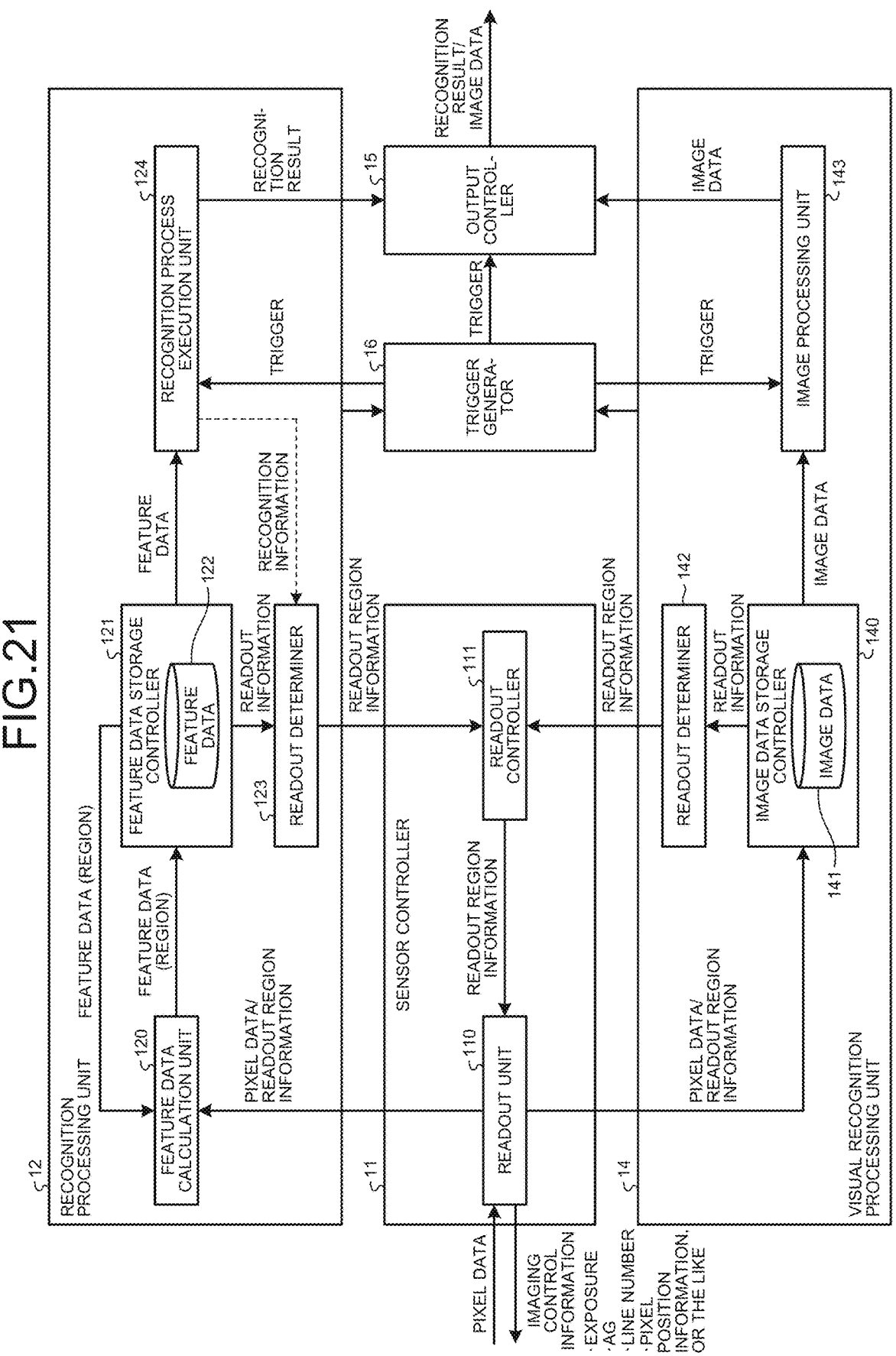
FIG. 21 is a functional block diagram of an example illustrating functions of an imaging apparatus according to a second embodiment.

Next, a second embodiment of the present disclosure will be described. The second embodiment is an extension of the recognition process according to the first embodiment described above. FIG. 21 is a functional block diagram of an example illustrating functions of an imaging apparatus according to the second embodiment. Note that FIG. 21 omits illustration of the optical unit 30, the sensor unit 10, the memory 13 and the display unit 31 illustrated in FIG. 1. Furthermore, FIG. 21 has a trigger generator 16 which is added to the configuration of FIG. 1.

In FIG. 21, the sensor controller 11 includes a readout unit 110 and a readout controller 111. The recognition processing unit 12 includes a feature data calculation unit 120, a feature data storage controller 121, a readout determiner 123, and a recognition process execution unit 124. The feature data storage controller 121 includes a feature data storage unit 122. Furthermore, the visual recognition processing unit 14 includes an image data storage controller 140, a readout determiner 142, and an image processing unit 143. The image data storage controller 140 includes an image data storage unit 141.

In the sensor controller 11, the readout controller 111 receives readout region information indicating a readout region for the readout performed by the recognition processing unit 12, from the readout determiner 123 included in the recognition processing unit 12. The readout region information represents line number(s) of one or more lines. Not limited to this, the readout region information may be information indicating the pixel position in one line. Furthermore, by providing the readout region information obtained by combining one or more line numbers and information indicating the pixel positions of one or more pixels in the line, it is possible to designate various patterns of readout regions. The readout region is equivalent to the units of readout. Not limited to this, the readout region and the units of readout may be different.

Similarly, the readout controller 111 receives readout region information indicating a readout region for the readout performed by the visual recognition processing unit 14, from the readout determiner 142 included in the visual recognition processing unit 14.

Based on these readout determiners 123 and 142, the readout controller 111 passes the readout region information indicating the readout region used for actual readout to the readout unit 110. For example, in a case where there is a conflict between the readout region information received from the readout determiner 123 and the readout region information received from the readout determiner 142, the readout controller 111 can perform mediation and adjustment of the readout region information to be passed to the readout unit 110.

Furthermore, the readout controller 111 can receive information indicating exposure and analog gain from the readout determiner 123 or the readout determiner 142. The readout controller 111 passes the received information indicating the exposure and analog gain to the readout unit 110.

The readout unit 110 reads out the pixel data from the sensor unit 10 in accordance with the readout region information passed from the readout controller 111. For example, the readout unit 110 obtains the line number indicating the line to be read out and the pixel position information indicating the position of the pixel to be read out in the line based on the readout region information, and passes the obtained line number and the pixel position information to the sensor unit 10. The readout unit 110 passes individual pieces of pixel data acquired from the sensor unit 10 to the recognition processing unit 12 and the visual recognition processing unit 14 together with the readout region information.

Furthermore, the readout unit 110 sets the exposure and analog gain (AG) for the sensor unit 10 in accordance with the information indicating the exposure and analog gain received from the readout controller 111. Furthermore, the readout unit 110 can generate a vertical synchronization signal and a horizontal synchronization signal and supply the generated signals to the sensor unit 10.

In the recognition processing unit 12, the readout determiner 123 receives the readout information indicating the readout region to be read out next, from the feature data storage controller 121. The readout determiner 123 generates readout region information based on the received readout information and passes the generated information to the readout controller 111.

Here, the readout determiner 123 can use, for example, information in which readout position information for readout of the pixel data of the units of readout has been added to a predetermined unit of readout, as a readout region indicated in the readout region information. The unit of readout is a set of one or more pixels, and corresponds to the unit of process performed by the recognition processing unit 12 and the visual recognition processing unit 14. As an example, when the unit of readout is a line, a line number [L #x] indicating the line position will be added as the readout position information. Moreover, when the unit of readout is a rectangular region including a plurality of pixels, information indicating the position of the rectangular region in the pixel array unit 101, for example, information indicating the position of the pixel in the upper left corner will be added as the readout position information. The readout determiner 123 preliminarily designates the unit of readout to be applied. Not limited to this, the readout determiner 123 can also determine the unit of readout, for example, in response to an instruction from the outside of the readout determiner 123. Therefore, the readout determiner 123 functions as a unit-of-readout controller that controls the unit of readout.

Note that the readout determiner 123 can also determine a readout region to be read out next based on the recognition information passed from the recognition process execution unit 124, which will be described below, and can generate readout region information indicating the determined readout region.

Similarly, in the visual recognition processing unit 14, the readout determiner 142 receives readout information indicating a readout region to be read out next from the image data storage controller 140, for example. The readout determiner 142 generates readout region information based on the received readout information and passes the generated information to the readout controller 111.

In the recognition processing unit 12, the feature data calculation unit 120 calculates the feature data in the region indicated by the readout region information based on the pixel data and the readout region information passed from the readout unit 110. The feature data calculation unit 120 passes the calculated feature data to the feature data storage controller 121.

As will be described below, the feature data calculation unit 120 may calculate the feature data based on the pixel data passed from the readout unit 110 and the past feature data passed from the feature data storage controller 121. Not limited to this, the feature data calculation unit 120 may acquire information for setting the exposure and analog gain from the readout unit 110, for example, and may further use the acquired information to calculate the feature data.

In the recognition processing unit 12, the feature data storage controller 121 stores the feature data passed from the feature data calculation unit 120 in the feature data storage unit 122. Furthermore, when the feature is passed from the feature data calculation unit 120, the feature data storage controller 121 generates readout information indicating a readout region for the next readout and passes the generated information to the readout determiner 123.

Here, the feature data storage controller 121 can integrated storage of the already stored feature data and the newly passed feature data. Furthermore, the feature data storage controller 121 can delete unnecessary feature data from the feature data stored in the feature data storage unit 122. Examples of the unnecessary feature data can be feature data related to the previous frame or feature data calculated based on a frame image regarding a scene different from the frame image in which the new feature data is calculated and already stored. Furthermore, the feature data storage controller 121 can also delete and initialize all the feature data stored in the feature data storage unit 122 as needed.

Furthermore, the feature data storage controller 121 generates feature data to be used by the recognition process execution unit 124 for the recognition process based on the feature data passed from the feature data calculation unit 120 and the feature data stored in the feature data storage unit 122. The feature data storage controller 121 passes the generated feature data to the recognition process execution unit 124.

The recognition process execution unit 124 executes the recognition process based on the feature data passed from the feature data storage controller 121. The recognition process execution unit 124 performs object detection, face detection, or the like by recognition process. The recognition process execution unit 124 passes the recognition result obtained by the recognition process to the output controller 15. The recognition process execution unit 124 can also pass recognition information including the recognition result generated by the recognition process to the readout determiner 123. The recognition process execution unit 124 can receive feature data from the feature data storage controller 121 and execute the recognition process, for example, in accordance with the execution of a trigger generated by the trigger generator 16.

Meanwhile, in the visual recognition processing unit 14, the image data storage controller 140 receives the pixel data read out from the readout region and the readout region information corresponding to the image data, from the readout unit 110. The image data storage controller 140 stores the pixel data and the readout region information in the image data storage unit 141 in association with each other.

The image data storage controller 140 generates image data used by the image processing unit 143 to perform image processing, based on the pixel data passed from the readout unit 110 and the image data stored in the image data storage unit 141. The image data storage controller 140 passes the generated image data to the image processing unit 143. Not limited to this, the image data storage controller 140 can also pass the pixel data passed from the readout unit 110 to the image processing unit 143 as it is.

Furthermore, the image data storage controller 140 generates readout information indicating a readout region for the next readout based on the readout region information passed from the readout unit 110, and passes the generated readout information to the readout determiner 142.

Here, the image data storage controller 140 can perform integrated storage of already stored image data and newly passed pixel data using addition averaging, for example. Furthermore, the image data storage controller 140 can delete unnecessary image data from among the image data stored in the image data storage unit 141. Example of the unnecessary image data can be image data related to the previous frame, or image data calculated based on a frame image regarding a scene different from the frame image in which new image data is calculated and already stored. Furthermore, the image data storage controller 140 can also delete and initialize all the image data stored in the image data storage unit 141, as needed.

Furthermore, the image data storage controller 140 can acquire information for setting the exposure and analog gain from the readout unit 110, and may store the image data corrected using the acquired information, in the image data storage unit 141.

The image processing unit 143 performs predetermined image processing on the image data passed from the image data storage controller 140. For example, the image processing unit 143 can perform a predetermined image quality enhancement process on the image data. Furthermore, in a case where the passed image data is image data with spatially reduced data by line thinning or the like, it is possible to use an interpolation process to fill image information to the thinned portion. The image processing unit 143 passes the image data that has undergone image processing to the output controller 15.

The image processing unit 143 can receive image data from the image data storage controller 140 and execute image processing, for example, in accordance with the execution of a trigger generated by the trigger generator 16.

The output controller 15 outputs one or both of the recognition result passed from the recognition process execution unit 124 and the image data passed from the image processing unit 143. The output controller 15 outputs one or both of the recognition result and the image data in accordance with the trigger generated by the trigger generator 16, for example.

Based on the information related to the recognition process passed from the recognition processing unit 12 and the information related to the image processing passed from the visual recognition processing unit 14, the trigger generator 16 generates triggers including a trigger to be passed to the recognition process execution unit 124, a trigger to be passed to the image processing unit 143, and a trigger to be passed to the output controller 15.

The trigger generator 16 passes each of the generated trigger to the recognition process execution unit 124, the image processing unit 143, and the output controller 15 at predetermined timings, individually.

(5-0-2. Example of Processes in the Recognition Processing Unit According to Second Embodiment)

Figure 22:
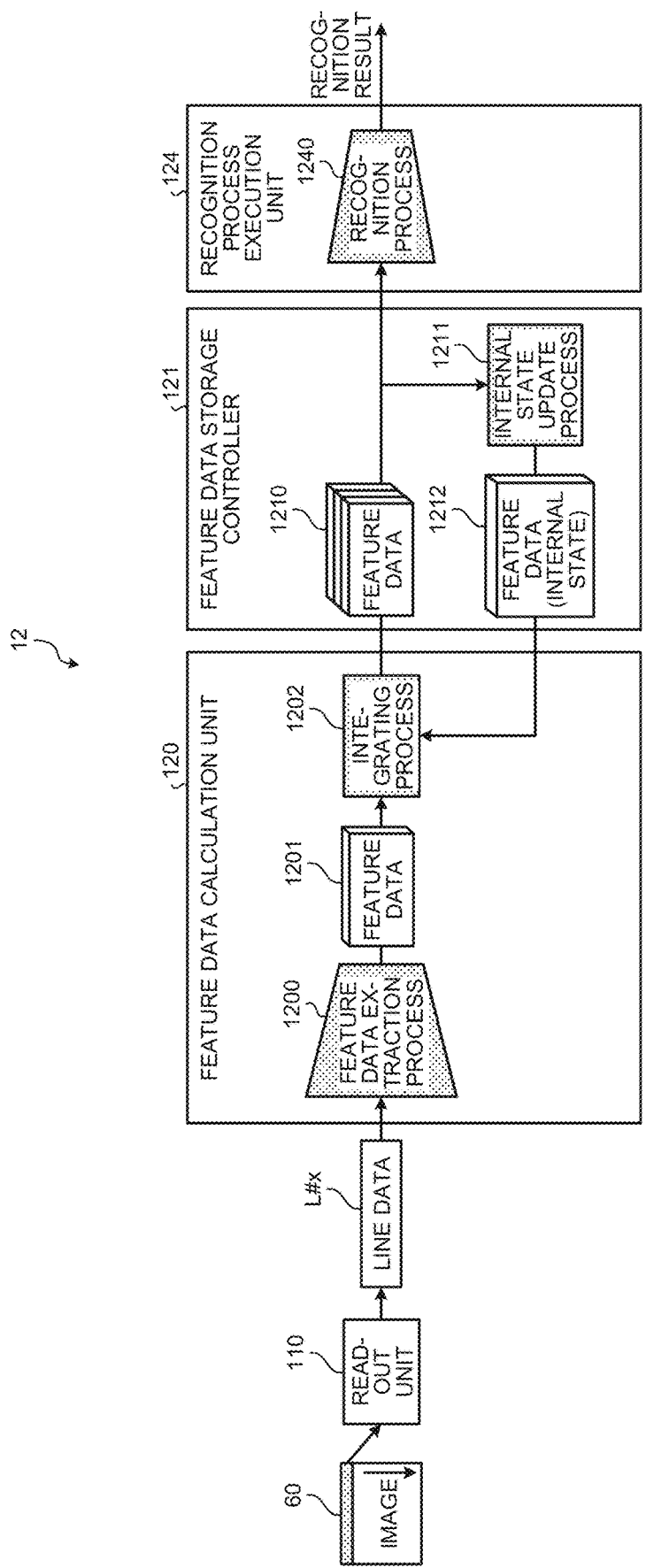
FIG. 22 is a schematic diagram illustrating in more detail an example of processes in the recognition processing unit according to the second embodiment.

FIG. 22 is a schematic diagram illustrating in more detail an example of processes in the recognition processing unit 12 according to a second embodiment. Here, it is assumed that the readout region is a line, and the readout unit 110 reads out pixel data in units of line from the upper end to the lower end of the frame of an image 60. The line image data (line data) of line L #x read out by the readout unit 110 in units of line will be input to the feature data calculation unit 120.

The feature data calculation unit 120 executes a feature data extraction process 1200 and an integrating process 1202. The feature data calculation unit 120 performs the feature data extraction process 1200 on the input line data to extract feature data 1201 from the line data. Here, the feature data extraction process 1200 extracts the feature data 1201 from the line data based on the parameters obtained by learning in advance. Using the integrating process 1202, the feature data 1201 extracted by the feature data extraction process 1200 is integrated with feature data 1212 processed by the feature data storage controller 121. Integrated feature data 1210 is passed to the feature data storage controller 121.

The feature data storage controller 121 executes an internal state update process 1211. The feature data 1210 passed to the feature data storage controller 121 is passed to the recognition process execution unit 124 and undergoes the internal state update process 1211. The internal state update process 1211 reduces the feature data 1210 based on the parameters learned in advance so as to update the internal state of the DNN, and then generates the feature data 1212 corresponding to the updated internal state. The feature data 1212 is integrated with the feature data 1201 by the integrating process 1202. The process performed by the feature data storage controller 121 corresponds to the process using an RNN.

The recognition process execution unit 124 executes a recognition process 1240 on the feature data 1210 passed from the feature data storage controller 121 based on the parameters learned in advance using predetermined training data, for example, and outputs a recognition result.

As described above, based on the parameters learned in advance, the recognition processing unit 12 according to the second embodiment executes processes, specifically, the feature data extraction process 1200, the integrating process 1202, the internal state update process 1211, and the recognition process 1240. Parameter learning is performed using training data based on an assumable recognition target.

Note that the functions of the feature data calculation unit 120, the feature data storage controller 121, the readout determiner 123, and the recognition process execution unit 124 described above are implemented when a program stored in the memory 13 or the like is read to and executed by a DSP included in the imaging apparatus 1, for example. Similarly, the functions of the image data storage controller 140, the readout determiner 142, and the image processing unit 143 described above are implemented when a program stored in the memory 13 or the like is read to and executed by an ISP included in the imaging apparatus 1, for example. These programs may be stored in the memory 13 in advance, or may be supplied to the imaging apparatus 1 from the outside and written to the memory 13.

(5-0-3. Details of Recognition Process According to Second Embodiment)

Figure 23:
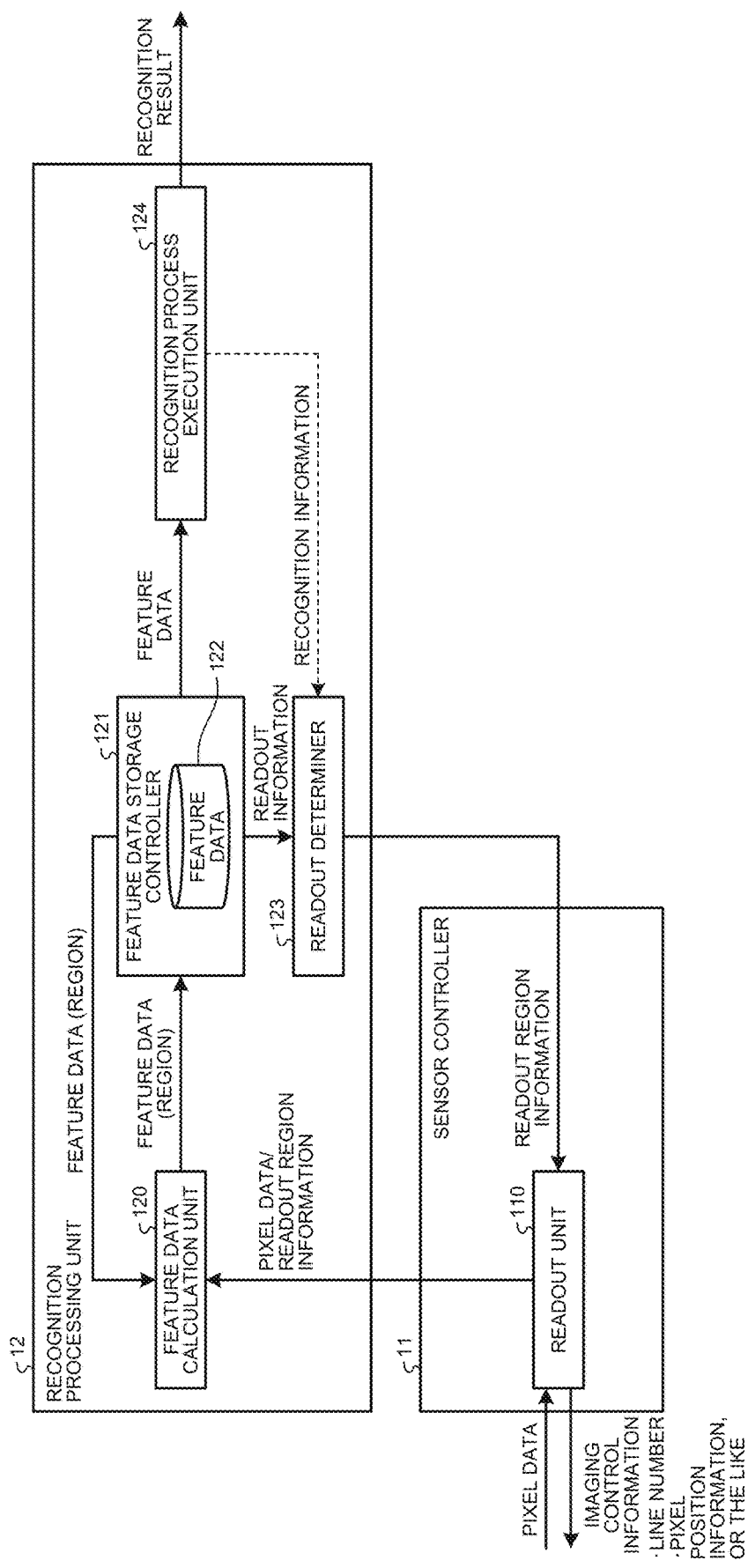
FIG. 23 is a functional block diagram of an example illustrating functions according to the second embodiment.

Next, the second embodiment will be described in more detail. FIG. 23 is a functional block diagram of an example illustrating functions according to the second embodiment. Since the second embodiment mainly describes the recognition process performed by the recognition processing unit 12, FIG. 23 omits illustration of the visual recognition processing unit 14, the output controller 15, and the trigger generator 16, which are illustrated in the configuration of FIG. 21. Furthermore, FIG. 23 omits illustration of the readout controller 111 from the sensor controller 11.

Figure 24:
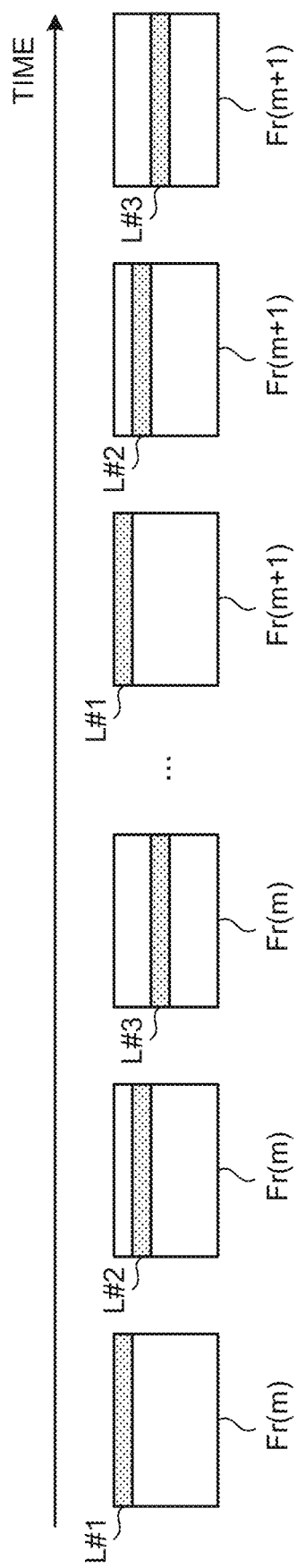
FIG. 24 is a schematic diagram illustrating a frame readout process according to the second embodiment.

FIG. 24 is a schematic diagram illustrating a frame readout process according to the second embodiment. In the second embodiment, the unit of readout is a line, and readout of pixel data is performed sequentially in the order of lines for the frame Fr(x). In the example of FIG. 24, readout of the line is performed in the mth frame Fr(m) sequentially in the order of lines starting from line L #1 at the upper end of the frame Fr(m), so as to continue to line L #2, L #3, and so on. When the line readout in the frame Fr(m) is completed, in the next frame Fr(m+1), which is the (m+1)th frame, readout of the lines is performed sequentially in the order of lines from the upper end line L #1 in a similar manner.

Figure 25:
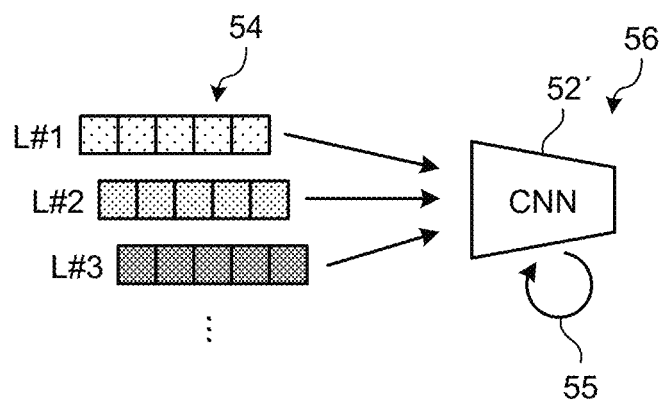
FIG. 25 is a schematic diagram illustrating an outline of a recognition process according to the second embodiment.

FIG. 25 is a schematic diagram schematically illustrating a recognition process according to the second embodiment. As illustrated in FIG. 25, the recognition process is performed by sequentially executing the process performed by a CNN 52' and an internal information update 55 for each of pieces of the pixel information 54 of each of the lines L #1, L #2, L #3, and so on. Therefore, it is sufficient to input the pixel information 54 for one line into the CNN 52', making it possible to form a recognizer 56 on an extremely small scale. Note that the recognizer 56 has a configuration as an RNN because it executes processes of the CNN 52' on sequentially input information and performs the internal information update 55.

By performing the recognition process sequentially in the order of lines using an RNN, a valid recognition result might be obtained without performing readout of all the lines included in the frame. In this case, the recognition processing unit 12 can end the recognition process at a point where a valid recognition result is obtained. An example of ending the recognition process in the middle of frame readout will be described with reference to FIGS. 26 and 27.

Figure 26:
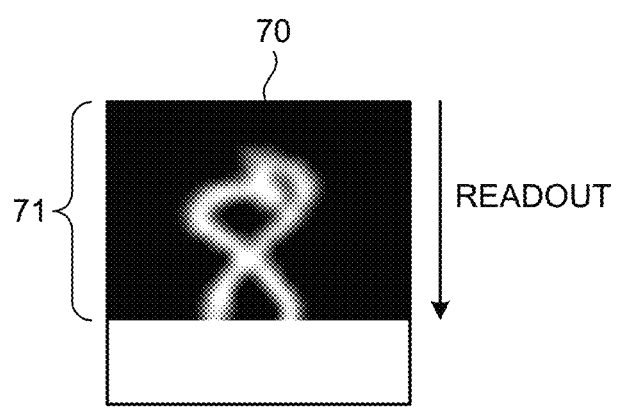
FIG. 26 is a diagram illustrating an example of terminating the recognition process in the middle of frame readout.

FIG. 26 is a diagram illustrating an exemplary case where the recognition target is the number "8". In the example of FIG. 26, the number "8" is recognized at a point where a range 71 of about ¾ of a frame 70 in the vertical direction has been read out. Therefore, the recognition processing unit 12 can output a valid recognition result indicating that the number "8" is recognized at a point where the range 71 has been read out, and can end the line readout process and recognition process for the frame 70.

Figure 27:
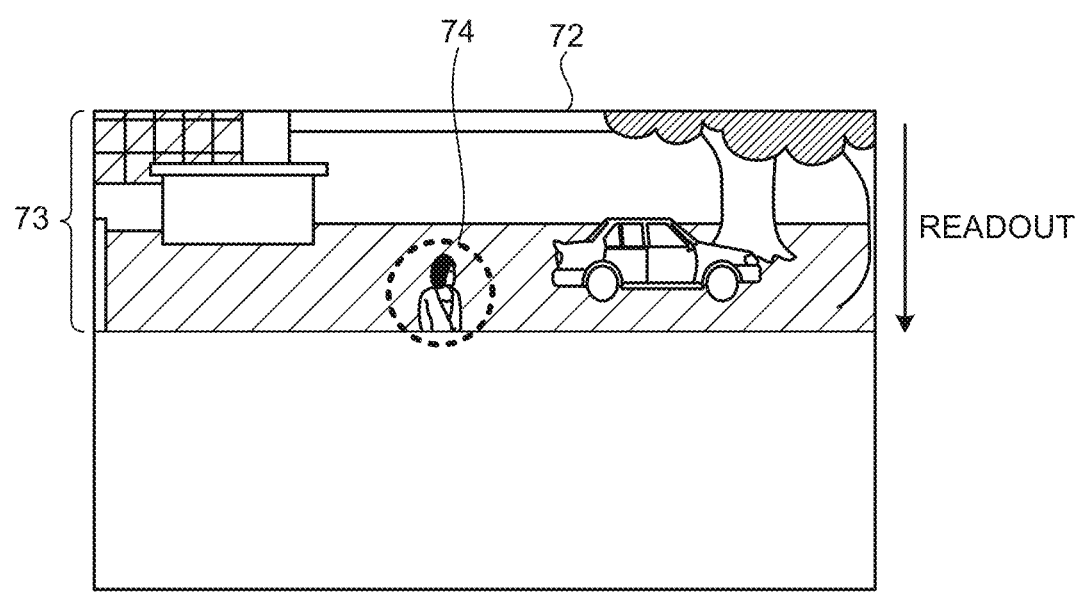
FIG. 27 is a diagram illustrating an example of terminating the recognition process in the middle of frame readout.

FIG. 27 is a diagram illustrating an example when the recognition target is a person. In the example of FIG. 27, a person 74 is recognized at a point where a range 73 of about ½ of a frame 72 in the vertical direction has been read out. Therefore, the recognition processing unit 12 can output a valid recognition result indicating that the person 74 is recognized at a point where the range 73 has been read out, and can end the line readout process and recognition process for the frame 72.

In this manner, in the second embodiment, when a valid recognition result is obtained in the middle of line readout for the frame, it is possible to end the line readout and recognition process. This makes it possible to save power in the recognition process and shorten the time required for the recognition process.

Although the above is an example in which the line readout is performed from the upper end side to the lower end side of the frame, readout direction is not limited to this example. For example, the line readout may be performed from the lower end side to the upper end side of the frame. That is, an object being existence located far away from the imaging apparatus 1 can generally be recognized earlier by performing line readout from the upper end side to the lower end side of the frame. In contrast, an object being existence on the front side with respect to the imaging apparatus 1 can generally be recognized earlier by performing line readout from the lower end side to the upper end side of the frame.

For example, there is a conceivable situation in which the imaging apparatus 1 is installed for in-vehicle application so as to image the front view. In this case, the object in front (for example, a vehicle or a pedestrian in front of the own vehicle) exists in the lower part of the screen to be imaged. Therefore, performing the line readout from the lower end side to the upper end side of the frame will be more effective. In addition, when an Advanced driver-assistance system (ADAS) requires immediate stop, it would be only necessary to recognize at least one corresponding object. In addition, in a case where one object has been recognized, executing line readout from the lower end side of the frame again is considered to be more effective. Furthermore, there are cases where a distant object is to be prioritized, for example, on a highway. In this case, it is preferable to execute the line readout from the upper end side to the lower end side of the frame.

Furthermore, the unit of readout may be set to the column direction among the matrix (row-column) directions in the pixel array unit 101. For example, it is conceivable to use a plurality of pixels arranged in a column in the pixel array unit 101 as the unit of readout. Application of the global shutter method as the imaging method makes it possible to perform column-based readout using columns as the unit of readout. In the global shutter method, it is possible to execute readout by switching between column-based readout and line-based readout. When the reading is fixed to the column-based readout, for example, it is conceivable to rotate the pixel array unit 101 by 90° and use the rolling shutter method.

For example, an object being existence on the left side of the imaging apparatus 1 can be recognized earlier by sequentially reading out from the left end side of the frame by column-based readout. Similarly, an object being existence on the right side with respect to the imaging apparatus 1 can be recognized earlier by sequentially reading out from the right end side of the frame by column-based readout.

In an example of using the imaging apparatus 1 is used for in-vehicle application, for example, when the vehicle is turning, an object being existence on the turning side will be prioritized in some cases. In such a case, it is preferable to perform readout from the end on the turning side by column-based readout. The turning direction can be acquired based on steering information of the vehicle, for example. Not limited to this, for example, it is possible to provide the imaging apparatus 1 with a sensor capable of detecting angular velocity in three directions, and to acquire the turning direction based on the detection result of this sensor.

FIG. 28 is a flowchart illustrating an example of the recognition process according to the second embodiment. The process according to the flowchart of FIG. 28 is a process corresponding to the readout of pixel data in the unit of readout (for example, one line) from a frame, for example. Here, it is assumed that the unit of readout is a line. For example, the readout region information can be represented by a line number indicating a line to be read out.

In Step S100, the recognition processing unit 12 reads out line data from the line indicated by the readout line of the frame. More specifically, in the recognition processing unit 12, the readout determiner 123 passes the line number regarding the line to be read out next, to the sensor controller 11. In the sensor controller 11, the readout unit 110 reads out the pixel data of the line indicated by the line number from the sensor unit 10 as line data in accordance with the passed line number. The readout unit 110 passes the line data read out from the sensor unit 10 to the feature data calculation unit 120. Furthermore, the readout unit 110 passes the readout region information (for example, a line number) indicating the region used for pixel data readout, to the feature data calculation unit 120.

In the next Step S101, the feature data calculation unit 120 calculates the feature data based on the line data based on the pixel data passed from the readout unit 110, and calculates the feature data of the line. In the next Step S102, the feature data calculation unit 120 acquires the feature data stored in the feature data storage unit 122 from the feature data storage controller 121. In the next Step S103, the feature data calculation unit 120 integrates the feature data calculated in Step S101 and the feature data acquired from the feature data storage controller 121 in Step S102. The integrated feature data is passed to the feature data storage controller 121. The feature data storage controller 121 stores the integrated feature data passed from the feature data calculation unit 120 in the feature data storage unit 122 (Step S104).

Note that a series of processes from Step S100 is the process for the first line of a frame, and thus, when the feature data storage unit 122 is initialized, for example, the processes in Steps S102 and S103 can be omitted. At this time, the process according to Step S104 is a process of accumulating the line feature data calculated based on the first line in the feature data storage unit 122.

Furthermore, the feature data storage controller 121 passes the integrated feature data passed from the feature data calculation unit 120 to the recognition process execution unit 124 as well. In Step S105, the recognition process execution unit 124 executes the recognition process using the integrated feature data passed from the feature data storage controller 121. In the next Step S106, the recognition process execution unit 124 outputs the recognition result of the recognition process of Step S105.

In Step S107, the readout determiner 123 in the recognition processing unit 12 determines a readout line for performing the next readout in accordance with the readout information passed from the feature data storage controller 121. For example, the feature data storage controller 121 receives readout region information together with the feature data, from the feature data calculation unit 120. Based on this readout region information, the feature data storage controller 121 determines a readout line to be read out next in accordance with, for example, a predetermined readout pattern (sequentially in the order of lines, in this example). The process from Step S100 is executed again for the determined readout line.

(5-0-4. Example of Control of Readout and Recognition Processes According to Second Embodiment)

Next, an example of controlling readout and a recognition process according to a second embodiment will be described. FIGS. 29A and 29B are time charts illustrating an example of controlling readout and the recognition process according to the second embodiment. The examples of FIGS. 29A and 29B are examples in which a blank time blk during which no imaging operation is performed is provided within one imaging period (one frame period). FIGS. 29A and 29B illustrate that time passes to the right.

FIG. 29A illustrates an example of assigning ½ of the imaging period continuously to the blank time blk. In FIG. 29A, the imaging period corresponds to a frame period, which is 1/30 [sec], for example. The readout of the frame from the sensor unit 10 is performed in this frame period. The imaging time is a time length required to image all the lines included in the frame. In the example of FIG. 29A, it is assumed that the frame includes n lines, and imaging of n lines from the line L #1 to line L #n is completed in 1/60 [sec], which is ½ the frame period of 1/30 [sec]. The length of time assigned to one-line imaging is 1/(60×n) [sec]. The period of 1/30 [sec] from the timing of imaging the last line L #n in the frame to the timing of imaging the first line L #1 of the next frame is defined as the blank time blk.

For example, at a timing where the imaging of the line L #1 is completed, the imaging of the next line L #2 is started. At the same time, the recognition processing unit 12 executes a line recognition process for the line L #1, that is, a recognition process for the pixel data included in line L #1. The recognition processing unit 12 ends the line recognition process for the line L #1 before the imaging of the next line L #2 is started. When the line recognition process for the line L #1 is completed, the recognition processing unit 12 outputs a recognition result regarding the recognition process.

Similarly for the next line L #2, the imaging of the next line L #3 is started at the timing when the imaging of the line L #2 is completed. Subsequently, the recognition processing unit 12 executes a line recognition process for the line L #2 and ends this executed line recognition process before the start of imaging of the next line L #3. In the example of FIG. 29A, the imaging of the lines L #1, L #2, #3, . . . , L #m, . . . are sequentially executed in this manner. In each of the lines L #1, L #2, L #3, . . . , L #m, . . . , at the timing of the end of imaging, the imaging of the line next to the imaging completed line is started. At the same time as the start, the line recognition process for the imaging completed line is executed.

In this manner, by sequentially executing the recognition process in units of readout (line in this example), it is possible to sequentially obtain the recognition result without inputting all the image data of the frame to the recognizer (recognition processing unit 12), making it possible to reduce the delay until the recognition result is obtained. Furthermore, when a valid recognition result is obtained on a certain line, it is possible to end the recognition process at that point, leading to reduction of time for the recognition process and the power saving. In addition, by propagating information on the time axis and integrating the recognition results for each of lines, it is possible to gradually improve the recognition accuracy.

In the example of FIG. 29A, the blank time blk within the frame period can be used to execute other processes supposed to be executed within the frame period (for example, image processing in the visual recognition processing unit 14 using the recognition result).

FIG. 29B illustrates an example in which a blank time blk is provided for each of times of one line imaging. In the example of FIG. 29B, the frame period (imaging period) is set to ⅓₀ [sec], similar to the example of FIG. 29A. On the other hand, the imaging time is set to ⅓₀ [sec], which is the same as the imaging period. Furthermore, it is assumes, in the example of FIG. 29B, that line imaging of n lines, namely, lines L #1 to L #n, are executed at a time interval of 1/(30×n) [sec] in one frame period, and that the imaging time for one line is 1/(60×n) [sec].

In this case, it is possible to provide a blank time blk of 1/(60×n) [sec] for each of imaging times of each of lines L #1 to L #n. In each of the blank times blk of each of the lines L #1 to L #n, it is possible to execute other processes supposed to be executed for the captured image of the corresponding line (for example, image processing in the visual recognition processing unit 14 using the recognition result). At this time, it is possible to assign the time (approximately 1/(30×n) [sec] in this example) until immediately before the end of imaging of the next line of the target line to the other processes. In the example of FIG. 29B, the processing results of the other processes can be output line by line, making it possible to acquire the processing results of the other processes more rapidly.

Figure 30:
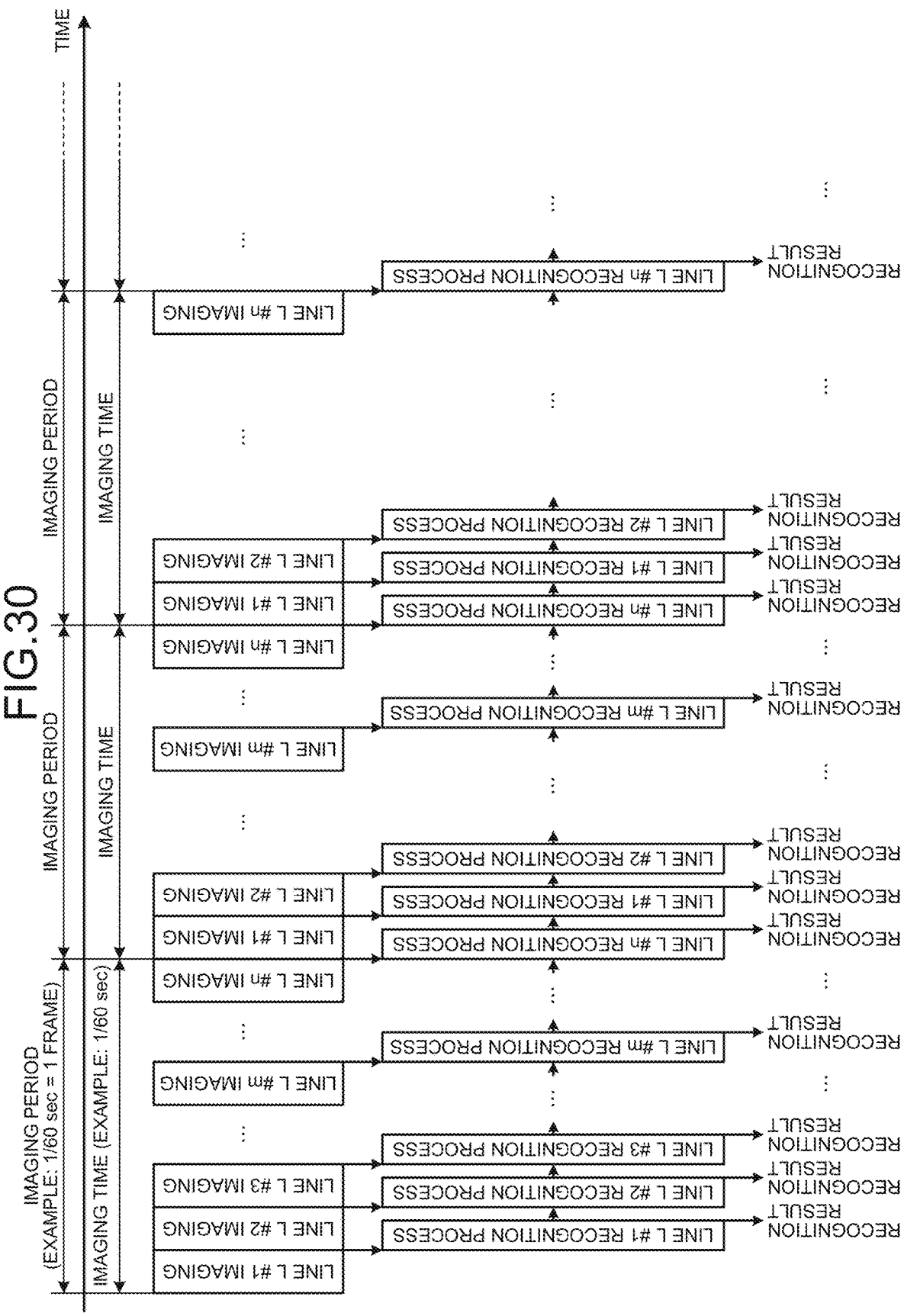
FIG. 30 is a time chart illustrating another example of controlling readout and the recognition process according to the second embodiment.

FIG. 30 is a time chart illustrating another example of controlling readout and the recognition process according to the second embodiment. In the example of FIG. 29 described above, imaging of all lines L #1 to L #n included in the frame is completed in a period of ½ of the frame period, with the remaining ½ period of the frame period set as a blank time. In contrast, in the example illustrated in FIG. 30, imaging of all the lines L #1 to L #n included in the frame is performed using all the frame period without having the blank time within the frame period.

Here, when the imaging time of one line is 1/(60×n) [sec] which is the same as the time of FIGS. 29A and 29B, and the number of lines included in the frame is n which is the same as the number of FIGS. 29A and 29B, the frame period, that is, the imaging period will be ¹⁄₆₀ [sec]. Therefore, in the example in which the blank time blk illustrated in FIG. 30 is not provided, it is possible to increase the frame rate as compared with the examples of FIGS. 29A and 29B described above.

[5-1. First Modification of Second Embodiment]

Next, a first modification according to the second embodiment will be described. The first modification according to the second embodiment is an example in which the unit of readout is set to a plurality of lines sequentially adjacent to each other. Note that the configuration described with reference to FIG. 23 can be applied as it is to the first modification of the second embodiment and also to the second to seventh modifications of the second embodiment described below, and thus, detailed description of the configuration will be omitted.

Figure 31:
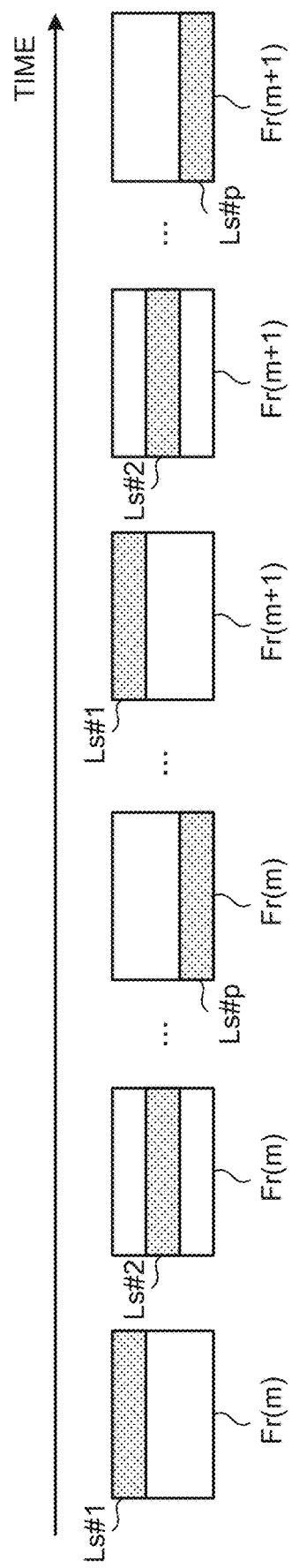
FIG. 31 is a schematic diagram illustrating a frame readout process according to a first modification of the second embodiment.

FIG. 31 is a schematic diagram illustrating a frame readout process according to the first modification of the second embodiment. As illustrated in FIG. 31, in the first modification of the second embodiment, a line group including a plurality of lines adjacent to each other is set as a unit of readout, and readout of pixel data is performed sequentially in the line groups for a frame Fr(m). In the recognition processing unit 12, the readout determiner 123 determines a line group Ls #x including the number of lines pre-designated as the unit of readout, for example.

The readout determiner 123 passes readout region information in which the readout position information for reading out the pixel data in the unit of readout has been added to the information indicating the unit of readout determined as the line group Ls #x, to the readout controller 111. The readout controller 111 passes the readout region information passed from the readout determiner 123 to the readout unit 110. The readout unit 110 reads out the pixel data from the sensor unit 10 in accordance with the readout region information passed from the readout controller 111.

In the example of FIG. 31, readout of the line group Ls #x is performed in the mth frame Fr(m), sequentially in the order of lines, starting from the line group Ls #1 at the upper end of the frame Fr(m), so as to continue to Ls #2, Ls #3, . . . , Ls #p, and so on. When the readout of the line group Ls #x in the frame Fr(m) is completed, in the next frame Fr(m+1), which is the (m+1)th frame, readout of the line group will be similarly performed sequentially in the order of lines from the upper end line group Ls #1 so as to continue to the line groups Ls #2, Ls #3, and so on.

In this manner, by reading out the pixel data using the line group Ls #x including a plurality of lines as the unit of readout, it is possible to read out the pixel data for one frame at a higher rate than in the case of performing the readout sequentially in the order of lines. In addition, the recognition processing unit 12 can use a large amount of pixel data in one recognition process, leading to improvement of the recognition response speed. Furthermore, since the number of times of readout in one frame is less than the case of performing readout sequentially in the order of lines, it is possible to suppress distortion of a captured frame image in a case where the imaging method of the sensor unit 10 is the rolling shutter method.

Note that in the first modification of the second embodiment, it is possible to execute the readout of the line group Ls #x from the lower end side to the upper end side of the frame similarly to the second embodiment described above. Furthermore, when a valid recognition result is obtained in the middle of readout of the line group Ls #x for the frame, it is possible to end the readout of the line groups and recognition process. This makes it possible to save power in the recognition process and shorten the time required for the recognition process.

[5-2. Second Modification of the Second Embodiment]

Next, a second modification of the second embodiment will be described. The second modification of the second embodiment is an example in which the unit of readout is a part of one line.

Figure 32:
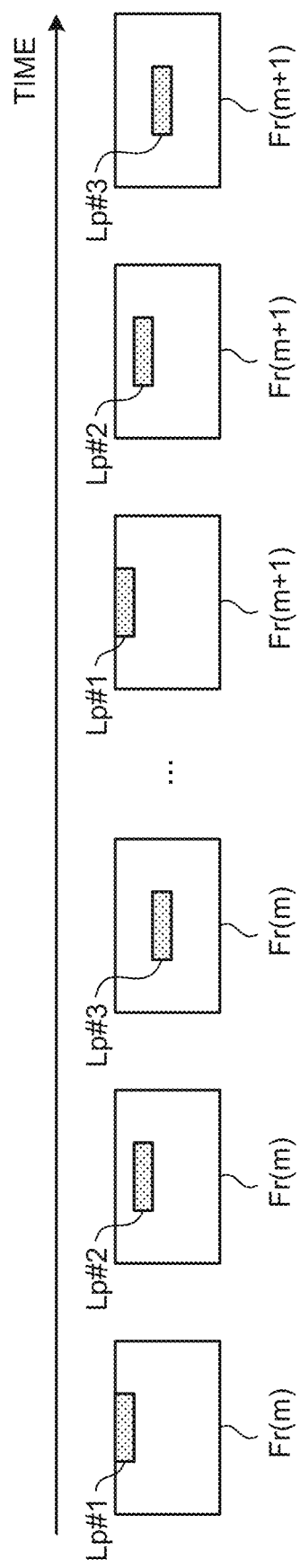
FIG. 32 is a schematic diagram illustrating a frame readout process according to a second modification of the second embodiment.

FIG. 32 is a schematic diagram illustrating a frame readout process according to the second modification of the second embodiment. As illustrated in FIG. 32, in the second modification of the second embodiment, in the line readout performed sequentially in the order of lines, a part (referred to as a partial line) of each of lines is set as a unit of readout, and pixel data readout is performed on a partial line Lp #x in each of lines sequentially in the order of lines over the frame Fr(m). In the recognition processing unit 12, the readout determiner 123 determines, for example, a plurality of pixels included in the line, which are sequentially adjacent to each other and have a smaller number than the total number of pixels included in the line, as a unit of readout.

The readout determiner 123 passes readout region information in which the readout position information for reading out the pixel data in the partial line Lp #x has been added to the information indicating the unit of readout determined as the partial line Lp #x, to the readout controller 111. Here, it is conceivable that the information indicating the unit of readout is constituted with the position of the partial line Lp #x within one line and the number of pixels included in the partial line Lp #x. Furthermore, it is conceivable that the readout position information is constituted using the line number including the partial line Lp #x on which readout is to be performed. The readout controller 111 passes the readout region information passed from the readout determiner 123 to the readout unit 110. The readout unit 110 reads out the pixel data from the sensor unit 10 in accordance with the readout region information passed from the readout controller 111.

In the example of FIG. 32, readout of each of the partial lines Lp #x is performed in the mth frame Fr(m), sequentially in the order of lines, starting from the partial line Lp #1 at the upper end of the frame Fr(m), so as to continue to Lp #2, Lp #3, and so on. When the readout of the line group in the frame Fr(m) is completed, in the next frame Fr(m+1), which is the (m+1)th frame, readout of the partial line Lp #x will be similarly performed sequentially in the order of lines from the partial line Lp #1 included in the upper end line.

In this manner, by limiting the pixels to be read out in the line readout to the pixels included in a part of the line, it is possible to transfer the pixel data in a narrower band as compared with the case where the pixel data is read out from the entire line. In the readout method according to the second modification of the second embodiment, the pixel data transfer amount is smaller than that in the case of reading out pixel data from the entire line, making it possible to achieve power saving.

Note that in the second modification of the second embodiment, it is possible to execute the readout of the partial line from the lower end side to the upper end side of the frame similarly to the second embodiment described above. Furthermore, when a valid recognition result is obtained in the middle of readout of the partial line for the frame, it is possible to end the readout of the partial line Lp #x and recognition process. This makes it possible to save power in the recognition process and shorten the time required for the recognition process.

[5-3. Third Modification of Second Embodiment]

Next, a third modification of the second embodiment will be described. The third modification of the second embodiment is an example in which the unit of readout is defined as an area of a predetermined size within a frame.

Figure 33:
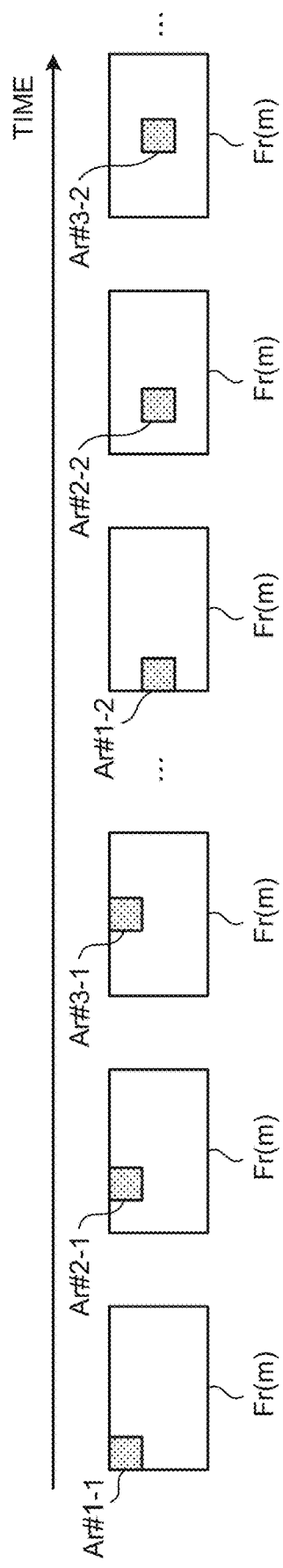
FIG. 33 is a schematic diagram illustrating a frame readout process according to a third modification of the second embodiment.

FIG. 33 is a schematic diagram illustrating a frame readout process according to a third modification of the second embodiment. As illustrated in FIG. 33, in the third modification of the second embodiment, an area Ar #x-y of a predetermined size including a plurality of pixels sequentially adjacent to each other in the line direction and the vertical direction is defined as a unit of readout within a frame. With this unit of readout, readout is performed for the frame Fr(m) such that the area Ar #x-y is read out sequentially in the line direction, for example, and then the sequential readout of this area Ar #x-y in the line direction is then sequentially repeated in the vertical direction. In the recognition processing unit 12, the readout determiner 123 determines, for example, the area Ar #x-y defined by the size in the line direction (number of pixels) and the size in the vertical direction (number of lines), as the unit of readout.

The readout determiner 123 passes readout region information in which the readout position information for reading out the pixel data of the area Ar #x-y has been added to the information indicating the unit of readout determined as the area Ar #x-y, to the readout controller 111. Here, it is conceivable that the information indicating the unit of readout is constituted with the above-described size in the line direction (number of pixels) and the size in the vertical direction (number of lines), for example. Furthermore, it is conceivable that the readout position information is constituted using the position of a predetermined pixel included in the area Ar #x-y on which readout is to be performed, for example, the pixel position regarding the pixel in the upper left corner of the area Ar #x-y. The readout controller 111 passes the readout region information passed from the readout determiner 123 to the readout unit 110. The readout unit 110 reads out the pixel data from the sensor unit 10 in accordance with the readout region information passed from the readout controller 111.

In the example of FIG. 33, in the mth frame Fr(m), readout of each of areas Ar #x-y is sequentially performed in the line direction, starting from area Ar #1-1 located at the upper left corner of the frame Fr(m) so as to continue to areas Ar #2-1, Ar #3-1, and so on. After readout of the frame Fr(m) is finished to the right end in the line direction, the read position in the vertical direction is shifted. Subsequently, readout of each of areas Ar #x-y is sequentially performed again in the line direction from the left end of the frame Fr(m) in the order of the area Ar #1-2, Ar #2-2, Ar #3-2, and so on.

Figure 34:
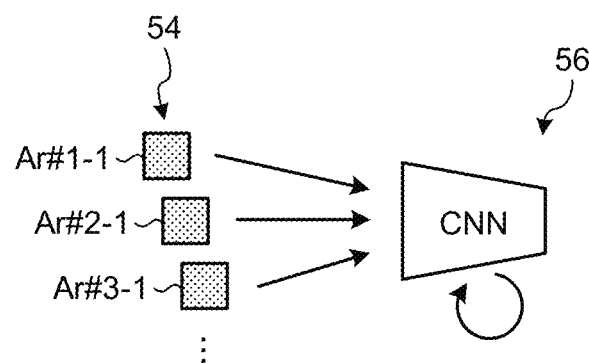
FIG. 34 is a schematic diagram illustrating an outline of a recognition process according to a third modification of the second embodiment.

FIG. 34 is a schematic diagram illustrating an outline of a recognition process according to the third modification of the second embodiment. As illustrated in FIG. 34, the recognition process is performed by sequentially executing the process performed by a CNN 52' and an internal information update 55 for each of pieces of the pixel information 54 of each of the areas Ar #1-1, Ar #2-1, Ar #3-1, and so on. Therefore, it is sufficient to input the pixel information 54 for one area into the CNN 52', making it possible to form the recognizer 56 on an extremely small scale. Note that the recognizer 56 has a configuration as an RNN because it executes processes of the CNN 52' on sequentially input information and performs the internal information update 55.

Figure 35:
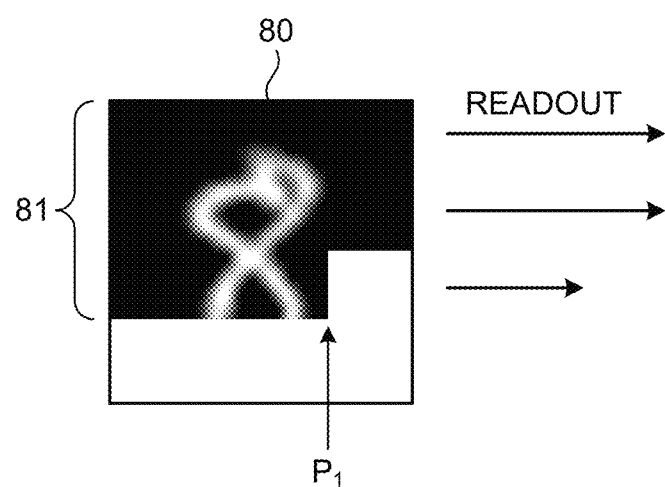
FIG. 35 is a diagram illustrating an example of terminating the recognition process in the middle of frame readout in a case where the unit of readout is area.
Figure 36:
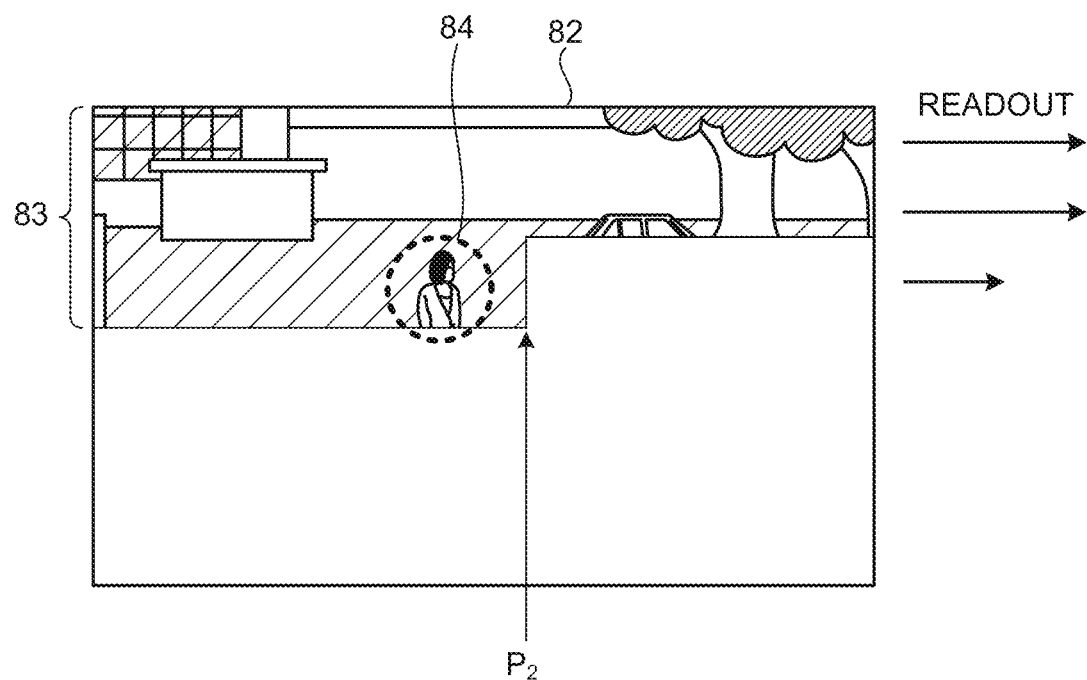
FIG. 36 is a diagram illustrating an example of terminating the recognition process in the middle of frame readout in a case where the unit of readout is area.

By performing the recognition process sequentially in the order of lines using an RNN, a valid recognition result might be obtained without performing readout of all the lines included in the frame. In this case, the recognition processing unit 12 can end the recognition process at a point where a valid recognition result is obtained. With reference to FIGS. 35 and 36, an example of terminating the recognition process in the middle of frame readout in a case where the unit of readout is area Ar #x-y.

FIG. 35 is a diagram illustrating an exemplary case where the recognition target is the number "8". In the example of FIG. 35, in a frame 80, the number "8" is recognized at a position $P_1$ at a point where a range 81 of approximately ⅔ of the whole has been read out. Therefore, the recognition processing unit 12 can output a valid recognition result indicating that the number "8" is recognized at a point where the range 81 has been read out, and can end the line readout process and recognition process for the frame 80.

FIG. 36 is a diagram illustrating an example when the recognition target is a person. In the example of FIG. 36, in a frame 82, a person 84 is recognized at a position $P_2$ at a point where a range 83 of approximately ½ in the vertical direction has been read out. Therefore, the recognition processing unit 12 can output a valid recognition result indicating that the person 84 has been recognized at a point where the range 83 has been read out, and can end the line readout and recognition process for the frame 82.

In this manner, in third modification of the second embodiment, when a valid recognition result is obtained in the middle of area readout for the frame, it is possible to end the area readout and recognition process. This makes it possible to save power in the recognition process and shorten the time required for the recognition process. Furthermore, compared with the example of performing readout over the entire width in the line direction according to the second embodiment and the first modification of the second embodiment described above, for example, the third modification of the second embodiment makes it possible to reduce redundant readout cases and possible to reduce the time required for the recognition process.

In the above, the area Ar #x-y is read out from the left end side to the right end side in the line direction, and from the upper end side to the lower end side of the frame in the vertical direction. However, the present disclosure is not limited to these examples. For example, the readout in the line direction may be performed from the right end side to the left end side, and the readout in the vertical direction may be performed from the lower end side to the upper end side of the frame.

[5-4. Fourth Modification of Second Embodiment]

Next, a fourth modification of the second embodiment will be described. The fourth modification of the second embodiment is an example in which the unit of readout is defines as a pattern formed with a plurality of pixels including non-adjacent pixels.

Figure 37:
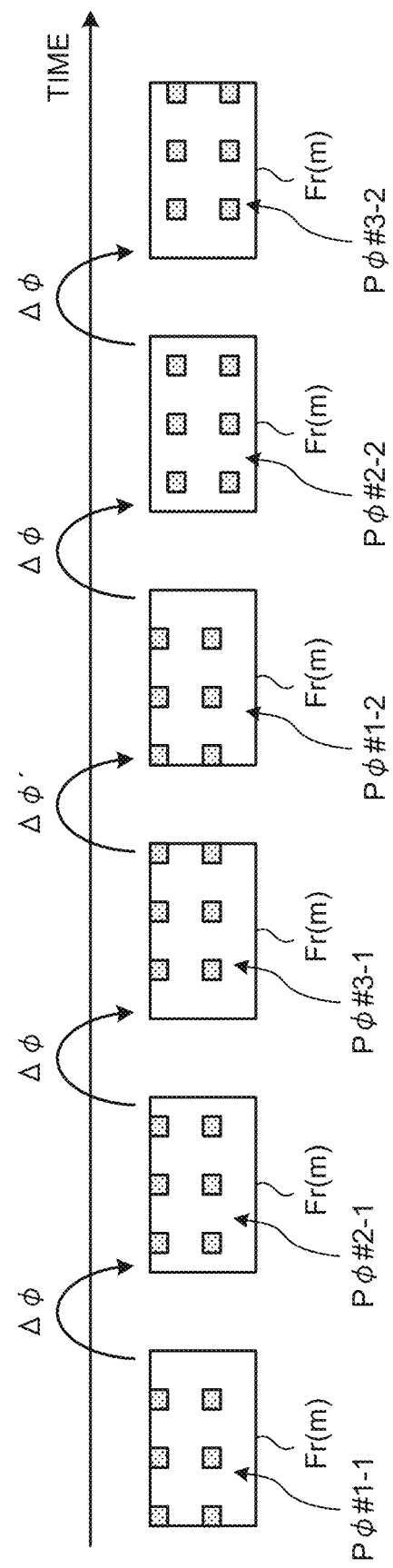
FIG. 37 is a schematic diagram illustrating a frame readout process according to a fourth modification of the second embodiment.

FIG. 37 is a schematic diagram illustrating a frame readout process according to the fourth modification of the second embodiment. As illustrated in FIG. 37, in the fourth modification of the second embodiment, for example, a pattern Pϕ #x-y formed with a plurality of pixels arranged discretely and periodically in the line direction and the vertical direction, individually, will be the unit of readout. In the example of FIG. 37, the pattern Pϕ #x-y is constituted with six pixels, namely, three pixels arranged at predetermined intervals in the line direction and three pixels arranged at predetermined intervals in the vertical direction corresponding to the positions of the three pixels in the line direction. In the recognition processing unit 12, the readout determiner 123 determines the plurality of pixels arranged in accordance with this pattern Pϕ #x-y as a unit of readout.

Although the above description is an example in which the pattern Pϕ #x-y is formed with a plurality of discrete pixels, this is not limited to this example. For example, a plurality of pixel groups each including a plurality of pixels adjacent to each other may be arranged discretely to form the pattern Pϕ #x-y. For example, a plurality of pixel groups each being formed with 4 pixels including 2 pixels×2 pixels adjacent to each other can be arranged discretely and periodically as illustrated in FIG. 37 to form the pattern Pϕ #x-y.

The readout determiner 123 passes readout region information in which the readout position information for reading out the pattern Pϕ #x-y has been added to the information indicating the unit of readout determined as the pattern Pϕ #x-y, to the readout controller 111. Here, it is conceivable that the information indicating the unit of readout is to be constituted with information indicating a positional relationship between a predetermined pixel among the pixels constituting the pattern Pϕ #x-y (for example, the pixel in the upper left corner of the pixels constituting the pattern Pϕ #x-y) and each of other pixels constituting the pattern Pϕ #x-y. Furthermore, it is conceivable that the readout position information is constituted using information indicating the position of a predetermined pixel included in the pattern Pϕ #x-y to be read out (information indicating the position in the line and the line number). The readout controller 111 passes the readout region information passed from the readout determiner 123 to the readout unit 110. The readout unit 110 reads out the pixel data from the sensor unit 10 in accordance with the readout region information passed from the readout controller 111.

In the example of FIG. 37, in the mth frame Fr(m), the readout of each of patterns Pϕ #x-y is sequentially performed, starting from pattern Pϕ #1-1 in which the upper left corner pixel is located at the upper left corner of the frame Fr(m), while shifting one pixel at a time in the line direction, for example, so as to continue to patterns Pϕ #2-1 and Pϕ #3-1, and so on. For example, when the right end of the pattern Pϕ #x-y reaches the right end of the frame Fr(m), the position of the pattern Pϕ #x-y is shifted in the vertical direction by one pixel (one line) from the left end of the frame Fr(m) so as to allow the readout of each of patterns Pϕ #x-y to continue to patterns Pϕ #1-2, Pϕ #2-2, Pϕ #3-2, and so on.

Since the pattern Pϕ #x-y has a configuration in which pixels are arranged periodically, the operation of shifting the pattern Pϕ #x-y by one pixel can be considered as an operation of shifting the phase of the pattern Pϕ #x-y. That is, in the fourth modification of the second embodiment, the readout of each of patterns P #x-y is performed while shifting the pattern Pϕ #x-y by a phase Δϕ in the line direction. The movement of the pattern Pϕ #x-y in the vertical direction is performed by shifting a phase Δϕ' in the vertical direction with respect to the position of the initial pattern Pϕ #1-y in the line direction.

Figure 38:
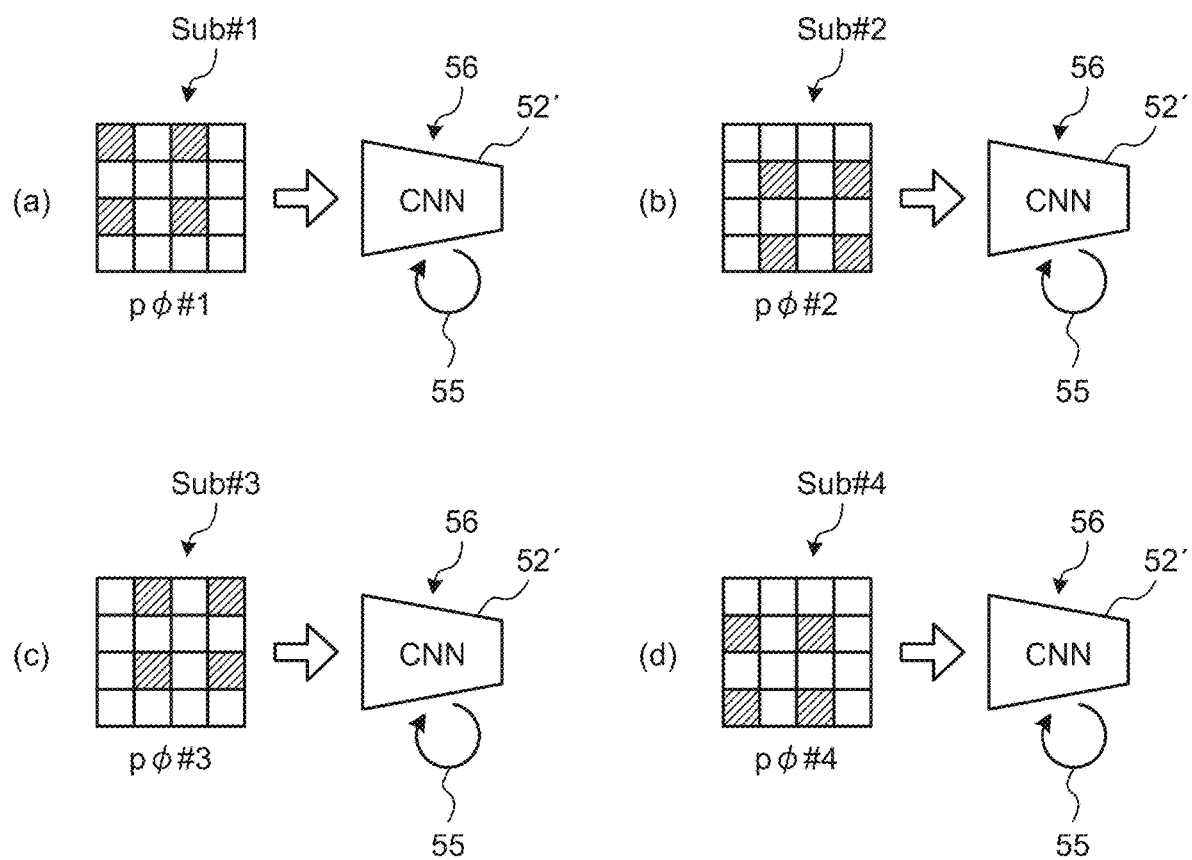
FIG. 38 is a schematic diagram schematically illustrating a recognition process applicable to the fourth modification of the second embodiment.

FIG. 38 is a schematic diagram illustrating an outline of a recognition process applicable to the fourth modification of the second embodiment. FIG. 38 illustrates an example in which a pattern Pϕ #z is formed with four pixels separated via one pixel each in the horizontal direction (line direction) and the vertical direction. As illustrated in Sections (a), (b), (c), and (d) of FIG. 38, with a configuration having patterns Pϕ #1, Pϕ #2, Pϕ #3, and Pϕ #4 with four pixels shifted in phase by one pixel in the horizontal and vertical directions, it is possible to read out all 16 pixels included in a 4 pixel×4 pixel area without duplication. Each of the four pixels read out in accordance with the patterns Pϕ #1, Pϕ #2, Pϕ #3, and Pϕ #4 are each correspond to subsamples Sub #1, Sub #2, Sub #3, and Sub #4, respectively, which have been extracted from 16 pixels included in a sample region of 4 pixels×4 pixels so as to avoid duplication.

In the example of Sections (a) to (d) of FIG. 38, the recognition process is performed by executing the process of the CNN 52' and the internal information update 55 onto the subsamples Sub #1, Sub #2, Sub #3, and Sub #4, individually. Therefore, it is only necessary to input four pieces of pixel data to the CNN 52' for one recognition process, enabling the recognizer 56 to be configured on an extremely small scale.

Figure 39:
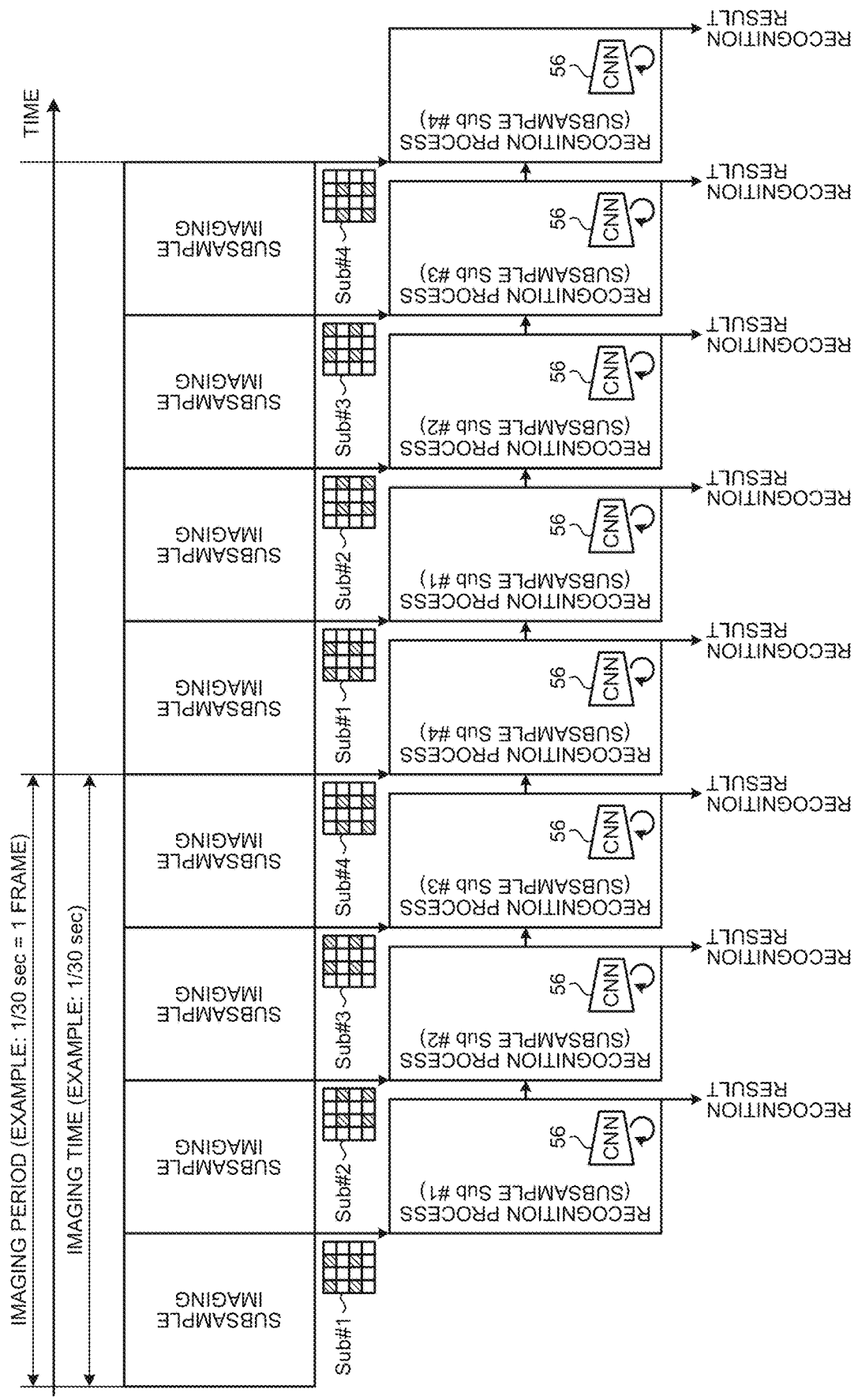
FIG. 39 is a time chart illustrating an example of readout and control according to the fourth modification of the second embodiment.

FIG. 39 is a time chart illustrating an example of readout and control according to the fourth modification of the second embodiment. In FIG. 39, the imaging period corresponds to a frame period, which is 1/30 [sec], for example. The readout of the frame from the sensor unit 10 is performed in this frame period. The imaging time is a time length required to image all the subsamples Sub #1 to Sub #4 included in the frame. In the example of FIG. 39, the imaging time is set to 1/30 [sec], which is the same as the imaging period. The imaging of one subsample Sub #x is referred to as subsample imaging.

In the fourth modification of the second embodiment, the imaging time is divided into four durations, and subsample imaging of each of subsample Sub #1, Sub #2, Sub #3, and Sub #4 is executed in each of durations.

More specifically, the sensor controller 11 executes subsample imaging using subsample Sub #1 over the entire frame in the first duration among the first to fourth durations obtained by division of the imaging time. The sensor controller 11 extracts subsample Sub #1 while moving the 4 pixel×4 pixel sample regions in the line direction so as not to cause duplication, for example. The operation of extracting the subsample Sub #1 while moving the sample region in the line direction is repeatedly executed in the vertical direction by the sensor controller 11.

When the extraction of the subsample Sub #1 for one frame is completed, the recognition processing unit 12 inputs the extracted subsample Sub #1 for one frame to the recognizer 56 for each subsample Sub #1 to execute the recognition process. The recognition processing unit 12 outputs the recognition result after completion of the recognition process for one frame. Not limited to this, the recognition processing unit 12 may output a recognition result when a valid recognition result is obtained in the middle of the recognition process for one frame, and may terminate the recognition process for the subsample Sub #1.

Thereafter, in each of the second, third, and fourth durations, subsample imaging over the entire frame will be executed similarly using subsamples Sub #2, Sub #3, and Sub #4.

Figure 40:
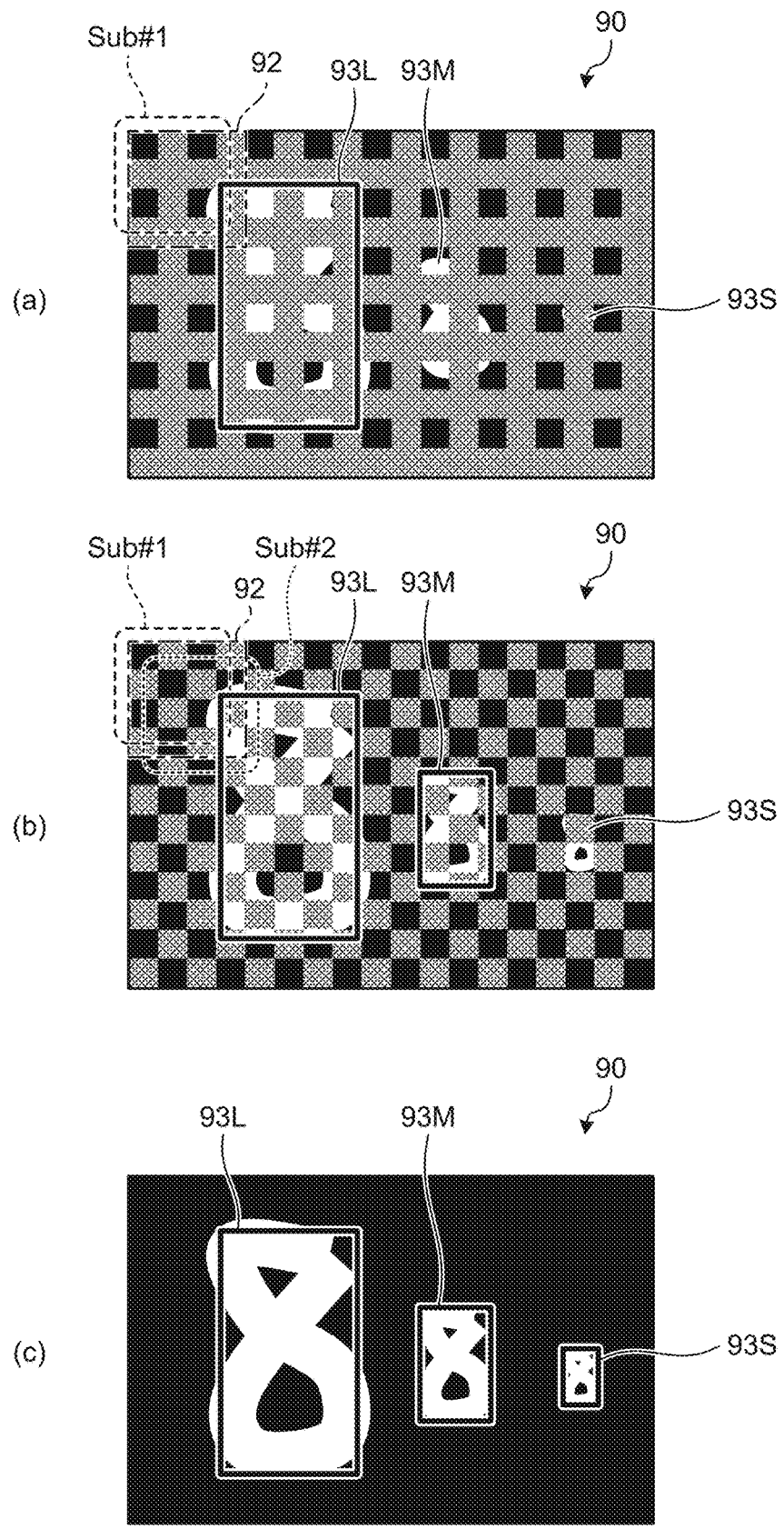
FIG. 40 is a view specifically illustrating the frame readout process according to the fourth modification of the second embodiment.

With reference to FIGS. 40 and 41, a frame readout process according to the fourth modification of the second embodiment will be described more specifically. FIG. 40 is a diagram illustrating an example in which the recognition target is the number "8" and three numbers "8" having different sizes are included in one frame. In Sections (a), (b) and (c) of FIG. 40, a frame 90 includes three objects 93L, 93M, and 93S each of which indicating the number "8" and having a different size from each other. Of these, the object 93L is the largest and object 93S is the smallest.

In Section (a) of FIG. 40, a subsample Sub #1 is extracted in a sample region 92. By extracting a subsample Sub #1 in each of the sample regions 92 included in the frame 90, pixels are read out in a grid pattern in intervals of every other pixel from the frame 90 in each of the horizontal and vertical directions, as illustrated in Section (a) of FIG. 40. In the example of Section (a) of FIG. 40, the recognition processing unit 12 recognizes the largest object 93L among the objects 93L, 93M, and 93S based on the pixel data of the pixels read out in a grid pattern.

After completion of the extraction of the subsample Sub #1 from the frame 90, the extraction of the subsample Sub #2 in the sample region 92 is performed next. The subsample Sub #2 is constituted with pixels that are shifted by one pixel each in the horizontal and vertical directions in the sample region 92 with respect to the subsample Sub #1. Since the internal state of the recognizer 56 has been updated based on the recognition result of the subsample Sub #1, the recognition result corresponding to the extraction of the subsample Sub #2 will have an influence of the recognition process of the subsample Sub #1. Therefore, the recognition process according to the extraction of the subsample Sub #2 can be considered to have been performed based on the pixel data regarding the pixels read out in a checkered pattern, as illustrated in Section (b) of FIG. 40. Therefore, the state illustrated in the Section (b) of FIG. 40 in which the subsample Sub #2 is further extracted can lead to higher resolution based on the pixel data and enable the recognition process with higher accuracy as compared to the state illustrated in Section (a) of FIG. 40 in which only the subsample Sub #1 is extracted. In the example in Section (b) of FIG. 40, the next largest object 93M after the object 93L described above is further recognized.

Section (c) of FIG. 40 illustrates a state in which extraction of all subsamples Sub #1 to Sub #4 included in the sample region 92 is completed in the frame 90. In Section (c) of FIG. 40, all pixels included in the frame 90 are to be read out, resulting in a state where the smallest object 93S is recognized in addition to the objects 93L and 93M recognized in the extraction of subsamples Sub #1 and Sub #2.

FIG. 41 is a view illustrating an example in which the recognition target is a person and images of three persons located at different distances from the imaging apparatus 1 are included in one frame. In Sections (a), (b), and (c) of FIG. 41, a frame 95 includes three objects 96L, 96M, and 96S each of which being an image of a person and having a different size from each other. Of these, the object 96L is the largest, and of the three people included in the frame 95, the person corresponding to the object 96L is the closest to the imaging apparatus 1. Furthermore, the smallest object 96S among the objects 96L, 96M, and 96S represents a state that a person who corresponds to the object 96S among the three people included in the frame 95 is the farthest person from the imaging apparatus 1.

In FIG. 41, Section (a) corresponds to Section (a) in FIG. 40, and indicates an example in which the above-described subsample Sub #1 is extracted and recognition processing is executed, and the largest object 96L is recognized. The Section (b) of FIG. 41 corresponds to the Section (b) of FIG. 40, and indicates an example in which the subsample Sub #2 is further extracted and the recognition process is executed for the state of the Section (a) of FIG. 41, and the next largest object 96M is recognized. In addition, the Section (c) of FIG. 41 corresponds to the Section (c) of FIG. 40, and indicates an example in which the subsamples Sub #3 and Sub #4 are further extracted and recognized for the state of the Section (b) of FIG. 41, the recognition process is executed, and the recognition process is executed based on the pixel data of all the pixels included in the frame 95. The Section (c) of FIG. 41 illustrates a scene in which the smallest object 96S has been recognized in addition to the objects 96L and 96M.

In this manner, by extracting subsamples Sub #1, Sub #2, and so on and repeating the recognition process, it is possible to sequentially recognize a person who is farther away.

In the examples of FIGS. 40 and 41, the frame readout and recognition processing can be controlled in accordance with the time that can be assigned to the recognition process, for example. As an example, in a case where the time that can be assigned to the recognition process is short, it is conceivable to terminate the frame readout and recognition process at a point where the extraction of the subsample Sub #1 in the frame 90 is completed and the object 93L is recognized. In contrast, in a case where the time that can be assigned to the recognition process is long, it is conceivable to continue the frame readout and the execution of the recognition process until the extractions of all the subsamples Sub #1 to Sub #4 are completed.

Not limited to this, the recognition processing unit 12 may control the frame readout and the recognition processing in accordance with the reliability (score) of the recognition result. For example, when the score for the recognition result based on the extraction of the subsample Sub #2 and the recognition process is a predetermined value or more in Section (b) of FIG. 41, the recognition processing unit 12 can terminate the recognition process and suppress the execution of extraction of the next subsample Sub #3.

In this manner, in the fourth modification of the second embodiment, the recognition process can be terminated at a point where a predetermined recognition result is obtained, leading to reduction of the processing amount in the recognition processing unit 12 and power saving.

Furthermore, with the fourth modification of the second embodiment, it is possible to increase the recognition response speed for an object having a large size in the frame, and possible to achieve a higher frame rate.

[5-5. Fifth Modification of Second Embodiment]

Next, a fifth modification of the second embodiment will be described. The fifth modification of the second embodiment is an example in which the unit of readout is defined as a pattern in which a plurality of pixels including non-adjacent pixels is randomly arranged.

Figure 42:
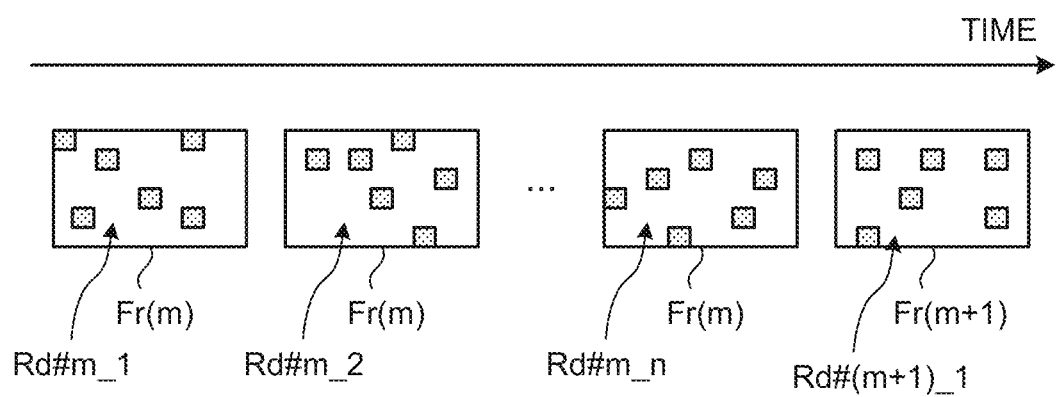
FIG. 42 is a schematic diagram illustrating a frame readout process according to a fifth modification of the second embodiment.

FIG. 42 is a schematic diagram illustrating a frame readout process according to the fifth modification of the second embodiment. As illustrated in FIG. 42, in the fifth modification of the second embodiment, for example, a pattern Rd #m_x formed with a plurality of pixels arranged discretely and aperiodically in the frame Fr(m) is uses as the unit of readout. That is, the unit of readout according to the fifth modification of the second embodiment is an entire frame.

In the fifth modification of the second embodiment, referring to FIG. 39 described above, one frame period is divided into a plurality of durations, and the pattern is switched for each of the durations. In the example of FIG. 42, in the first duration of the divided frame period of the mth frame Fr(m), the recognition processing unit 12 executes a recognition process by reading out pixels in accordance with a pattern Rd #m_1 formed with the plurality of pixels arranged discretely and aperiodically within the frame Fr(m). As an example, when the total number of pixels included in the frame Fr(m) is s and the number of divisions of the frame period is D, the recognition processing unit 12 selects s/D pixels arranged discretely and aperiodically in the frame Fr(m) so as to form the pattern Rd #m_1.

In the next duration after the frame period is divided, the recognition processing unit 12 executes the recognition process by reading out pixels in accordance with a pattern Rd #m_2 in which pixels different from the pattern Rd #m_1 have been selected in the frame Fr(m).

Similarly, in the next (m+1)th frame Fr(m+1), in the first duration of the divided frame period of the frame Fr(m+1), the recognition processing unit 12 executes a recognition process by reading out pixels in accordance with a pattern Rd #(m+1)_1 formed with the plurality of pixels arranged discretely and aperiodically within a frame Fr(m+1). In the next duration, the recognition processing unit 12 executes the recognition process by reading out the pixels in accordance with a pattern Rd #(m+1)_2 in which the pixels different from the pattern Rd #(m+1)_1 have been selected.

In the recognition processing unit 12, the readout determiner 123 performs, within the first duration of the divided frame period of the frame Fr(m), for example, selection of a predetermined number of pixels from among all the pixels included in the frame Fr(m) based on a pseudorandom number so as to determine the pattern Rd #m_1 as a unit of readout. In the next duration, based on a pseudorandom number, the readout determiner 123 selects a predetermined number of pixels from among all the pixels included in the frame Fr(m) excluding the pixels selected in the pattern Rd #m_1 and determines the pattern Rd #m_2 as a unit of readout. Not limited to this, the recognition processing unit 12 may again select a predetermined number of pixels from among all the pixels included in the frame Fr(m) based on a pseudorandom number to determine the pattern Rd #m_2 as the unit of readout.

The readout determiner 123 passes readout region information in which the readout position information for reading out pixel data of the pattern Rd #m_x has been added to the information indicating the unit of readout determined as the pattern Rd #m_x, to the readout controller 111. The readout controller 111 passes the readout region information passed from the readout determiner 123 to the readout unit 110. The readout unit 110 reads out the pixel data from the sensor unit 10 in accordance with the readout region information passed from the readout controller 111.

Here, it is conceivable that the information indicating the unit of readout is constituted with, for example, the position information (for example, the line number and the information indicating the pixel position in the line) of each of pixels included in the pattern Rd #m_1 within the frame Fr(m). Furthermore, since the unit of readout in this case covers the entire frame Fr(m), the readout position information can be omitted. As the readout position information, it is allowable to use the information indicating the position of a predetermined pixel within the frame Fr(m).

In this manner, the fifth modification of the second embodiment performs the frame readout process by using the pattern Rd #m_x formed with a plurality of pixels discretely and aperiodically arranged from among all the pixels of the frame Fr(m). This makes it possible to reduce the sampling artifacts as compared with the case of using periodic patterns. For example, according to the frame readout process according to the fifth modification of the second embodiment, it is possible to suppress erroneous detection or non-detection of a temporal periodic pattern (for example, flicker) in the recognition process. Furthermore, according to the frame readout process, it is possible to suppress erroneous detection and non-detection of spatial periodic patterns (fences, mesh-like structures, or the like) in the recognition process.

Furthermore, according to the frame readout process, the pixel data usable for the recognition process increases with the passage of time, making it possible to increase the recognition response speed for an object having a large size in the frame Fr(m), leading to achieve a higher frame rate.

Although the above description is an example in which the recognition processing unit 12 generates each of patterns Rd #m_x each time, the present disclosure is not limited to this example. For example, each of patterns Rd #m_x may be generated in advance and stored in memory or the like, and the readout determiner 123 may read the stored pattern Rd #m_x from the memory and use it.

[5-6. Sixth Modification of Second Embodiment]

Figure 43:
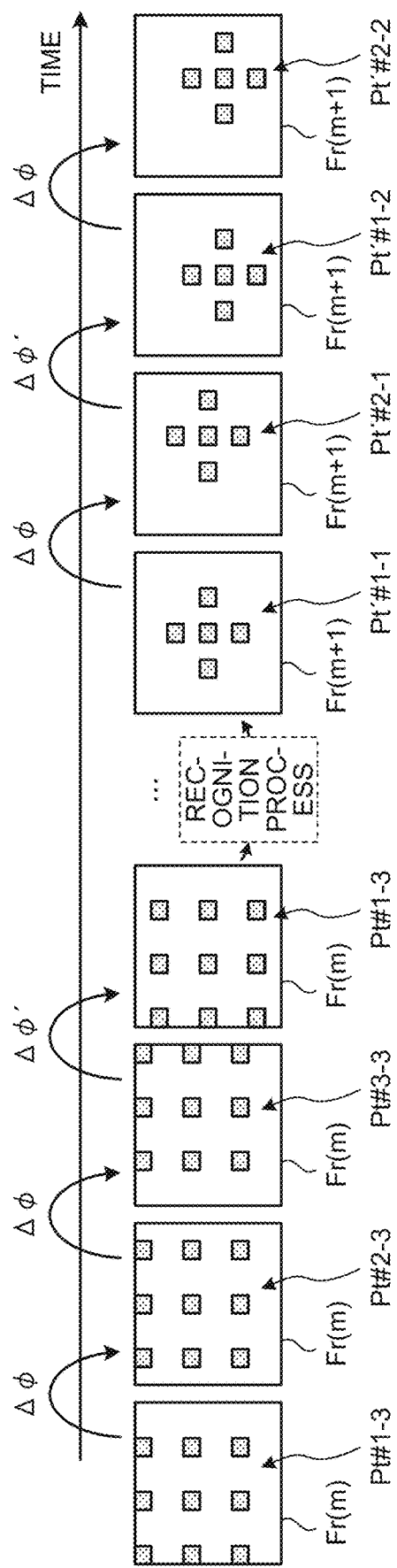
FIG. 43 is a schematic diagram illustrating a frame readout process according to a sixth modification of the second embodiment.

Next, a sixth modification of the second embodiment will be described. The sixth modification of the second embodiment is an example in which the configuration of the unit of readout is changed in accordance with the result of the recognition process. FIG. 43 is a schematic diagram illustrating a frame readout process according to the sixth modification of the second embodiment. Here, a unit of readout based on a pattern formed with a plurality of pixels including non-adjacent pixels, which has been described with reference to FIG. 37, will be described as an example.

In FIG. 43, in the mth frame Fr(m), the readout determiner 123 generates a pattern Pt #x-y formed with a plurality of pixels discretely and periodically arranged individually in the line direction and the vertical direction, similarly to the pattern Pφ #x-y described with reference to FIG. 37, and sets the generated pattern Pt #x-y as an initial unit of readout. The readout determiner 123 passes the readout region information in which the readout position information for reading the pattern Pt #x-y has been added to the information indicating the unit of readout determined as the pattern Pt #x-y, to the readout controller 111. The readout controller 111 passes the readout region information passed from the readout determiner 123 to the readout unit 110. The readout unit 110 reads out the pixel data from the sensor unit 10 in accordance with the readout region information passed from the readout controller 111.

As illustrated in FIG. 43, the recognition processing unit 12 performs readout and a recognition process from the left end side while shifting the positions in the horizontal direction by a phase Δφ in the order of patterns Pt #1-1, Pt #2-1, and Pt #3-1 within the frame Fr(m). When the right end of the pattern Pt #x-y reaches the right end of the frame Fr(m), the position is shifted in the vertical direction by a phase Δφ', and the readout and recognition process will be again performed from the right end side of the frame Fr(m) while shifting the position in the horizontal direction by the phase Δφ, in the order from Pt #1-2, and so on.

The recognition processing unit 12 generates a new pattern Pt' #x-y in accordance with the recognition result in the frame Fr(m). As an example, it is assumed that the recognition processing unit 12 has recognized a target object (for example, a person) in the central part of the frame Fr(m) in the recognition process for the frame Fr(m). Based on the recognition result, the readout determiner 123 of the recognition processing unit 12 generates, as a new unit of readout, a pattern Pt' #x-y of readout that concentrates on the pixels in the central portion of the frame Fr(m).

The readout determiner 123 can generate a pattern Pt' #x-1 with fewer pixels than the pattern Pt #x-y. Furthermore, the readout determiner 123 can arrange the pixels of the pattern Pt' #x-y with higher density than in the pixel arrangement of the pattern Pt #x-y.

The readout determiner 123 passes the readout region information in which the readout position information for reading the pattern Pt' #x-y has been added to the information indicating the unit of readout determined as the pattern Pt' #x-y, to the readout controller 111. Here, the readout determiner 123 applies this pattern Pt' #x-y to the next frame Fr(m+1). The readout controller 111 passes the readout region information passed from the readout determiner 123 to the readout unit 110. The readout unit 110 reads out the pixel data from the sensor unit 10 in accordance with the readout region information passed from the readout controller 111.

In the example of FIG. 43, in the frame Fr(m+1), the recognition processing unit 12 first performs the readout and recognition process using a pattern Pt' #1-1 at the central portion of the frame Fr(m+1), and then performs the readout and recognition process using a pattern Pt' #2-1 with a shifted position in the horizontal direction by the phase Δφ, for example. Furthermore, the recognition processing unit 12 shifts the position of the pattern Pt' #1-1 in the vertical direction by the phase Δφ', and further performs readout of patterns Pt' #1-2 and Pt' #2-2 with sequentially shifted position in the horizontal direction by the phase Δφ.

In this manner, in the sixth modification of the second embodiment, based on the recognition result in the frame Fr(m) based on the pattern Pt #x-y being the initial pattern, the pattern Pt' #x-y to be used for the readout of the pixel in the next frame Fr(m+1) will be generated. This enables the recognition process to be performed with higher accuracy. In addition, by using a new pattern Pt' #x-y generated in accordance with the result of the recognition process and executing the recognition process of narrowing down to the part in which an object has been recognized, it is possible to achieve reduction of the processing amount in the recognition processing unit 12, power saving, and a higher frame rate.

Another Example of Sixth Modification

Figure 44:
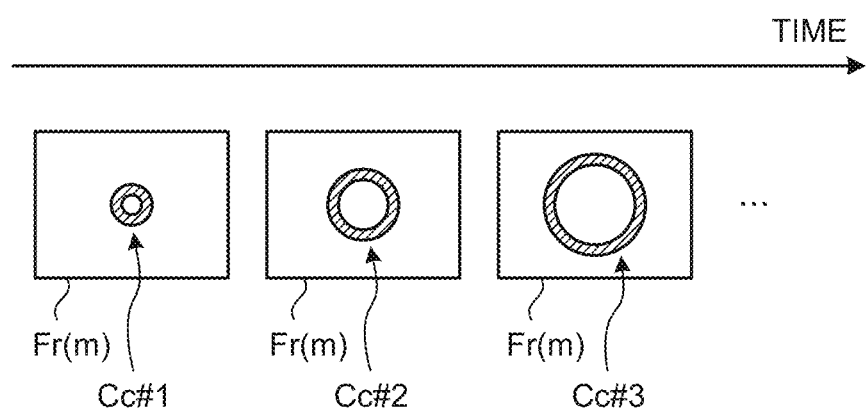
FIG. 44 is a diagram illustrating an example of a pattern for performing readout and a recognition process according to the sixth modification of the second embodiment.

Next, another example of the sixth modification of the second embodiment will be described. FIG. 44 is a diagram illustrating an example of a pattern for performing readout and a recognition process according to the sixth modification of the second embodiment. A pattern Cc #x illustrated in FIG. 44 is a unit of readout having an annular shape and having an annular radius that changes with the passage of time. In the example of FIG. 44, a pattern Cc #1 having a smallest radius is used in the first duration of the divided frame period of the frame Fr(m), a pattern Cc #2 having a radius larger than the pattern Cc #1 is used in the next duration, and a pattern Cc #3 having a still larger radius than the pattern Cc #2 is used in the subsequent duration.

For example, as illustrated in above FIG. 43, the recognition processing unit 12 performs readout and a recognition process from the left end side while shifting the positions in the horizontal direction by a phase Δφ in the order of patterns Pt #1-1, Pt #2-1, and Pt #3-1 within the frame Fr(m). When the right end of the pattern Pt #x-y reaches the right end of the frame Fr(m), the position is shifted in the vertical direction by a phase Δφ', and the readout and recognition process will be again performed from the right end side of the frame Fr(m) while shifting the position in the horizontal direction by the phase Δφ, in the order from Pt #1-2, and so on.

The recognition processing unit 12 generates a new pattern Cc #1 having an annular shape in accordance with the recognition result in the frame Fr(m). As an example, it is assumed that the recognition processing unit 12 has recognized a target object (for example, a person) in the central part of the frame Fr(m) in the recognition process for the frame Fr(m). Based on the recognition result, the readout determiner 123 of the recognition processing unit 12 generates patterns Cc #1, Cc #2, and so on, and performs the recognition process based on these generated patterns Cc #1, Cc #2, and so on.

In FIG. 44, the radius of the pattern Cc #m is increased with the passage of time. However, the present disclosure is not limited to this example, and the radius of the pattern Cc #m may be decreased with the passage of time.

As yet another example of the sixth modification of the second embodiment, it is allowable to vary the density of pixels in the pattern on which the readout is performed. Furthermore, although the size is changed from the center of the annular shape to the outer circumference or from the outer circumference to the center in the pattern Cc #m illustrated in FIG. 44, the present disclosure is not limited to this example.

[5-7. Seventh Modification of Second Embodiment]

Next, a seventh modification of the second embodiment will be described. In the second embodiment described above and the first to fourth modifications of the second embodiment, the lines, areas, and patterns for readout of pixels are sequentially moved following the order of coordinates in the frame (line number, pixel order within the line). In contrast, in the seventh modification of the second embodiment, the lines, areas, and patterns for readout of pixels are set so that the pixels in the frame can be read out with higher uniformity in a short time.

Figure 45:
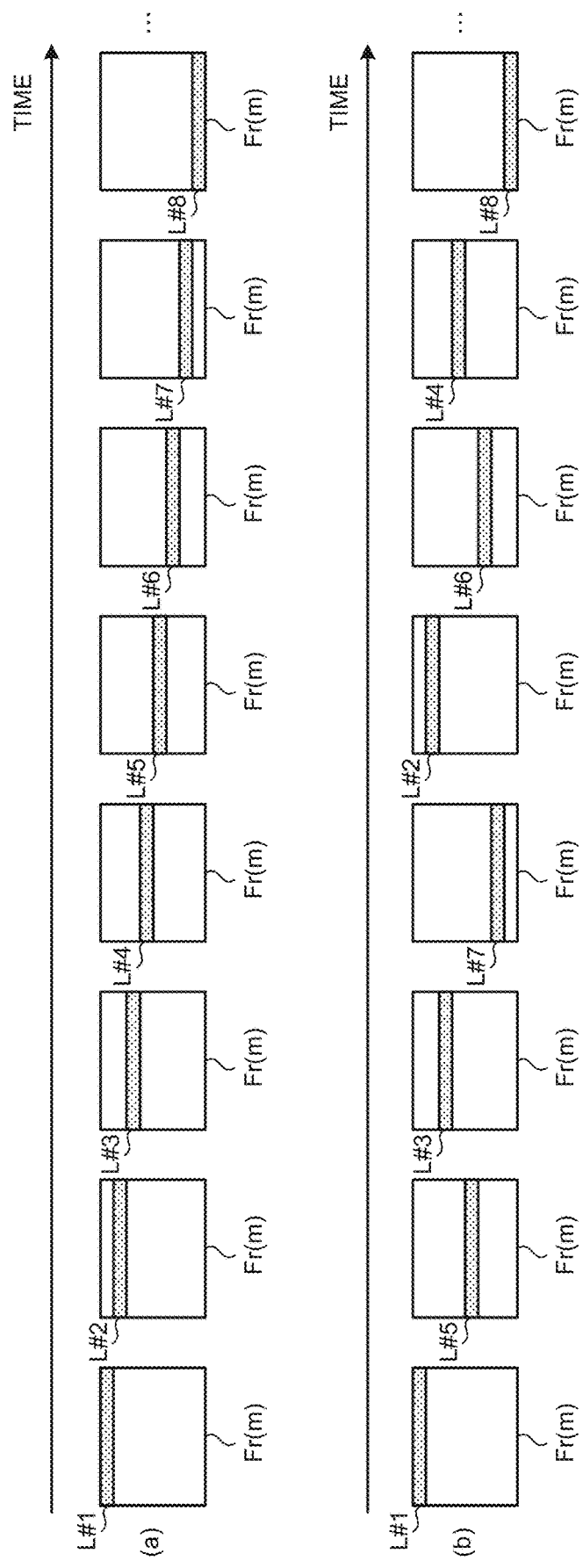
FIG. 45 is a schematic diagram illustrating a first example of a frame readout process according to a seventh modification of the second embodiment.

FIG. 45 is a schematic diagram illustrating a first example of a frame readout process according to the seventh modification of the second embodiment. In FIG. 45, for the sake of explanation, the frame Fr(m) contains eight lines, namely, line L #1, L #2, L #3, L #4, L #5, L #6, L #7, and L #8.

The readout process illustrated in Section (a) of FIG. 45 corresponds to the readout process described with reference to FIG. 24 in the second embodiment, illustrating an example in which the unit of readout is a line, and pixel data readout is performed sequentially in the order of lines for the frame Fr(m), specifically in the order of lines L #1, L #2, . . . , L #8. In the example of this Section (a), there is a large delay from the start of readout of the frame Fr(m) to the acquisition of the pixel data at the bottom of the frame Fr(m).

Section (b) of FIG. 45 illustrates an example of the readout process according to the seventh modification of the second embodiment. Section (b) also uses a line as the unit of readout similarly to the Section (a) of FIG. 45 described above. In the example of Section (b), in the frame Fr(m), in individual lines of the odd line number and individual lines of the even line number, two individual lines having the distance between the lines being ½ the number of lines of the frame Fr(m) are paired. Among these pairs, the pairs having odd line numbers are sequentially read out, and then, the pair having even line numbers are sequentially read out.

More specifically, in the example of Section (b) of FIG. 45, in the first half of the frame period, for example, among the lines L #x included in the frame Fr(m), lines with odd line numbers, namely, lines L #1 and L #3, L #5, and L #7 are read out in the changed readout order, that is, the order of lines L #1, L #5, L #3, and L #7. Similarly, for the latter half of the frame period, among the lines L #x included in the frame Fr(m), the lines with even line numbers, namely, lines L #2, L #4, L #6, and L #8 are read out in the changed readout order, that is, the order of lines L #2, L #6, L #4, and L #8.

This type of control of the readout order of individual lines L #x is implemented by the readout determiner 123 sequentially setting the readout position information in accordance with the readout order as illustrated in Section (b) of FIG. 45.

By deciding the readout order in this manner, it is possible to reduce the delay from the start of readout of the frame Fr(m) to the acquisition of the pixel data at the bottom of the frame Fr(m) as compared with the example in Section (a). Furthermore, with the seventh modification of the second embodiment, it is possible to increase the recognition response speed for an object having a large size in the frame, and possible to achieve a higher frame rate.

The readout order of individual lines L #x described with reference to Section (b) of FIG. 45 is an example, and the readout region can be set so that the assumed object can be easily recognized. For example, the readout determiner 123 can sets a region in the frame for preferentially executing recognition processes based on external information given from the outside of the imaging apparatus 1, and may determine the readout position information so as to preferentially execute the readout of the readout region corresponding to this region. Furthermore, the readout determiner 123 can also set a region in which the recognition process is preferentially executed in the frame in accordance with the scene imaged in the frame.

Furthermore, also in the seventh modification of the second embodiment, when a valid recognition result is obtained in the middle of the readout of each of lines in the frame, it is possible to end the readout and recognition process for the line, similarly to the second embodiment described above. This makes it possible to save power in the recognition process and shorten the time required for the recognition process.

First Other Example of Seventh Modification of Second Embodiment

Next, a first other example of the seventh modification of the second embodiment will be described. Although the seventh modification of the second embodiment described above is an example in which one line is used as the unit of readout, the present disclosure is not limited to this example. In the first other example, two non-adjacent lines are used as a unit of readout.

Figure 46:
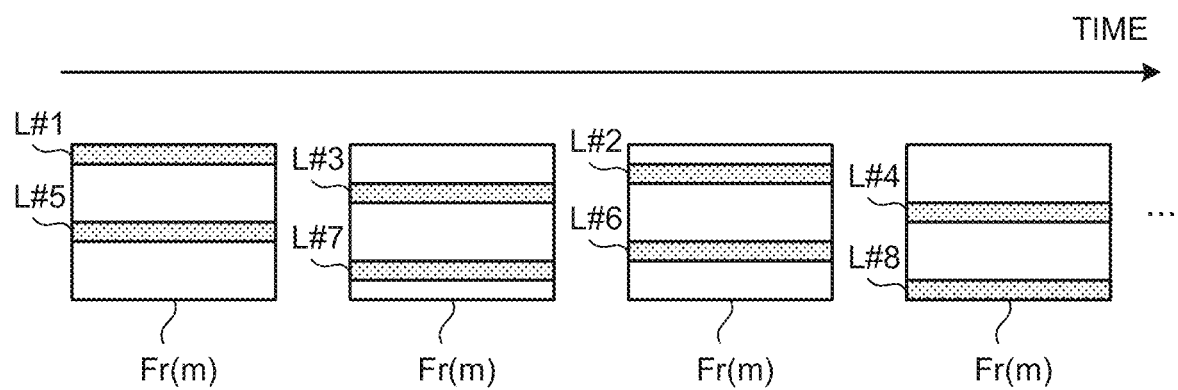
FIG. 46 is a schematic diagram illustrating a frame readout process according to a first other example of the seventh modification of the second embodiment.

FIG. 46 is a schematic diagram illustrating a frame readout process according to the first other example of the seventh modification of the second embodiment. In the example of FIG. 46, in the frame Fr(m) described in Section (b) of FIG. 45, in individual lines having the odd line number and individual lines having even line number, two individual lines which are paired and having the distance between the lines being ½ the number of lines, are defined as the unit of readout. More specifically, a pair of lines L #1 and L #5, a pair of lines L #3 and L #7, a pair of lines L #2 and L #6, and a pair of lines L #4 and L #8, are defined as the unit of readout. Among these pairs, the pair having odd line numbers is sequentially read out first, and then the pair having even line numbers will be sequentially read out.

In this first other example, since the unit of readout includes two lines, the time required for the recognition process can be further shortened as compared with the seventh modification of the second embodiment described above.

Second Other Example of Seventh Modification of the Second Embodiment

Next, a second other example of the seventh modification of the second embodiment will be described. This second other example is a modification obtained by applying an example of setting a readout region for the readout of a unit of readout in order to achieve the readout of the pixels in a frame with shorter time and higher uniformity, to the example according to the third modification of the second embodiment, which are illustrated using FIG. 33, in which an area of a predetermined size in the frame is defined as the unit of readout.

Figure 47:
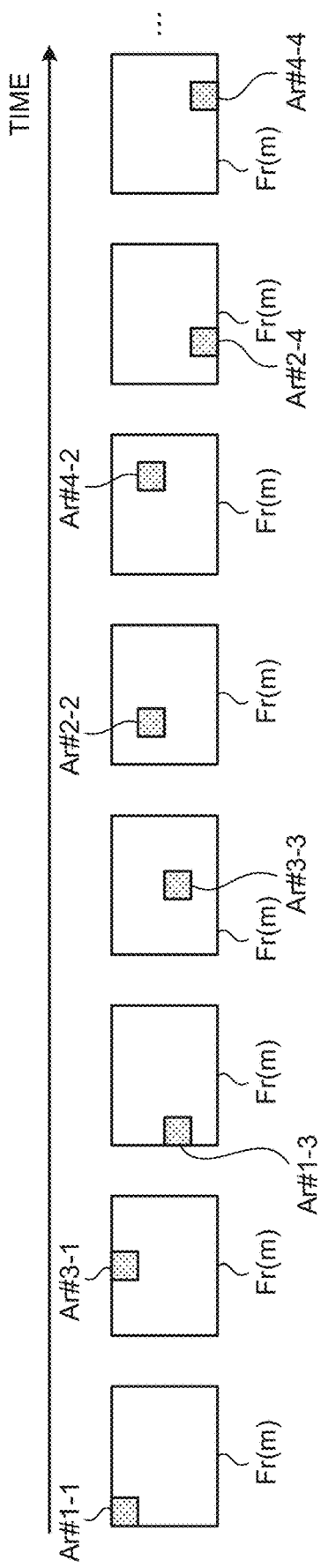
FIG. 47 is a schematic diagram illustrating a frame readout process according to a second other example of the seventh modification of the second embodiment.

FIG. 47 is a schematic diagram illustrating a frame readout process according to the second other example of the seventh modification of the second embodiment. In the example of FIG. 47, readout of the frame Fr(m) is performed by discretely designating, in the frame Fr(m), the position of each of areas Ar #x-y described with reference to FIG. 33. As an example, after execution of the readout and recognition process of an area Ar #1-1 in the upper left corner of the frame Fr(m), readout and a recognition process is performed on an area Ar #3-1 that includes the same line as the area Ar #1-1 in the frame Fr(m) and that is located at a central portion of the frame Fr(m) in the line direction. Next, readout and a recognition process is performed on an area Ar #1-3 in the upper left corner in a region that is ½ the lower part of the frame Fr(m), and then readout and a recognition process is performed on an area Ar #3-3 that includes the same line as the area Ar #1-3 in the frame Fr(m) and that is located at a central portion of the frame Fr(m) in the line direction.

Readout and the recognition process will be similarly performed on areas Ar #2-2 and Ar #4-2, as well as areas Ar #2-4 and Ar #4-4.

By deciding the readout order in this manner, it is possible to reduce the delay from the start of readout of the frame Fr(m) from the left end side of the frame Fr(m) to the acquisition of the pixel data at the bottom and the right end side of the frame Fr(m) as compared with the example in FIG. 33. Furthermore, with the second other example, it is possible to increase the recognition response speed for an object having a large size in the frame, and possible to achieve a higher frame rate.

Furthermore, also in the second other example, when a valid recognition result is obtained in the middle of the readout of each of areas Ar #x-y in the frame, it is possible to end the readout and recognition process for the area Ar #x-y, similarly to the second embodiment described above. This makes it possible to save power in the recognition process and shorten the time required for the recognition process.

Third Other Example of Seventh Modification of Second Embodiment

Next, a third other example of the seventh modification of the second embodiment will be described. This third other example is a modification obtained by applying an example of setting a readout region for the readout of a unit of readout in order to achieve the readout of the pixels in a frame with shorter time and higher uniformity, to the example according to the third modification of the second embodiment, which are illustrated using FIG. 37, in which a plurality of pixels arranged discretely and periodically individually in the line direction and the vertical direction is defined as the unit of readout.

Figure 48:
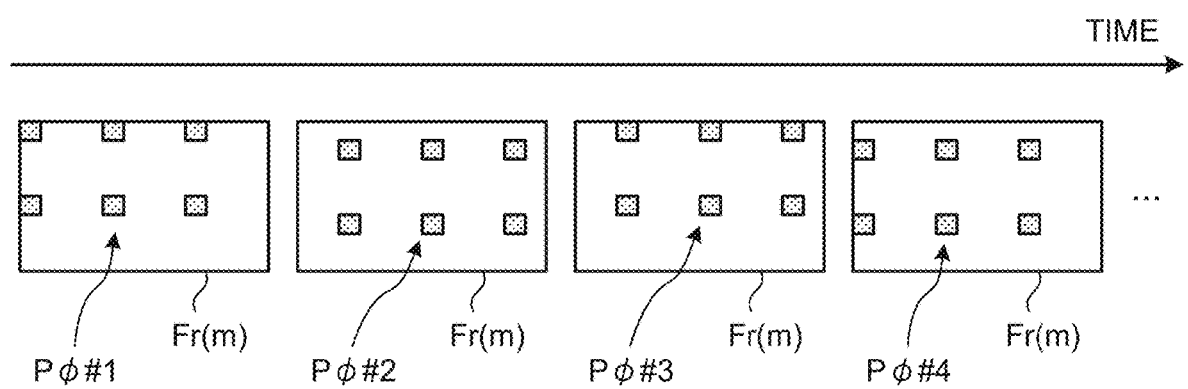
FIG. 48 is a schematic diagram illustrating a frame readout process according to a third other example of the seventh modification of the second embodiment.

FIG. 48 is a schematic diagram illustrating a frame readout process according to the third other example of the seventh modification of the second embodiment. In the example of FIG. 48, having a pattern Pφ #z having a configuration equivalent to that of the pattern Pφ #x-y described using FIG. 37, readout of the frame Fr(m) is performed by discretely designating the position of the pattern Pφ #z in the frame Fr(m).

As an example, the recognition processing unit 12 performs readout and a recognition process of a pattern Pφ #1 located in the upper left corner of the frame Fr(m) with the upper left corner as a start position. Next, readout and a recognition process are performed on a pattern Pφ #2 whose position is shifted by a distance of ½ of the interval individually in the line direction and the vertical direction of the pixels in the pattern Pφ #1. Next, readout and a recognition process is performed on a pattern Pφ #3 obtained by shifting the position of the pattern Pφ #1 by ½ of the interval in the line direction, and then readout and a recognition process is performed on a pattern Pφ #4 obtained by shifting the position of the pattern Pφ #1 by ½ of the interval in the vertical direction. The readout and the recognition process for these patterns Pφ #1 to Pφ #4 are repeatedly executed while shifting the position of the pattern Pφ #1 in the line direction by one pixel, for example, and repeats the processes by further shifting by one pixel in the vertical direction.

By deciding the readout order in this manner, it is possible to reduce the delay from the start of readout of the frame Fr(m) from the left end side of the frame Fr(m) to the acquisition of the pixel data at the bottom and the right end side of the frame Fr(m) as compared with the example in FIG. 37. Furthermore, with the third other example, it is possible to increase the recognition response speed for an object having a large size in the frame, and possible to achieve a higher frame rate.

Furthermore, also in the third other example, when a valid recognition result is obtained in the middle of the readout of each of the patterns Pφ #z in the frame, it is possible to end the readout and recognition process for the pattern Pφ #z, similarly to the second embodiment described above. This makes it possible to save power in the recognition process and shorten the time required for the recognition process.

[5-8. Eighth Modification of Second Embodiment]

Next, an eighth modification of the second embodiment will be described. The eighth modification of the second embodiment is an example in which at least one of the exposure or an analog gain in the sensor unit 10 is controlled in accordance with a predetermined pattern. In the following, the analog gain will be abbreviated as "AG" as appropriate.

Figure 49:
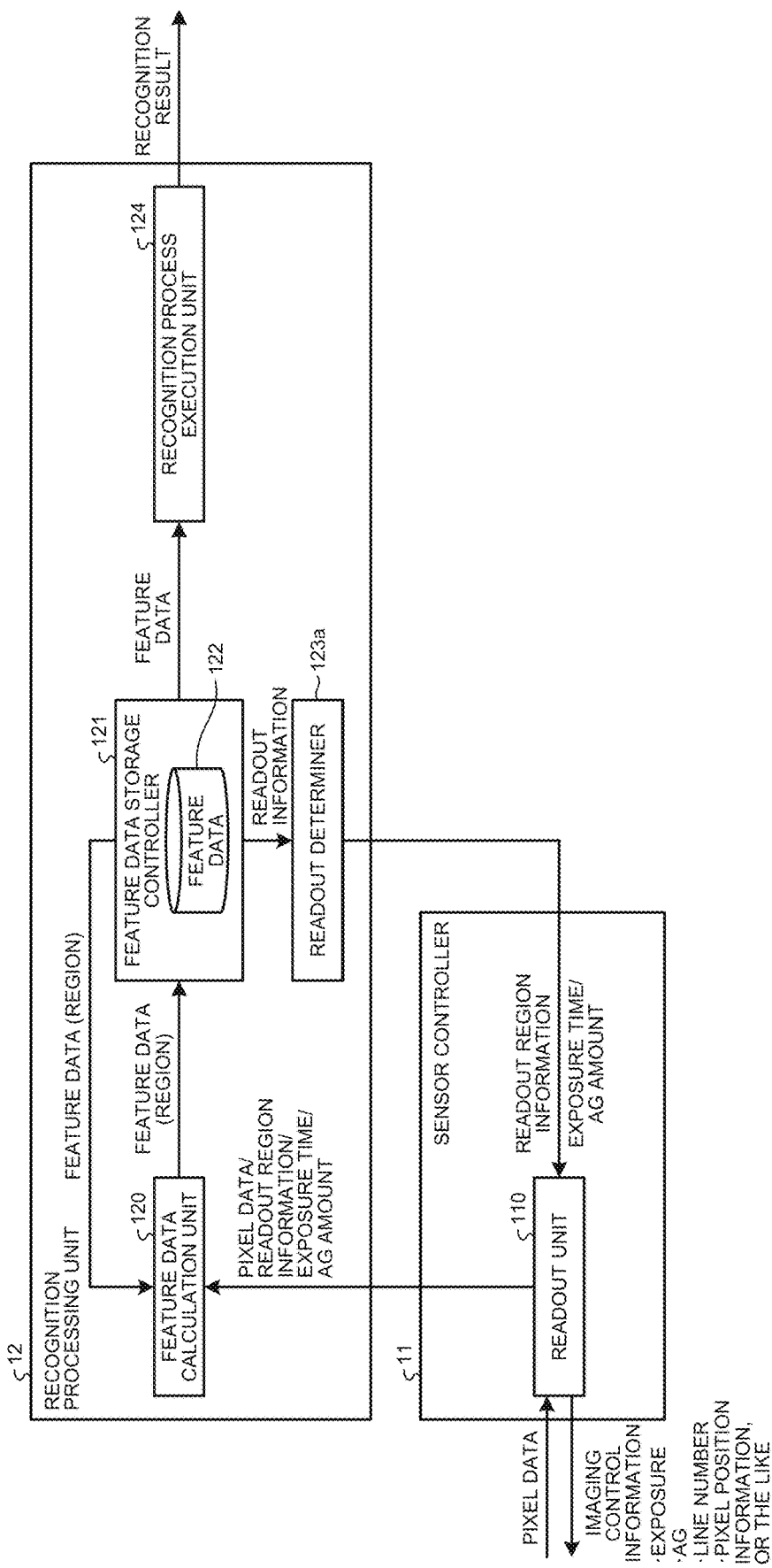
FIG. 49 is a functional block diagram illustrating an example of functions according to an eighth modification of the second embodiment.

FIG. 49 is a functional block diagram illustrating an example of functions according to the eighth modification of the second embodiment. In FIG. 49, a readout determiner 123a generates readout region information and information indicating exposure time and analog gain, based on the readout information passed from the feature data storage controller 121. Not limited to this, the readout determiner 123a may generate at least one of the exposure time or analog gain. The readout determiner 123a passes the generated readout region information, the exposure time, and the analog gain to the readout unit 110.

Figure 50:
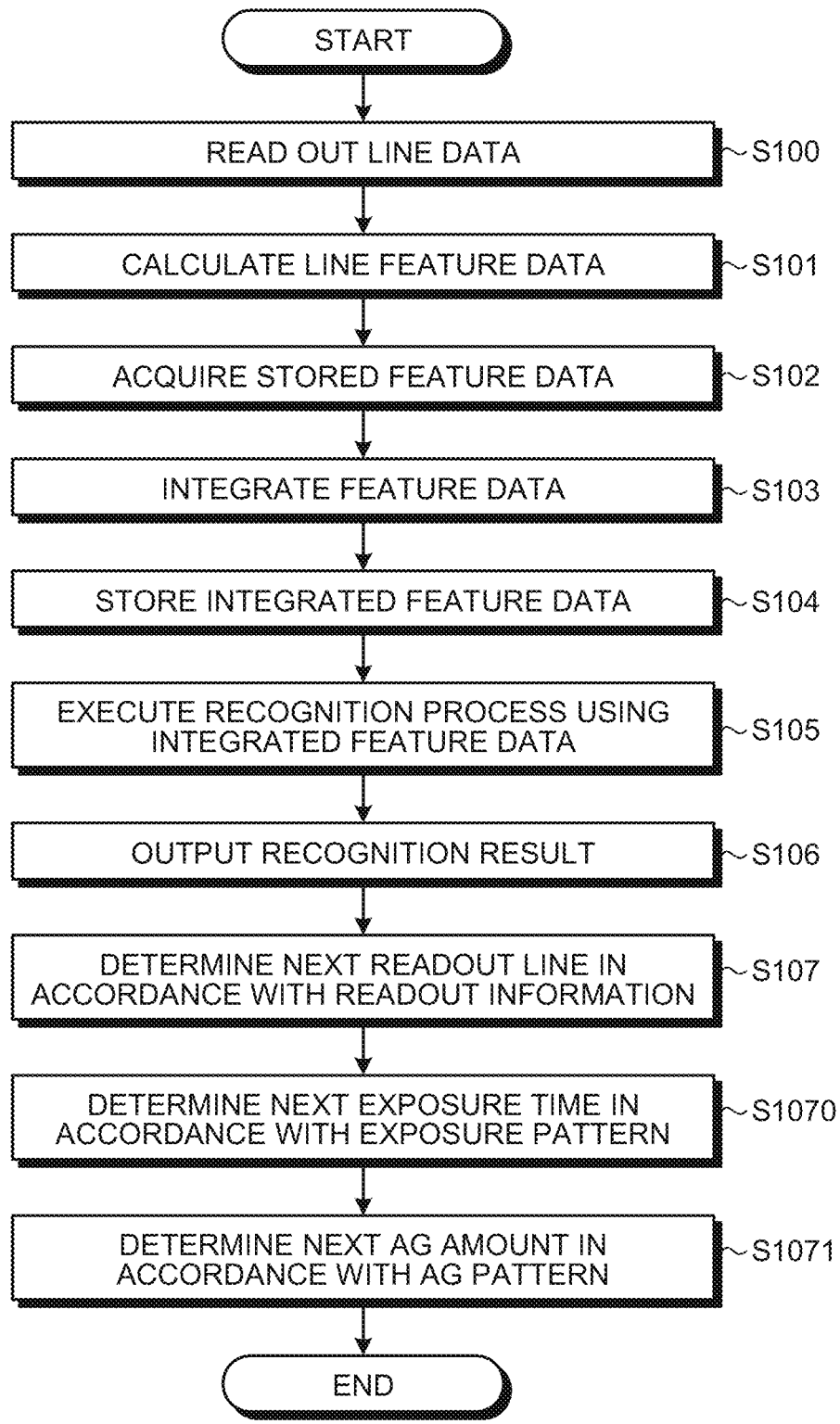
FIG. 50 is a flowchart of an example illustrating a recognition process according to the eighth modification of the second embodiment.

FIG. 50 is a flowchart of an example illustrating a recognition process according to the eighth modification of the second embodiment. The process according to the flowchart of FIG. 50 is a process corresponding to the readout of pixel data in the unit of readout (for example, one line) from a frame, for example. Here, it is assumed that the unit of readout is a line and that the readout region information is a line number indicating a line as a target of readout.

In the flowchart of FIG. 50, the processes of Steps S100 to S107 are respectively equivalent to the processes of Steps S100 to S107 in the flowchart of FIG. 28 described in the second embodiment.

That is, in Step S100, the recognition processing unit 12 performs readout of line data from the line indicated by the readout line of the frame. In the next Step S101, the feature data calculation unit 120 calculates the feature data of the line based on the line data passed from the readout unit 110. In the next Step S102, the feature data calculation unit 120 acquires the feature data stored in the feature data storage unit 122 from the feature data storage controller 121. In the next Step S103, the feature data calculation unit 120 integrates the feature data calculated in Step S101 and the feature data acquired from the feature data storage controller 121 in Step S102, and passes the integrated data to the feature data storage controller 121.

In the next Step S104, the feature data storage controller 121 stores the integrated feature data in the feature data storage unit 122 (Step S104). In the next Step S105, the recognition process execution unit 124 executes the recognition process using the integrated feature data. In the next Step S106, the recognition process execution unit 124 outputs the recognition result of the recognition process of Step S105. In Step S107, the readout determiner 123 in the recognition processing unit 12 determines a readout line for performing the next readout in accordance with the readout information passed from the feature data storage controller 121.

After the process of Step S107, the process proceeds to Step S1070. In Step S1070, the readout determiner 123 determines the exposure time in the next readout in accordance with a predetermined exposure pattern. In the next Step S1071, the readout determiner 123 determines the analog gain in the next readout in accordance with a predetermined AG pattern.

The exposure time and analog gain respectively determined in Step S1070 and Step S1071 are applied to the readout line determined in Step S107 so as to execute the process from Step S100 again.

The order of Steps S107 to S1071 is not limited to the above-described order. Furthermore, one of the processes of Step S1070 or Step S1071 can be omitted.

(First Example of Readout and Recognition Process)

Figure 51A:
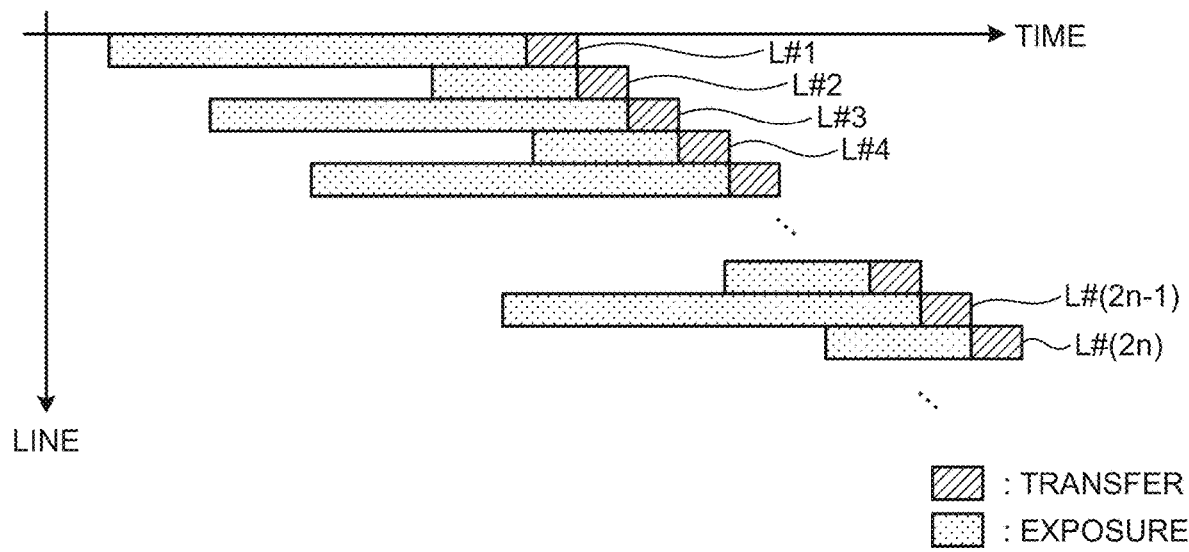
FIG. 51A is a diagram illustrating a first example of readout and the recognition process according to the eighth modification of the second embodiment.

Next, a first example of the readout and recognition process according to the eighth modification of the second embodiment will be described with reference to FIGS. 51A and 51B. FIG. 51A is a schematic diagram illustrating an example of an exposure pattern applicable to the eighth modification of the second embodiment. In FIG. 51A, the vertical axis represents lines and the horizontal axis represents time. In the example of FIG. 51A, the exposure pattern takes a pattern in which the first exposure time and the second exposure time, which is shorter than the first exposure time, alternate line by line, as in L #1, L #2, and so on. Therefore, the lines L #1, L #3, . . . , L #(2n−1) having odd line numbers are exposed with the first exposure time, while the lines L #2, L #4, . . . , L #2n having even line numbers are exposed with the second exposure time shorter than the first exposure time. Note that the line data transfer time is constant regardless of the exposure time.

Figure 51B:
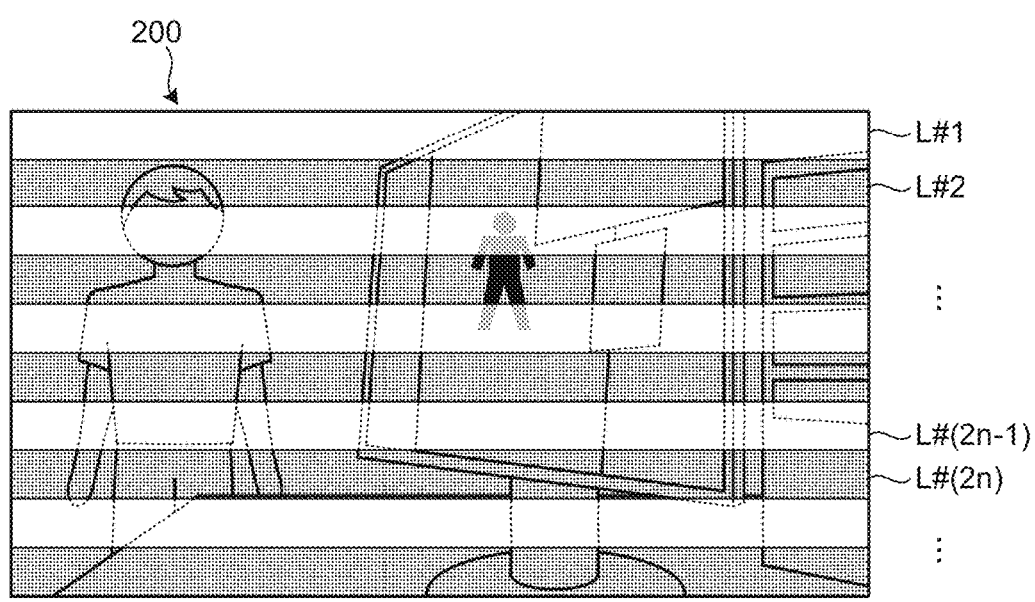
FIG. 51B is a view illustrating a first example of readout and the recognition process according to the eighth modification of the second embodiment.

FIG. 51B is a view illustrating an example of a captured image when imaging is performed in accordance with the exposure pattern of FIG. 51A. In this example, the first exposure time is set to the lines L #1, L #3, . . . , L #(2n−1) with odd line numbers so as to cause overexposure on these lines, while the second exposure time is set to the lines L #2, L #4, . . . , L #2n with even line numbers so as to cause underexposure on these lines.

Here, processes of the recognition processing unit 12, more specifically, referring to FIG. 22, the feature data extraction process 1200, the integrating process 1202, the internal state update process 1211 and the recognition process 1240 are executed using parameters preliminarily obtained by the learning based on the images, as illustrated in FIG. 51B, in which the contrast levels are switched line by line. Not limited to this, the recognition processing unit 12 may perform the learning using a general image.

By alternately setting different exposures for each of lines in one frame in this manner, the recognition processing unit 12 can recognize bright objects and dark objects in the recognition process in one frame individually.

The example of FIG. 51A is an example in which the exposure time is alternately switched for each of lines in accordance with a predetermined exposure pattern. However, the present disclosure is not limited to this example. That is, the analog gain may be switched alternately for each of lines in accordance with a predetermined AG pattern, or the exposure time and the analog gain may be switched in accordance with a predetermined exposure pattern and the AG pattern, respectively.

Furthermore, in the example of FIG. 51A, the unit of readout is set as a line, and the first exposure time and the second exposure time are alternately set for each of lines. However, the present disclosure is not limited to this example. For example, setting of the exposure time and analog gain for each of the unit of readout according to the eighth modification of the second embodiment is also applicable to each of the units of readout of the first to seventh modifications of the second embodiment described above.

[5-9. Ninth Modification of Second Embodiment]

Next, a ninth modification of the second embodiment will be described. The ninth modification of the second embodiment is an example in which the length of the exposure time is set to be spatially different in density in the frame. In the ninth modification of the second embodiment, the configuration described with reference to FIG. 49 can be applied as it is, and therefore detailed description of the configuration will be omitted.

Figure 52:
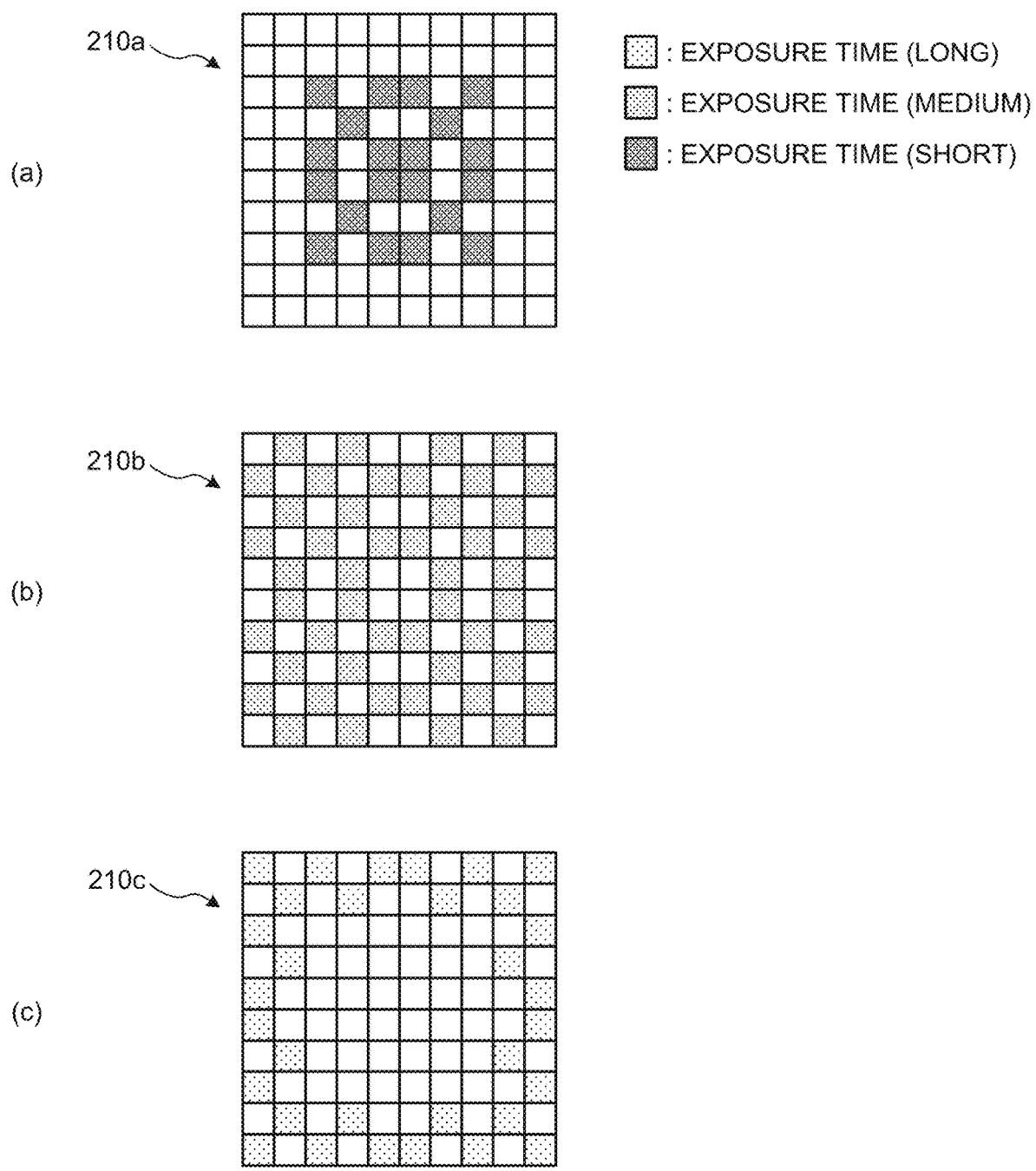
FIG. 52 is a diagram illustrating an example of an exposure pattern according to a ninth modification of the second embodiment.

FIG. 52 is a diagram illustrating an example of an exposure pattern according to the ninth modification of the second embodiment. In Sections (a) to (c) of FIG. 52, each of cells represents an area containing a plurality of pixels, for example. In each Section (a) to (c) of FIG. 52, the blank cells are areas on which no exposure or readout is to be performed. Furthermore, in FIG. 52, the exposure time is expressed in three levels by the shade of the cell, and the cell with the shorter exposure time is filled in darker color. Hereinafter, the blank cells indicate areas on which no exposure is to be performed. Furthermore, the filled cells will be described as areas where exposure is performed with various exposure times, specifically, short time, medium time, and long time, in accordance with the shades of the cells. The medium time is longer than the short time and shorter than the long time. In each of the Sections (a) to (c) of FIG. 52, for example, a set of filled cells will form a unit of readout.

Specifically, a frame 210a illustrated in Section (a) is an example in which the areas where the exposure time is set to the short time are present in high density in the central portion and decreases the density toward the peripheral portion (referred to as a first pattern). Furthermore, a frame 210b illustrated in the Section (b) is an example in which the areas in which the exposure time is set to the medium time are present substantially uniformly over the entire frame 210b (referred to as a second pattern). Furthermore, a frame 210c illustrated in Section (c) is an example in which the areas where the exposure time is set to the long time are present with high density in the peripheral portion and decreases the density toward the central portion (referred to as a third pattern).

The readout determiner 123 of the recognition processing unit 12 selects a pattern according to the readout information passed from the feature data storage controller 121 and the recognition information (not illustrated) passed from the recognition process execution unit 124, from among the first to third pattern described above. Not limited to this, the readout determiner 123 may select one pattern from among the first to third patterns in accordance with external control information such as user operation.

The readout determiner 123 generates readout region information including the exposure time of the selected pattern and the position of each of areas, and passes the generated readout region information to the sensor controller 11. In the sensor controller 11, the readout unit 110 reads out the pixel data from the sensor unit 10 in accordance with the received readout region information. It is preferable that the readout in the above-described first to third patterns is applied to the global shutter method.

Here, there is a conceivable case where the imaging apparatus 1 according to the ninth modification of the second embodiment is installed for in-vehicle application so as to image the front view. In this case, particularly at night or the like, the headlights cause a spatial difference in brightness in a captured image. Specifically, it is considered that the luminance value of the captured image increases in the central portion and decreases toward the peripheral portion. Accordingly, when the headlight is turned on in a dark place, the first pattern (Section (a) in FIG. 52) will be selected.

Furthermore, the areas having different exposure times can be arranged in a pattern different from the above-described first to third patterns. Examples of assumable patterns include: a fourth pattern in which the area where the exposure time is set to the long time has high density in the central portion and decreases the density toward the peripheral portion; and a fifth pattern in which the area where the exposure time is set to the short time has high density in the peripheral portion and decreases the density toward the central portion.

In the above-described in-vehicle example, when the vehicle on which the imaging apparatus 1 is mounted is moving forward, the movement of the vehicle causes blurring of the captured image. The level of the blur is small in the central portion of the image and increases toward the periphery. Therefore, in a case where it is intended to execute the recognition process for the central portion of the image, it is conceivable to select the fourth pattern, and in a case where it is intended to execute the recognition process for the peripheral portion of the image, it is conceivable to select the fifth pattern.

In this manner, by setting the length of the exposure time to be spatially different in density within the frame, the recognition processing unit 12 can recognize bright objects and dark objects in the recognition process in one frame, individually. In addition, since the density of the exposed area is changed in accordance with the position in the frame, it is possible to detect the spatial appearance frequency of bright objects and dark objects.

[5-10. Tenth Modification of the Second Embodiment]

Next, a tenth modification of the second embodiment will be described. The tenth modification of the second embodiment is an example of determining a readout region for performing the readout in the unit of readout next, based on the feature data generated by the feature data storage controller 121.

FIG. 53 is a functional block diagram illustrating an example of functions according to the tenth modification of the second embodiment. In Section (a) of FIG. 53, a feature data storage controller 121a integrates the feature data passed from the feature data calculation unit 120 and the feature data stored in the feature data storage unit 122, and passes the integrated feature data to a readout determiner 123b, together with the readout information. A readout determiner 123b generates readout region information and information indicating exposure time and analog gain, based on the feature data and the readout information passed from the feature data storage controller 121a. Not limited to this, the readout determiner 123b may generate at least one of the exposure time or analog gain. The readout determiner 123a/ the readout determiner 123b passes the generated readout region information, the exposure time, and the analog gain to the readout unit 110.

Section (b) of FIG. 53 is a functional block diagram of an example illustrating in more detail the function of the readout determiner 123b according to the tenth modification of the second embodiment. In Section (b) of FIG. 53, the readout determiner 123b includes a readout region determiner 1230, an exposure time determiner 1231, and an AG amount determiner 1232.

The readout information and the feature data passed from the feature data storage controller 121 to the readout determiner 123b are input to the readout region determiner 1230, the exposure time determiner 1231, and the AG amount determiner 1232, individually. The readout region determiner 1230 generates and outputs readout region information (for example, a line number) indicating a readout region to be read out next, based on the input readout information and the feature data. The exposure time determiner 1231 generates and outputs information indicating the exposure time in the next imaging based on the input feature data. Furthermore, the AG amount determiner 1232 generates and outputs information indicating the analog gain in the next imaging based on the input feature data.

Figure 54:
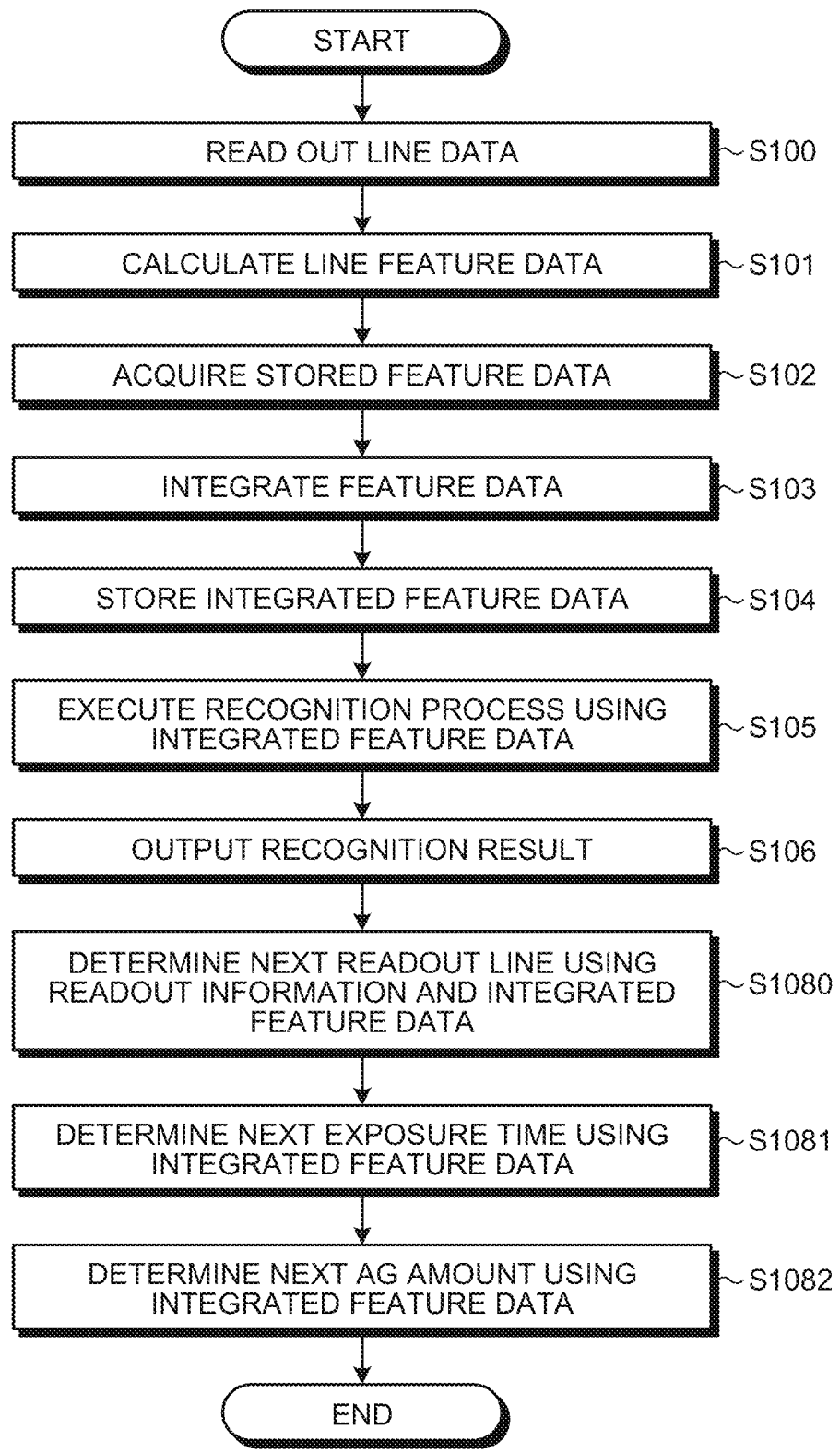
FIG. 54 is a flowchart of an example illustrating a process according to the tenth modification of the second embodiment.

FIG. 54 is a flowchart of an example illustrating a process according to the tenth modification of the second embodiment. The process according to the flowchart of FIG. 54 is a process corresponding to the readout of pixel data in the unit of readout (for example, one line) from a frame, for example. Here, it is assumed that the unit of readout is a line and that the readout region information is a line number indicating a line as a target of readout.

In the flowchart of FIG. 54, the processes of Steps S100 to S106 are equivalent to the processes of Steps S100 to S107 in the flowchart of FIG. 28 described in the second embodiment.

That is, in Step S100, the recognition processing unit 12 performs readout of line data from the line indicated by the readout line of the frame. In the next Step S101, the feature data calculation unit 120 calculates the feature data of the line based on the line data passed from the readout unit 110. In the next Step S102, the feature data calculation unit 120 acquires the feature data stored in the feature data storage unit 122 from the feature data storage controller 121. In the next Step S103, the feature data calculation unit 120 integrates the feature data calculated in Step S101 and the feature data acquired from the feature data storage controller 121 in Step S102, and passes the integrated data to the feature data storage controller 121.

In the next Step S104, the feature data storage controller 121 stores the integrated feature data in the feature data storage unit 122. In the next Step S105, the recognition process execution unit 124 executes the recognition process using the integrated feature data. In the next Step S106, the recognition process execution unit 124 outputs the recognition result of the recognition process of Step S105.

In the next Step S1080, the readout region determiner 1230 in the readout determiner 123b determines the readout line on which the next readout is to be performed, by using the readout information passed from the feature data storage controller 121 and the feature data obtained by integrating the feature data calculated in Step S101 with the feature data acquired from the feature data storage controller 121 in Step S102. In the next Step S1081, the exposure time determiner 1231 of the readout determiner 123b determines the exposure time in the next readout based on the integrated feature data passed from the feature data storage controller 121. In the next Step S1082, the AG amount determiner 1232 of the readout determiner 123b determines the analog gain in the next readout based on the integrated feature data passed from the feature data storage controller 121.

The exposure time and analog gain respectively determined in Step S1081 and Step S1082 are applied to the readout line determined in Step S1080 so as to execute the process from Step S100 again.

The order of Steps S1080 to S1082 is not limited to the above-described order. Furthermore, one of the processes of Step S1081 or Step S1082 can be omitted.

(First Process)

Figure 55:
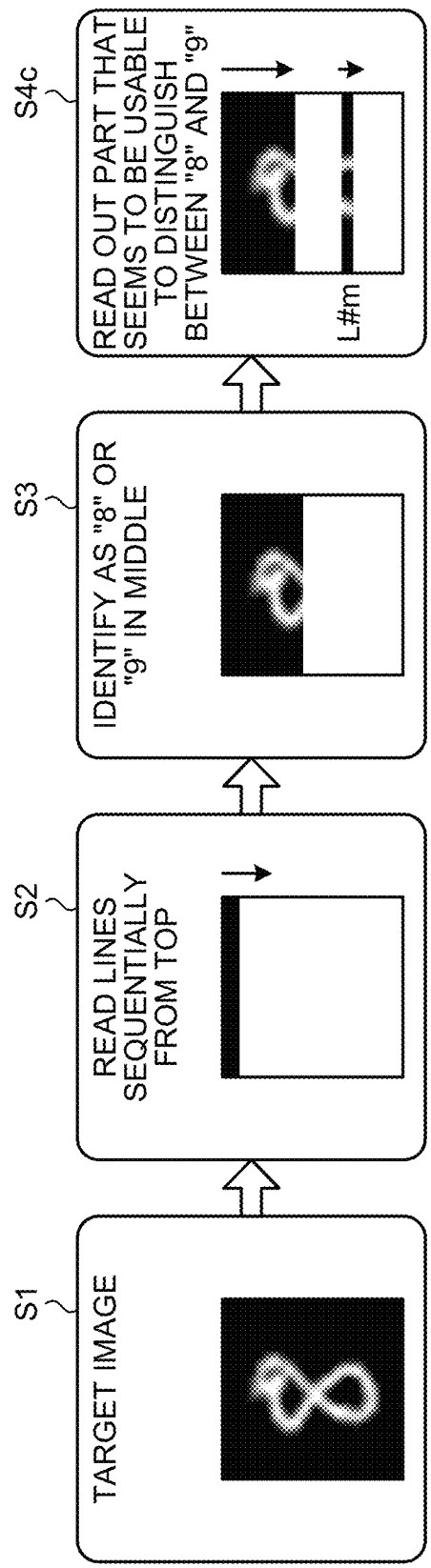
FIG. 55 is a schematic diagram illustrating a first process according to the tenth modification of the second embodiment.

First, a first process according to the tenth modification of the second embodiment will be described. FIG. 55 is a schematic diagram illustrating the first process according to the tenth modification of the second embodiment. The process illustrated in FIG. 55 corresponds to the process of Steps S1 to S4c of FIG. 16 described above. Furthermore, it is assumed here that imaging is performed by using a line as the unit of readout and by using the rolling shutter method.

In FIG. 55, in Step S1, thee imaging apparatus 1 (refer to FIG. 1) starts imaging of a target image as a recognition target (handwritten number "8"). Here, as preconditions, the memory 13 preliminarily stores a learning model trained to be able to identify numbers by predetermined training data, as a program, and the recognition processing unit 12 reads out this program from the memory 13 and executes the program, thereby enabling identification of the numbers included in the image.

When the imaging is started, in Step S2, the sensor controller 11 reads out a frame sequentially in the order of lines from the upper end side to the lower end side in accordance with the readout region information passed from the recognition processing unit 12.

When the line is read out up to a certain position, the recognition processing unit 12 identifies the number "8" or "9" from the image of the read out lines (Step S3). Based on the integrated feature data passed from the feature data storage controller 121, the readout determiner 123b of the recognition processing unit 12 generates readout region information designating a line L #m from which it is predictable that the object identified in Step S3 is which of the numbers "8" or "9", and passes the generated information to the readout unit 110. Subsequently, the recognition processing unit 12 executes a recognition process based on the pixel data obtained by readout of the line L #m by the readout unit 110 (Step S4c).

Here, in a case where the object is identified in Step S4c described above, the recognition processing unit 12 can end the recognition process. This makes it possible to shorten the recognition process and save power.

(Second Process)

Next, a second process according to the tenth modification of the second embodiment will be described. FIG. 56 is a schematic diagram illustrating the second process according to the tenth modification of the second embodiment. The process illustrated in FIG. 56 corresponds to the process illustrated in FIG. 55 described above. In this second process, readout of the frame in line units is executed while thinning the lines.

In FIG. 56, in Step S10, the imaging apparatus 1 starts imaging of a target image as a recognition target (handwritten number "8"). Here, as preconditions, similar to the above, the memory 13 preliminarily stores a learning model trained to be able to identify numbers at the readout performed in the unit of line, by predetermined training data, as a program, and the recognition processing unit 12 reads this program from the memory 13 and executes the program, thereby enabling identification of the numbers included in the image.

When the imaging is started, in Step S11, the sensor controller 11 reads out a frame in the units of line from the upper end side to the lower end side while thinning the lines, in accordance with the readout region information passed from the recognition processing unit 12. In the example of FIG. 56, the sensor controller 11 first reads out the line L #1 at the upper end of the frame, and then reads out the line L #p obtained by thinning a predetermined number of lines, in accordance with the readout region information. The recognition processing unit 12 executes the recognition process for each of times of readout, for each of pieces of line data of lines L #1 and L #p.

Here, as a result of performing further readout in units of line with thinning and executing the recognition process by the recognition processing unit 12 on the line data obtained by the readout of the line L #q, the numbers "8" or "0" are recognized (Step S12). Based on the integrated feature data passed from the feature data storage controller 121, the readout determiner 123b generates readout region information designating a line L #r from which it is predictable that the object identified in Step S12 is which of the numbers "8" or "0", and passes the generated information to the readout unit 110. At this time, the position of the line L #r may be the upper end side of the frame or the lower end side of the frame with respect to the line L #q.

The recognition processing unit 12 executes a recognition process based on the pixel data obtained by readout of the line L #r by the readout unit 110 (Step S13).

Since this second process executes the line readout of the frame while thinning the lines, it is possible to realize further shortening of the recognition process and power saving.

(Third Process)

Next, a third process according to the tenth modification of the second embodiment will be described. In the third process according to the tenth modification of the second embodiment, the exposure time and the analog gain are adaptively set while performing readout in the unit of readout.

FIGS. 57A and 57B, 58A and 58B, and 59A and 59B are schematic diagrams illustrating the third process according to the tenth modification of the second embodiment. The following is a case where the exposure time is adaptively set among the exposure time and the analog gain.

Figure 57A:
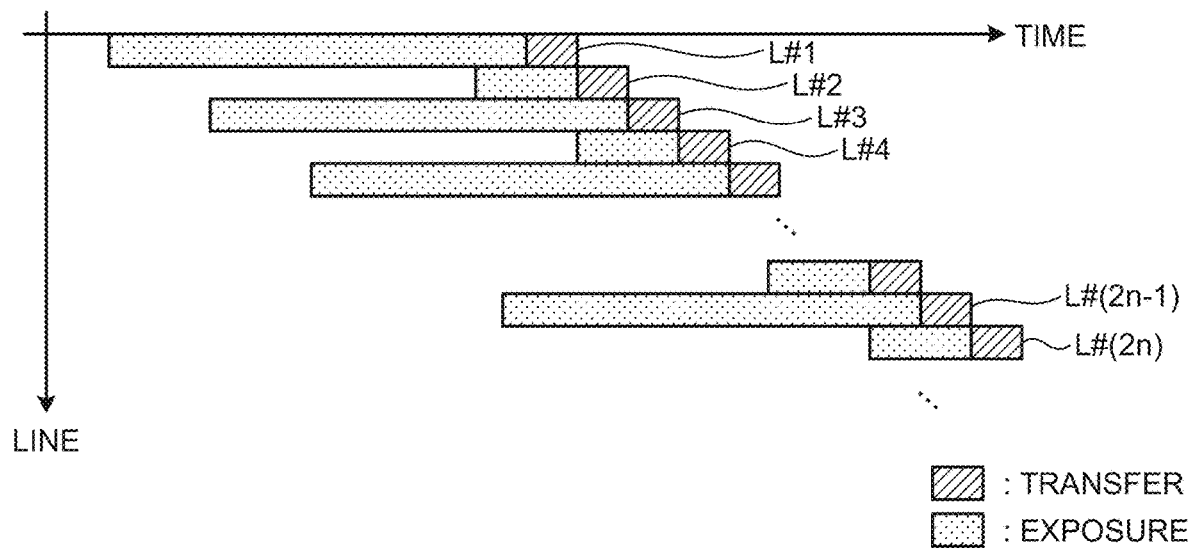
FIG. 57A is a schematic diagram illustrating a third process according to the tenth modification of the second embodiment.
Figure 57B:
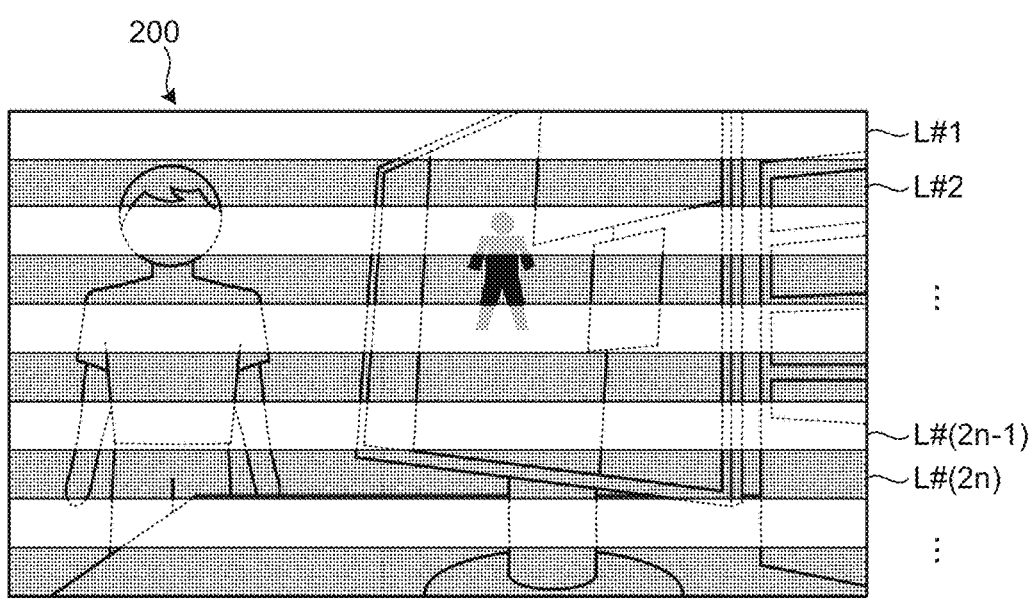
FIG. 57B is a schematic diagram illustrating the third process according to the tenth modification of the second embodiment.

FIGS. 57A and 57B are diagrams corresponding to FIGS. 51A and 51B described above, and illustrate an example in the case where the exposure time is not adaptively set. Compared to the exposure pattern illustrated in FIG. 51A described above, the exposure pattern illustrated in FIG. 57A has a larger difference in time between the first exposure time and the second exposure time shorter than the first exposure time. Similar to the example of FIG. 51A, the exposure pattern in FIG. 57A is a pattern in which the first exposure time and the second exposure time are alternately applied to the lines, such as line L #1, L #2, and so on.

FIG. 57B is a view illustrating an example of a captured image 200a when imaging is performed in accordance with the exposure pattern of FIG. 57A. In this example, the first exposure time is set to the lines L #1, L #3, . . . , L #(2n−1) with odd line numbers so as to cause overexposure on these lines, while the second exposure time is set to the lines L #2, L #4, . . . , L #2n with even line numbers so as to cause underexposure on these lines.

Figure 58A:
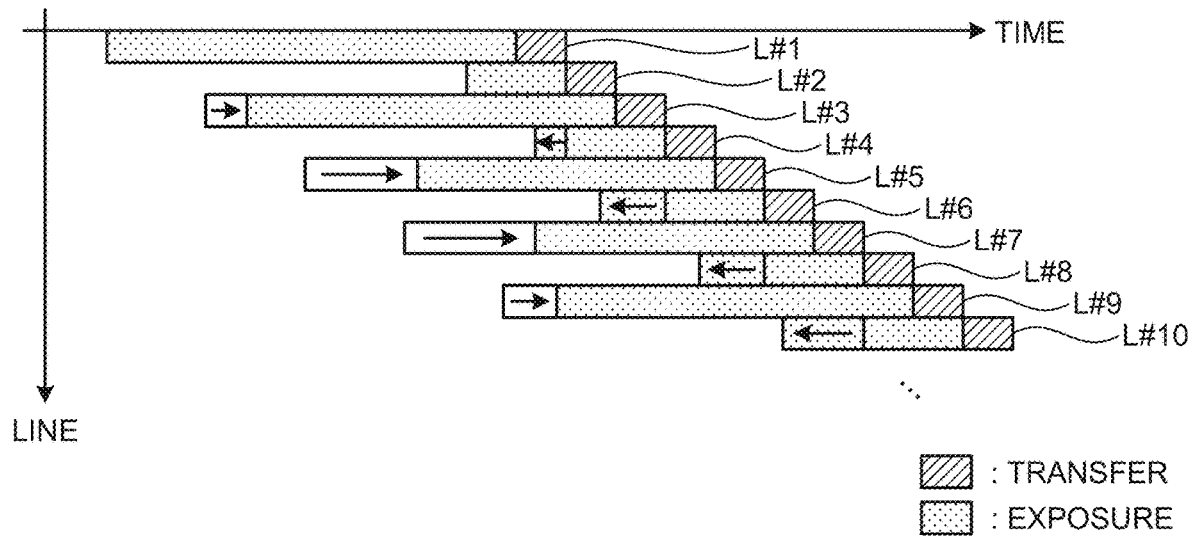
FIG. 58A is a schematic diagram illustrating the third process according to the tenth modification of the second embodiment.
Figure 58B:
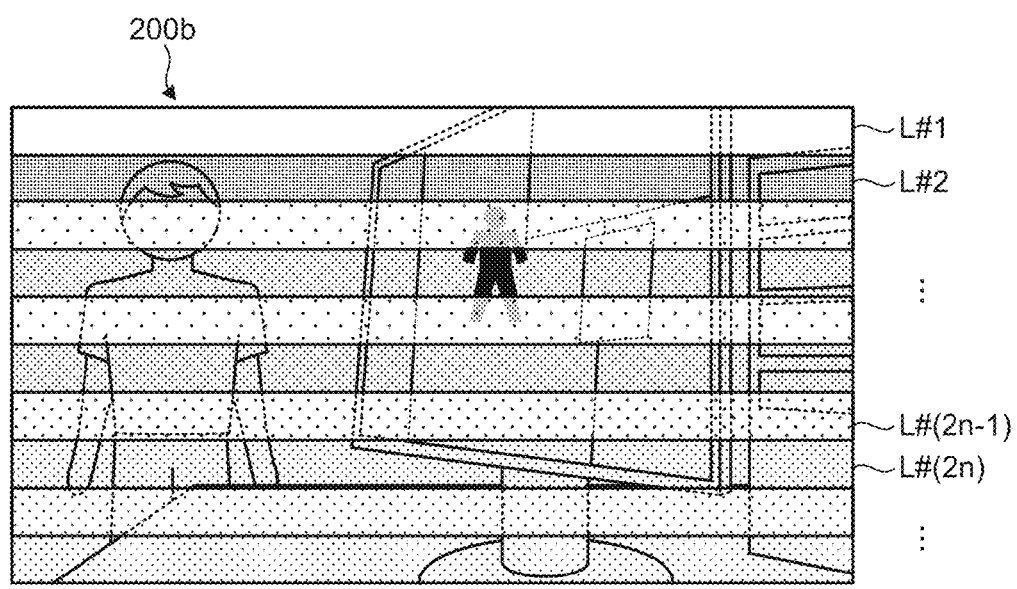
FIG. 58B is a schematic diagram illustrating the third process according to the tenth modification of the second embodiment.

FIGS. 58A and 58B illustrate a case where imaging is performed in accordance with the exposure pattern of FIG. 57A and exposure time for each of lines L #2, L #3, . . . , L #2n is set based on the integrated feature data in accordance with the pixel data read out from each of lines L #1, L #2, . . . , L #(2n−1).

After execution of the readout from line L #1, the readout determiner 123b sets the exposure time (exposure time (L #3)) for the line L #3 being the next line with odd line number based on the integrated feature data obtained by the feature data storage controller 121 by integrating the feature data calculated by the feature data calculation unit 120 based on the pixel data read out from the line L #1 with the feature data stored in the feature data storage unit 122. In the example of FIG. 58A, the exposure time (L #3) is set shorter than the exposure time for the line L #1. The readout determiner 123b holds this exposure time (L #3). The process of setting the exposure time by the readout determiner 123b is executed during the transfer period of the next line (in this case, line L #2), for example.

Next, readout is performed starting from the line L #2 having an even line number. The readout determiner 123b sets the exposure time (exposure time (L #4)) for the line L #4 being the next line with even line number based on the integrated feature data obtained by the feature data storage controller 121 by integrating the feature data calculated by the feature data calculation unit 120 based on the pixel data read out from the line L #2 with the feature data stored in the feature data storage unit 122. In the example of FIG. 58A, the exposure time (L #4) is set shorter than the exposure time for the line L #2.

When the readout and the recognition process for the line L #2 is completed, the readout determiner 123b passes the exposure time (L #3) held and the readout region information for instructing the readout of the next line L #3, to the readout unit 110.

Similarly, regarding the readout of the line L #3, the readout determiner 123b sets the exposure time (L #5) of the next line L #5 with odd line number based on the pixel data read out from the line L #3. In the example of FIG. 58A, the exposure time (L #5) is set shorter than the exposure time of line L #3. The readout determiner 123b holds this exposure time (L #5). Next, readout from line L #4 being the next line with even line number is performed, and the readout determiner 123b sets the exposure time (L #6) for the next line with even line number L #6 based on the pixel data read out from the line L #4. In the example of FIG. 58A, the exposure time (L #6) is set shorter than the exposure time of line L #4. The readout determiner 123b holds this exposure time (L #6).

In this manner, the line readout and the exposure setting are alternately repeated between the line with odd line number and the line with even line number. With this procedure, as illustrated in FIG. 58B, the exposure time will be appropriately set for each of lines L #1, L #3, . . . , L #(2n−1) with odd line numbers that undergo overexposure setting and each of lines L #2, L #4, . . . , L #2n with even line numbers that undergo underexposure setting.

Here, the readout determiner 123b sets the exposure time by using the feature data obtained based on the pixel information read out from the line. Therefore, the readout determiner 123b can set an exposure time suitable for the recognition process execution unit 124 to execute the recognition process.

Comparing FIG. 57B and FIG. 58B, in the example of FIG. 58B, the luminance is suppressed in the lines with odd line numbers L #1, L #3, and so on, with overexposure setting, while the luminance is increased in the lines with even line numbers L #2, L #4, and so on, with underexposure setting. Therefore, in the example of FIG. 58B, it is expected, in each of the lines with odd line numbers and the lines with even line numbers, that the recognition process is executed with higher accuracy compared to the example of FIG. 57B Note that by using the exposure time set for the lines with odd line numbers and the lines with even line numbers at the lower end of the frame, it is possible to set the exposure time for each of the lines with odd line numbers and the lines with even line numbers.

Although the entire line of the frame is read out in the example of FIGS. 58A and 58B described above, the present disclosure is not limited to this example. For example, it is also possible to perform readout of the lines halfway in the frame and possible to return the readout position in accordance with the result of the readout.

This will be described with reference to FIGS. 59A and 59B. Similarly to the example of FIGS. 58A and 58B described above, FIGS. 59A and 59B illustrate a case where imaging is performed in accordance with the exposure pattern of FIG. 57A and exposure time for each of lines L #2, L #3, . . . , L #2n is set based on the integrated feature data in accordance with the pixel data read out from each of lines L #1, L #2, . . . , L #(2n−1).

Figure 59A:
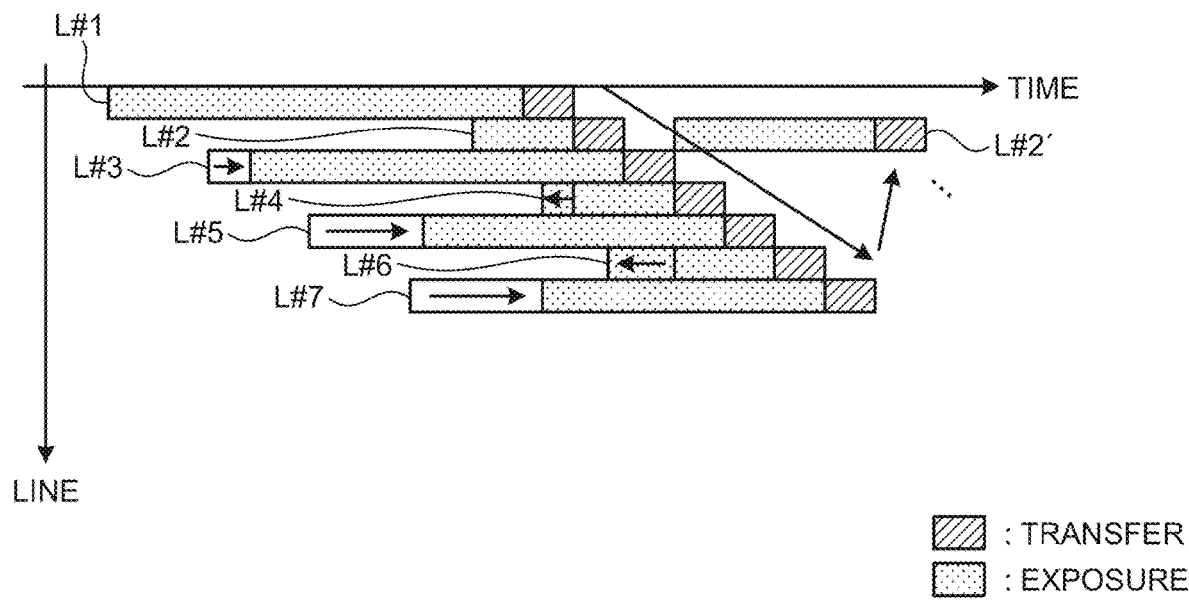
FIG. 59A is a schematic diagram illustrating the third process according to the tenth modification of the second embodiment.

In the example of FIG. 59A, it is assumed that a predetermined object (being a person) is recognized by the recognition process performed by the recognition process execution unit 124 based on the pixel data read out from the line L #2, for example. For example, the recognition process execution unit 124 passes the recognition information indicating that the person has been recognized to the readout determiner 123b. The readout determiner 123b sets the exposure time of a line L #2' corresponding to the line L #2 in the next frame in accordance with the recognition information. In the example of FIG. 59A, the readout determiner 123b sets the exposure time for the line L #2' longer than the exposure time for the line L #2.

After setting the exposure time for the line L #2', the readout determiner 123b passes the readout region information indicating the line L #2' and the exposure time set for the line L #2' to the readout unit 110. In accordance with the readout region information and the exposure time, the readout unit 110 starts exposure of the line L #2' after completion of the transfer process for the line L #3, for example.

Regarding the line L #3 and subsequent lines, the readout determiner 123b sets the exposure time individually for lines with odd line numbers L #3, L #5, and so on, and for lines with even line numbers L #4 and L #6, similarly to FIG. 58A. Here, in the example of FIG. 59A, immediately after the end of the transfer process of the line L #7, the exposure of the line L #2' ends and the transfer of the pixel data read out from the line L #2' starts.

Figure 59B:
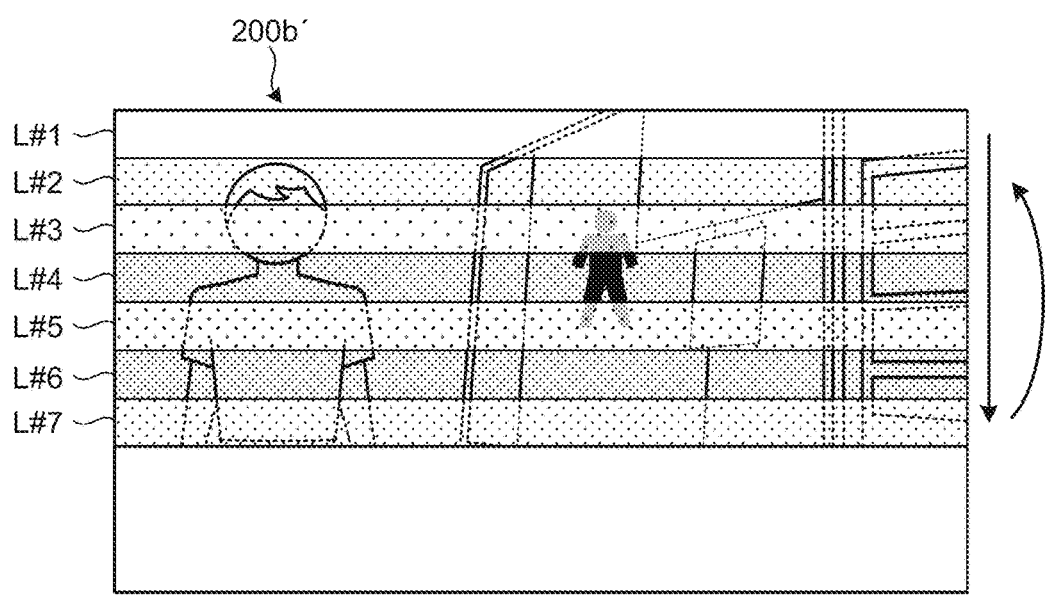
FIG. 59B is a schematic diagram illustrating the third process according to the tenth modification of the second embodiment.

As illustrated in FIG. 59B, the line L #2' has a higher luminance compared with the line L #2 illustrated in FIG. 58B, leading to the high possibility of enabling recognition with higher accuracy.

Note that the readout determiner 123b performs the exposure time setting and readout for the lines subsequent to the line L #2', namely, individual lines L #3', L #4', and so on included in the same frame as the line L #2' similarly to the process as illustrated in FIGS. 58A and 58B.

The exposure time of the line L #2' is set in accordance with the recognition information based on the pixel data read out from the line L #2 of the previous frame. Therefore, the recognition process execution unit 124 can execute the recognition process based on the line L #2' with higher accuracy compared with the recognition process based on the line L #2.

Note that although the third process in the tenth modification of the second embodiment is an example in which the exposure time of the line is set based on the readout result of the line, the present disclosure is not limited to this example, and the analog gain of the line may be set.

Here, increasing the exposure time will make it possible to achieve imaging with a high luminance value and reduction of noise. On the other hand, increasing the exposure time might increase blur, particularly in dynamic scenes, for example. In contrast, adjusting the analog gain would not cause a change in blur, but increasing the analog gain might increase noise.

In view of these, it is preferable to select whether to set the exposure time or the analog gain in accordance with the purpose of the recognition process and the imaging target. For example, in a case where the imaging target is a dynamic scene, the analog gain is preferably increased to suppress blurring, while in a case where the imaging target is a static scene, the exposure time is preferably increased to capture a bright image with suppressed noise.

FIG. 60 is a schematic diagram illustrating in more detail an example of processes in the recognition processing unit 12 according to the tenth modification of the second embodiment. In the configuration illustrated in FIG. 60, a readout determiner 123b is added to the configuration illustrated in FIG. 22 described above. The readout determiner 123b receives an input of feature data 1212 related to the internal state updated by the internal state update process 1211.

The process in the readout determiner 123b includes a next line determination process 1233, a next exposure determination process 1234, and a next AG determination process 1235. The next line determination process 1233, the next exposure determination process 1234, and the next AG determination process 1235 are processes to be executed by the readout region determiner 1230, the exposure time determiner 1231, and the AG amount determiner, 1232 respectively, which are described using Section (b) of FIG. 53.

The next line determination process 1233, the next exposure determination process 1234, and the next AG determination process 1235 are each executed based on the parameters learned in advance. Parameter learning is performed using training data based on an assumed readout pattern and recognition target, for example. In the above example, an example of the assumed readout pattern can be a pattern that alternately reads out overexposed lines and underexposed lines.

Note that, in FIGS. 57A and 57B, FIGS. 58A and 58B, and FIGS. 59A and 59B described above, the unit of readout is assumed to be a line, but the present disclosure is not limited to this example. That is, another unit of readout such as a plurality of sequentially adjacent lines may be applied to the tenth modification of the second embodiment.

The imaging apparatus 1 according to the second embodiment and their individual modifications described above performs a recognition process by the recognition processing unit 12 for each of times of readout based on the unit of readout. However, the present disclosure is not limited to this example. For example, it is allowable to perform both the recognition process for each of units of readout and the normal recognition process, that is, readout for the entire frame, and allowable to enable switching between the recognition process for the unit of readout and the recognition process based on the pixel data regarding the pixels read out from the entire frame. That is, the normal recognition process is executed based on the pixels of the entire frame, making it possible to obtain a recognition result with higher accuracy as compared with the recognition process for the unit of readout.

For example, it is possible to perform the normal recognition process at certain time intervals with respect to the recognition process for each of units of readout. Furthermore, the normal recognition process can be performed, in emergency, at the recognition process for each of units of readout so as to improve the stability of recognition. Furthermore, in a case where the recognition process for each of units of readout is switched to the normal recognition process, since the normal recognition process has lower immediacy than the recognition process for each of units of readout. Accordingly, it is allowable to switch the clock for device operations to a faster clock in the normal recognition process. Furthermore, it is allowable to switch to the normal recognition process when the reliability of the recognition process for each of units of readout is low, and it is allowable to return to the recognition process for each of units of readout when the reliability of the recognition process becomes high.

6. THIRD EMBODIMENT

Next, a third embodiment of the present disclosure will be described. The third embodiment is an example of adaptively setting parameters at the time of readout of a frame. Examples of the parameters at the time of readout of a frame include the unit of readout, the readout order in the frame based on the unit of readout, the readout region, the exposure time, and the analog gain. Since the function described with reference to FIG. 21 can be applied to the function of the imaging apparatus 1 according to the third embodiment as a whole, the description of the overall configuration will be omitted.

Figure 61:
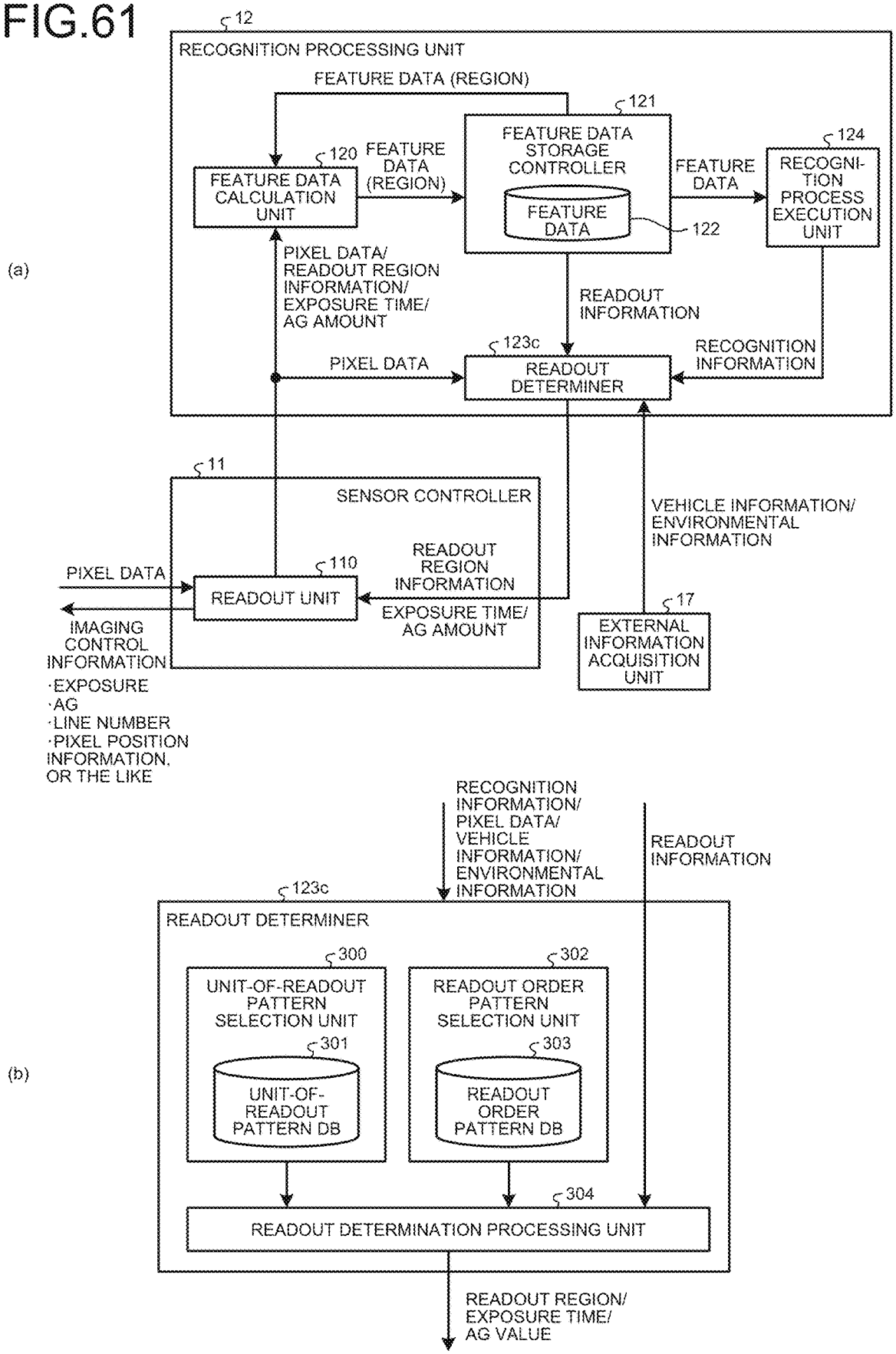
FIG. 61 is a functional block diagram of an example illustrating functions according to a third embodiment.

FIG. 61 is a functional block diagram of an example illustrating functions according to the third embodiment. Since the third embodiment mainly describes the recognition process performed by the recognition processing unit 12, the configuration illustrated in Section (a) of FIG. 61 omits illustration of the visual recognition processing unit 14, the output controller 15, the trigger generator 16, and the readout controller 111 of the sensor controller 11, which are illustrated in the configuration of FIG. 21 above.

On the other hand, in the configuration illustrated in Section (a) of FIG. 61, an external information acquisition unit 17 is added to the configuration of FIG. 21, and the pixel data is passed from the readout unit 110 to a readout determiner 123c. Furthermore, the readout determiner 123c receives the recognition information from the recognition process execution unit 124.

Furthermore, the external information acquisition unit 17 acquires external information generated outside the imaging apparatus 1, and passes the acquired external information to the readout determiner 123c.

Specifically, the external information acquisition unit 17 can use an interface that transmits and receives a signal of a predetermined format. In a case where the imaging apparatus 1 is used as for in-vehicle application, for example, vehicle information is applicable as the external information. The vehicle information is, for example, information acquired from the vehicle system, such as steering information and speed information. Environmental information is information indicating the surrounding environment of the imaging apparatus 1, and includes, for example, the brightness of the surroundings. Hereinafter, unless otherwise specified, the description will be given on condition that the imaging apparatus 1 is used as an in-vehicle apparatus, and the external information is vehicle information acquired from the vehicle on which the imaging apparatus 1 is mounted.

Section (b) of FIG. 61 is a functional block diagram of an example illustrating in more detail the functions of the readout determiner 123c according to the third embodiment. In Section (b) of FIG. 61, the readout determiner 123c includes a unit-of-readout pattern selection unit 300, a readout order pattern selection unit 302, and a readout determination processing unit 304. The unit-of-readout pattern selection unit 300 includes a unit-of-readout pattern DB (database) 301 in which a plurality of different readout patterns is stored in advance. Furthermore, the readout order pattern selection unit 302 includes a readout order pattern DB 303 in which a plurality of different readout order patterns is stored in advance.

Based on one or more of the pieces of passed recognition information, pixel data, vehicle information, and environmental information, the readout determiner 123c sets priority for individual unit-of-readout order patterns stored in the unit-of-readout pattern DB 301 and for individual unit-of-readout order patterns stored in the unit-of-readout pattern DB 303.

The unit-of-readout pattern selection unit 300 selects the unit-of-readout pattern set with the highest priority among the unit-of-readout patterns stored in the unit-of-readout pattern DB 301. The unit-of-readout pattern selection unit 300 passes the unit-of-readout pattern selected from the unit-of-readout pattern DB 301 to the readout determination processing unit 304. Similarly, the readout order pattern selection unit 302 selects the readout order pattern set with the highest priority among the readout order patterns stored in the readout order pattern DB 303. The readout order pattern selection unit 302 passes the readout order pattern selected from the readout order pattern DB 303 to the readout determination processing unit 304.

Based on the readout information passed from the feature data storage controller 121, the unit-of-readout pattern passed from the unit-of-readout pattern selection unit 300, and the readout order pattern passed from the readout order pattern selection unit 302, the readout determination processing unit 304 determines a readout region to be read out next from the frame and passes readout region information indicating the determined readout region to the readout unit 110. Furthermore, based on the pixel data and one or more pieces of information out of the recognition information, vehicle information, and environmental information passed to the readout determiner 123c, the readout determination processing unit 304 generates the exposure time and analog gain for the use at next execution of readout from the frame, and passes the generated pieces of information to the readout unit 110.

(6-0-1. Method of Setting Unit-of-Readout Patterns and Readout Order Patterns)

An example of a method of setting unit-of-readout patterns and readout order patterns according to the third embodiment with the configurations illustrated in Sections (a) and (b) of FIG. 61 will be described.

(6-0-1-1. Example of Unit-of-Readout Patterns and Readout Order Patterns)

Figure 62:
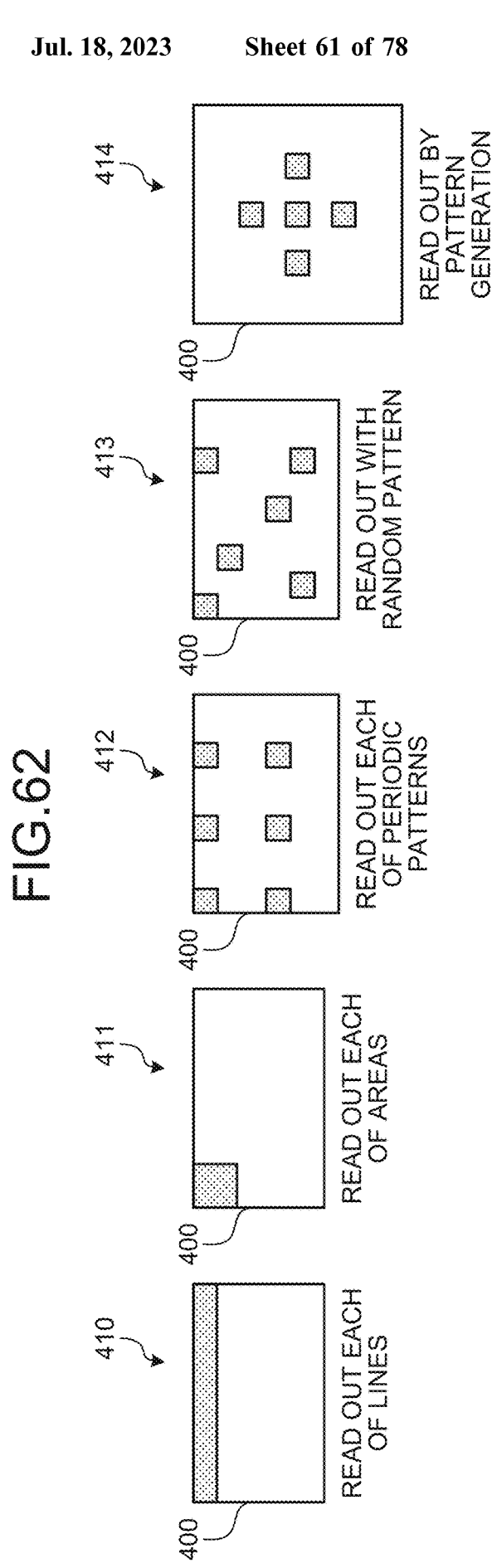
FIG. 62 is a schematic diagram illustrating an example of unit-of-readout patterns applicable to the third embodiment.

Here, an example of unit-of-readout patterns and readout order patterns applicable to the third embodiment will be described. FIG. 62 is a schematic diagram illustrating an example of unit-of-readout patterns applicable to the third embodiment. The example of FIG. 62 illustrates five unit-of-readout patterns 410, 411, 412, 413, and 414.

The unit-of-readout pattern 410 corresponds to FIG. 24 described above, and is a unit-of-readout pattern in which a line is defined as a unit of readout and readout is performed for each of lines in a frame 400. The unit-of-readout pattern 411 is a readout pattern corresponding to FIG. 33 described above and in which an area of a predetermined size is defined as a unit of readout in the frame 400, and readout is performed for each of areas in the frame 400.

The unit-of-readout pattern 412 is a unit-of-readout pattern corresponding to FIG. 37 described above and in which a pixel set including a plurality of pixels including non-adjacent pixels and periodically arranged is defined as a unit of readout, and readout is performed for each of the plurality of pixels in the frame 400. The unit-of-readout pattern 413 is a unit-of-readout pattern corresponding to FIG. 42 described above and in which a plurality of pixels discretely and aperiodically arranged (in random patterns) is defined as unit of readout, and readout is performed while updating the random pattern in the frame 400. These unit-of-readout patterns 412 and 413 make it possible to sample pixels with higher uniformity from the frame 400.

Furthermore, the unit-of-readout pattern 414 is a unit-of-readout pattern corresponding to FIG. 43 described above and in which a pattern is adaptively generated based on recognition information.

Each unit-of-readout pattern 410 to 414 described with reference to FIG. 62 is stored in advance in the unit-of-readout pattern DB 301 illustrated in Section (b) of FIG. 61.

The unit of readout applicable as the unit-of-readout pattern according to the third embodiment is not limited to the example illustrated in FIG. 62. For example, individual units of readout described in the second embodiment and its modification is applicable as a unit-of-readout pattern according to the third embodiment.

Figure 63:
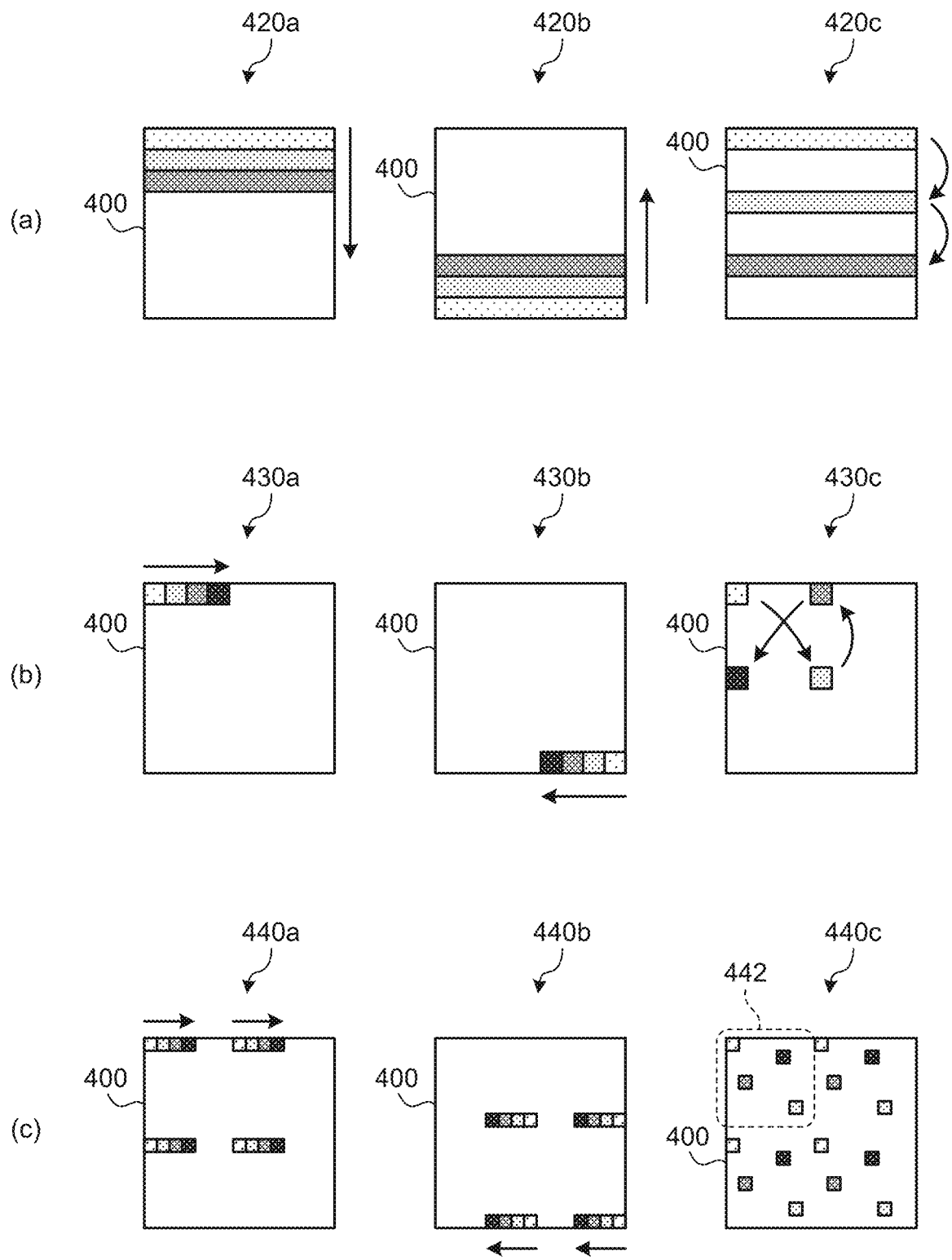
FIG. 63 is a schematic diagram illustrating an example of a readout order pattern applicable to the third embodiment.

FIG. 63 is a schematic diagram illustrating an example of a readout order pattern applicable to the third embodiment. Section (a) of FIG. 63 illustrates an example of a readout order pattern in which the unit of readout is a line. Section (b) illustrates an example of the readout order pattern in which the unit of readout is an area. Section (c) illustrates an example of a readout order pattern in which the unit of readout is a pixel set described above.

Furthermore, the readout order patterns 420a, 430a, and 440a on the left side respectively in Sections (a), (b), and (c) of FIG. 63 illustrate examples of readout order patterns in which readout is sequentially performed in the order of lines or pixels.

Here, the readout order pattern 420a of the Section (a) is an example of readout in the order of lines order from the upper end side to the lower end side of the frame 400. The readout order patterns 430a and 440a in Sections (b) and (c) are examples in which readout is performed sequentially from the upper left corner of the frame 400 for each of areas or pixels in the line direction, and the readout in the line direction is repeated in the vertical direction of the frame 400. These readout order patterns 420a, 430a, and 440a are referred to as forward readout order patterns.

In contrast, the readout order pattern 420b of Section (a) is an example of readout in the order of lines from the lower end side to the upper end side of the frame 400. The readout order patterns 430b and 440b in Sections (b) and (c) are examples in which readout is performed sequentially from the lower right corner of the frame 400 for each of areas or pixel set in the line direction, and the readout in the line direction is repeated in the vertical direction of the frame 400. These readout order patterns 420b, 430b, and 440b are referred to as backward readout order patterns.

Furthermore, the readout order pattern 420c of Section (a) is an example of readout from the upper end side to the lower end side of the frame 400 while thinning the lines. The readout order patterns 430c and 440c in Sections (b) and (c) are examples of individually performing readout on areas within frame 400 in discrete positions and readout order. In the readout order pattern 430c, in a case where the unit of readout is formed with four pixels, for example, each of the pixels is read out in the order indicated by the arrows in the figure. In the readout order pattern 440c, as illustrated in a region 442 in the figure, for example, readout of individual pixels are performed while the pixels that are the reference of the pattern are moved to discrete positions in an order different from the orders in the line direction or the column direction of the pixel positions.

The readout order patterns 420a to 420c, the readout order patterns 430a to 430c, and the readout order patterns 420a to 420c described with reference to FIG. 63 are stored in advance in the readout order pattern DB 303 illustrated in Section (b) of FIG. 61.

(6-0-1-2. Specific Example of Unit-of-Readout Pattern Setting Method)

An example of a unit-of-readout pattern setting method according to the third embodiment will be described in more detail with reference to FIGS. 62 and 63 described above.

First, a method of setting a unit-of-readout pattern based on image information (pixel data) will be described. The readout determiner 123c detects noise included in the pixel data passed from the readout unit 110. Here, with a configuration of arranging a plurality of pixels in a group, the resistance to noise is higher than in the case where pixels are arranged discretely as separate pixels. In view of this, in a case where the pixel data passed from the readout unit 110 contains noise of a predetermined level or more, the readout determiner 123c gives higher priority setting to the unit-of-readout pattern 410 or 411 out of the unit-of-readout patterns 410 to 414 stored in the unit-of-readout pattern DB 301, compared to the priority of the other unit-of-readout patterns.

Next, a method of setting the unit-of-readout pattern based on recognition information will be described. The first setting method is an example in which many objects of a predetermined size or more are recognized in the frame 400 based on the recognition information passed from the recognition process execution unit 124. In this case, the readout determiner 123c gives higher priority setting to the unit-of-readout pattern 412 or 413 among the unit-of-readout patterns 410 to 414 stored in the unit-of-readout pattern DB301, compared to the priority of the other unit-of-readout patterns. This is because sampling the entire frame 400 with higher uniformity makes it possible to improve the immediacy.

The second setting method is an example in which flicker is detected in an image obtained based on pixel data, for example. In this case, the readout determiner 123c gives higher priority setting to the unit-of-readout pattern 413 among the unit-of-readout patterns 410 to 414 stored in the unit-of-readout pattern DB301, compared to the priority of the other unit-of-readout patterns. This is because, in a case of flicker, sampling the entire frame 400 using a random pattern makes it possible to suppress the artifact caused by the flicker.

The third setting method is an example of a case of generation of a configuration of the unit of readout in which adaptively changing the configuration based on recognition information would enable the recognition process to be executed with higher efficiency. In this case, the readout determiner 123c gives higher priority setting to the unit-of-readout pattern 414 among the unit-of-readout patterns 410 to 414 stored in the unit-of-readout pattern DB301, compared to the priority of the other unit-of-readout patterns.

Next, a method of setting a unit-of-readout pattern based on external information acquired by the external information acquisition unit 17 will be described. The first setting method is an example in which the vehicle equipped with the imaging apparatus 1 turns in either the left or right direction based on external information. In this case, the readout determiner 123c gives a higher priority to the unit-of-readout pattern 410 or 411 among the unit-of-readout patterns 410 to 414 stored in the unit-of-readout pattern DB301, compared to the priority of the other unit-of-readout patterns.

Here, the first setting method assumes the setting in which the readout determiner 123c defines, for the unit-of-readout pattern 410, the column direction as the unit of readout among the matrix (row-column) directions in the pixel array unit 101, and performs readout sequentially in the order of columns in the line direction of the frame 400. Furthermore, the setting for the unit-of-readout pattern 411 would be such that readout is performed on the areas in the column direction and this will be repeated in the line direction.

In a case where the vehicle turns to the left, the readout determiner 123c performs setting, toward the readout determination processing unit 304, to execute the readout sequentially in the order of columns or readout of areas sequentially in the column direction, starting from the left end side of the frame 400. In an opposite case where the vehicle turns to the right, the readout determiner 123c performs setting, toward the readout determination processing unit 304, to execute the readout sequentially in the order of columns or readout of areas sequentially in the column direction, starting from the right end side of the frame 400.

Note that in a case where the vehicle is traveling straight, the readout determiner 123c can perform readout sequentially in the order of line as ordinary, or in the line direction of the area, and in a case where the vehicle turns left or right, the readout determiner 123c can perform, for example, initialization of the feature data stored in the feature data storage unit 122 so as to restart the readout process with the readout performed sequentially in the order columns or with the readout of areas performed sequentially in the column direction as described above.

The second setting method of the unit-of-readout pattern based on the external information is an example in which the vehicle equipped with the imaging apparatus 1 is traveling on the expressway based on the external information. In this case, the readout determiner 123c gives a higher priority to the unit-of-readout pattern 410 or 411 among the unit-of-readout patterns 410 to 414 stored in the unit-of-readout pattern DB301, compared to the priority of the other unit-of-readout patterns. When driving on an expressway, it is considered important to recognize an object being a small-sized existence in the distance. In view of this, performing readout sequentially from the upper end side of the frame 400 would make it possible to further improve the immediacy to the object being a small-sized existence in the distance.

(6-0-1-3. Specific Example of Readout Order Pattern Setting Method)

An example of a readout order pattern setting method according to the third embodiment will be described in more detail with reference to FIGS. 62 and 63 described above.

First, a method of setting a readout order pattern based on image information (pixel data) will be described. The readout determiner 123c detects noise included in the pixel data passed from the readout unit 110. Here, the smaller the change in the region as a recognition process target, the less the recognition process would be affected by noise, more facilitating the recognition process. In view of this, in a case where the pixel data passed from the readout unit 110 contains noise of a predetermined level or more, the readout determiner 123c gives higher priority setting to one of the readout order patterns 420a, 430a, or 440a, out of the readout order patterns 420a to 420c, 430a to 430c, and 440a to 440c stored in the readout order pattern DB 303, compared to the priority of the other readout order patterns. Not limited to this, the priority of any of the readout order patterns 420b, 430b, and 440b may be set higher than the priority of the other readout order patterns.

Note that which of the readout order patterns 420a, 430a, and 440a and the readout order patterns 420b, 430b, and 440b should be to set to the higher priority can be determined by, for example, which of the unit-of-readout patterns 410 to 414 has been set to the higher priority in the unit-of-readout pattern selection unit 300, or by from which of the upper end side or the lower end side of the frame 400 the readout has been started.

Next, a method of setting the readout order pattern based on the recognition information will be described. In a case where it is determined that many objects of a predetermined size or more have been recognized in the frame 400 based on the recognition information passed from the recognition process execution unit 124, the readout determiner 123c gives higher priority setting to any of the readout order patterns 420c, 430c, and 440c, among the readout order patterns 420a to 420c, 430a to 430c, and 440a to 440c stored in the readout order pattern DB 303, compared to the other readout order patterns. This is because sampling the entire frame 400 with higher uniformity, rather than sequentially reading out the frame 400, makes it possible to improve the immediacy.

Next, a method of setting a readout order pattern based on external information will be described. The first setting method is an example in which the vehicle equipped with the imaging apparatus 1 turns in either the left or right direction based on external information. In this case, the readout determiner 123c gives higher priority to one of the readout order patterns 420a, 430a, or 440a, out of the readout order patterns 420a to 420c, 430a to 430c, and 440a to 440c stored in the readout order pattern DB 303, compared to the priority of the other unit-of-readout patterns.

Here, the first setting method assumes the setting in which the readout determiner 123c defines, for the readout order pattern 420a, the column direction as the unit of readout among the matrix (row-column) directions in the pixel array unit 101, and performs readout sequentially in the order of columns in the line direction of the frame 400. Furthermore, the setting for the readout order pattern 430a would be such that readout is performed on the areas in the column direction and this will be repeated in the line direction. Furthermore, the setting for the readout order pattern 440a would be such that readout is performed on the pixel set in the column direction and this will be repeated in the line direction.

In a case where the vehicle turns to the left, the readout determiner 123c performs setting, toward the readout determination processing unit 304, to execute the readout sequentially in the order of columns or readout of areas sequentially in the column direction, starting from the left end side of the frame 400. In an opposite case where the vehicle turns to the right, the readout determiner 123c performs setting, toward the readout determination processing unit 304, to execute the readout sequentially in the order of columns or readout of areas sequentially in the column direction, starting from the right end side of the frame 400.

Note that in a case where the vehicle is traveling straight, the readout determiner 123c can perform readout sequentially in the order of line as ordinary, or in the line direction of the area, and in a case where the vehicle turns left or right, the readout determiner 123c can perform, for example, initialization of the feature data stored in the feature data storage unit 122 so as to restart the readout process with the readout performed sequentially in the order columns or with the readout of areas performed sequentially in the column direction as described above.

The second setting method of the readout order pattern based on the external information is an example in which the vehicle equipped with the imaging apparatus 1 is traveling on the expressway based on the external information. In this case, the readout determiner 123c gives higher priority to one of the readout order patterns 420a, 430a, or 440a, out of the readout order patterns 420a to 420c, 430a to 430c, and 440a to 440c stored in the readout order pattern DB 303, compared to the priority of the other readout order patterns. When driving on an expressway, it is considered important to recognize an object being a small-sized existence in the distance. In view of this, performing readout sequentially from the upper end side of the frame 400 would make it possible to further improve the immediacy to the object being a small-sized existence in the distance.

Here, as described above, when the priority of the unit-of-readout patterns or the readout order patterns is set based on a plurality of pieces of different information (image information, recognition information, and external information), there is a possible of occurrence of a collision between different unit-of-readout patterns or between different readout order patterns. In order to avoid this collision, for example, it is conceivable to make individual priority levels that have been set based on individual pieces of information, to different levels in advance.

[6-1. First Modification of Third Embodiment]

Next, a first modification of the third embodiment will be described. The first modification of the third embodiment is an example of adaptively setting the readout region in the case of performing frame readout.

FIG. 64 is a functional block diagram illustrating an example of functions according to the first modification of the third embodiment. Since the first modification of the third embodiment mainly describes the recognition process performed by the recognition processing unit 12, the configuration illustrated in Section (a) of FIG. 64 omits illustration of the visual recognition processing unit 14, the output controller 15, the trigger generator 16, and the readout controller 111 of the sensor controller 11, which are illustrated in the configuration of FIG. 21 above. Furthermore, a readout determiner 123d illustrated in Sections (a) and (b) of FIG. 64 has a different function from the readout determiner 123c according to the third embodiment illustrated in FIG. 61.

In the Section (b) of FIG. 64, the readout determiner 123b has a configuration corresponding to the readout determiner 123b illustrated in the Section (b) of FIG. 53 described above. Accordingly, the readout determiner 123b includes a readout region determiner 1230', an exposure time determiner 1231' and an AG amount determiner 1232'.

The readout information and the feature data passed from the feature data storage controller 121 to the readout determiner 123d are individually input to the readout region determiner 1230', the exposure time determiner 1231', and the AG amount determiner 1232'. Furthermore, the pixel data passed from the readout unit 110, the recognition information passed from the recognition process execution unit 124, and the vehicle information and the environmental information passed from the external information acquisition unit 17 are individually input to the readout region determiner 1230', the exposure time determiner 1231', and the AG amount determiner 1232'.

The readout region determiner 1230 generates and outputs readout region information (for example, a line number) indicating a readout region to be read out next, based on at least one piece of input information, that is, the readout information, the feature data, the pixel data, the recognition information, the vehicle information and the environmental information. The exposure time determiner 1231' generates and outputs information indicating the exposure time in next imaging based on at least one piece of input information, that is, the readout information, the feature data, the pixel data, the recognition information, the vehicle information and the environmental information. Furthermore, the AG amount determiner 1232' generates and outputs information indicating analog gain in next imaging based on at least one piece of input information, that is, the readout information, the feature data, the pixel data, the recognition information, the vehicle information and the environmental information.

(Adaptive Setting Method of Readout Region)

Next, an adaptive setting method of the readout region according to the first modification of the third embodiment will be described more specifically. In addition, here, it is assumed that the imaging apparatus 1 is used as an in-vehicle apparatus.

(Example of Setting Readout Region Based on Recognition Information)

First, a first setting method for adaptively setting the readout region based on recognition information will be described. In the first setting method, the readout determiner 123d adaptively sets a region in the frame using the region or class detected by the recognition process of the recognition process execution unit 124 so as to restrict a readout region to be read out next. This first setting method will be described more specifically with reference to FIG. 65.

FIG. 65 is a schematic diagram illustrating the first setting method of the first modification of the third embodiment. In Section (a) of FIG. 65, line readout is performed for a frame 500a sequentially in the order of lines and using line thinning, with a line defined as the unit of readout. In the example of Section (a) of FIG. 65, the recognition process execution unit 124 executes a recognition process based on the pixel data read out by the line readout, on the entire frame 500a. As a result, the recognition process execution unit 124 has detected a specific object (person in this example) in a region 501 within the frame 500a. The recognition process execution unit 124 passes the recognition information indicating the recognition result to the readout determiner 123d.

The readout region determiner 1230' of the readout determiner 123d determines a readout region to be read out next based on the recognition information passed from the recognition process execution unit 124. For example, the readout region determiner 1230' determines a region including the recognized region 501 and the peripheral portion of the region 501, as the readout region to be read out next. The readout region determiner 1230' passes the readout region information indicating the readout region defined by a region 502 to the readout unit 110.

In accordance with the readout region information passed from the readout region determiner 1230', the readout unit 110 performs frame readout without thinning the lines, for example, and passes the read out pixel data to the recognition processing unit 12. Section (b) of FIG. 65 illustrates an example of an image read out in accordance with the readout region. In this example, in a frame 500b, which is the next frame of the frame 500a, for example, pixel data of the region 502 indicated by the readout region information has been acquired, disregarding the outside of the region 502. In the recognition processing unit 12, the recognition process execution unit 124 performs a recognition process on the region 502. With this process, the person detected in the region 501 is recognized as a pedestrian.

In this manner, by restricting the readout region to be read out next based on the region detected by the recognition process execution unit 124, it is possible to execute a high-accuracy recognition process at higher speed.

Not limited to this, in this first determination method, based on the determination as to whether an object recognized in the frame 500a is a stationary body or moving body, it is also possible to predict the position of the object 500a in the next frame 500b, enabling restriction of the readout region to be read out next based on the predicted position. Furthermore, at this time, in a case where the recognized object is a moving body, further predicting the speed of the moving body will make it possible to restrict the readout region to be read out next with higher accuracy.

Furthermore, in this first determination method, it is also possible to restrict the readout region to be read out next in accordance with the type of the recognized object. For example, in a case where the object recognized in the frame 500a is a traffic light, the readout determiner 123d can restrict the readout region to be read out in the next frame 500b to a lamp portion of the traffic light. Furthermore, in a case where the object recognized in the frame 500a is a traffic light, the readout determiner 123d can change the frame readout method to a readout method effective for reducing the influence of flicker and can perform readout in the next frame 500b using the new method. As an example of the readout method effective for reducing the influence of flicker, the pattern Rd #m_x according to the fifth modification of the second embodiment described above can be applied.

Next, a second setting method for adaptively setting the readout region based on recognition information will be described. In the second setting method, the readout determiner 123d restricts the readout region to be read out next by using the recognition information in the middle of the recognition process performed by the recognition process execution unit 124. This second setting method will be described more specifically with reference to FIG. 66.

FIG. 66 is a schematic diagram illustrating a second setting method of the first modification of the third embodiment. In this example, it is assumed that the object as a recognition target is a license plate of a vehicle. Section (a) of FIG. 66 is a diagram illustrating an example in which an object indicating a bus vehicle is recognized in a region 503 in the middle of the recognition process corresponding to the frame readout for a frame 500c. The Section (a) of FIG. 66 can be used to correspond to the example illustrated in the Section (b) of FIG. 65 described above, for example, in which the readout region is limited to the region 502 and the readout and recognize process is performed.

Here, when it is recognized that the object is a bus vehicle in the region 503 in the middle of the recognition process, the readout region determiner 1230' can predict the position of the license plate of the bus vehicle based on the information recognized in the region 503. Based on the predicted position of the license plate, the readout region determiner 1230' determines the readout region to be read out next, and passes the readout region information indicating the determined readout region to the readout unit 110.

In accordance with the readout region information passed from the readout region determiner 1230', the readout unit 110 reads outs a next frame 500d of the frame 500c, for example, and passes the read out pixel data to the recognition processing unit 12. Section (b) of FIG. 66 illustrates an example of an image read out in accordance with the readout region. In this example, in the frame 500d, pixel data of the region 504 including the predicted license plate position indicated by the readout region information has been acquired. In the recognition processing unit 12, the recognition process execution unit 124 performs a recognition process on the region 504. With this process, the recognition process is performed onto the license plate as an object included in the region 504, making it possible to acquire, for example, the vehicle number of the bus vehicle detected by the recognition process on the region 503.

In this second setting method, the readout region of the next frame 500d is determined in the middle of the recognition process for the entire target object corresponding to the readout of the frame 500c executed by the recognition process execution unit 124, making it possible to execute a high-accuracy recognition process at higher speed.

In the recognition process for the frame 500c illustrated in Section (a) of FIG. 66, it is possible to enable the readout determiner 123d to perform determination of the region 504 as the readout region to be read out next and perform the readout illustrated in Section (b) of FIG. 66 in a case where the reliability indicated by the recognition information passed from the recognition process execution unit 124 in the middle of the recognition is a predetermined level or more. In this case, in a case where the reliability indicated by the recognition information is less than a predetermined level, the recognition process for the entire object will be executed in the frame 500c.

Next, a third setting method for adaptively setting the readout region based on recognition information will be described. In the third setting method, the readout determiner 123d restricts the readout region to be read out next by using the reliability of the recognition process performed by the recognition process execution unit 124. This third setting method will be described more specifically with reference to FIG. 67.

In Section (a) of FIG. 67, line readout is performed for a frame 500e sequentially in the order of lines and using line thinning, with a line defined as the unit of readout. In the example of Section (a) of FIG. 67, the recognition process execution unit 124 executes a recognition process based on the pixel data read out by line readout on the entire frame 500a, and has detected a specific object (a person in this example) in a region 505a in the frame 500e. The recognition process execution unit 124 passes the recognition information indicating the recognition result to the readout determiner 123d.

In the readout determiner 123d, the readout region determiner 1230' generates readout region information indicating that, when the reliability indicated by the recognition information passed from the recognition process execution unit 124 is a predetermined level or more, readout on a next frame of the frame 500e will not be performed, for example. The readout region determiner 1230' passes the generated readout region information to the readout unit 110.

In contrast, the readout region determiner 1230' generates readout region information indicating that, when the reliability indicated by the recognition information passed from the recognition process execution unit 124 is less than a predetermined level, readout on a next frame of the frame 500e will be performed. For example, the readout region determiner 1230' generates readout region information that designates the region corresponding to the region 505a in which a specific object (person) is detected in the frame 500e, as the readout region. The readout region determiner 1230' passes the generated readout region information to the readout unit 110.

The readout unit 110 reads out the next frame of the frame 500e in accordance with the readout region information passed from the readout region determiner 1230'. Here, the readout region determiner 1230' can add an instruction to read out a region corresponding to the region 505a in the frame next to the frame 500e without performing thinning, to the readout region information. The readout unit 110 reads out the next frame of the frame 500e in accordance with the readout region information, and passes the read out pixel data to the recognition processing unit 12.

Section (b) of FIG. 67 illustrates an example of an image read out in accordance with the readout region information. In this example, in the frame 500f, which is the next frame of the frame 500e, for example, the pixel data of a region 505b corresponding to the region 505a illustrated in the readout region information has been acquired. For the portion of the frame 500f other than the region 505b, the pixel data of the frame 500e can be used as it is without performing readout, for example. In the recognition processing unit 12, the recognition process execution unit 124 performs a recognition process on the region 505b. This process makes it possible to recognize that the person detected in the region 501 is a pedestrian with higher reliability.

(Example of Adaptively Setting Readout Region Based on External Information)

Next, a first setting method for adaptively setting the readout region based on external information will be described. In the first setting method, the readout determiner 123*d* adaptively sets the region in the frame based on the vehicle information passed from the external information acquisition unit 17, and restricts the readout region to be read out next. This makes it possible to execute the recognition process suitable for the traveling of a vehicle.

For example, in the readout determiner 123*d*, the readout region determiner 1230' acquires the inclination of the vehicle based on the vehicle information, and determines the readout region in accordance with the acquired inclination. As an example, in a case where the readout region determiner 1230' has acquired that the vehicle is on a Step or the like and the front side is lifted based on the vehicle information, the readout region determiner 1230' corrects the readout region to be directed toward the upper end side of the frame. Furthermore, in a case where the readout region determiner 1230' has acquired a state where the vehicle is turning based on the vehicle information, the readout region determiner 1230' determines an unobserved region in the turning direction (for example, the region on the left end side in the case of a left turn) as the readout region.

Next, a second setting method for adaptively setting the readout region based on external information will be described. In the second setting method, map information that can sequentially reflect the current position is used as external information. In this case, the readout region determiner 1230' generates readout region information that instructs to increase the frame readout frequency in a case where the current position is an area that requires careful driving of a vehicle (for example, around a school or a nursery school). This makes it possible to prevent accidents caused by running out of the children to the road.

Next, a third setting method for adaptively setting the readout region based on external information will be described. In the third setting method, detection information obtained by another sensor is used as external information. An example of another sensor can be a Laser Imaging Detection and Ranging (LiDAR) type sensor. The readout region determiner 1230' generates readout region information indicating skipping readout of a region in which the reliability of the information detected by the other sensor is a predetermined level or more. With this, it is possible to achieve power saving and higher speed in the frame readout and the recognition process.

[6-2. Second Modification of Third Embodiment]

Next, a second modification of the third embodiment will be described. The second modification of the third embodiment is an example in which at least one of the exposure time or the analog gain in the case of performing frame readout is adaptively set.

(Example of Adaptively Setting Exposure Time and Analog Gain Based on Image Information)

First, a method of adaptively setting the exposure time and the analog gain based on image information (pixel data) will be described. The readout determiner 123*d* detects noise included in the pixel data passed from the readout unit 110. In a case where the pixel data passed from the readout unit 110 includes noise of a predetermined level or more, the exposure time determiner 1231' sets the exposure time to be longer, and the AG amount determiner 1232' sets the analog gain to be higher.

(Example of Adaptively Setting Exposure Time and Analog Gain Based on Recognition Information)

Next, a method of adaptively setting the exposure time and the analog gain based on the recognition information will be described. In a case where the reliability indicated by the recognition information passed from the recognition process execution unit 124 is less than a predetermined value, the exposure time determiner 1231' and the AG amount determiner 1232' in the readout determiner 123*d* adjust the exposure time and the analog gain, respectively. The readout unit 110 performs readout of the next frame, for example, by using the adjusted exposure time and analog gain.

(Example of Adaptively Setting Exposure Time and Analog Gain Based on External Information)

Next, a method of adaptively setting the exposure time and the analog gain based on external information will be described. Here, vehicle information is used as external information.

As a first example, in the readout determiner 123*d*, the exposure time determiner 1231' and the AG amount determiner 1232' sets different analog gains for the central portion and the peripheral portion of the frame in a case where the vehicle information passed from the external information acquisition unit 17 indicates that the headlight is turned on. That is, when the vehicle headlights are turned on, the luminance value is high in the central portion of the frame and low in the peripheral portion of the frame. In view of this, in the case where the headlights are turned on, the exposure time determiner 1231' sets a shorter exposure time while the AG amount determiner 1232' sets a higher analog gain for the central portion of the frame. In contrast, in the case where the headlights are turned on, the exposure time determiner 1231' sets a longer exposure time while the AG amount determiner 1232' sets a lower analog gain for the peripheral portion of the frame.

As a second example, in the readout determiner 123*d*, the exposure time determiner 1231' and the AG amount determiner 1232' adaptively set the exposure time and the analog gain based on the vehicle speed indicated by the vehicle information passed from the external information acquisition unit 17. For example, the central portion of the frame has a small amount of blurring due to vehicle movement. Therefore, the exposure time determiner 1231' sets a longer exposure time while the AG amount determiner 1232' sets a lower analog gain for the central portion of the frame. In contrast, the peripheral portion of the frame has a large amount of blurring due to vehicle movement. Therefore, the exposure time determiner 1231' sets a shorter exposure time while the AG amount determiner 1232' sets a higher analog gain for the peripheral portion of the frame.

Here, when the speed of the vehicle has been changed to a higher speed based on the vehicle information, the exposure time determiner 1231' changes the exposure time to a shorter time and the AG amount determiner 1232' changes the analog gain to a higher gain for the central portion of the frame.

By adaptively setting the exposure time and the analog gain in this manner, it is possible to suppress the influence of changes in the imaging environment in the recognition process.

[6-3. Third Modification of Third Embodiment]

Next, a third modification of the third embodiment will be described. The third modification of the third embodiment is an example in which the readout region, exposure time, analog gain, and drive speed are set in accordance with a predetermined priority mode. The drive speed is the speed at which the sensor unit 10 is driven. By increasing the drive speed within a range allowable for the sensor unit 10, for example, it is possible to increase the frame readout speed.

Figure 68:
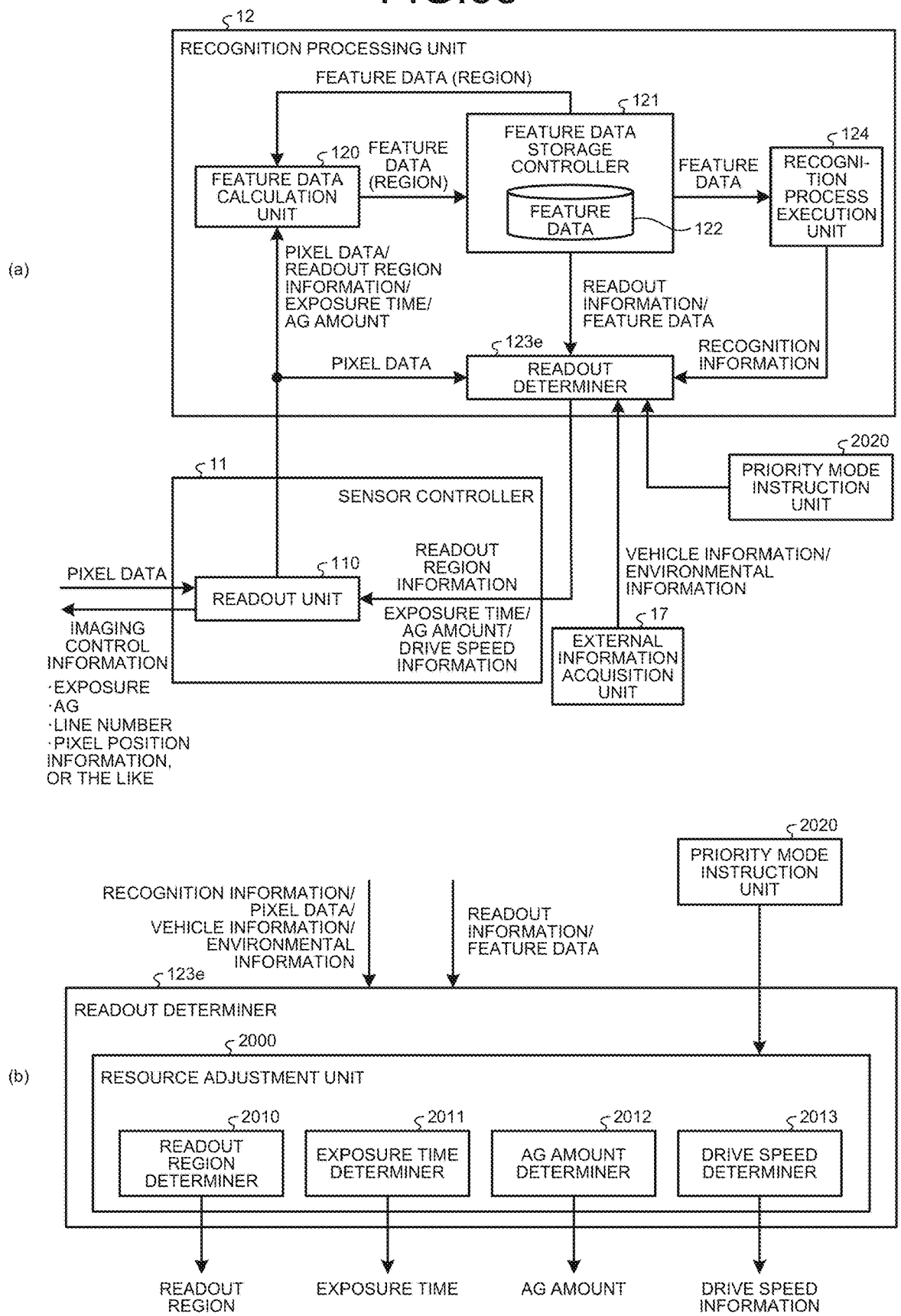
FIG. 68 is a functional block diagram of an example illustrating the function of the imaging apparatus according to the third modification of the third embodiment.

FIG. 68 is a functional block diagram of an example illustrating the function of the imaging apparatus according to the third modification of the third embodiment. In the configuration illustrated in Section (a) of FIG. 68, a priority mode instruction unit 2020 is added to the configuration illustrated in Section (a) of FIG. 64. Furthermore, a readout determiner 123e includes a function different from that of the readout determiner 123d illustrated in FIG. 64.

Section (b) of FIG. 68 is a functional block diagram of an example illustrating in more detail the function of the readout determiner 123e according to the third modification of the third embodiment. In Section (b) of FIG. 68, the readout determiner 123e includes a resource adjustment unit 2000. The resource adjustment unit 2000 includes a readout region determiner 2010, an exposure time determiner 2011, an AG amount determiner 2012, and a drive speed determiner 2013.

The readout information and the feature data passed from the feature data storage controller 121 to the readout determiner 123e are input to the readout region determiner 2010, the exposure time determiner 2011, the AG amount determiner 2012, and the drive speed determiner 2013, individually. In addition, the vehicle information and environmental information passed from the external information acquisition unit 17 and the pixel data passed from the readout unit 110 are input to the readout region determiner 2010, the exposure time determiner 2011, the AG amount determiner 2012, and the drive speed determiner 2013 individually.

The readout region determiner 2010 generates and outputs readout region information (for example, a line number) indicating a readout region to be read out next, based on the input pieces of information. The exposure time determiner 2011 generates and outputs information indicating the exposure time in the next imaging based on the input pieces of information. Furthermore, the AG amount determiner 2012 generates and outputs information indicating the analog gain in the next imaging based on each of input pieces of information.

Furthermore, the drive speed determiner 2013 generates and outputs drive speed information for adjusting the drive speed of the sensor unit 10 based on each of input pieces of information. Examples of the methods for adjusting the drive speed by the drive speed determiner 2013 include a method of changing the frequency of the clock signal of the sensor unit 10. In this method, the power consumption in the sensor unit 10 will change in accordance with the drive speed. Furthermore, other examples of drive speed adjustment method include a method of adjusting the drive speed using a fixed amount of power consumption of the sensor unit 10. For example, the drive speed determiner 2013 can adjust the drive speed by changing the bit depth of pixel data read out from the sensor unit 10. The drive speed determiner 2013 passes the generated drive speed information to the readout unit 110. The readout unit 110 includes the drive speed information in the imaging control information and passes it to the sensor unit 10.

The priority mode instruction unit 2020 outputs priority mode setting information for setting the priority mode in accordance with an instruction in response to user's operation or an instruction from a higher-level system. The priority mode setting information is input to the resource adjustment unit 2000. In accordance with the input priority mode setting information, the resource adjustment unit 2000 adjusts generation of the readout region information by the readout region determiner 2010, generation of the exposure time by the exposure time determiner 2011, generation of the analog gain by the AG amount determiner 2012, and generation of the drive speed information by the drive speed determiner 2013.

The priority mode instruction unit 2020 is capable of instructing various priority modes. Examples of conceivable priority modes include: accuracy priority mode that prioritizes recognition accuracy, power saving mode that prioritizes power consumption, promptness priority mode that prioritizes promptness of recognition results, and wide region priority mode that prioritizes a recognition process for a wide region, a dark place mode that prioritizes a recognition process for imaging in a dark environment, a small object priority mode that prioritizes a recognition process for small objects, and a high-speed object priority mode that prioritizes a recognition process for fast-moving objects. The priority mode instruction unit 2020 may instruct one priority mode from these priority modes, or may instruct a plurality of priority modes from these priority modes.

(Example of Operation in Priority Mode)

An example of operation in the priority mode will be described. As a first example, an example in which the resource adjustment unit 2000 adopts the setting corresponding to the priority mode on which an instruction is given by the priority mode instruction unit 2020 will be described. For example, the first setting is based on the assumption that the imaging environment is a dark environment and the captured pixel data contains a predetermined level of noise or more, with an exposure time of 10 [msec] and analog gain of 1 times. Furthermore, a second setting is defined as a setting that assumes a case where the vehicle equipped with the imaging apparatus 1 according to the third modification of the third embodiment travels at a high speed, that is a predetermined speed or more, that is, the setting that assumes a case where the imaging apparatus 1 moves at a higher speed and the captured image includes a large amount of blurring, with the exposure time of 1 [msec], and the analog gain of 10 times.

In this case, in a case where the priority mode instruction unit 2020 has instructed the resource adjustment unit 2000 to perform the dark place priority mode, the resource adjustment unit 2000 adopts the first setting. In accordance with the first setting adopted, the resource adjustment unit 2000 instructs the exposure time determiner 2011 and the AG amount determiner 2012 to set the exposure time=10 [msec] and the analog gain=1 times. The exposure time determiner 2011 and the AG amount determiner 2012 pass the exposure time on which an instruction is given and analog gain respectively to the readout unit 110. The readout unit 110 sets the exposure time and analog gain respectively passed from the exposure time determiner 2011 and the AG amount determiner 2012, to the sensor unit 10.

As a second example, an example in which the resource adjustment unit 2000 determines the setting to be adopted for the priority mode on which an instruction is given by the priority mode instruction unit 2020 by weighting will be described. As an example, taking the above-described first setting and second setting as an example, the resource adjustment unit 2000 applies weighting on each of the first setting and the second setting in accordance with the priority mode on which an instruction is given by the priority mode instruction unit 2020. The resource adjustment unit 2000 determines the setting using the priority mode on which an instruction is given in accordance with the first setting and the second setting to which weighting has been applied. For example, the target of the setting (exposure time, analog gain, or the like) and the weighting value corresponding to the target can be set and stored in advance for each of the priority modes on which an instruction can be given by the priority mode instruction unit 2020.

As a third example, the following description is an example in which the resource adjustment unit 2000 applies weighting to the frequency of the setting to be adopted for the priority mode on which an instruction is given by the priority mode instruction unit 2020 and determines the setting for the priority mode. As an example, it is conceivable to have a third setting of performing uniform readout that reads out the entire frame substantially uniformly, and a fourth setting of performing peripheral readout that performs intensive readout on the peripheral portion of the frame. Here, the third setting is defined as a normal readout setting. Furthermore, the fourth setting is defined as a readout setting in a case where an object having a reliability lower than a predetermined value is recognized.

In this case, for example, when the priority mode instruction unit 2020 instructs the resource adjustment unit 2000 to use the wide region priority mode, the resource adjustment unit 2000 can set the frequency of readout and a recognition process with the third setting to be higher than the frequency of readout and a recognition process with the fourth setting. As a specific example, the resource adjustment unit 2000 performs designation in time series of frame units, for example, "third setting", "third setting", "fourth setting", "third setting", "third setting", "fourth setting", and so on, so as to increase the frequency of operation with the third setting to the higher than the frequency of operation with the fourth setting.

As another example, when the priority mode instruction unit 2020 instructs the resource adjustment unit 2000 to use the accuracy priority mode, the resource adjustment unit 2000 can set the frequency of readout and a recognition process with the fourth setting to be higher than the frequency of readout and a recognition process with the third setting. As a specific example, the resource adjustment unit 2000 performs designation in time series of frame units, for example, "fourth setting", "fourth setting", "third setting", "fourth setting", "fourth setting", "third setting", and so on, so as to increase the frequency of operation with the fourth setting to the higher than the frequency of operation with the third setting.

By determining the operation in the priority mode in this manner, it is possible to execute appropriate frame readout and recognition processes in various situations.

(Example of Drive Speed Adjustment)

The drive speed determiner 2013 can adjust the drive speed regarding the driving of the sensor unit 10 based on each of pieces of information passed to the readout determiner 123d. For example, the drive speed determiner 2013 can increase the drive speed in order to improve the accuracy and responsiveness of the recognition process, for example, when the vehicle information indicates an emergency. The drive speed determiner 2013 can increase the drive speed when the reliability of the recognition process is a predetermined level or less based on the recognition information and the frame needs to be read out again. Furthermore, when it is determined that the vehicle is turning based on the vehicle information and an unobserved region appears in the frame based on the recognition information, the drive speed determiner 2013 can increase the drive speed until the readout of the unobserved region is completed. Furthermore, the drive speed determiner 2013 can increase the drive speed when the current position is an area that requires careful traveling by the vehicle based on map information that can sequentially reflect the current position, for example.

On the other hand, when an instruction on the power saving mode is given by the priority mode instruction unit 2020, it is possible to suppress an increase of the drive speed except the case where the above-described vehicle information indicates an emergency. Similarly, when the instruction on the power saving mode is given, the readout region determiner 2010 can determine the region in which an object is predicted to be recognized in the frame as a readout region, and the drive speed determiner 2013 can decrease the drive speed.

7. FOURTH EMBODIMENT

Next, a fourth embodiment of the present disclosure will be described. In the first to third embodiments described above and their modifications, various forms of recognition process according to the present disclosure have been described. Here, for example, an image processed for the image recognition process using machine learning is often not suitable for human visual recognition. The fourth embodiment enables an output an image having a quality tolerable for human visual recognition while performing recognition processes on the image for which frame readout has been performed.

Figure 69:
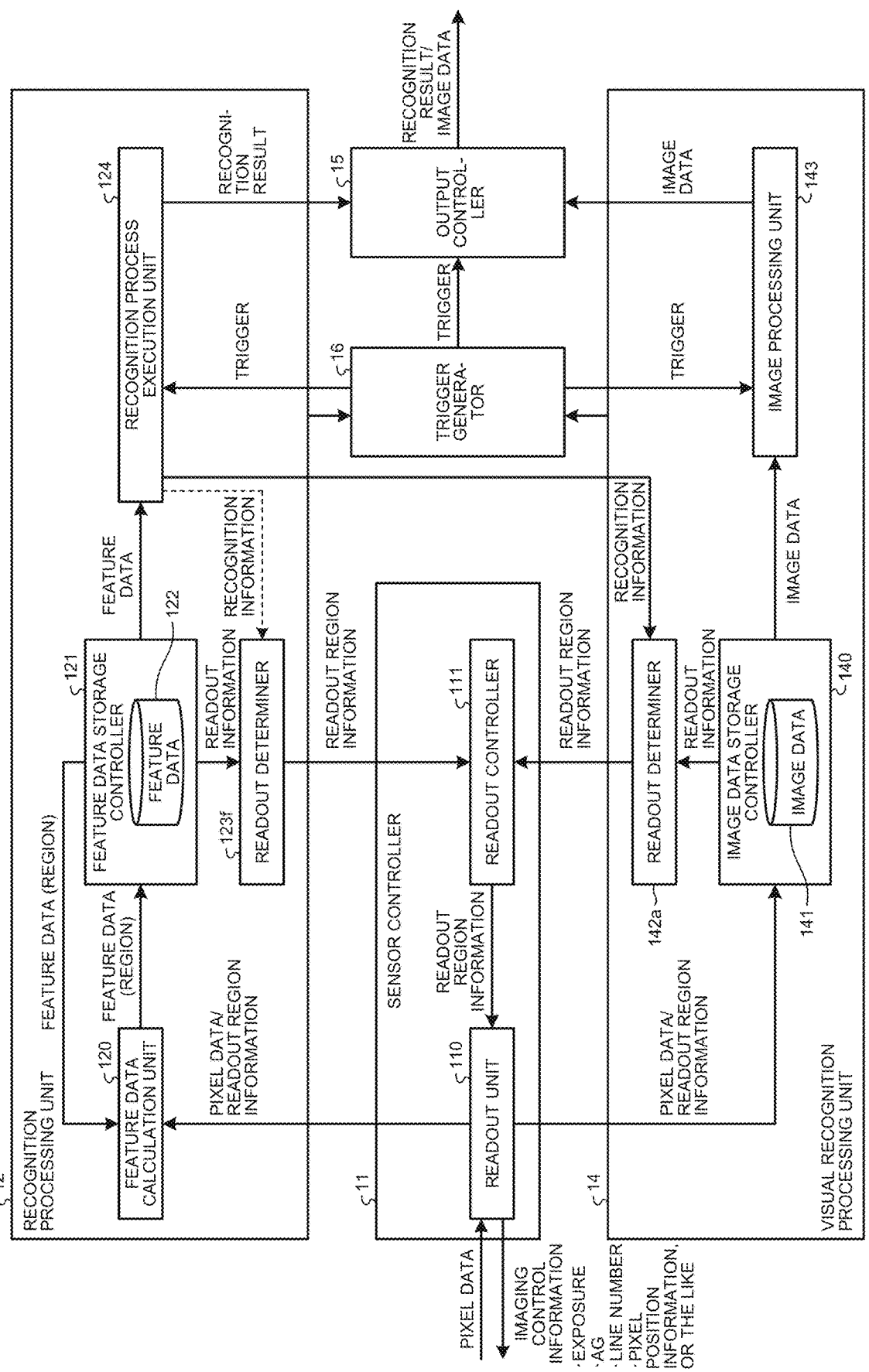
FIG. 69 is a functional block diagram of an example illustrating functions of an imaging apparatus according to a fourth embodiment.

FIG. 69 is a functional block diagram of an example illustrating functions of an imaging apparatus according to the fourth embodiment. The imaging apparatus illustrated in FIG. 69 differs from the imaging apparatus illustrated in the above FIG. 21 in that the recognition process execution unit 124 supplies recognition information to a readout determiner 142a in the visual recognition processing unit 14.

Figure 70:
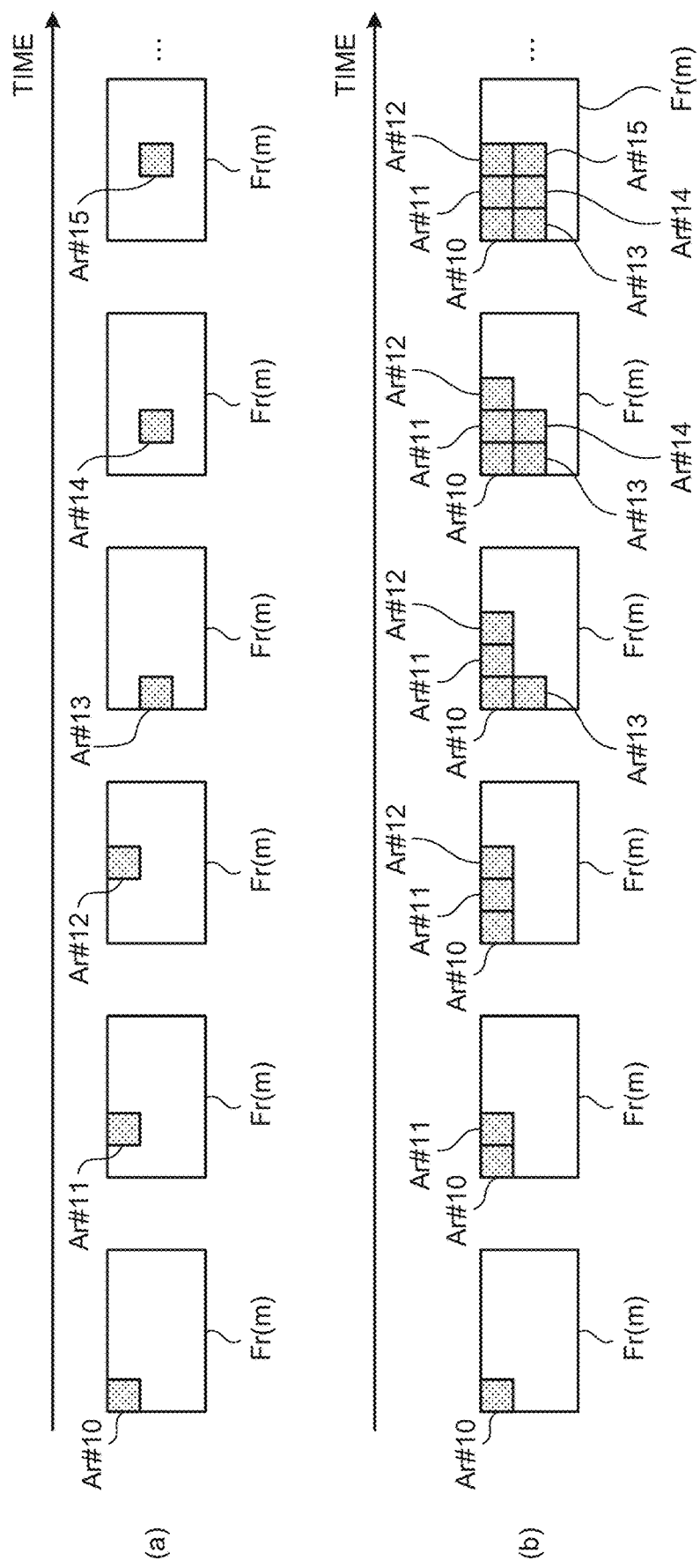
FIG. 70 is a schematic diagram schematically illustrating image processing according to the fourth embodiment.

FIG. 70 is a schematic diagram schematically illustrating image processing according to the fourth embodiment. Here, it is assumed that the frame is read out sequentially in the horizontal direction and then in the vertical direction of the frame with the area Ar #z of a predetermined size as the unit of readout described with reference to FIG. 33. Section (a) of FIG. 70 schematically illustrates how the pixel data of each of the areas Ar #10, Ar #11, . . . , Ar #15 is sequentially read out by the readout unit 110. The recognition processing unit 12 according to the present disclosure can execute the recognition process based on the pixel data of each of the areas Ar #10, Ar #11, . . . , Ar #15 read out in this order.

In the visual recognition processing unit 14, for example, as illustrated in Section (b) of FIG. 70, the frame image is updated sequentially by the pixel data of each of the areas Ar #10, Ar #11, . . . , Ar #15 read out in this order, for example. This makes it possible to generate an image suitable for visual recognition.

More specifically, the visual recognition processing unit 14 stores the pixel data of each of areas Ar #10, Ar #11, . . . , Ar #15 read out in order by the readout unit 110 to the image data storage unit 141 of the image data storage controller 140. At this time, the image data storage controller 140 performs storage to the image data storage unit 141 while maintaining the positional relationship within the frame regarding the pixel data of each of areas Ar #10, Ar #11, . . . , Ar #15 read out from the same frame. That is, the image data storage controller 140 stores each of pieces of pixel data in the image data storage unit 141 as image data in a state where the pixel data is mapped to each of positions in the frame.

In response to a request from the image processing unit 143, for example, the image data storage controller 140 reads out each of pieces of pixel data for each of areas Ar

10, Ar #11, . . . , Ar #15 of the same frame stored in the image data storage unit 141, from the image data storage unit 141 as the image data of the frame.

Here, in the present disclosure, in the recognition processing unit 12, for example, when a desired recognition result is obtained in the middle of readout of a frame, the readout of the frame can be terminated at that point (refer to second embodiment, FIG. 26, 27, or the like). Furthermore, in the recognition processing unit 12, when a predetermined recognition result is obtained in the middle of readout of a frame, the frame readout position can be jumped to a position where a desired recognition result is predicted to be obtained based on the recognition result (refer to the tenth modification of the second embodiment, FIG. 55, 56, or the like). In these cases, the frame readout ends with the termination of the recognition process, and thus, there is a possibility that a missing portion of the image occurs in the frame image.

Therefore, in the fourth embodiment, in a case where there is an unprocessed region that has not been read out in the frame at the point where the recognition process by the recognition processing unit 12 is terminated, the visual recognition processing unit 14 will perform readout of the unprocessed region after the termination of the recognition process so as to fill the missing part of the frame image.

Figure 71:
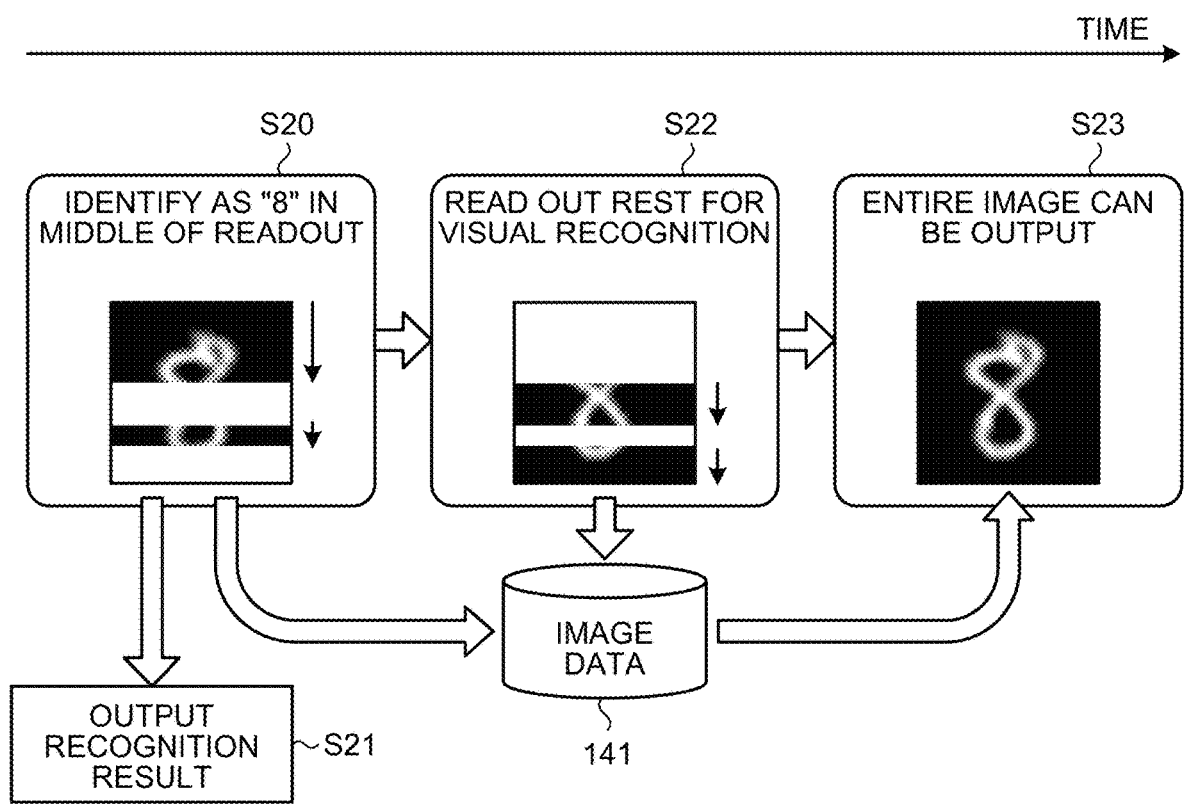
FIG. 71 is a diagram illustrating an example of a readout process according to the fourth embodiment.

FIG. 71 is a diagram illustrating an example of a readout process according to the fourth embodiment. The readout process according to the fourth embodiment will be described with reference to the example of FIG. 55 described above. Step S20 of FIG. 71 corresponds to the process of Step S4c of FIG. 55. That is, referring to FIG. 55, in Step S1, the imaging apparatus 1 starts imaging of a target image as a recognition target (handwritten number "8"). In Step S2, the sensor controller 11 reads out a frame sequentially in the order of lines from the upper end side to the lower end side in accordance with the readout region information passed from the recognition processing unit 12. When the line is read out up to a certain position, the recognition processing unit 12 identifies the number "8" or "9" from the image of the read out lines (Step S3).

Note that the pixel data read out by the readout unit 110 in Step S2 is passed to the recognition processing unit 12 and also to the visual recognition processing unit 14. In the visual recognition processing unit 14, the image data storage controller 140 sequentially stores the pixel data passed from the readout unit 110 in the image data storage unit 141.

Based on the result of the recognition process up to Step S3, a readout determiner 123f of the recognition processing unit 12 generates readout region information designating a prediction line from which it is predictable that the object identified in Step S3 is which of the numbers "8" or "9", and passes the generated information to the readout unit 110. The readout unit 110 passes the prediction line read out in accordance with the readout region information to the recognition processing unit 12 and also to the visual recognition processing unit 14. In the visual recognition processing unit 14, the image data storage controller 140 stores the pixel data of the prediction line passed from the readout unit 110 in the image data storage unit 141.

The recognition processing unit 12 executes the recognition process based on the pixel data of the prediction line passed from the readout unit 110 (Step S20). When the object is identified in Step S20, the recognition processing unit 12 outputs the recognition result (Step S21).

When the recognition result has been output in Step S21, the recognition process execution unit 124 in the recognition processing unit 12 passes the recognition information indicating the termination of the recognition process to the visual recognition processing unit 14. The visual recognition processing unit 14 reads out an unprocessed region at the point of Step S20 in accordance with the recognition information passed from the recognition process execution unit 124 (Step S22).

More specifically, the recognition information indicating the termination of the recognition process, which is passed to the visual recognition processing unit 14, will be passed to the readout determiner 142a. The readout determiner 142a sets a readout region for reading out the unprocessed region in accordance with the passed recognition information. The readout determiner 142a passes the readout region information indicating the set readout region to the readout unit 110. The readout unit 110 reads out the unprocessed region in the frame in accordance with the passed readout region information, and passes the read out pixel data to the visual recognition processing unit 14. In the visual recognition processing unit 14, the image data storage controller 140 stores the pixel data of the unprocessed region passed from the readout unit 110 in the image data storage unit 141.

The readout of the entire frame is completed with the completion of the readout of the unprocessed region of the frame by the readout unit 110. The image data storage unit 141 stores pixel data read out for the recognition process and pixel data read out from an unprocessed region after completion of the recognition process. Therefore, for example, the image data storage controller 140 can output the image data of the entire frame image by reading out the pixel data of the same frame from the image data storage unit 141 (Step S23).

Note that execution of the series of processes of Steps S1 to S23 described with reference to FIG. 71 within one frame period would be preferable because this enables the visual recognition processing unit 14 to output a substantially real-time moving image with the imaging timing.

The readout for the recognition process up to Step S20 and the readout for the visual recognition processing in Step S22 are performed in a different order from the readout performed sequentially in the order of lines of the frame. Therefore, for example, when the imaging method of the sensor unit 10 is the rolling shutter method, deviation (referred to as a temporal deviation) occurs due to inconsistency between the readout order and the time in each of line groups in which the readout order is divided. This temporal deviation can be corrected by image processing based on the line numbers of each of line groups and the frame period, for example.

Furthermore, when the imaging apparatus 1 is moving with respect to the subject, this temporal deviation becomes more remarkable. In this case, for example, by providing the imaging apparatus 1 with a gyro capable of detecting angular velocity in three directions, it is possible to obtain the moving method and speed of the imaging apparatus 1 based on the detection output of the gyro, enabling correction of the temporal deviation by using the moving direction and speed obtained.

Figure 72:
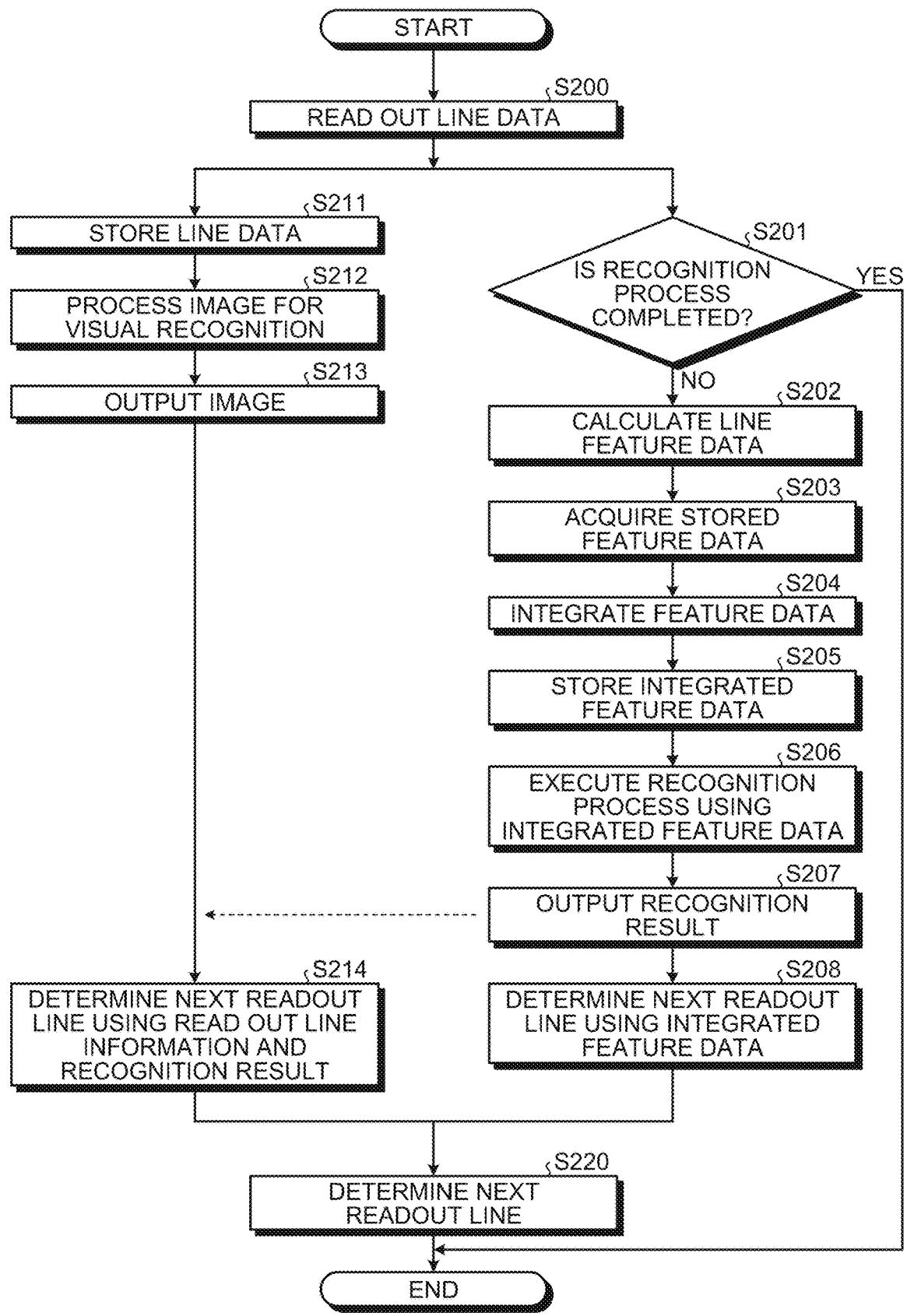
FIG. 72 is a flowchart illustrating an example of processes according to the fourth embodiment.

FIG. 72 is a flowchart of an example illustrating the process according to the fourth embodiment. In the flowchart of FIG. 72, the processes of Steps S200 to S206 are equivalent to the processes of Steps S100 to S1080 in the flowchart of FIG. 54 described above.

That is, in Step S200, the readout unit 110 performs readout of line data from the line indicated by the readout line of the target frame. The readout unit 110 passes the line data based on each of pieces of pixel data of the line that has been read out, to the recognition processing unit 12 and the visual recognition processing unit 14.

When the processing of Step S200 is completed, the process proceeds to Step S201 and Step S211. The processes of Steps S201 to S208 are processes in the recognition processing unit 12. In contrast, the processes of Steps S211 to S214 are processes in the visual recognition processing unit 14. The process in the recognition processing unit 12 and the process in the visual recognition processing unit 14 can be executed in parallel.

First, the process by the recognition processing unit 12 from Step S201 will be described. In Step S201, the recognition processing unit 12 determines whether the recognition process for the target frame has been completed. When determination is completion of the process (Step S201, "Yes"), the recognition processing unit 12 will not execute the processes in Step S202 or subsequent Steps. In contrast, when the determination is non-completion (Step S201, "No"), the recognition processing unit 12 proceeds to the process of Step S202.

The processes of Steps S202 to S208 are equivalent to the processes of Steps S101 to S1080 of FIG. 54. That is, in Step S202, the feature data calculation unit 120 in the recognition processing unit 12 calculates the feature data of the line based on the line data passed from the readout unit 110. In the next Step S203, the feature data calculation unit 120 acquires the feature data stored in the feature data storage unit 122 from the feature data storage controller 121. In the next Step S204, the feature data calculation unit 120 integrates the feature data calculated in Step S202 and the feature data acquired from the feature data storage controller 121 in Step S203, and passes the integrated data to the feature data storage controller 121.

In the next Step S205, the feature data storage controller 121 stores the integrated feature data in the feature data storage unit 122. In the next Step S206, the recognition process execution unit 124 executes the recognition process using the integrated feature data. In the next Step S207, the recognition process execution unit 124 outputs the recognition result of the recognition process of Step S206. Here, the recognition process execution unit 124 passes the recognition information including the recognition result to the readout determiner 142a of the visual recognition processing unit 14.

In the next Step S208, the readout region determiner 1230 in the readout determiner 123f determines the readout line on which the next readout is to be performed, by using the readout information passed from the feature data storage controller 121 and the feature data obtained by integrating the feature data calculated in Step S202 with the feature data acquired from the feature data storage controller 121 in Step S203. The readout determiner 123f passes information indicating the determined readout line (readout region information) to the readout controller 111 of the sensor controller 11. After the process of Step S208 is completed, the process proceeds to Step S220.

Next, the processes performed by the visual recognition processing unit 14 from Step S211 will be described. In Step S211, the image data storage controller 140 in the visual recognition processing unit 14 stores the line data passed from the readout unit 110 in the image data storage unit 141. In the next Step S212, the image processing unit 143 in the visual recognition processing unit 14 performs image processing for visual recognition on the image data formed with the line data stored in the image data storage unit 141, for example. In the next Step S213, the image processing unit 143 outputs image data that has undergone image processing for visual recognition.

Not limited to this, the image processing unit 143 may store the image data subjected to the image processing for visual recognition in the image data storage unit 141 again in Step S213. Furthermore, in a case where the image data of the entire target frame is stored in the image data storage unit 141, the image processing unit 143 may perform the image processing of Step S212 on the image data.

In the next Step S214, the readout determiner 142a in the visual recognition processing unit 14 determines the readout line to be read out next based on the line information indicating the line data read out in Step S200 and the recognition information passed from the recognition process execution unit 124 in Step S207. The readout determiner 142a passes information (readout region information) indicating the determined readout line to the readout controller 111. When the processing of Step S214 is completed, the process proceeds to Step S220.

In Step S220, the readout controller 111 passes the readout region information indicating any of the readout lines out of the readout line passed from the recognition processing unit 12 in Step S208, or the readout line passed from the visual recognition processing unit 14 in Step S214, to the readout unit 110. Here, in a case where the recognition process has been performed in the recognition processing unit 12 (Step S201, "No"), there is a match between the readout line passed from the recognition processing unit 12 in Step S208 and the readout line passed from the visual recognition processing unit 14 in Step S214. Therefore, the readout controller 111 may pass the readout region information indicating either the readout line passed from the recognition processing unit 12 or the readout line passed from the visual recognition processing unit 14, to the readout unit 110. In contrast, in a case where the recognition process has not been performed in the recognition processing unit 12 (Step S201, "Yes"), the readout controller 111 passes the readout region information passed from the visual recognition processing unit 14 to the readout unit 110.

In this manner, in the fourth embodiment, the unprocessed region of the frame is read out after the recognition process is completed. Therefore, even in a case where the recognition process is terminated in the middle or where the readout position jumped in the recognition process, it is possible to acquire an image of the entire frame.

Although the above description is an example in which the visual recognition processing unit 14 sequentially updates the image of the frame by the pixel data read out by the frame readout, the present disclosure is not limited to this example. For example, the visual recognition processing unit 14 may store the pixel data read out by frame readout in the image data storage unit 141, for example, and when the amount of stored pixel data of the same frame exceeds a threshold, the pixel data of the same frame may be collectively read out from the image data storage unit 141. Furthermore, in a case where the frame readout is performed by line thinning, for example, the thinned portion may be interpolated by the surrounding pixel data.

(Example of Trigger for Image Data Output)

In a case where output of image data is performed in units of frame, the visual recognition processing unit 14 outputs image data after the image data corresponding to a frame has been stored in the image data storage unit 141. In contrast, in a case where the output of image data is not performed in units of frame, the visual recognition processing unit 14 can sequentially output the line data passed from the readout unit 110, for example.

(Image Data Storage Control)

Next, an example of control regarding the image data storage unit 141, which can be applied to the fourth embodiment, will be described. As a first example of control regarding the image data storage unit 141, in a case where the image data stored in the image data storage unit 141 is insufficient, the image data storage controller 140 stores the line data passed from the readout unit 110 to the image data storage unit 141.

As an example, in a case where the image data corresponding to the unit of image processing performed by the image processing unit 143 is not stored in the image data storage unit 141, the line data passed from the readout unit 110 is stored in the image data storage unit 141. As a more specific example, it is conceivable that, when the image processing unit 143 performs image processing on a frame-by-frame basis and when the image data of the target frame stored in the image data storage unit 141 is less than one frame, the pixel data passed from the readout unit 110 is stored in the image data storage unit 141.

As a second example of control regarding the image data storage unit 141, the image data stored in the image data storage unit 141 is discarded when there is a change in a scene in the imaging target. The change in the scene in the imaging target, for example, due to a sudden change in the brightness, movement, screen configuration, or the like, in the imaging target. In a case where the imaging apparatus 1 is used as an in-vehicle apparatus, there might be a change in the scene when the vehicle enters a tunnel or the like, or exits the tunnel to cause a sudden change in the brightness of the imaging target. Furthermore, in a case of occurrence of vehicle sudden acceleration of stop in the vehicle, or in a case where the vehicle makes a sharp turn, the motion of the imaging target suddenly changes, leading to a change in the scene. Furthermore, when the vehicle suddenly goes out from a crowded place to an open place, the screen configuration of the image target suddenly changes, leading to a change in the scene. These changes in the scene in the imaging target can be determined based on the pixel data passed from the readout unit 110. Not limited to this, it is also possible to determine a change in the scene in the imaging target based on the recognition information passed from the recognition process execution unit 124 to the visual recognition processing unit 14.

Figure 73:
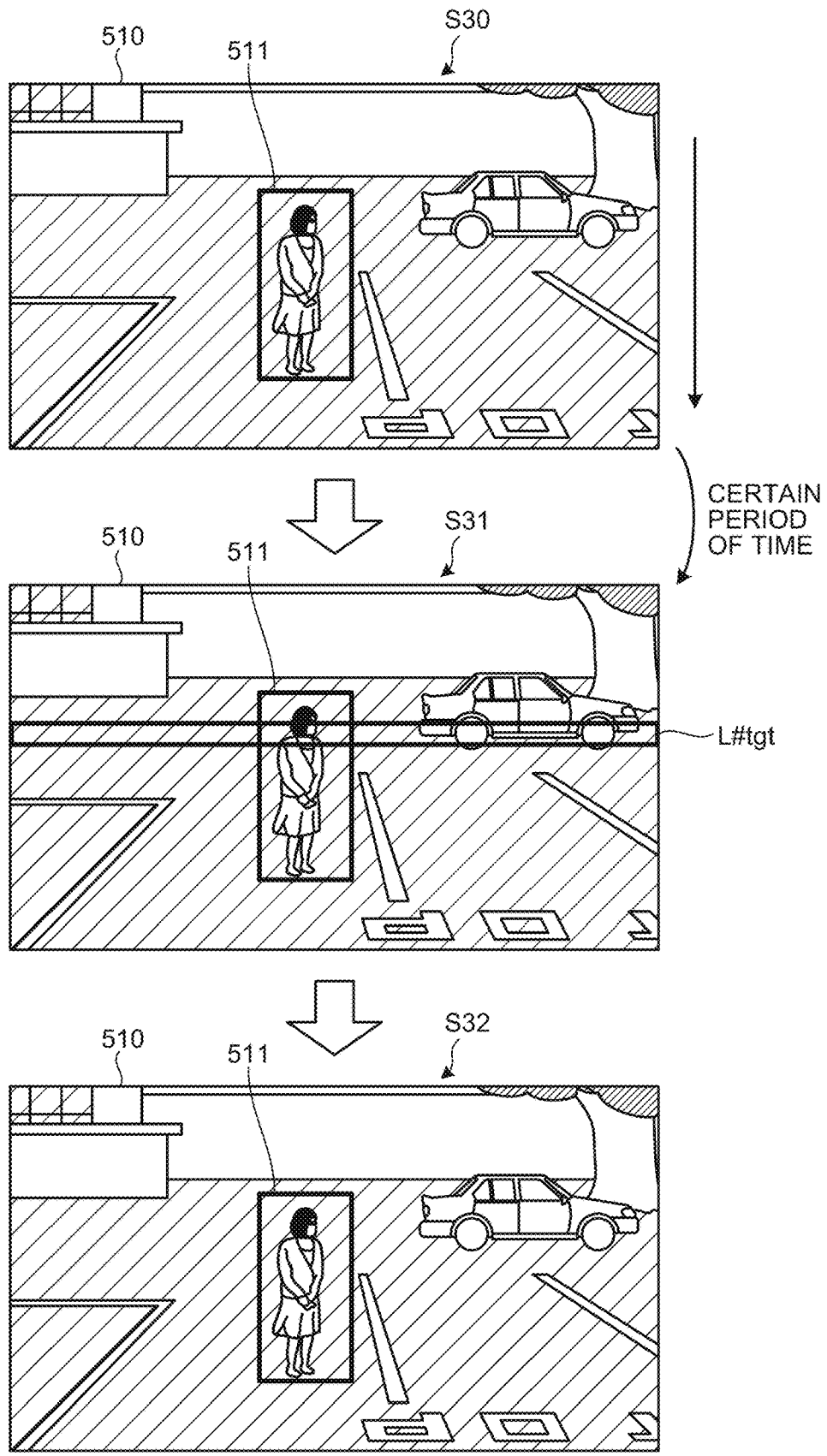
FIG. 73 is a diagram illustrating a third example of control of an image data storage unit according to the fourth embodiment.

As a third example of control of the image data storage unit 141, the line data passed from the readout unit 110 will not be stored in the image data storage unit 141. The third example of control regarding the image data storage unit 141 according to the fourth embodiment will be described with reference to FIG. 73. In FIG. 73, Step S30 illustrates a state in which all the pixel data included in a frame 510 has been read out in the frame 510 including a region 511 in which a person has been recognized.

In the next Step S31, the recognition processing unit 12 reads out the frame by the readout unit 110 after passage of a certain period of time from Step S30, and determines whether there is a change in the recognition result in the region 511 recognized in Step S30. In this example, the recognition processing unit 12 makes a determination by executing a recognition process on a part of the region 511 (line L #tgt in this example) in which a person has been recognized. For example, the recognition processing unit 12 can determine that there is no change in the recognition result when the amount of change of the recognition score of the portion on which the recognition process has been executed in Step S31 with respect to the state of Step S30 is a threshold or less. In a case where the recognition processing unit 12 has determined that there is no change in the recognition result, the recognition processing unit 12 will not store the line data read out in Step S31 in the image data storage unit 141.

For example, when only the swinging of the human hair included in the region 511 is recognized and there is no positional change in the person, the recognition score can be lower than the threshold, and the recognition result might be no change. In this case, the consistency of the image data can be maintained from the viewpoint of visibility without storing the pixel data read out in Step S31. In this manner, by suppressing the storage of read out pixel data when there is no change in the recognition result even with a change in the image, it is possible to save the capacity of the image data storage unit 141.

[7-1. First Modification of Fourth Embodiment]

Next, a first modification of the fourth embodiment will be described. The first modification of the fourth embodiment is an example of masking a region where a specific object is recognized or is predicted to be recognized at the time of outputting an image obtained by readout of a frame.

Figure 74:
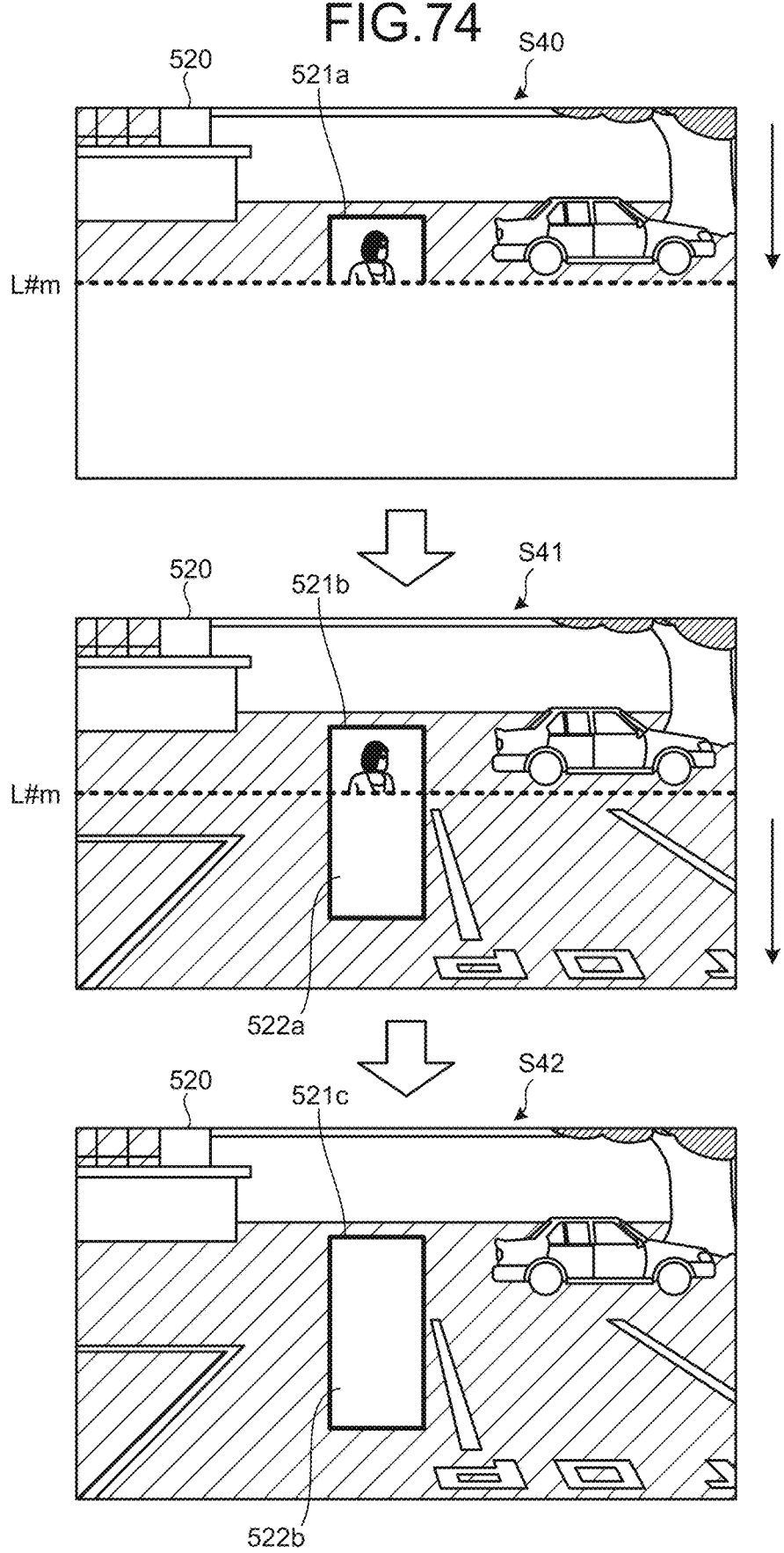
FIG. 74 is a diagram illustrating a first modification of the fourth embodiment.

The first modification of the fourth embodiment will be described with reference to FIG. 74. In FIG. 74, at a point where the recognition processing unit 12 has read out the line data from the upper end of a frame 520 to the position of line L #m in Step S41, the recognition processing unit 12 has recognized a part of the specific object (person in this example) in a region 521a. The visual recognition processing unit 14 outputs an image based on the line data up to the line L #m. Alternatively, the visual recognition processing unit 14 stores the line data up to the line L #m in the image data storage unit 141.

Here, at a point where the recognition processing unit 12 has recognized a part of the specific object, the entire recognition processing unit 12 can predict the entire of the specific object (illustrated as a region 521b in Step S42). The recognition processing unit 12 passes the recognition information including the information regarding the region 521b in which a specific object is recognized and predicted, to the visual recognition processing unit 14. In addition, the recognition processing unit 12 terminates the recognition process at the position of the line L #m where the specific object is recognized.

The visual recognition processing unit 14 continues to read out the line data from the frame 520 even after the line L #m, outputs an image based on the read line data, or stores the read line data in the image data storage unit 141. At this time, the visual recognition processing unit 14 masks the portion read out after the line L #m in the region 521b predicted to include a specific object (Step S42). For example, in the visual recognition processing unit 14, the image processing unit 143 outputs the image with the mask applied to a part of this region 521b. Not limited to this, the image processing unit 143 may store a frame image with a mask applied to a part of the region 521b in the image data storage unit 141. Alternatively, the visual recognition processing unit 14 may suppress readout of the pixel data after the line L #m in the region 521b.

Furthermore, the visual recognition processing unit 14 may mask all of the region 521b predicted to include a specific object, as illustrated in Step S43. In this case, the target to be masked is the pixel data to be output by the visual recognition processing unit 14, and the pixel data used by the recognition processing unit 12 for the recognition process is not to be masked, for example.

The above is an example in which the region 521b in which the specific object is recognized is masked and images of the other portions are output, for example, within the frame 520. The present disclosure is not limited to this example, and it is allowable to have a method in which portions other than the region 521b are masked while images within the region 521b are output, for example.

By masking the region 521b in which a specific object is recognized in the image for visual recognition in this manner, it is possible to protect privacy. For example, in a case where the imaging apparatus 1 according to the first modification of the fourth embodiment is applied to a road surveillance camera, a drive recorder, an on-drone device, or the like, it is possible erase personal information alone from the captured image data (for example, the same image data) to make the image into a format that is easy to handle. Examples of specific objects to be masked in such applications include people, faces, vehicles, vehicle numbers, or the like.

[7-2. Second Modification of Fourth Embodiment]

Next, a second modification of the fourth embodiment will be described. The second modification of the fourth embodiment is an example for a case where an integrated display using both an output of a sensor that performs object detection or the like by another method and an image output by the imaging apparatus 1, and in which a region suitable for the display in the frame is read out with higher priority.

The second modification of the fourth embodiment will be described with reference to FIG. 75. Here, a LiDAR type sensor (hereinafter referred to as a LiDAR sensor) is applied as another type of sensor. Not limited to this, radar or the like can be applied as the sensor of another type. Although not illustrated, it is assumed that the imaging apparatus 1 according to the second modification of the fourth embodiment inputs the detection result from the sensor of the other type, instead of the recognition information from the recognition process execution unit 124, to the readout determiner 142a.

In FIG. 75, Section (a) illustrates an example of an image 530 acquired by a LiDAR sensor. In this Section (a), it is assumed that a region 531 is an image acquired within a predetermined distance range (for example, 10 [m] to several tens of [m]) from the LiDAR sensor.

In FIG. 75, Section (b) illustrates an example of a frame 540 imaged by the imaging apparatus 1 according to the second modification of the fourth embodiment. In this frame 540, a hatched region 541 corresponds to the region 531 in Section (a) and includes objects such as existence within a predetermined distance from the imaging apparatus 1. In contrast, a region 542 is a region in which an image is taken beyond a predetermined distance from the imaging apparatus 1, and includes a sky or a distant landscape, or the like.

In Section (a) of FIG. 75, the region 531 corresponding to the predetermined distance range from the LiDAR sensor and the imaging apparatus 1 is considered to be a region where the objects are dense and suitable for display. In contrast, the part other than the region 531 is considered to be a region where the objects are sparse and there is little need to perform intensive display. Accordingly, in the visual recognition processing unit 14, the readout determiner 142a executes readout of the frame 540 onto the region 541 corresponding to the region 531 with higher priority, out of the regions 541 and 542. For example, the readout determiner 142a executes readout of the region 541 at a high resolution without thinning. In contrast, the readout determiner 142a reads out the region 542 at a low resolution with thinning, for example, or would not perform readout at all.

In this manner, the imaging apparatus 1 according to the second modification of the fourth embodiment can set the frame readout resolution in accordance with the detection result obtained by the sensor of another method, and thereby can optimize the readout of the frame 540.

[7-3. Third Modification of Fourth Embodiment]

Next, a third modification of the fourth embodiment will be described. The third modification of the fourth embodiment is an example in which the recognition processing unit 12 and the visual recognition processing unit 14 adaptively read out the frame. In a first example of the third modification of the fourth embodiment, the readout of the region where the specific object is recognized is to be performed with higher priority, and then readout of the unprocessed region will be performed. At this time, the readout of the unprocessed region is performed by a low-resolution readout method such as readout with thinning.

Figure 76:
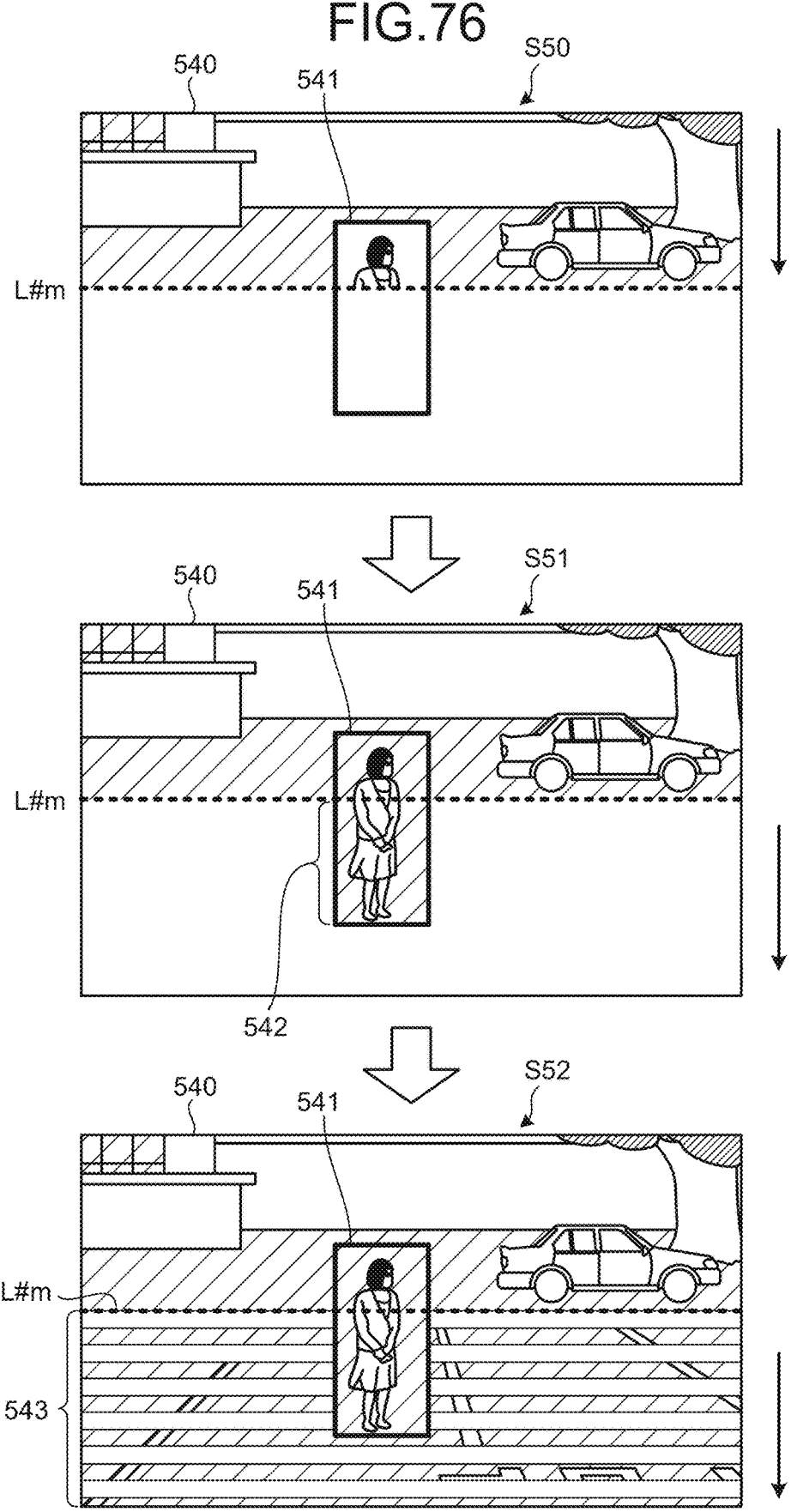
FIG. 76 is a diagram illustrating a first example in a third modification of the fourth embodiment.

The first example in the third modification of the fourth embodiment will be described with reference to FIG. 76. In FIG. 76, the recognition processing unit 12 has recognized a specific object (person in this example) in a region 541 at a point where the readout of the line data is performed from the upper end of the frame 540 to the position of the line L #m in Step S50. The visual recognition processing unit 14 outputs an image based on the line data up to the line L #m. Alternatively, the visual recognition processing unit 14 stores the line data up to the line L #m in the image data storage unit 141.

In Step S50 of FIG. 76, similarly to Step S40 of FIG. 74 described above, at a point where the recognition processing unit 12 has recognized a part of a specific object (region up to line L #m), the recognition processing unit 12 has predicted the entire region 541 of the specific object.

In the next Step S51, the recognition processing unit 12 performs readout, with higher priority, of the region 541 recognized in Step S50 in the portion below the line L #m of the frame 540. The recognition processing unit 12 can execute a more detailed recognition process based on the pixel data read out from the region 541. Having recognized the specific object in the region 541, the recognition processing unit 12 terminates the recognition process. Furthermore, the visual recognition processing unit 14 outputs an image based on the pixel data of the region 541. Alternatively, the visual recognition processing unit 14 stores the pixel data of the region 541 in the image data storage unit 141.

In the next Step S52, the visual recognition processing unit 14 reads out the region after the line L #m of the frame 540. At this time, the visual recognition processing unit 14 can read out the region after the line L #m at a lower resolution than in the readout before the line L #m. In the example of FIG. 76, the visual recognition processing unit 14 reads out the lines L #m and subsequent portions by using readout with thinning. The visual recognition processing unit 14 can perform this readout on portions except for the portion of the region 541, for example.

The visual recognition processing unit 14 outputs an image based on the line data after the line L #m of the frame 540 read out by the readout with thinning. In this case, in the visual recognition processing unit 14, the image processing unit 143 can output the line data in which the thinned lines are interpolated by other lines. Alternatively, the visual recognition processing unit 14 stores the line data after the line L #m in the image data storage unit 141.

In this manner, in the first example of the third modification of the fourth embodiment, after the recognition processing unit 12 has recognized a specific object, the unprocessed region is read out by the visual recognition processing unit 14 at a low resolution. Therefore, it is possible to perform a recognition process with higher accuracy on a specific object, while enabling output of an entire frame image at a higher speed.

Next, a second example of the third modification of the fourth embodiment will be described. In this second example, the readout conditions are varied between the recognition process and the visual recognition process. As an example, at least one of the exposure time or the analog gain is set to have difference between the recognition process and the visual process. As a specific example, the recognition processing unit 12 performs frame readout by imaging with the maximized analog gain. In contrast, the visual recognition processing unit 14 performs frame readout by imaging with an appropriately set exposure time.

At this time, the frame readout by the recognition processing unit 12 and the frame readout by the visual recognition processing unit 14 can be alternately executed for each of frames. Not limited to this, frame readout by the recognition processing unit 12 and frame readout by the visual recognition processing unit 14 can be alternately executed for each unit of readout (for example, line). This makes it possible to execute the recognition process and the visual recognition process under appropriate conditions individually.

8. FIFTH EMBODIMENT

Figure 77:
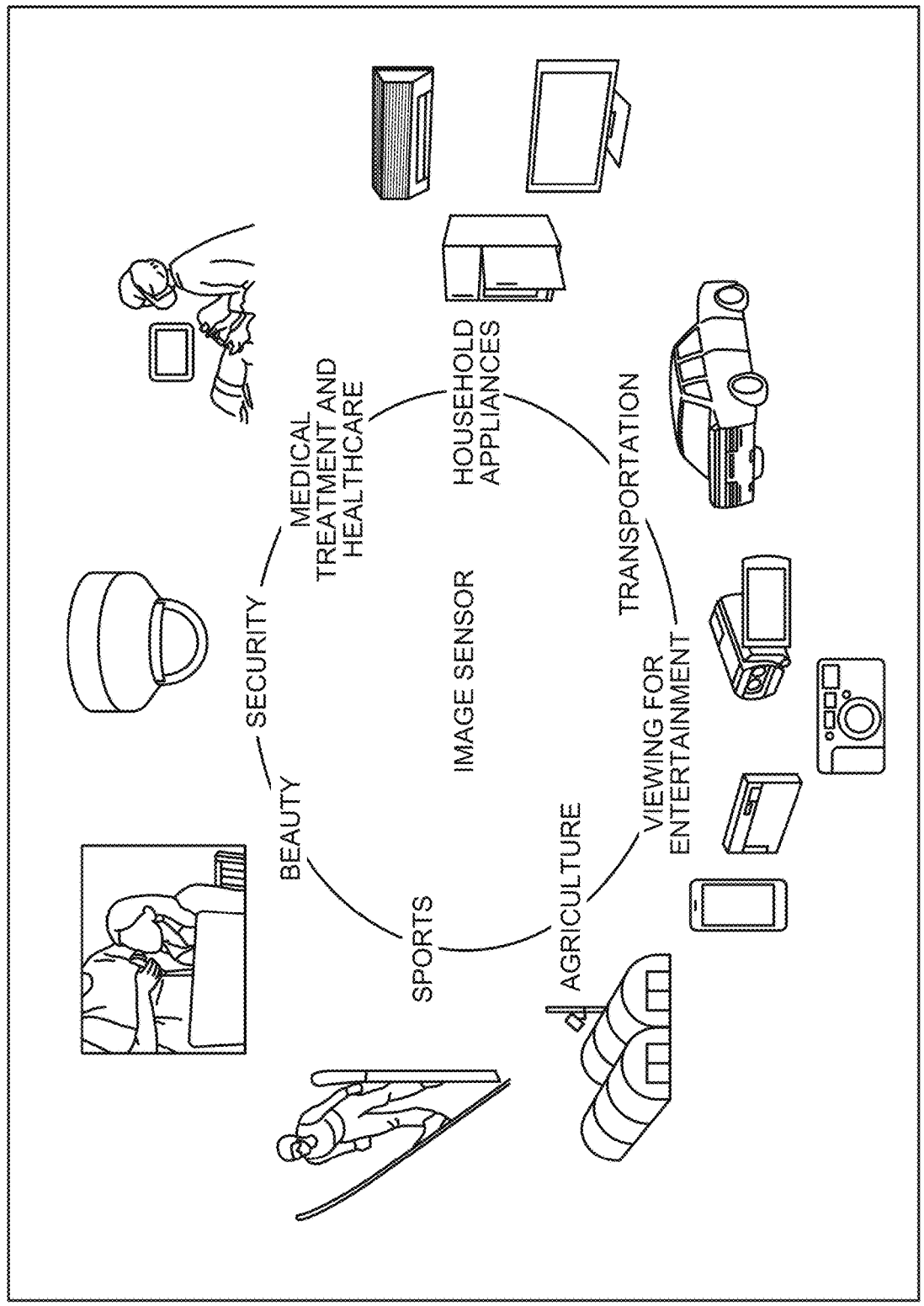
FIG. 77 is a diagram illustrating a usage example of an imaging apparatus to which the technique of the present disclosure is applied.

Next, as a fifth embodiment, application examples of the imaging apparatus 1 according to the first to fourth embodiments and individual modifications according to the present disclosure will be described. FIG. 77 is a diagram illustrating an example of using the imaging apparatus 1 according to the first to fourth embodiments and individual modifications described above.

The imaging apparatus 1 described above is applicable to the following various situations in which sensing is performed for light including visual light, infrared light, ultraviolet light, and X-ray.

- A device that captures images used for viewing for entertainment, such as digital cameras and mobile devices with a camera function.
- A device for transportation, such as an in-vehicle sensor that images a front, back, surroundings, interior, or the like, of a vehicle in order to ensure safe driving including automatic stop or the like, and to recognize driver's states, a surveillance camera to monitor traveling vehicles and roads, and a range-finding sensor to perform measurement of a distance between vehicles, or the like.
- A device for household appliances including a TV, a refrigerator, an air conditioner, or the like to image user's gesture and perform operation of the apparatus according to the gesture.
- A device used for medical treatment and healthcare, such as endoscopes and devices that perform angiography by receiving infrared light.
- A device used for security, such as surveillance cameras for crime prevention and cameras for personal authentication.
- A device used for beauty, such as a skin measuring device that images the skin and a microscope that images the scalp.
- A device used for sports, such as action cameras and wearable cameras for sports applications.
- A device used for agriculture, such as cameras for monitoring the conditions of fields and crops.

Further Application Example of Technology According to the Present Disclosure

The technology according to the present disclosure (the present technology) is applicable to various products. For example, the technology according to the present disclosure may be applied to devices mounted on various moving objects such as automobiles, electric vehicles, hybrid electric vehicles, motorcycles, bicycles, personal mobility, airplanes, drones, ships, and robots.

Figure 78:
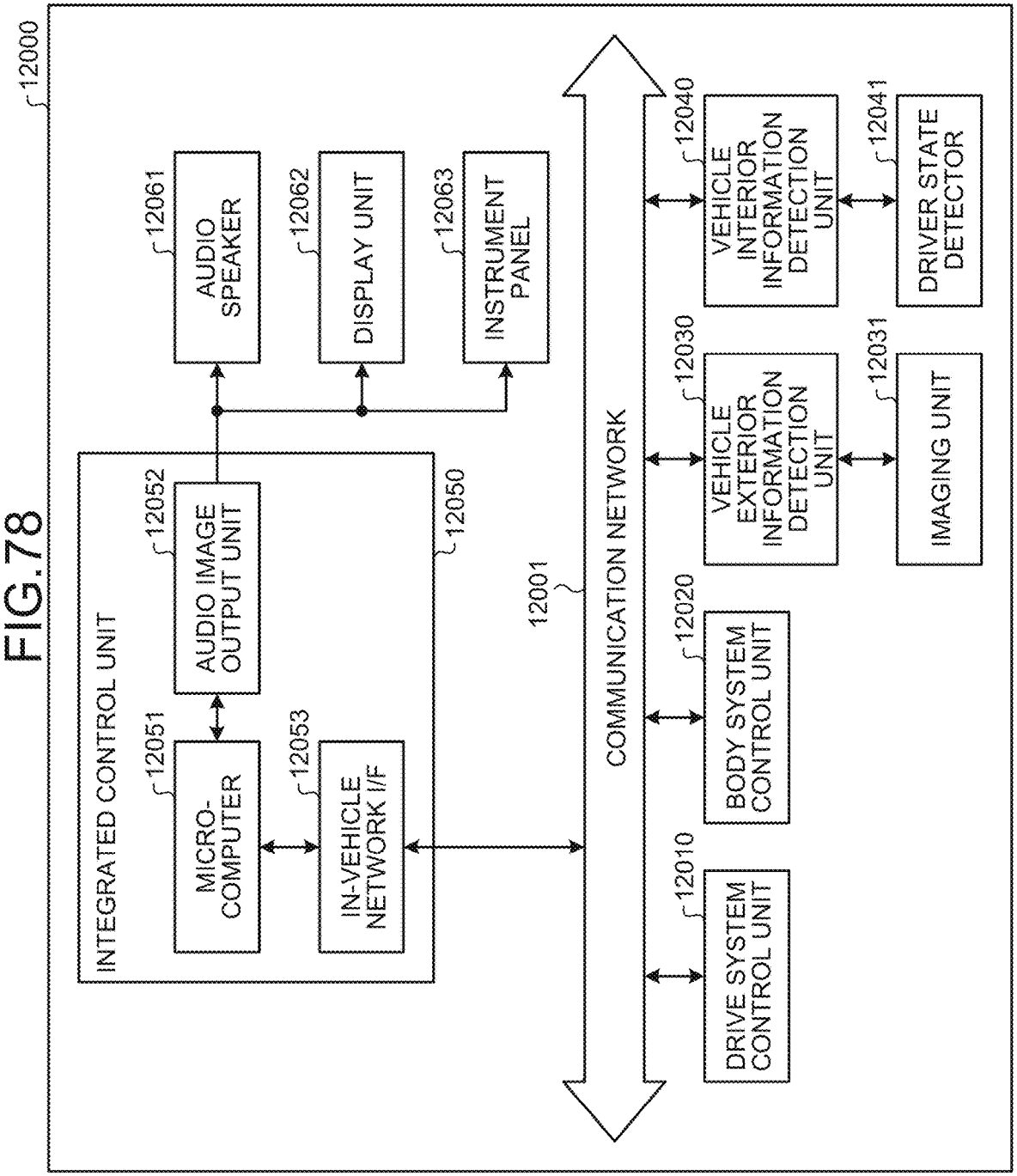
FIG. 78 is a block diagram illustrating an example of a schematic configuration of a vehicle control system.

FIG. 78 is a block diagram illustrating a schematic configuration example of a vehicle control system, which is an example of a mobile control system to which the technique according to the present disclosure is applicable.

A vehicle control system 12000 includes a plurality of electronic control units connected via a communication network 12001. In the example illustrated in FIG. 78, the vehicle control system 12000 includes a drive system control unit 12010, a body system control unit 12020, a vehicle exterior information detection unit 12030, a vehicle interior information detection unit 12040, and an integrated control unit 12050. Furthermore, as a functional configuration of the integrated control unit 12050, a microcomputer 12051, an audio image output unit 12052, and an in-vehicle network interface (I/F) 12053 are illustrated.

The drive system control unit 12010 controls operation of the apparatus related to the drive system of the vehicle in accordance with various programs. For example, the drive system control unit 12010 functions as a control apparatus of a driving force generation apparatus that generates a driving force of a vehicle such as an internal combustion engine or a driving motor, a driving force transmission mechanism that transmits a driving force to the wheels, a steering mechanism that adjusts steering angle of the vehicle, a braking apparatus that generates a braking force of the vehicle, or the like.

The body system control unit 12020 controls the operation of various devices mounted on the vehicle body in accordance with various programs. For example, the body system control unit 12020 functions as a control apparatus for a keyless entry system, a smart key system, a power window device, or various lamps such as a head lamp, a back lamp, a brake lamp, a turn signal lamp, or a fog lamp. In this case, the body system control unit 12020 can receive input of radio waves transmitted from a portable device that substitutes for the key or signals from various switches. The body system control unit 12020 receives the input of these radio waves or signals and controls the door lock device, the power window device, the lamp, or the like, of the vehicle.

The vehicle exterior information detection unit 12030 detects information outside the vehicle equipped with the vehicle control system 12000. For example, an imaging unit 12031 is connected to the vehicle exterior information detection unit 12030. The vehicle exterior information detection unit 12030 causes the imaging unit 12031 to capture an image of the exterior of the vehicle and receives the captured image. The vehicle exterior information detection unit 12030 may perform an object detection process or a distance detection process of people, vehicles, obstacles, signs, or characters on the road surface based on the received image. The vehicle exterior information detection unit 12030 performs image processing on the received image, for example, and performs an object detection process and a distance detection process based on the result of the image processing.

The imaging unit 12031 is an optical sensor that receives light and outputs an electrical signal corresponding to the amount of received light. The imaging unit 12031 can output the electric signal as an image and also as distance measurement information. The light received by the imaging unit 12031 may be visible light or invisible light such as infrared light.

The vehicle interior information detection unit 12040 detects vehicle interior information. The vehicle interior information detection unit 12040 is connected to a driver state detector 12041 that detects the state of the driver, for example. The driver state detector 12041 may include a camera that images the driver, for example. The vehicle interior information detection unit 12040 may calculate the degree of fatigue or degree of concentration of the driver or may determine whether the driver is dozing off on the basis of the detection information input from the driver state detector 12041.

The microcomputer 12051 can calculate a control target value of the driving force generation apparatus, the steering mechanism, or the braking apparatus on the basis of vehicle external/internal information obtained by the vehicle exterior information detection unit 12030 or the vehicle interior information detection unit 12040, and can output a control command to the drive system control unit 12010. For example, the microcomputer 12051 can perform cooperative control for the purpose of achieving a function of an advanced driver assistance system (ADAS) including collision avoidance or impact mitigation of vehicles, follow-up running based on an inter-vehicle distance, cruise control, vehicle collision warning, vehicle lane departure warning, or the like.

Furthermore, it is allowable such that the microcomputer 12051 controls the driving force generation apparatus, the steering mechanism, the braking apparatus, or the like, on the basis of the information regarding the surroundings of the vehicle obtained by the vehicle exterior information detection unit 12030 or the vehicle interior information detection unit 12040, thereby performing cooperative control for the purpose of autonomous driving or the like, in which the vehicle performs autonomous traveling without depending on the operation of the driver.

Furthermore, the microcomputer 12051 can output a control command to the body system control unit 12020 based on the vehicle exterior information acquired by the vehicle exterior information detection unit 12030. For example, the microcomputer 12051 can control the head lamp in accordance with the position of the preceding vehicle or the oncoming vehicle sensed by the vehicle exterior information detection unit 12030, and thereby can perform cooperative control aiming at antiglare such as switching the high beam to low beam.

The audio image output unit 12052 transmits an output signal in the form of at least one of audio or image to an output apparatus capable of visually or audibly notifying the occupant of the vehicle or the outside of the vehicle of information. In the example of FIG. 78, an audio speaker 12061, a display unit 12062, and an instrument panel 12063 are illustrated as exemplary output apparatuses. The display unit 12062 may include at least one of an on-board display or a head-up display, for example.

Figure 79:
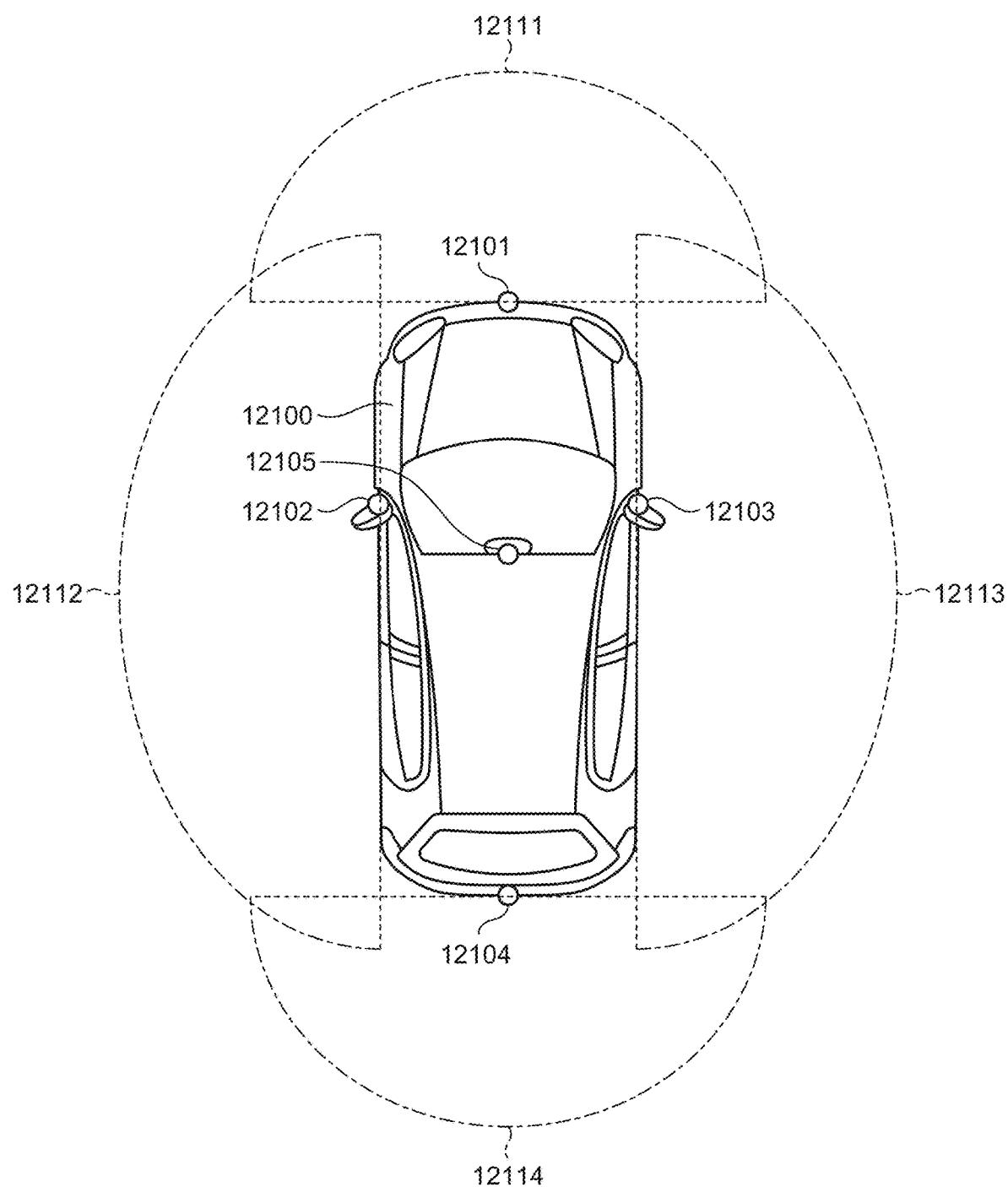
FIG. 79 is a view illustrating an example of installation positions of a vehicle exterior information detection unit and an imaging unit.

FIG. 79 is a view illustrating an example of an installation position of the imaging unit 12031. In FIG. 79, a vehicle 12100 has imaging units 12101, 12102, 12103, 12104, and 12105 as imaging units 12031.

For example, the imaging units 12101, 12102, 12103, 12104, and 12105 are installed at positions on a vehicle 12100, including a nose, a side mirror, a rear bumper, a back door, an upper portion of the windshield in a vehicle interior, or the like. The imaging unit 12101 provided on the front nose and the imaging unit 12105 provided on the upper portion of the windshield in the vehicle interior mainly acquire an image in front of the vehicle 12100. The imaging units 12102 and 12103 provided in the side mirrors mainly acquire images of the side of the vehicle 12100. The imaging unit 12104 provided in the rear bumper or the back door mainly acquires an image behind the vehicle 12100. The front view images acquired by the imaging units 12101 and 12105 are mainly used for detecting a preceding vehicle or a pedestrian, an obstacle, a traffic light, a traffic sign, a lane, or the like.

Note that FIG. 79 illustrates an example of the imaging range of the imaging units 12101 to 12104. An imaging range 12111 indicates an imaging range of the imaging unit 12101 provided on the front nose, imaging ranges 12112 and 12113 indicate imaging ranges of the imaging units 12102 and 12103 provided on the side mirrors, respectively, and an imaging range 12114 indicates an imaging range of the imaging unit 12104 provided on the rear bumper or the back door. For example, by superimposing pieces of image data captured by the imaging units 12101 to 12104, it is possible to obtain a bird's-eye view image of the vehicle 12100 as viewed from above.

At least one of the imaging units 12101 to 12104 may have a function of acquiring distance information. For example, at least one of the imaging units 12101 to 12104 may be a stereo camera including a plurality of imaging elements, or an imaging element having pixels for phase difference detection.

For example, the microcomputer 12051 can calculate a distance to each of three-dimensional objects in the imaging ranges 12111 to 12114 and a temporal change (relative speed with respect to the vehicle 12100) of the distance based on the distance information obtained from the imaging units 12101 to 12104, and thereby can extract a three-dimensional object traveling at a predetermined speed (for example, 0 km/h or more) in substantially the same direction as the vehicle 12100 being the closest three-dimensional object on the traveling path of the vehicle 12100, as a preceding vehicle. Furthermore, the microcomputer 12051 can set an inter-vehicle distance to be ensured in front of the preceding vehicle in advance, and can perform automatic brake control (including follow-up stop control), automatic acceleration control (including follow-up start control), or the like. In this manner, it is possible to perform cooperative control for the purpose of autonomous driving or the like, in which the vehicle autonomously travels without depending on the operation of the driver.

For example, based on the distance information obtained from the imaging units 12101 to 12104, the microcomputer 12051 can extract three-dimensional object data regarding the three-dimensional object with classification into three-dimensional objects, such as a two-wheeled vehicle, a regular vehicle, a large vehicle, a pedestrian, and other three-dimensional objects such as a utility pole, and can use the data for automatic avoidance of obstacles. For example, the microcomputer 12051 distinguishes obstacles around the vehicle 12100 into obstacles having high visibility to the driver of the vehicle 12100 and obstacles having low visibility to the driver. Subsequently, the microcomputer 12051 determines a collision risk indicating the risk of collision with each of obstacles. When the collision risk is a set value or more and there is a possibility of collision, the microcomputer 12051 can output an alarm to the driver via the audio speaker 12061 and the display unit 12062, and can perform forced deceleration and avoidance steering via the drive system control unit 12010, thereby achieving driving assistance for collision avoidance.

At least one of the imaging units 12101 to 12104 may be an infrared camera that detects infrared rays. For example, the microcomputer 12051 can recognize a pedestrian by determining whether a pedestrian is present in the captured images of the imaging units 12101 to 12104. Such pedestrian recognition is performed, for example, by a procedure of extracting feature points in a captured image of the imaging units 12101 to 12104 as an infrared camera, and by a procedure of performing pattern matching processing on a series of feature points indicating the contour of the object to discriminate whether it is a pedestrian. When the microcomputer 12051 determines that a pedestrian is present in the captured images of the imaging units 12101 to 12104 and recognizes a pedestrian, the audio image output unit 12052 causes the display unit 12062 to perform superimposing display of a rectangular contour line for emphasis to the recognized pedestrian. Furthermore, the audio image output unit 12052 may cause the display unit 12062 to display an icon indicating a pedestrian or the like at a desired position.

Hereinabove, an example of the vehicle control system to which the technology according to the present disclosure is applicable has been described. The technology according to the present disclosure is applicable to the imaging unit 12031, for example, among the configurations described above. With application of the imaging apparatus 1 according to the present disclosure to the imaging unit 12031, it is possible to execute recognition of pedestrians, obstacles, or the like at higher speed, and possible to save power.

The effects described in the present specification are merely examples, and thus, there may be other effects, not limited to the exemplified effects.

Note that the present technology can also have the following configurations.

(1) An imaging apparatus comprising:
an imaging unit having a pixel region in which a plurality of pixels is arranged;
a readout controller that controls readout of pixel signals from pixels included in the pixel region;
a first unit-of-readout setting unit that sets a unit of readout as a part of the pixel region, for which the readout controller performs readout of the pixel signal;
an image output unit that outputs a first image based on the pixel signal read out from the unit of readout, to a subsequent stage;
a second unit-of-readout setting unit that sets the unit of readout in which the readout controller performs readout of the pixel signal; and
a recognition unit that learns training data for each of the units of readout, performs a recognition process on the pixel signal for each of the units of readout, and outputs a recognition result which is a result of the recognition process.

(2) The imaging apparatus according to (1),
wherein the first unit-of-readout setting unit determines the unit of readout in accordance with the recognition result.

(3) The imaging apparatus according to (1) or (2),
wherein the first unit-of-readout setting unit executes an output of the first image by the image output unit at a timing different from a timing of an output of a second image based on the pixel signal for the recognition unit to perform the recognition process.

(4) The imaging apparatus according to any one of (1) to (3),
wherein the first unit-of-readout setting unit does not set the unit of readout in a region within a frame image in which a specific object has been recognized by the recognition unit.

(5) The imaging apparatus according to any one of (1) to (3),
wherein the image output unit
masks a region within a frame image in which a specific object has been recognized by the recognition unit.

(6) The imaging apparatus according to (4),
wherein the image output unit
masks a region that is read out after the recognition, out of the regions within a frame image in which a specific object has been recognized by the recognition unit.

(7) The imaging apparatus according to any one of (1) to (6),
wherein the first unit-of-readout setting unit sets the unit of readout in accordance with a detection output of another sensor device.

(8) The imaging apparatus according to any one of (1) to (3),
wherein the first unit-of-readout setting unit sets the unit of readout with higher priority to a region within a frame image in which a specific object has been recognized by the recognition unit, compared to another region in the frame image.

(9) The imaging apparatus according to (8),
wherein the first unit-of-readout setting unit sets the unit of readout to the other region so that readout of the pixel signal is to be performed with resolution lower than resolution for the region within the frame image in which the specific object has been recognized.

(10) The imaging apparatus according to (8) or (9),
wherein the first unit-of-readout setting unit sets the unit of readout to the other region after completion of the readout of the region within the frame image in which the specific object has been recognized.

(11) The imaging apparatus according to any one of (1) to (10),
wherein the first unit-of-readout setting unit sets, to the unit of readout, an imaging condition different from an imaging condition set for the unit of readout by the second unit-of-readout setting unit.

(12) The imaging apparatus according to any one of (1) to (11), further comprising
a storage controller that controls storage of the pixel signal read out from the unit of readout in the storage unit,
wherein the storage controller controls storage of the pixel signal onto the storage unit based on at least one of the pixel signal or the recognition result of the recognition unit.

(13) The imaging apparatus according to (12),
wherein, in a case where a change amount of a second recognition result of the recognition unit after passage of a predetermined time from a first recognition result of the recognition unit, with respect to the first recognition result, is a threshold or less,
the storage controller will not perform storage of the pixel signal read out corresponding to the second recognition result, onto the storage unit.

(14) The imaging apparatus according to (12) or (13),
wherein the storage controller
stores the pixel signal onto the storage unit in a case where the pixel signal by the unit for the image output unit to output the first image to the subsequent stage is not stored in the storage unit.

(15) The imaging apparatus according to any one of (12) to (14),
wherein the storage controller
discards the pixel signal stored in the storage unit in a case where it is determined that there is a change in a scene as an imaging target based on the pixel signal read out by the readout controller.
(16) The imaging apparatus according to any one of (1) to (15),
wherein, in a case where a unit of processing of the first image is not in a unit of frame,
the image output unit sequentially outputs the first image in accordance with the pixel signal read out from the unit of readout.
(17) An imaging system comprising:
an imaging apparatus equipped with
an imaging unit having a pixel region in which a plurality of pixels is arranged,
a readout controller that controls readout of pixel signals from pixels included in the pixel region,
a first unit-of-readout setting unit that sets a unit of readout as a part of the pixel region, for which the readout controller performs readout of the pixel signal,
an image output unit that outputs a first image based on the pixel signal read out from the unit of readout to a subsequent stage, and
a second unit-of-readout controller that sets the unit of readout in which the readout controller performs readout of the pixel signal; and
an information processing apparatus equipped with a recognition unit that learns training data for each of the units of readout, performs a recognition process on the pixel signal for each of the units of readout, and outputs a recognition result which is a result of the recognition process.
(18) An imaging method executed by a processor, comprising:
a readout control step of controlling readout of pixel signals from pixels included in the pixel region in which a plurality of pixels is arranged, included in an imaging unit;
a first unit-of-readout setting step of setting a unit of readout as a part of the pixel region, for which the readout control step performs readout of the pixel signal;
an image output step of outputting a first image based on the pixel signal read out from the unit of readout to a subsequent stage;
a second unit-of-readout control step of controlling the unit of readout in which the readout control step performs readout of the pixel signal; and
a recognition step of learning training data for each of the units of readout, performing a recognition process on the pixel signal for each of the units of readout, and outputting a recognition result which is a result of the recognition process.
(19) An imaging program causing a processor to execute:
a readout control step of controlling readout of pixel signals from pixels included in the pixel region in which a plurality of pixels is arranged, included in an imaging unit;
a first unit-of-readout setting step of setting a unit of readout as a part of the pixel region, for which the readout control step performs readout of the pixel signal;
an image output step of outputting a first image based on the pixel signal read out from the unit of readout to a subsequent stage;
a unit-of-readout control step of controlling the unit of readout in which the readout control step performs readout of the pixel signal; and
a recognition step of learning training data for each of the units of readout, performing a recognition process on the pixel signal for each of the units of readout, and outputting a recognition result which is a result of the recognition process.

Furthermore, the present technology can also have the following configurations.
(20)
An electronic apparatus including:
an imaging unit that generates image data;
a machine learning unit that executes a machine learning process using a learning model on image data for each of unit regions read out from the imaging unit; and
a function execution unit that executes a predetermined function based on a result of the machine learning process.
(21)
The electronic apparatus according to (20),
in which the machine learning unit executes a machine learning process using a Convolution Neural Network (CNN) on the image data of the unit region first input among the image data of a same frame.
(22)
The electronic apparatus according to (21),
in which, in a case where the machine learning process using the CNN for the image data with the first input unit region has failed, the machine learning unit executes a machine learning process using a recurrent neural network (RNN) on next input image data with the unit region in the same frame.
(23)
The electronic apparatus according to any of (20) to (22), further including
a control part that reads out image data from the imaging unit in units of line,
in which the image data is input to the machine learning unit in the unit of line.
(24)
The electronic apparatus according to any of (20) to (23),
in which the image data in the unit region is image data having a predetermined number of lines.
(25)
The electronic apparatus according to any of (20) to (23),
in which the image data in the unit region is image data in a rectangular region.
(26)
The electronic apparatus according to any of (20) to (25), further including
a memory that records a program of the learning model,
in which the machine learning unit executes the machine learning process performed by reading out the program from the memory and executing the program.

REFERENCE SIGNS LIST

1 IMAGING APPARATUS
10 SENSOR UNIT
11 SENSOR CONTROLLER
12 RECOGNITION PROCESSING UNIT
14 VISUAL RECOGNITION PROCESSING UNIT
110 READOUT UNIT
111 READOUT CONTROLLER
120 FEATURE DATA CALCULATION UNIT
121 FEATURE DATA STORAGE CONTROLLER
122 FEATURE DATA STORAGE UNIT
123, 123a, 123b, 123c, 123d, 123e, 123f, 142, 142a READOUT DETERMINER
124 RECOGNITION PROCESS EXECUTION UNIT

140 IMAGE DATA STORAGE CONTROLLER
141 IMAGE DATA STORAGE UNIT
143 IMAGE PROCESSING UNIT
300 UNIT-OF-READOUT PATTERN SELECTION UNIT
301 UNIT-OF-READOUT PATTERN DB
302 READOUT ORDER PATTERN SELECTION UNIT
303 READOUT ORDER PATTERN DB
304 READOUT DETERMINATION PROCESSING UNIT
1230, 1230', 2010 READOUT REGION DETERMINER
1231, 1231', 2011 EXPOSURE TIME DETERMINER
1232, 1232', 2012 AG AMOUNT DETERMINER
2000 RESOURCE ADJUSTMENT UNIT
2013 DRIVE SPEED DETERMINER
2020 PRIORITY MODE INSTRUCTION UNIT

The invention claimed is:

1. An imaging apparatus comprising:
a sensor having a pixel region in which a plurality of pixels is arranged;
readout control circuitry configured to control readout of pixel signals from pixels included in the pixel region;
first readout setting circuitry configured to set a first unit of readout as a part of the pixel region and output the first unit of readout to the readout control circuitry to sequentially readout the pixel signal corresponding to a frame image using the first unit of readout;
image output circuitry configured to output a first image based on the pixel signal read out using the first unit of readout, to a subsequent stage; and
second readout setting circuitry configured to set a second unit of readout and output the second unit of readout to the readout control circuitry to perform readout of the pixel signal using the second unit of readout; and
a recognition circuitry configured to
sequentially perform a recognition process on the pixel signal corresponding to the frame image for each of the first units of readout, and
output a recognition result which is a result of the recognition process,
wherein the first readout setting circuitry is configured to
set the first unit of readout in accordance with the recognition result,
set the first unit of readout in accordance with a detection output of another sensor device, or
not output the first unit of readout in a region within the frame image in which a specific object has been recognized by the recognition circuitry.

2. The imaging apparatus according to claim 1, wherein the first unit of readout is set in accordance with the recognition result.

3. The imaging apparatus according to claim 1, wherein the first readout setting circuitry is configured to execute an output of the first image by the image output circuitry at a timing different from a timing of an output of a second image based on the pixel signal for the recognition circuitry to perform the recognition process.

4. The imaging apparatus according to claim 1, wherein the first readout setting circuitry does not output the first unit of readout in a region within the frame image in which the specific object has been recognized by the recognition circuitry.

5. The imaging apparatus according to claim 1, wherein the image output circuitry is configured to mask a region within the frame image in which the specific object has been recognized by the recognition circuitry.

6. The imaging apparatus according to claim 4, wherein the image output circuitry is configured to mask a region that is read out after the recognition process, out of the regions within the frame image in which the specific object has been recognized by the recognition circuitry.

7. The imaging apparatus according to claim 1, wherein the first readout setting circuitry is configured to set the first unit of readout in accordance with a detection output of another sensor device.

8. The imaging apparatus according to claim 1, wherein the first readout setting circuitry is configured to set the first unit of readout with higher priority to a region within the frame image in which the specific object has been recognized by the recognition circuitry, compared to another region in the frame image.

9. The imaging apparatus according to claim 8, wherein the first readout setting circuitry is configured to set the first unit of readout to the other region so that readout of the pixel signal is to be performed with resolution lower than resolution for the region within the frame image in which the specific object has been recognized.

10. The imaging apparatus according to claim 8, wherein the second readout setting circuitry is configured to set the second unit of readout to the other region after completion of the readout of the region within the frame image in which the specific object has been recognized.

11. The imaging apparatus according to claim 1, wherein the first readout setting circuitry is configured to set, to the first unit of readout, an imaging condition different from an imaging condition set for the second unit of readout by the second readout setting circuitry.

12. The imaging apparatus according to claim 1, further comprising
a storage control circuitry configured to control storage of the pixel signal read out from the unit of readout in a memory,
wherein the storage control circuitry is configured to control storage of the pixel signal in the memory based on at least one of the pixel signal or the recognition result of the recognition circuitry.

13. The imaging apparatus according to claim 12, wherein, in a case where a change amount of a second recognition result of the recognition circuitry after passage of a predetermined time from a first recognition result of the recognition circuitry, with respect to the first recognition result, is a threshold or less,
the storage control circuitry is configured not to perform storage of the pixel signal read out corresponding to the second recognition result, in the memory.

14. The imaging apparatus according to claim 12,
wherein the storage control circuitry is configured to
store the pixel signal in the memory in a case where the pixel signal of the first image output to the subsequent stage is not stored in the memory.

15. The imaging apparatus according to claim 12,
wherein the storage control circuitry is configured to
discard the pixel signal stored in the memory in a case where it is determined that there is a change in a scene as an imaging target based on the pixel signal read out by the readout control circuitry.

16. The imaging apparatus according to claim 1,
wherein, in a case where a unit of processing of the first image is not a frame,
the image output circuitry sequentially outputs the first image in accordance with the pixel signal read out using the first unit of readout.

17. An imaging system comprising:
an imaging apparatus equipped with
a sensor having a pixel region in which a plurality of pixels is arranged,
readout control circuitry configured to control readout of pixel signals from pixels included in the pixel region,
first readout setting circuitry configured to set a first unit of readout as a part of the pixel region, and output the first unit of readout to the readout control circuitry to sequentially readout of the pixel signal corresponding to a frame image using the first unit of readout,
image output circuitry configured to output a first image based on the pixel signal read out from using the first unit of readout to a subsequent stage, and
second readout control circuitry configured to set a second unit of readout and output the second unit of readout to the readout control circuitry to readout of the pixel signal using the second unit of readout; and
recognition circuitry configured to
sequentially perform a recognition process on the pixel signal corresponding to the frame image for each of the first units of readout, and
output a recognition result which is a result of the recognition process,
wherein the first readout setting circuitry is configured to
set the first unit of readout in accordance with the recognition result,
set the first unit of readout in accordance with a detection output of another sensor device, or
not output the first unit of readout in a region within the frame image in which a specific object has been recognized by the recognition process.

18. An imaging method executed by a processor, comprising:
controlling readout of pixel signals from pixels included in a pixel region in which a plurality of pixels is arranged, included in a sensor;
first setting a first unit of readout as a part of the pixel region and sequentially readout of the pixel signal corresponding to a frame image in accordance with the first unit of readout;
outputting a first image based on the pixel signal read out from the first unit of readout to a subsequent stage;
second setting a second unit of readout and controlling readout of the pixel signal in accordance with the second unit of readout; and
sequentially performing a recognition process on the pixel signal corresponding to the frame image for of the first units of readout, and
outputting a recognition result which is a result of the recognition process,
wherein the first setting includes
setting the first unit of readout in accordance with the recognition result,
setting the first unit of readout in accordance with a detection output of another sensor device, or
not outputting the first unit of readout in a region within the frame image in which a specific object has been recognized by the recognition process.

19. A non-transitory computer readable storage device having an imaging program stored therein that when executed by a processor causes the processor to execute:
controlling readout of pixel signals from pixels included in a pixel region in which a plurality of pixels is arranged, included in a sensor;
first setting a first unit of readout as a part of the pixel region;
sequentially reading out the pixel signal corresponding to a frame image in accordance with the first unit of readout;
outputting a first image based on the pixel signal read out from the first unit of readout to a subsequent stage;
second setting a second unit of readout;
reading out the pixel signal in accordance with the second unit of readout; and
sequentially performing a recognition process on the pixel signal corresponding to the frame image for of the first units of readout, and
outputting a recognition result which is a result of the recognition process,
wherein the first setting includes
setting the first unit of readout in accordance with the recognition result,
setting the first unit of readout in accordance with a detection output of another sensor device, or
not outputting the first unit of readout in a region within the frame image in which a specific object has been recognized by the recognition process.

* * * * *